United States Patent
Yap et al.

(10) Patent No.: US 12,399,416 B2
(45) Date of Patent: Aug. 26, 2025

(54) OPTICAL WAVEGUIDE STRUCTURE WITH PARTIALLY OVERLAPPING LOOPS IN DIRECTION DEPENDENT MATERIAL

(71) Applicant: The Boeing Company, Chicago, IL (US)

(72) Inventors: Daniel Yap, Malibu, CA (US); Thaddeus Ladd, Woodland Hills, CA (US); Brett Yurash, Venice, CA (US)

(73) Assignee: The Boeing Company, Chicago, IL (US)

( * ) Notice: Subject to any disclaimer, the term of this patent is extended or adjusted under 35 U.S.C. 154(b) by 169 days.

(21) Appl. No.: 18/059,605

(22) Filed: Nov. 29, 2022

(65) Prior Publication Data

US 2023/0140305 A1     May 4, 2023

Related U.S. Application Data

(63) Continuation-in-part of application No. 17/450,038, filed on Oct. 5, 2021, now Pat. No. 11,561,454.

(60) Provisional application No. 63/201,664, filed on May 7, 2021, provisional application No. 63/088,220, filed on Oct. 6, 2020, provisional application No. 63/201,661, filed on May 7, 2021.

(51) Int. Cl.
  *G02F 1/365*  (2006.01)
  *G02F 1/35*   (2006.01)
  *G02F 1/39*   (2006.01)

(52) U.S. Cl.
  CPC .......... *G02F 1/365* (2013.01); *G02F 1/3534* (2013.01); *G02F 1/3536* (2013.01); *G02F 1/395* (2013.01); *G02F 2202/20* (2013.01)

(58) Field of Classification Search
  CPC ...... G02F 1/3503; G02F 1/3536; G02F 1/365; G02F 1/395
  See application file for complete search history.

(56) References Cited

U.S. PATENT DOCUMENTS

| | | | |
|---|---|---|---|
| 3,842,289 A | 10/1974 | Yariv et al. | |
| 5,002,349 A | 3/1991 | Cheung et al. | |
| 5,206,868 A | 4/1993 | Deacon | |
| 5,295,218 A | 3/1994 | Agostinelli et al. | |
| 5,875,272 A | 2/1999 | Kewitsch et al. | |
| 5,999,548 A | 12/1999 | Mori | |

(Continued)

FOREIGN PATENT DOCUMENTS

| | | |
|---|---|---|
| CN | 110333637 A | 10/2019 |
| JP | H01134309 A | 5/1989 |

(Continued)

OTHER PUBLICATIONS

English Translation of JP-2017078786-A, 8 pages. (Year: 2017).*

(Continued)

*Primary Examiner* — Daniel Petkovsek
(74) *Attorney, Agent, or Firm* — Yee & Associates, P.C.

(57) ABSTRACT

An optical waveguide structure comprises a nonlinear optical waveguide, a set of tuning optical waveguides, a set of wavelength selective couplers that couples light between the nonlinear optical waveguide and one or more tuning optical waveguides in the set of tuning optical waveguide based on a wavelength of light, and a set of phase shifters located along one or more tuning optical waveguides in the set of tuning optical waveguides.

22 Claims, 44 Drawing Sheets

(56) References Cited

U.S. PATENT DOCUMENTS

| | | | |
|---|---|---|---|
| 6,078,717 | A | 6/2000 | Nashimoto et al. |
| 6,081,632 | A | 6/2000 | Yoshimura et al. |
| 6,269,205 | B1 | 7/2001 | Peral et al. |
| 6,438,291 | B1 | 8/2002 | Duck et al. |
| 6,445,848 | B1 | 9/2002 | Islam et al. |
| 6,483,953 | B1 | 11/2002 | McBrien et al. |
| 6,721,481 | B2 | 4/2004 | Terahara et al. |
| 6,888,667 | B2 | 5/2005 | Nicolaescu |
| 7,046,714 | B2 | 5/2006 | Nicolaescu et al. |
| 7,262,902 | B2 | 8/2007 | Burns et al. |
| 7,266,258 | B2 | 9/2007 | Liu et al. |
| 7,489,439 | B2 | 2/2009 | Kuo et al. |
| 7,495,823 | B2 | 2/2009 | Kanner et al. |
| 8,173,982 | B2 | 5/2012 | Edamatsu et al. |
| 9,291,837 | B1 | 3/2016 | Yap |
| 9,798,219 | B2 * | 10/2017 | Pant ........................ G02F 1/39 |
| 10,372,014 | B1 * | 8/2019 | Vidrighin .............. G02F 1/3536 |
| 10,451,951 | B1 | 10/2019 | Yap et al. |
| 10,698,292 | B1 | 6/2020 | Nagano |
| 11,003,046 | B2 | 5/2021 | Liscidini et al. |
| 11,092,875 | B2 | 8/2021 | Xu et al. |
| 11,221,540 | B2 | 1/2022 | Srinivasan et al. |
| 11,226,538 | B2 | 1/2022 | Marandi et al. |
| 11,307,484 | B2 | 4/2022 | Zhang et al. |
| 11,550,201 | B2 | 1/2023 | Yap et al. |
| 11,561,454 | B2 | 1/2023 | Yap et al. |
| 2003/0048527 | A1 | 3/2003 | Kimerling et al. |
| 2005/0047702 | A1 | 3/2005 | Parker et al. |
| 2006/0132901 | A1 | 6/2006 | Miller |
| 2012/0093459 | A1 | 4/2012 | Mathai et al. |
| 2014/0193155 | A1 * | 7/2014 | Popovic .............. H04J 14/0307 29/428 |
| 2015/0016767 | A1 * | 1/2015 | Akiyama ................ G02F 1/225 385/3 |
| 2017/0199443 | A1 | 7/2017 | Vermeulen et al. |
| 2018/0031949 | A1 | 2/2018 | Mookherjea et al. |
| 2019/0361315 | A1 | 11/2019 | Zhou |
| 2020/0256722 | A1 | 8/2020 | Najafi et al. |
| 2021/0026222 | A1 | 1/2021 | Nagano |
| 2021/0157177 | A1 | 5/2021 | Kharel et al. |
| 2022/0107548 | A1 | 4/2022 | Yap |
| 2022/0236621 | A1 | 7/2022 | Kashiwazaki et al. |

FOREIGN PATENT DOCUMENTS

| | | | |
|---|---|---|---|
| JP | H01134310 | A | 5/1989 |
| JP | H05107577 | A | 4/1993 |
| JP | H05216079 | A | 8/1993 |
| JP | H10319444 | A | 12/1998 |
| JP | 2014222331 | A | 11/2014 |
| JP | 2017078786 | A * | 4/2017 ............. G02F 1/313 |
| JP | 7160194 | B2 | 10/2022 |
| WO | WO2019208582 | A1 | 5/2021 |

OTHER PUBLICATIONS

Runde et al., "Mode-selective coupler for wavelength multiplexing using LiNbO3:Ti optical waveguides", Cent. Eur. J. Phys. 6(3), 2008, pp. 588-592, found at DOI: 10.2478/311534-008-0078-1 (Year: 2008).*

Office Action, dated Jun. 11, 2024, regarding U.S. Appl. No. 17/655,930, 33 pages.

Final Office Action dated Feb. 21, 2025, regarding U.S. Appl. No. 18/059,624, 31 pages.

Final Office Action dated Oct. 10, 2024, regarding U.S. Appl. No. 17/655,930, 22 pages.

Lumerical, "Lithium Niobate Nonlinear Thermal Waveguide," ANSYS, available at https://optics.ansys.com/hc/en-us/articles/360047509134-Lithium-Niobate-Nonlinear-Thermal-Waveguide, last accessed on Dec. 5, 2022, 19 pages.

Notice of Allowance, dated Nov. 23, 2022, regarding U.S. Appl. No. 17/450,046, 10 pages.

PCT International Search Report and Written Opinion, dated Mar. 28, 2023, regarding Application No. PCT/US2021/071721, 8 pages.

PCT International Search Report and Written Opinion, dated Mar. 28, 2023, regarding Application No. PCT/US2021/071723, 9 pages.

Bosshard, "Cascading of second-order nonlinearities in polar materials," Advanced Materials, vol. 8, No. 5, May 1, 1996, pp. 385-397.

Biaggio, "Coupling-length phase matching for nonlinear optical frequency conversion in parallel waveguides," Physical Review A, vol. 90, Oct. 13, 2014, pp. 043816, 11 pages.

Boyd, "Nonlinear Optics," Third Edition, Academic Press, Mar. 28, 2008, pp. 69-133.

Cai et al., "Integrated optics on single-crystal lithium niobate thin film: some recent progress," 18th International Conference on Transparent Optical Networks ICTON, Jul. 2016, paper Tu.D5.5, pp. 1-4.

Chen et al., "Modal phase matched lithium niobate nanocircuits for integrated nonlinear photonics," OSA Continuum, vol. 1, No. 1, Sep. 2018, pp. 229-242.

Clark et al., "Depositing Light in a Photonic Stop Gap by Use of Kerr Nonlinear Microresonators," Optics Letters, vol. 28, No. 10, 2003, pp. 1966-1968.

Doerr, "Planar Lightwave Devices for WDM," Optical Fiber Telecommunications, vol. IVA, Jan. 1, 2002, pp. 405-476.

Dong et al., "Nonlinear frequency conversion in waveguide directional couplers," Phys. Rev. Lett., vol. 93, No. 13, Sep. 20, 2004, pp. 133901, 4 pages.

Dong et al., "Observation of continuous-wave second-harmonic generation in semiconductor waveguide directional couplers," Optics Express, vol. 14, No. 6, Mar. 20, 2006, pp. 2256-2262 (2006).

Fan et al., "290 Hz intrinsic linewidth from an integrated optical chip-based widely tunable InP—Si3N4 hybrid laser," Digest 2017 Conference on Lasers and Electro-Optics CLEO, May 2017, paper JTh5C.9, pp. 1-2.

Fejer et al., "Quasi-phase-matched second harmonic generation tuning and tolerances," IEEE Journal of Quantum Electronics, vol. 28, No. 11, Nov. 1992, pp. 2631-2654.

Gad et al., "Compound ring resonator circuit for integrated optics applications," Journal Optical Society America A, vol. 26, No. 9, Sep. 9, 2009, pp. 2023-2032.

Halir et al., "Compact High-Performance Multimode Interference Couplers in Silicon-on-Insulator," IEEE Photonics Technology Letters, vol. 21, No. 21, Nov. 1, 2009, pp. 1600-1602.

Helt et al., "How does it scale Comparing quantum and classical nonlinear optical processes in integrated devices," Journal of the Optical Society of America B, vol. 29, No. 8, Aug. 1, 2012, pp. 2199-2212.

Huang et al., "A novel quasi-phase-matching frequency doubling technique," Optics Communications, vol. 150, May 1, 1998, pp. 235-238.

Lin et al., "Broadband Quasi-Phase-Matched Harmonic Generation in an On-Chip Monocrystalline Lithium Niobate Microdisk Resonator," Phys. Rev. Lett., vol. 122, No. 17, May 3, 2019, pp. 173903, 5 pages.

Lin et al., "Characterization of hybrid InP-TriPlex photonic integrate tunable lasers based on silicon nitride (Si3N4/SiO2) microring resonators for optical coherent systems," IEEE Photonics Journal, vol. 10, No. 3, Jun. 2018, pp. 1400108, 9 pages.

Luo et al., "On-chip second-harmonic generation and broadband parametric down-conversion in a lithium niobate microresonator," Optics Express, vol. 25, No. 20, Oct. 2, 2017, pp. 24531-24539.

Luo et al., "Semi-nonlinear nanophotonic waveguides for highly efficient second-harmonic generation," Sep. 17, 2018, 8 pages, accessed Mar. 30, 2022, available at https://arxiv.org/abs/1809.06476.

Lu et al., "Chip-integrated visible-telecom entangled photon pair source for quantum communication," Nature Physics, vol. 15, Jan. 21, 2019, pp. 373-381, available at https://doi.org/10.1038/s41567-018-0394-3.

Matsushita et al., "Quasi-phase-matched parametric fluorescence in a periodically inverted GaP waveguide," Applied Physics Express, vol. 2, No. 6, May 22, 2009, pp. 061101.

(56) References Cited

OTHER PUBLICATIONS

May et al., "Second-harmonic generation in AlGaAs-on-insulator waveguides," Optics Letters, vol. 44, No. 6, Mar. 15, 2019, pp. 1339-1342.
Pasiskevicius et al., "Quasi-phase matched nonlinear media: Progress towards nonlinear optical engineering," Optical Materials, vol. 34, No. 3, Jul. 22, 2011, pp. 513-523.
Pernice et al., "Second harmonic generation in phase matched aluminum nitride waveguides and micro-ring resonators," Applied Physics Letters, vol. 100, No. 22, May 30, 2012, pp. 223501.
Rao et al., "Second-harmonic generation in periodically-poled thin film lithium niobate wafer-bonded on silicon," Optics Express, vol. 24, No. 26, Dec. 26, 2016, pp. 29941-29947.
Rao et al., "Second-harmonic generation in single-mode integrated waveguides based on mode-shape modulation," Applied Physics Letters, vol. 110, No. 11, Jan. 19, 2017, pp. 111109.
Schunemann et al., "Optical parametric oscillation in quasi-phase-matched GaP," Proc SPIE, Nonlinear Frequency Generation and Conversion: Materials, Devices, and Applications XIV, vol. 9347, Mar. 24, 2015, pp. 93470J.
Spencer et al., "Low kappa, narrow bandwidth Si3N4 Bragg gratings," Optics Express, vol. 23, No. 23, Nov. 16, 2015, pp. 30329-30336.
Thomson et al., "Low Loss MMI Couplers for High Performance MZI Modulators," IEEE Photonics Technology Letters, vol. 22, No. 20, Oct. 15, 2010, pp. 1485-1487.
Tison et al., "Path to increasing the coincidence efficiency of integrated resonant photon sources," Optics Express, vol. 25, No. 26, Dec. 25, 2017, pp. 33088-33096.
Wang et al., "Ultrahigh-efficiency wavelength conversion in nanophotonic periodically poled lithium niobate waveguides," Optica, vol. 5, No. 11, Nov. 7, 2018, pp. 1438-1441.
Wang et al., "Second harmonic generation in nano-structured thin-film lithium niobate waveguides," Optics Express, vol. 25, No. 6, Mar. 2017, pp. 6963-6973.
Yang et al., "Realization of controllable photonic molecule based on three ultrahigh-Q microtoroid cavities", Laser Photonics Reviews, vol. 11, No. 2, Jan. 16, 2017, paper 1600178, 8 pages.
Yoo et al., "Wavelength conversion by difference frequency generation in AlGaAs waveguides with periodic domain Inversion achieved by wafer bonding," Applied Physics Letters, vol. 68, No. 19, May 6, 1996, pp. 2609-2611.
Yu et al., "Efficient continuous wave second harmonic generation pumped at 1.55 m in quasi-phasematched AlGaAs waveguides," Optics Express, vol. 13, No. 26, Dec. 26, 2005, pp. 10742-10748.
International Search Report dated Jan. 11, 2022, regarding application No. PCT/US2021/071721, 4 pages.
Written Opinion of the International Searching Authority dated Jan. 11, 2022, regarding application No. PCT/US2021/071721, 7 pages.
International Search Report dated Jan. 14, 2022, regarding application No. PCT/US2021/071722, 5 pages.
Written Opinion of the International Searching Authority dated Jan. 14, 2022, regarding application No. PCT/US2021/071722, 6 pages.
International Search Report dated Feb. 8, 2022, regarding application No. PCT/US2021/071723, 5 pages.
Written Opinion of the International Searching Authority dated Feb. 8, 2022, regarding application No. PCT/US2021/071723, 8 pages.
International Search Report and Written Opinion of the International Searching Authority dated Feb. 9, 2022, regarding application No. PCT/US2021/071725, 24 pages. 021/071725, 24 pages.
Non-Final Office Action dated Jul. 8, 2022, regarding U.S. Appl. No. 17/450,046, 23 pages.
Non-Final Office Action dated Aug. 10, 2022, regarding U.S. Appl. No. 17/450,031, 29 pages.

* cited by examiner

US 12,399,416 B2

OPTICAL WAVEGUIDE STRUCTURE WITH PARTIALLY OVERLAPPING LOOPS IN DIRECTION DEPENDENT MATERIAL

CROSS-REFERENCE TO RELATED APPLICATIONS

This application is a continuation in part application of U.S. patent application Ser. No. 17/450,038 filed Oct. 5, 2021, and entitled "Optical Waveguide Structure With Partially Overlapping Loops In Direction Dependent Material," which is related to and claims the benefit of priority of provisional U.S. Patent Application Ser. No. 63/088,220, entitled "Directional Phase Matching (DPM) Optical Waveguide", filed on Oct. 6, 2020; provisional U.S. Patent Application Ser. No. 63/201,661, entitled "Directional Phase Matching Optical Waveguide", filed on May 7, 2021; and provisional U.S. Patent Application Ser. No. 63/201,664, entitled "Nonlinear Optical Waveguide Structures for Light Generation and Conversion", filed on May 7, 2021, all of which are hereby incorporated by reference.

This application is related to U.S. patent application Ser. No. 17/450,031 filed on Oct. 5, 2021 and entitled "Optical Waveguide Structure With Triple Partially Overlapping Loops", and U.S. patent application Ser. No. 18/059,624 filed on Nov. 29, 2022, entitled "Optical Waveguide Structure With Partially Overlapping Loops In Direction Dependent Material," assigned to the same assignee, and incorporated herein by reference in their entirety.

BACKGROUND INFORMATION

1. Field

The present disclosure relates generally to optical waveguide structures and, in particular, to phase matching optical waveguide structures with partially overlapping loops to generate light using non-linear optical processes.

2. Background

Optical waveguides are physical structures that guide electromagnetic waves in an optical spectrum. Optical waveguides can be used as components in integrated optical circuits. With respect to quantum communications and processing, nonlinear optical material structures can be used to create photon transmitters, repeaters, and other quantum devices for communications. Nonlinear optical structures can be used to change the light passing through them depending on factors such as orientation, temperature, wavelength of light, polarization of light, and other factors. For example, a waveguide with light of a blue wavelength passing through the waveguide can generate one or more photons of light that has a longer wavelength, such as green or red, and a correspondingly lower photon energy. This type of conversion can be performed using waveguides that incorporate a material having a second order nonlinear optical susceptibility or a third order nonlinear optical susceptibility.

Current waveguides and structures that implement second order nonlinear optical processes are not as efficient as desired. Therefore, it would be desirable to have a method and apparatus that take into account at least some of the issues discussed above, as well as other possible issues. For example, it would be desirable to have a method and apparatus that overcome a technical problem with increasing efficiency in generating light in nonlinear optical waveguide structures.

SUMMARY

In one illustrative embodiment, an optical waveguide structure comprises a nonlinear optical waveguide, a set of tuning optical waveguides, a set of wavelength selective couplers that couples light between the nonlinear optical waveguide and a tuning optical waveguide based on a wavelength of light, and a set of phase shifters located along one or more tuning optical waveguides in the set of tuning optical waveguides.

In another illustrative embodiment, an optical waveguide structure comprises a nonlinear optical waveguide, a tuning optical waveguide, a set of wavelength selective couplers that couples light between the nonlinear optical waveguide and the tuning optical waveguide based on a wavelength of light, and a set of phase shifters located along the set of tuning optical waveguide.

In yet another illustrative embodiment, a method facilitates a nonlinear optical interaction process. A wavelength selective coupler couples a first wavelength light from a first segment in a nonlinear optical waveguide into a second segment in the nonlinear optical waveguide. The wavelength selective coupler couples a second wavelength light from the first segment in the nonlinear optical waveguide into a tuning optical waveguide. A phase shifter applies an activation to the tuning optical waveguide to change a phase shift for the second wavelength light in the tuning optical waveguide.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
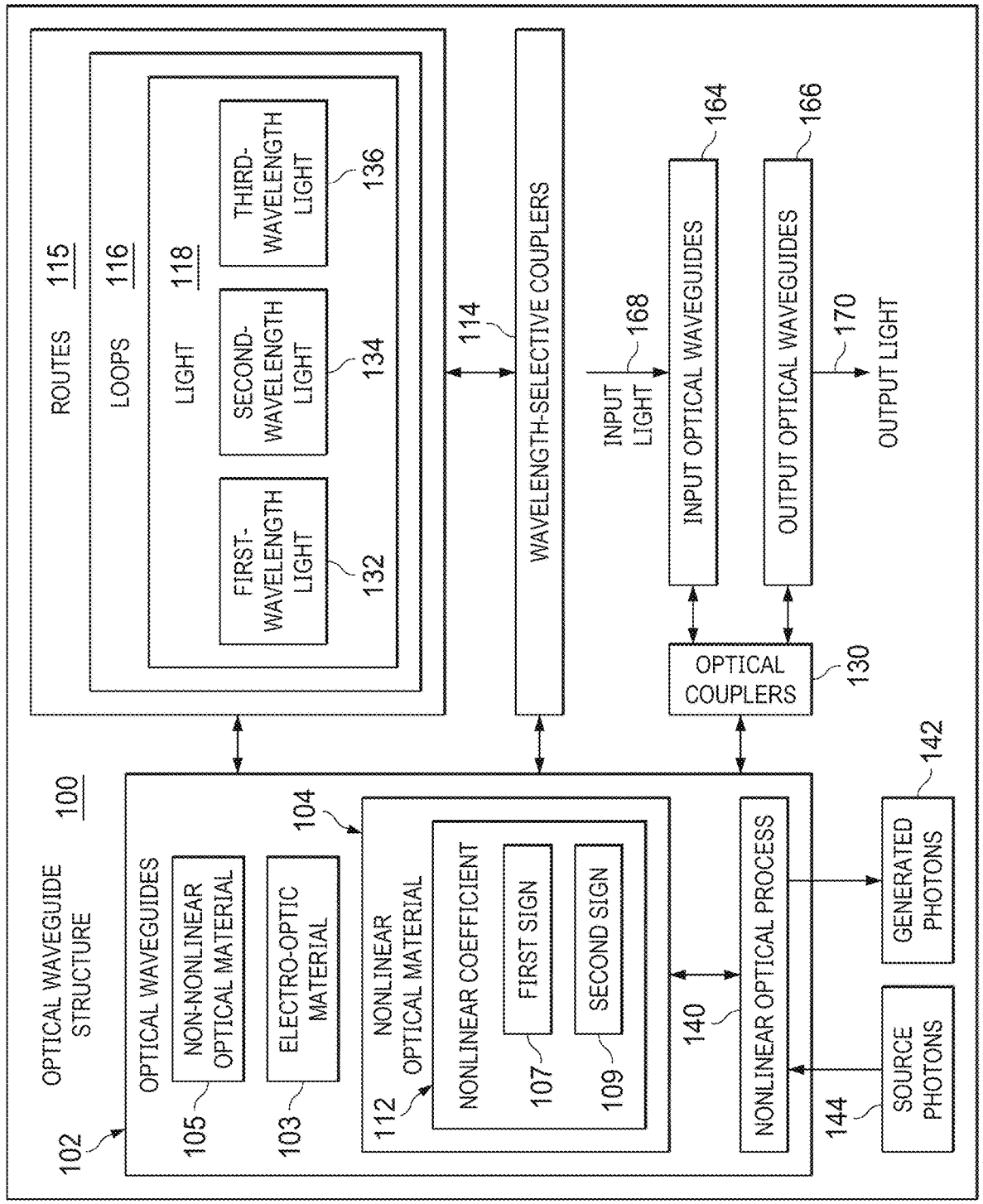
FIG. 1 is an illustration of a high level block diagram of an optical waveguide structure in accordance with an illustrative embodiment.

The illustrative embodiments recognize and take into account one or more different considerations. For example, the illustrative embodiments recognize and take into account that a nonlinear optical structure can function as a resonator such that light of a particular wavelength in resonance with the resonator can travel over a longer distance in a nonlinear optical waveguide of the nonlinear optical structure as compared to light of other wavelengths that are not in resonance with the resonator.

The illustrative embodiments recognize and take into account that the loss of light from a resonator occurs when some of the light exits the resonator instead of continuing to travel in the resonator. The resonator selects certain wavelengths of light to continue traveling in the resonator. The illustrative embodiments recognize and take into account that different resonators can have different resonances that match to different wavelengths of light. The illustrative embodiments recognize and take into account that the same resonator can have multiple resonances, with different resonances matching to different wavelengths of the light.

The illustrative embodiments recognize and take into account that currently used nonlinear optical waveguide structures employ a resonator that implements three-wave mixing and four-wave mixing processes to generate light of one wavelength from light of a different wavelength. In other words, the process changes the wavelength of the light. The illustrative embodiments recognize and take into account that spontaneous parametric down conversion (SPDC) is an example of a three-wave mixing process for generating certain wavelengths of light, such as a signal light and an idler light, in response to the introduction of source light of a different wavelength, such as a pump light, into the nonlinear optical waveguide structure. The illustrative embodiments recognize and take into account that spontaneous parametric down conversion can generate a pair of photons, such as a signal photon and an idler photon, from a pump photon.

The illustrative embodiments recognize and take into account that the nonlinear optical waveguide structure, in forming a ring-shaped route for the travel by the light, can employ a nonlinear optical waveguide in which light of three wavelengths involved in spontaneous parametric down conversion and spontaneous four-wave mixing propagates within the nonlinear optical waveguide structure. The illustrative embodiments recognize and take into account that the ring-shaped route formed from the nonlinear optical waveguide structure can be a closed path of a ring resonator. The illustrative embodiments recognize and take into account that for current nonlinear optical waveguides structures, different wavelengths of the light must match resonances of the same resonator. The illustrative embodiments recognize and take into account that this requirement results in severe limitation on allowable wavelengths for the signal light and the idler light that are generated.

The illustrative embodiments recognize and take into account that current optical waveguide structures can have optical structures to input and output light from the ring resonator. The illustrative embodiments recognize and take into account that the addition of these input and output optical structures is unhelpful for achieving the resonance match because the three wavelengths for the pump light, the signal light, and the idler light propagate through the ring resonator and are constrained to match the modes of the same ring resonator.

The illustrative embodiments recognize and take into account that current nonlinear optical waveguide structures can employ two coupled ring resonators having different values for their circumferences. The illustrative embodiments recognize and take into account that these different values can result in different sets of resonance modes for the two resonators. The illustrative embodiments recognize and take into account that a first resonator can have all three wavelengths for the pump light, the signal light, and the idler light matched to the modes for the first resonator. The illustrative embodiments recognize and take into account that the second resonator can have modes matched to the wavelengths of the signal light and the idler light. The illustrative embodiments recognize and take into account that these two coupled resonators still have the same limitations on resonance matching as a single ring resonator since wavelengths of the signal light and of the idler light must match with resonances of both resonators. The illustrative embodiments recognize and take into account that the use of three coupled ring resonators may provide some improvement, but still have limitations because at least some of the light from all of the three wavelengths travels through all three rings in the current nonlinear optical waveguide structures.

The illustrative embodiments recognize and take into account that current nonlinear optical waveguide structures employ multiple resonators that are coupled together directly through common wavelengths and not through a nonlinear optical process. The illustrative embodiments recognize and take into account that at least some light for all of the wavelengths travel through all of these multiple resonators. In other words, the illustrative embodiments recognize and take into account that the light with different wavelengths and traveling through all of the resonators is resonant with each of the individual resonators that are coupled together.

With currently used spontaneous parametric down conversion or spontaneous four-wave mixing, all three wavelengths involved in the nonlinear optical process are adjusted to match resonances of the same ring resonator or to match common resonances of multiple coupled rings. However, this type of adjustment of the wavelengths may not be possible if an entangled photon pair, such as entangled pair of idler and signal photons, is used in a quantum photonic circuit that also contains other sources of such photon pairs. The need in quantum photonics to perform optical interference functions involving photons produced by different sources of entangled photons may require those photons to have the same wavelength, so that photons can be indistinguishable.

As a result, adjusting the wavelengths associated with a first ring resonator whose output photons are involved in an optical interference function can cause a need to also adjust the wavelengths associated with a second ring resonator whose output photons are interfered with the photons from the first ring resonator. However, if those two ring resonators are not identical, such adjustment may be beyond what is permitted by the spectral width of the resonances of the two ring resonators.

For example, a departure of a dimension of the fabricated waveguide, such as the waveguide width, by only 1-2 nm would shift the resonance wavelength beyond the spectral width associated with a quality factor (Q) of $10^3$. Resonators with a higher Q have resonances with narrower spectral width, thereby making them impractical for use in quantum photonic circuits. Thus, if multiple currently available ring resonators are used in a quantum photonic circuit, those resonators would need to have a low Q.

As a result, the nonlinear optical interaction distance for producing the entangled photon pairs by spontaneous parametric down conversion or spontaneous four-wave mixing would be much shorter and the photon-pair generation rates would be much lower.

The optical waveguide structure in the illustrative examples provides design flexibility to enable three loops through the waveguides to have resonances that correspond to three pre-specified wavelengths. Also, if multiple optical waveguide structures are used together in a quantum photonic circuit, these optical waveguide structures can be adjusted to make the resonances of the optical waveguide structures correspond to specified wavelengths. This type of adjustment is in contrast to having all of the wavelengths adjusted to correspond to one resonator. Thus, the loops in the optical waveguide structures in a quantum photonic circuit can have a higher Q, enabling those optical waveguide structures to generate photon pairs at higher generation rates.

In an illustrative example, the optical waveguide structure can be a triple partially overlapping loops for entanglement (TriPOLE) optical waveguide structure that is used in illustrative examples to produce entangled photon pairs by nonlinear optical (NLO) processes. These nonlinear optical processes can be, for example, spontaneous parametric down conversion and spontaneous four-wave mixing. The two entangled photons produced by spontaneous parametric down conversion can be entangled when those photons are produced from the same pump photon. In a similar fashion, the two entangled photons produced by spontaneous four-wave mixing can be entangled when those photons are produced from the same two degenerate pump photons.

In this illustrative example, nonlinear optical waveguides in the form of ring resonators can be used to increase the generation rate of these entangled photon pairs, comprising a signal photon and an idler photon. In a high-Q ring resonator, light can travel many times around the circumference of the ring resonator. Thus, the interaction length of a ring resonator can be many times greater than its physical size. In implementing spontaneous parametric down conversion or spontaneous four-wave mixing with three partially overlapping ring resonators as in this example, all three wavelengths of light involved in the nonlinear optical process correspond to resonances of their individual resonators.

In an illustrative example, the optical waveguide structure is configured such that light of a particular wavelength can travel on a particular loop through the optical waveguide structure in which the loop is present for that particular wavelength of the light. In the illustrative examples, the loops are partially overlapping such that light of two different wavelengths are not required to travel along the same exact loop.

In one illustrative example, an optical waveguide structure comprises a main nonlinear optical waveguide; an extension optical waveguide; a secondary optical waveguide; a first wavelength-selective coupler; and a second wavelength-selective coupler. The first wavelength-selective coupler optically couples a first main location in the main nonlinear optical waveguide and a primary location in the extension optical waveguide to each other. The second wavelength-selective coupler optically couples a second main location in the main nonlinear optical waveguide and a secondary location in the extension optical waveguide to each other. The first wavelength-selective coupler also optically couples a first main location in the main nonlinear optical waveguide and a first location in the secondary optical waveguide to each other. The second wavelength-selective coupler also optically couples a second main location in the main nonlinear optical waveguide and a second location in the secondary optical waveguide to each other.

With this example, light of different wavelengths travels on different loops in the optical waveguide structure. A route is a path in which the light travels. In this illustrative example, a loop is a closed route. For example, a first loop can be present in which light of a first wavelength (a first-wavelength light) travels on a first loop having a first length. This first loop can extend through the main nonlinear optical waveguide and a portion of an extension optical waveguide. A second loop can extend through a portion of the main nonlinear optical waveguide and a portion of a secondary optical waveguide. Light of a second wavelength (a second-wavelength light) can travel in the second loop having a second length. The second length can be different from the first length.

In this example, the first wavelength-selective coupler and the second wavelength-selective coupler can be selected to cause light of a particular wavelength to travel from one optical waveguide to another optical waveguide. For example, the first wavelength-selective coupler can cause the second-wavelength light to be coupled from the main nonlinear optical waveguide to the secondary optical waveguide. The second wavelength-selective coupler can cause the second-wavelength light to be coupled from the secondary optical waveguide back to the main nonlinear optical waveguide. The second length is determined by the first-main and second-main locations and by the first-secondary and second-secondary locations as well as by the length of the secondary optical waveguide portion (or portions) between these first-secondary and second-secondary locations. The length of the secondary optical waveguide portion (or portions) between the first-secondary and second-secondary locations can be selected to obtain a desired value for the second length.

The length of the portions of secondary optical waveguide are selected to achieve a desired value for the second length. This desired value can be selected to achieve a resonance condition for a particular wavelength of light.

In this example, the first wavelength-selective coupler also can cause the first-wavelength light to be coupled from the main nonlinear optical waveguide to the extension optical waveguide. The second wavelength-selective coupler can cause the first-wavelength light to be coupled from the extension optical waveguide back to the main nonlinear optical waveguide. The first length is determined by first main location and the second main location in the main nonlinear optical waveguide, the primary-extension location and secondary-extension location in the extension waveguide as well as by the length of the primary optical waveguide portion between these primary-extension and secondary-extension locations. The length of the primary optical waveguide portion between these primary-extension and secondary-extension locations can be selected to obtain a desired value for the first length.

In the illustrative example, with this optical waveguide structure, the loops for the different light of different wavelengths in the optical waveguides can have lengths that can be selected such that at least one of resonance or round-trip phase matching is present for the different light of different wavelengths traveling on the different routes.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In other words, the length can be selected for a loop such that resonance is achieved for the light traveling in a loop. This type of selection of the length can be made for each loop independently of the lengths for other loops in the optical waveguide structure. In the illustrative example, resonance occurs for each wavelength of the light separately from the other wavelengths of the light.

Round-trip phase matching can be achieved for the combination of three loops in which three wavelengths of light travel. Round-trip phase matching involves all three wavelengths of the light. In the illustrative example, the lengths of all three loops are selected jointly such that round-trip phase matching is achieved for the nonlinear optical interaction between the three wavelengths of the light.

In some illustrative examples, an optical waveguide structure can be a resonator-enhanced structure for nonlinear optical (NLO) three-wave mixing processes. These nonlinear optical three-wave mixing processes can include difference frequency generation, sum frequency generation, and spontaneous parametric down conversion (SPDC). In other illustrative examples, an optical structure can be a resonator-enhanced structure for degenerately pumped or degenerate output nonlinear optical (NLO) four-wave mixing processes. These degenerate output nonlinear optical four-wave mixing processes can be, for example, difference frequency generation, sum frequency generation, and spontaneous four-wave mixing (SFWM). In these illustrative examples, degenerate means at least two of the waves participating in the nonlinear optical process have the same wavelength. Further, a degenerate three-wave mixing process, such as second harmonic generation, can be used. With second harmonic generation, the two input waves have the same wavelength and produce an output wave of a different wavelength.

In the illustrative examples, the nonlinear optical processes can involve three distinct wavelengths of light, a first wavelength, a second wavelength, and a third wavelength. The nonlinear optical waveguide structure in the different illustrative examples comprises triple partially overlapping loops for entanglement (TriPOLE). This optical waveguide structure comprises a main nonlinear optical waveguide, a first extension optical waveguide, a second extension optical waveguide, and a third extension optical waveguide in which light of different wavelengths travels in loops that extend through different combinations of these different optical waveguides. A first loop extends through the main nonlinear optical waveguide and a first extension optical waveguide. This first loop is overlapped by parts of two other loops, which are a second loop and a third loop. A second loop extends through the main nonlinear optical waveguide and a second extension optical waveguide. A third loop extends through the main nonlinear optical waveguide and a third extension optical waveguide. These loops can be closed routes that define optical resonators having resonances at specific sets of wavelengths.

The parts of the first loop, the second loop and the third loop that are in common with or that extend through the main nonlinear optical waveguide in the optical waveguide structure are the portions of the optical waveguide structure in which the nonlinear optical three-wave mixing or four-wave mixing processes can occur. In the illustrative examples, the first extension optical waveguide is physically separate from the main nonlinear optical waveguide and is connected to the main nonlinear optical waveguide by a first wavelength-selective coupler that selectively couples only the first-wavelength light into that first extension optical waveguide, but does not couple the second-wavelength light or the third-wavelength light into that first extension optical waveguide. In other words, the first wavelength-selective coupler optically connects the first extension optical waveguide to the main nonlinear optical waveguide only for the first-wavelength light. A second wavelength-selective coupler can couple the first-wavelength light from the first extension optical waveguide back into the main nonlinear optical waveguide.

In this illustrative example, the second extension optical waveguide and the third extension optical waveguide are connected to the main nonlinear optical waveguide through a segment of a secondary optical waveguide. In this example, the first wavelength-selective coupler couples the second-wavelength light and the third-wavelength light into a first segment of the secondary optical waveguide. A third wavelength-selective coupler selectively couples the second-wavelength light into the second extension optical waveguide, but the third wavelength-selective coupler does not couple the third-wavelength light into that second extension optical waveguide.

In other words, the third wavelength-selective coupler optically connects the second extension optical waveguide to the secondary optical waveguide. The third wavelength-selective coupler also selectively couples the third-wavelength light into the third extension optical waveguide, but the third wavelength-selective coupler does not couple the second-wavelength light into that third extension optical waveguide. In other words, this third wavelength-selective coupler optically connects the third extension optical waveguide to the secondary optical waveguide. As a result, the selection is between the second wavelength and the third wavelength. The first wavelength is assumed to not be present in the secondary optical waveguide in this example.

In an illustrative example, the first wavelength-selective coupler couples the second-wavelength light from the main nonlinear optical waveguide to travel in the second extension optical waveguide of the second loop, via a third wavelength-selective coupler, but does not couple light of the first wavelength from the main nonlinear optical waveguide to travel in the second extension optical waveguide. The first wavelength-selective coupler also couples the third-wavelength light from the main nonlinear optical waveguide to travel in the third extension optical waveguide of the third loop, via the third wavelength-selective coupler, but does not couple light of the first wavelength from the main nonlinear optical waveguide to travel in the third extension optical waveguide.

The third wavelength-selective coupler couples the light of the second wavelength from the main nonlinear optical waveguide, via the first waveguide-selective coupler, to the second extension optical waveguide of the second loop but does not couple light of the first or third wavelengths into the second extension optical waveguide. The third wavelength-selective coupler also couples the light of the third wavelength from the main nonlinear optical waveguide, via the first wavelength-selective coupler, to travel in the third extension optical waveguide of the third loop but does not couple the light of the first or second wavelengths into the third extension optical waveguide. Thus, only the second-wavelength light travels a second length through the entire second loop. Also, only the third-wavelength light travels a third length through the entire third loop. The first-wavelength light travels only a first length through the first loop that includes the main nonlinear optical waveguide and the first extension optical waveguide, but does not include the second extension optical waveguide or the third extension optical waveguide.

The main nonlinear optical waveguide is common to all three loops. The first-wavelength light travels in a first loop that includes the main nonlinear optical waveguide and the first extension optical waveguide. In this example, the first loop also can include the first wavelength-selective coupler and the second wavelength-selective coupler. The second-wavelength light travels in a loop that includes the main nonlinear optical waveguide and the second extension optical waveguide. The third-wavelength light travels in a third loop that includes the main nonlinear optical waveguide and the third extension optical waveguide. Each of the three loops has a length that is designed to be resonant for the light that travels in the loop. The three loops can have different lengths.

The length of the first loop for the light of the first wavelength can be selected such that the first-wavelength light is at a resonance of a first resonator comprising the main nonlinear optical waveguide and the first extension optical waveguide.

The length of the second loop for the light of the second wavelength can be selected such that the second-wavelength light is at a resonance of a second resonator comprising the main nonlinear optical waveguide and the second extension optical waveguide. The length of the third loop for the light of the third wavelength can be selected so that the third-wavelength light is at a resonance of a third resonator formed by the main nonlinear optical waveguide and the third extension nonlinear optical waveguide.

In the illustrative example, a loop may traverse one or more of these optical waveguides. The loops through these optical waveguides can partially overlap with each other. In other words, the different loops are not identical to each other but may have overlaps within the optical waveguide structures.

Thus, although the propagation constants or wave vectors for the three wavelengths may be different from each other, the light at the three different wavelengths can still be at resonances when propagating in their respective loops in the optical waveguide structure. The propagation can occur such that the light of the three wavelengths can propagate constructively over many cycles through loops within the optical waveguide structure. This type of propagation can occur because the three loops have different lengths. Furthermore, the relative lengths of the three loops can be selected to meet the phase-matching requirement to sustain the nonlinear optical process over an interaction distance that is greater than the length of the main nonlinear optical waveguide in the optical waveguide structure.

The phase matching can be a feature distinct from the resonance that occurs for a resonator in the optical waveguide structure. Thus, five constraints may be applied to the nonlinear optical interaction that occurs in the optical waveguide structure. One constraint is on "energy conservation" which constrains the relationship between the three wavelengths. The other four constraints relate to the propagation constants or wave vectors of the light of the three different wavelengths.

The phase-matching condition for the nonlinear optical process occurring in the main nonlinear optical waveguide can be described by a phase walk-off and by a constructive interaction distance. The constructive interaction distance is the distance at which a phase walk-off for the nonlinear optical interaction between the light of the three wavelengths equals 180 degrees or $\pi$ radians.

When the phase walk-off has a value between 0 and $\pi$ radians, the nonlinear optical interaction is "constructive" and transfers power from the pump into the signal and idler. This transfer of power increases the generation of signal and idler light. However, when the phase walk-off has a value between $\pi$ and $2\pi$ radians, the nonlinear optical interaction is "destructive" and transfers power from the signal and idler back to the pump, thereby reducing the generation of signal and idler light.

Constructive generation of signal and idler light occurs for values of the phase walk-off between 0 and $\pi$, between $2\pi$ and $3\pi$, between $4\pi$ and $5\pi$, etc. Destructive generation of signal and idler occurs for values of the phase walk-off between $\pi$ and $2\pi$, between $3\pi$ and $4\pi$, between $5\pi$ and $6\pi$, etc.

Whether the nonlinear optical generation is constructive or destructive can also depend on the sign of the nonlinear optical coefficient of the nonlinear optical material involved in that nonlinear optical process. For the same value of the phase walk-off, if the sign of the nonlinear optical coefficient changes, the generation can change from being constructive to being destructive, and vice versa.

In some illustrative examples, the length of the main nonlinear optical waveguide, in which all three wavelengths of light travel, can be set to be no greater than the constructive interaction distance. This length of the main nonlinear optical waveguide can be the length of multiple separate segments.

The length of the first extension optical waveguide, the length of the second extension optical waveguide, and the length of the third extension optical waveguide (when present) can be set such that that the roundtrip phase walk-off for the nonlinear optical interaction between the light of the three wavelengths is a specified value. This round-trip phase walk-off can be set equal to zero or as close to being zero as possible, or can be set as close as possible to being a multiple of $2\pi$ radians or 360 degrees.

In some examples, tuning electrodes can be located at optical waveguides. For example, the first extension optical waveguide can have a set of tuning electrodes that operates to adjust the roundtrip phase of the light of the first wavelength. The second extension optical waveguide can have a set of tuning electrodes that operate to adjust the roundtrip phase of the light of the second wavelength. The third extension optical waveguide can have a set of tuning electrodes that operate to adjust the roundtrip phase of the light of the third wavelength. The main nonlinear optical waveguide can have a set of phase shifters, such as a set of tuning electrodes, that operate to adjust the roundtrip phase of the light of all three wavelengths, and in particular of the first wavelength. Thus, these tuning electrodes can enable adjusting the resonance conditions to compensate for changes in at least one of the wavelengths of the light, the cross-sectional dimensions of the optical waveguides, and environmental conditions, such as temperature, or other factors. These tuning electrodes can also allow the optical waveguide structure to adjust the phase walk-off for the nonlinear optical interaction occurring in the main nonlinear optical waveguide.

For example, a structure for spontaneous parametric down conversion can have the light such as, the pump light, supplied to the main nonlinear optical waveguide through an input optical coupler and travel in the first loop. The optical coupler can be connected to an input optical waveguide that receives the pump light. The signal light and the idler light generated by the spontaneous parametric down conversion process would travel in the second loop and the third loop, respectively.

A nonlinear optical generation process such as spontaneous parametric down conversion can result in generation of lower intensity light from higher intensity light. A nonlinear optical generation process also can result in the generation of a higher intensity light from a lower intensity light.

However, since the efficiency of a nonlinear optical generation process depends on the intensity of the input or source light for that process, which typically is the pump light, a nonlinear optical process typically results in generation of additional lower intensity light from the higher intensity light. Typically, the pump light has an intensity that is at least twice the intensity of the signal light and at least twice the intensity of the idler light. In some examples, such as many examples as spontaneous parametric down conversion, the intensity of the pump light is at least ten times greater than the intensity of the signal light or of the idler light. Thus, even when a phase-matched condition is present, if the pump light is absent from an optical waveguide comprising nonlinear optical material, and only signal and idler light are present, there is much less generation of pump light from that weaker signal and idler light.

In the illustrative examples, an optical waveguide structure can comprise a first nonlinear optical waveguide segment, a second nonlinear optical waveguide segment, an extension optical waveguide, a first wavelength-selective coupler, and a second wavelength-selective coupler. A first-wavelength light and a second-wavelength light travel in the first nonlinear optical waveguide segment. A second-order nonlinear optical process such as spontaneous parametric down conversion can occur in the first and second nonlinear optical waveguide segments. The first nonlinear optical waveguide segment has a nonlinear optical coefficient of a first sign. The second nonlinear optical waveguide segment has a nonlinear optical coefficient of a second sign, which is opposite from the first sign. In this illustrative example, this second nonlinear optical segment is part of the second extension waveguide or the third extension waveguide. It is desirable to divert the pump light away from these extension segments for the signal and idler light. In this example these extension segments comprise electro-optic material to enable them to provide voltage-controlled phase shifts.

The first wavelength-selective coupler can optically couple a first location in the first nonlinear optical waveguide segment and a primary extension location in the extension optical waveguide to each other such that the first-wavelength light is coupled from the first nonlinear optical waveguide at the first location to the extension optical waveguide at the primary extension location. The second wavelength-selective coupler can optically couple a second location in the first nonlinear optical waveguide segment and a secondary extension location in the extension optical waveguide to each other such that the first-wavelength light is coupled from the extension optical waveguide at the secondary extension location to the main nonlinear optical waveguide at a location in the first nonlinear optical waveguide segment. Thus, the first-wavelength light bypasses the second nonlinear optical waveguide segment that has a nonlinear optical coefficient of a second sign, which is opposite from the first sign. Instead, the first-wavelength light travels only through the first nonlinear optical waveguide segment that has a nonlinear optical coefficient of the first sign.

In the illustrative examples, the wavelength-selective couplers enable selective coupling of light in a manner that directs light of different wavelengths to either travel through or to bypass two different nonlinear optical waveguide segments that have nonlinear optical coefficients of opposite sign.

Some examples of the optical waveguide structures can avoid undesired effects of the sign reversal in the nonlinear optical coefficient by removing the pump light or by having an absence of a non-linear optical material in part of the loop traversed by the pump light. Other examples of the optical waveguide structures can take advantage of a sign reversal in the nonlinear optical coefficient by adjusting the phase walk-off to compensate for the sign reversal in the nonlinear optical coefficient for two different segments of nonlinear optical waveguide.

With reference now to the figures and, in particular, with reference to FIG. 1, an illustration of a high level block diagram of an optical waveguide structure is depicted in accordance with an illustrative embodiment. In this illustrative example, optical waveguide structure 100 comprises optical waveguides 102 in which at least one of optical waveguides 102 is comprised of nonlinear optical material 104. One or more other optical waveguides in optical waveguides 102 can be comprised of at least one of non-linear optical material 104 or non-nonlinear optical material 105. In this example, nonlinear optical material 104 can have first sign 107 and second sign 109 for nonlinear optical coefficient 112 for a nonlinear optical interaction of light with nonlinear optical material 104. As depicted, first sign 107 is opposite of second sign 109. Nonlinear optical coefficient 112 is a coefficient that quantifies the strength of the nonlinear optical interaction. Nonlinear optical coefficient 112 can be a second order nonlinear optical coefficient or a third order nonlinear optical coefficient depending on the type of optical process implemented in optical waveguide structure 100. One or more optical waveguides in optical waveguides 102 also can be comprised of an electro-optic material 103. The refractive index of an electro-optic material 103 can be changed by applying a DC or low-frequency (as compared to the optical frequency) electric field to the material. In some cases, a material can be both a nonlinear optical material 104 as well as an electro-optic material 103.

In this illustrative example, optical waveguide structure 100 can also include at least one of input optical waveguides 164 or output optical waveguides 166. In this illustrative example, input optical waveguides 164 and output optical waveguides 166 are connected to one or more of optical waveguides 102 using optical couplers 130.

For example, a set of input optical waveguides 164 can input input-light 168 into one or more of optical waveguides 102. As another example, a set of output optical waveguides 166 can output output-light 170 from one or more of optical waveguides 102. The input of input light 168 and output of output light 170 can be facilitated by a set of optical couplers 130 that connect the set of input optical waveguides or the set of output optical waveguides to one or more of optical waveguides 102.

As used herein, a "set of" when used with reference items means one or more items. For example, a set of input optical waveguides 164 is one or more of input optical waveguides 164.

In this illustrative example, light generation can be improved for optical waveguide structure 100 using optical waveguides 102 arranged as loops 116 through optical waveguides 102. In the illustrative example, loops 116 are defined as the course of travel of light 118 within one or more of optical waveguides 102. In other words, loops 116 are defined as where light 118 travels within optical waveguides 102.

The manner in which optical waveguides 102 are coupled to each other is through mechanisms such as wavelength-selective couplers 114, which can be used to define loops 116 along which light 118 can travel within optical waveguides 102. In the illustrative example, loops 116 can use different portions of optical waveguides 102 and wavelength-selective couplers 114 in optical waveguide structure 100.

As depicted, optical waveguide structure 100 also includes wavelength-selective couplers 114 that can be used to define routes 115 in the form of loops 116 for light 118 traveling within optical waveguide structure 100. These wavelength-selective couplers can selectively direct light 118 from one optical waveguide to another optical waveguide in optical waveguides 102.

Wavelength-selective couplers 114 can take a number of different forms. For example, wavelength-selective couplers 114 can be selected from at least one of a two-waveguide coupler, a multi-mode interference coupler, a pulley coupler, a Mach-Zehnder interferometer, a 4-port micro-ring resonator coupler, or some other suitable wavelength-selective coupler that can couple light and determine which wavelengths of light are directed through coupling from one optical waveguide to another optical waveguide.

As used herein, a "number of" when used with reference items means one or more items. For example, a number of different forms is one or more different forms.

In this illustrative example, optical waveguides 102 in optical waveguide structure 100 can support the propagation of light 118 through routes 115 in the form of loops 116, which are closed routes. Light 118 travels within optical waveguides 102 along routes 115. In the illustrative example, a closed route is a route for which a starting point and ending point are common or for which no distinct starting point that is separate from an ending point is present. The closed route is also referred to as a loop.

In this illustrative example, loops 116 can traverse multiple optical waveguides 102 in optical waveguide structure 100. Loops 116 also can traverse one or more of wavelength-selective couplers 114 in optical waveguide structure 100. Loops 116 can comprise multiple loops that overlap each other in portions of some of optical waveguides 102 in optical waveguide structure 100 but do not overlap each other for other optical waveguides 102 traversed by a loop of loops 116. Different wavelengths of light 118 can travel through different loops. In other words, overlap is present between portions of loops 116 for the different wavelengths of light 118 traveling through optical waveguides 102.

As depicted, wavelength-selective couplers 114 can operate to define different loops in loops 116 for the different wavelengths of light 118, with these different loops having different lengths.

As depicted in this illustrative example, nonlinear optical material 104 has nonlinear optical coefficient 112. In the illustrative example, nonlinear optical coefficient 112 can be a second order nonlinear optical coefficient or a third order nonlinear optical coefficient depending on the type of optical process implemented in optical waveguide structure 100.

Nonlinear polarization can occur in nonlinear optical material 104 in which the material polarization no longer varies linearly with the electric field amplitude. This nonlinear relationship can be expressed as follows:

$$P = \chi^{(1)}E + \chi^{(2)}EE + \chi^{(3)}EEE + \ldots$$

where E is the electric field, $\chi^{(1)}$ is the linear optical susceptibility, $\chi^{(2)}$ is the second order nonlinear optical susceptibility, etc. The nonlinear susceptibilities, such as $\chi^{(2)}$ and $\chi^{(3)}$, represent the nonlinear parts of the material dipolar characteristics.

In this example, the electric field amplitude is the electric field amplitude of the light wave, which is an electromagnetic field. An electromagnetic field has a traveling (or propagating) electric field and a traveling (or propagating) magnetic field.

In this illustrative example, nonlinear optical process 140 can be nonlinear optical mixing processes that can occur within optical waveguide structure 100. These nonlinear optical mixing processes can be used to generate light 118. For example, the propagation of first-wavelength light 132 can result in the generation of at least one of second-wavelength light 134 or third-wavelength light 136 using one or more nonlinear optical waveguides employing nonlinear optical mixing processes in optical waveguides 102.

In the illustrative example, nonlinear optical mixing processes can include nonlinear optical three-wave mixing processes and nonlinear optical four-wave mixing processes. In this illustrative example, the nonlinear optical three-wave mixing processes and the nonlinear optical four-wave mixing processes can include difference frequency generation (DFG) and sum frequency generation (SFG). The nonlinear optical three-wave mixing processes can also include spontaneous parametric down conversion (SPDC). The nonlinear optical four-wave mixing can also include spontaneous four-wave mixing (SFWM).

In this illustrative example, nonlinear optical wave-mixing processes can include three types of light with three distinct wavelengths such as first-wavelength light 132, second-wavelength light 134, and third-wavelength light 136.

For example, nonlinear optical process 140 such as spontaneous three-wave mixing is a second-order nonlinear optical process that can occur in an optical waveguide having nonlinear optical material 104 in optical waveguides 102. In this process, pair of generated photons 142 are generated from source photons 144 in optical waveguides 102 that have nonlinear optical material 104. Generated photons 142 of a pair can have different wavelengths from each other, such as of second-wavelength light 134 and third-wavelength light 136 and have wavelengths different from the wavelength, such as first-wavelength light 132, of source photons 144.

In this illustrative example, "resonance matching" means a given wavelength is matched to a resonance of a resonator. A resonator can have many resonances. Also, a resonator can be designed such that different lengths can still produce resonance matching for a particular wavelength of light. Resonance is achieved every time the round-trip phase is a multiple of $2\pi$. In this illustrative example, lengths for loops 116 can be selected such that at least one of resonance matching or roundtrip phase matching is present for different wavelengths of light 118.

The lengths for loops 116 can be selected based on the locations where wavelength-selective couplers 114 connect to optical waveguides 102.

Thus, optical waveguide structure 100 can have multiple optical waveguides in optical waveguides 102 that are configured or constructed to enable the propagation of light 118 of different wavelengths to travel within optical waveguide structure 100 in a constructive manner. In one illustrative example, the light 118 of the different wavelengths can travel on loops 116 in which each loop is selected to enable light 118 of a particular wavelength to travel in a constructive manner. For example, a loop in loops 116 can traverse through both a main nonlinear optical waveguide and extension optical waveguides in optical waveguides 102 that extend the length of the loop in loops 116 for different wavelengths of light beyond that provided by the main nonlinear optical waveguide.

Additionally, some loops in loops 116 can extend through both the main nonlinear optical waveguide and one or more parts of a secondary waveguide in addition to or in place of the extension optical waveguides. As a result, a loop in loops 116 for a light of a particular wavelength can traverse one or more of optical waveguides 102.

Thus, although the propagation constants or wave vectors for the light of three wavelengths may be different from each other, the light at the three different wavelengths can still be at resonances when propagating on their respective loops in optical waveguides 102. The propagation can occur such that light 118 of the three wavelengths can propagate constructively over many cycles through loops 116 within the optical waveguide structure 100. This type of propagation can occur because loops 116 have different lengths that are selected to be constructive for light of a particular wavelength.

Figure 2:
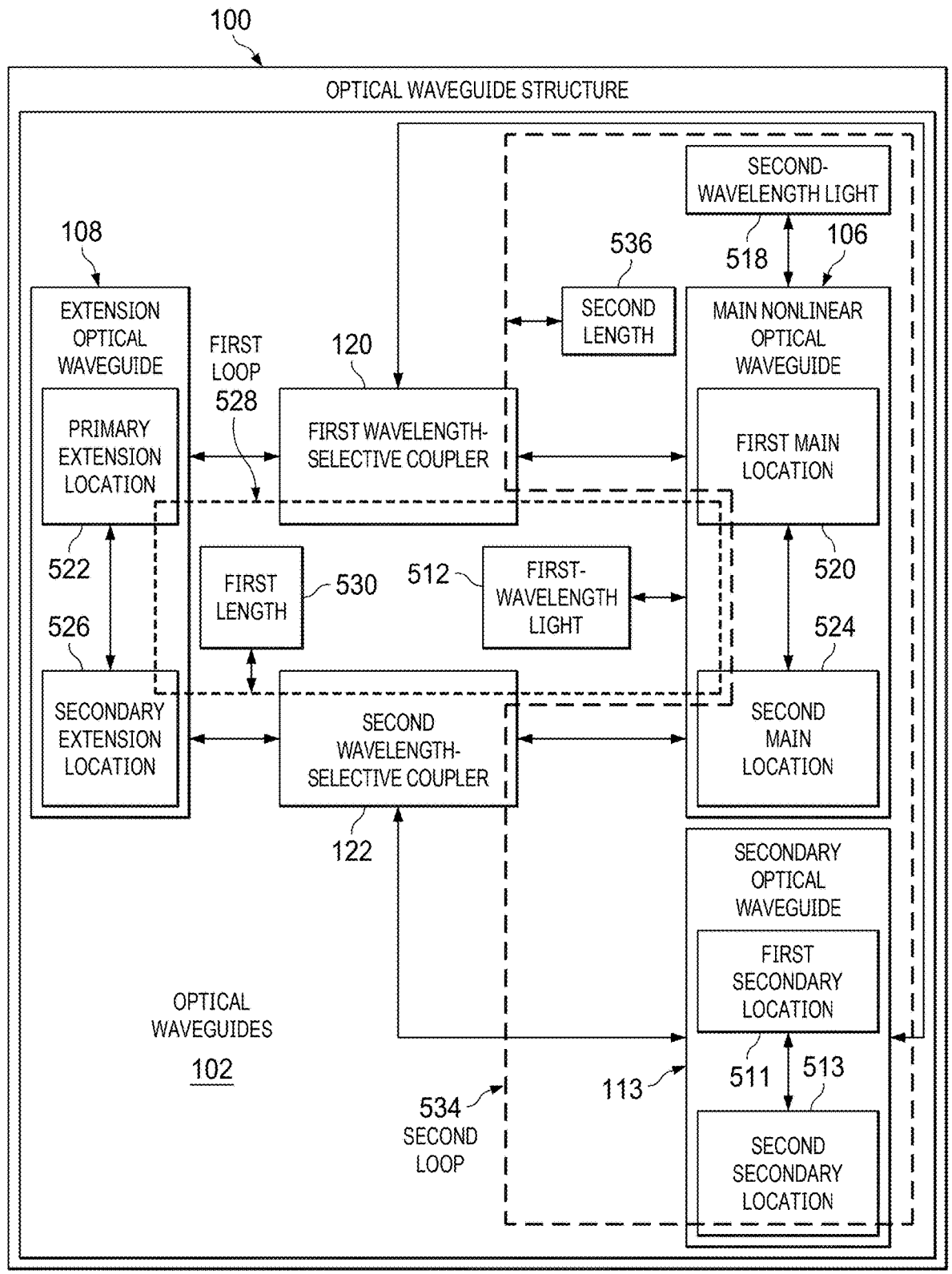
FIG. 2 is another illustration of an optical waveguide structure in accordance with an illustrative embodiment.

Turning next to FIG. 2, another illustration of an optical waveguide structure is depicted in accordance with an illustrative embodiment. In the illustrative examples, the same reference numeral may be used in more than one figure. This reuse of a reference numeral in different figures represents the same element in the different figures.

As depicted in this illustrative example, optical waveguide structure 100 comprises optical waveguides 102. As depicted, optical waveguides 102 include main nonlinear optical waveguide 106, first extension optical waveguide 108, secondary optical waveguide 113, and first wavelength-selective coupler 120, and second wavelength-selective coupler 122. In this example, main nonlinear optical waveguide 106 comprises a nonlinear optical material 104. Main nonlinear optical waveguide 106 also can comprise an electro-optic material 103. First extension optical waveguide 108 and secondary optical waveguide 113 can comprise a nonlinear optical material 104, a non-nonlinear optical material 105, or a combination of a nonlinear optical material and one or more non-nonlinear optical materials. Main nonlinear optical waveguide 106 can comprise a single optical waveguide segment or can comprise multiple optical waveguide segments that are physically separate from each other. Secondary optical waveguide 113 likewise can comprise a single optical waveguide segment or can comprise multiple optical waveguide segments that are physically separate from each other.

In this example, first-wavelength light 512 of a first wavelength and second-wavelength light 518 of a second wavelength travel in the main nonlinear optical waveguide 106. As an example, first-wavelength light 512 can be a pump light with second-wavelength light 518 being at least one of a signal light or an idler light.

In this illustrative example, first wavelength-selective coupler 120 optically couples first main location 520 in main nonlinear optical waveguide 106 and primary extension location 522 in first extension optical waveguide 108 to each other. First wavelength-selective coupler 120 optically couples these two optical waveguides such that first-wavelength light 512 is coupled from main nonlinear optical waveguide 106 at first main location 520 to first extension optical waveguide 108 at primary extension location 522.

Second wavelength-selective coupler 122 optically couples second main location 524 in main nonlinear optical waveguide 106 and secondary extension location 526 in first extension optical waveguide 108 to each other. In this example, second wavelength-selective coupler 122 optically couples these two optical waveguides such that first-wavelength light 512 is coupled from first extension optical waveguide 108 at secondary extension location 526 to main nonlinear optical waveguide 106 at second main location 524.

In this example, first-wavelength light 512 travels in first loop 528 that traverses through portions of main nonlinear optical waveguide 106, portions of first extension optical waveguide 108, first wavelength-selective coupler 120 and second wavelength-selective coupler 122. In this example, first loop 528 has first length 530.

In this illustrative example, first wavelength-selective coupler 120 also optically couples first main location 520 in main nonlinear optical waveguide 106 and first secondary location 511 in secondary optical waveguide 113 to each other. First wavelength-selective coupler 120 optically couples these two optical waveguides such that second-wavelength light 518 is coupled from main nonlinear optical waveguide 106 at first main location 520 to secondary optical waveguide 113 at first secondary location 511.

In this example, second wavelength-selective coupler 122 also optically couples second main location 524 in main nonlinear optical waveguide 106 and second secondary location 513 in secondary optical waveguide 113 to each other. In this example, second wavelength-selective coupler 122 optically couples these two optical waveguides such that second-wavelength light 518 is coupled from secondary optical waveguide 113 at second secondary location 513 to main nonlinear optical waveguide 106 at second main location 524.

In this illustrative example, second-wavelength light 518 travels in main nonlinear optical waveguide 106 and is coupled from main nonlinear optical waveguide 106 at first main location 520 to secondary optical waveguide 113 at first secondary location 511 and travels in secondary optical waveguide 113 to second secondary location 513. Second-wavelength light 518 is coupled from secondary optical waveguide 113 at second secondary location 513 to main nonlinear optical waveguide 106 at second main location 524 by second wavelength-selective coupler 122 such that second-wavelength light 518 travels in second loop 534 having second length 536 for second-wavelength light 518. Second loop 534 includes portions of main nonlinear optical waveguide 106, portions of secondary optical waveguide 113, first wavelength-selective coupler 120 and second wavelength-selective coupler 122.

Figure 3:
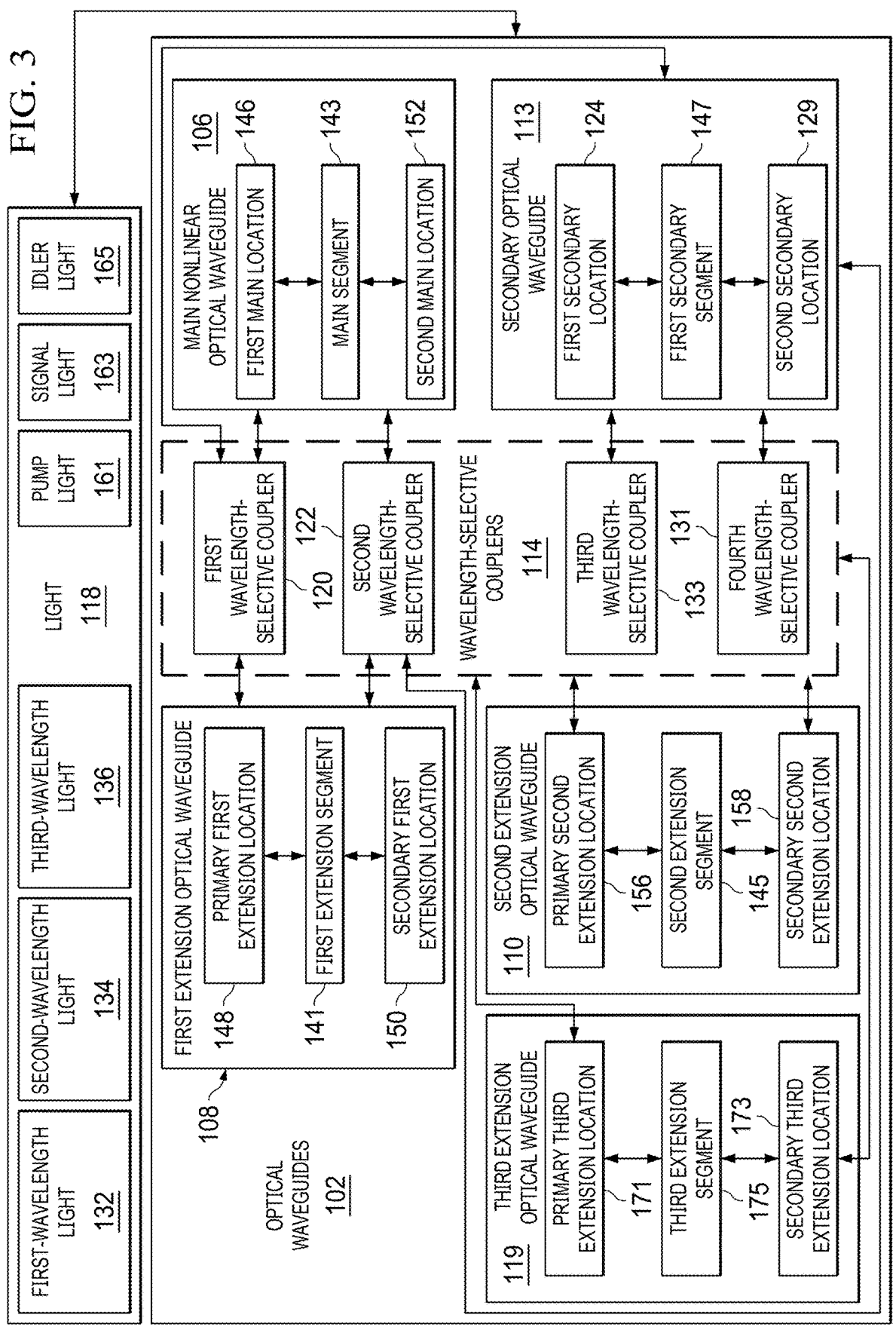
FIG. 3 is an illustration of a block diagram of optical waveguides in accordance with an illustrative example.

With reference next to FIG. 3, an illustration of a block diagram of optical waveguides is depicted in accordance with an illustrative embodiment. In this illustrative example, optical waveguides 102 comprise main nonlinear optical waveguide 106, secondary optical waveguide 113, first extension optical waveguide 108, second extension optical waveguide 110, and third extension optical waveguide 119. Each of these waveguides, main nonlinear optical waveguide 106, secondary optical waveguide 113, first extension optical waveguide 108, second extension optical waveguide 110, and third extension optical waveguide 119 can comprise one or more segments.

As depicted in this example, main nonlinear optical waveguide 106 is an optical waveguide in the set of optical waveguides 102 and is comprised of nonlinear optical material 104. Additionally, secondary optical waveguide 113 is another optical waveguide in the set of optical waveguides 102 and can be comprised of nonlinear optical material 104 or non-nonlinear optical material 105. Secondary optical waveguide 113 can comprise a single optical waveguide segment or can comprise multiple optical waveguide segments that are physically separate from each other. First extension optical waveguide 108 is an example of first extension optical waveguide 108 depicted in FIG. 2.

In this example, light 118 of three different wavelengths can travel through main nonlinear optical waveguide 106. For example, first-wavelength light 132, second-wavelength light 134, and third-wavelength light 136 can travel in main nonlinear optical waveguide 106.

Light of two different wavelengths can travel through secondary optical waveguide 113. For example, second-wavelength light 134 and third-wavelength light 136 can travel in secondary optical waveguide 113.

As depicted in this example, light 118 traveling through optical waveguides 102 can comprise at least one of first-wavelength light 132, second-wavelength light 134, or third-wavelength light 136. In this particular example, first-wavelength light 132, second-wavelength light 134, and third-wavelength light 136 can refer to a pump light 161, a signal light 163, and an idler light 165, but not necessarily in any particular order.

For example, first-wavelength light 132 can also be the signal light 163, second-wavelength light 134 can be the pump light 161, and third-wavelength light 136 can be idler light 165. As another example, first-wavelength light 132 can also be pump light 161, second-wavelength light 134 can be signal light 163, and third-wavelength light 136 can be idler light 165.

Typically, pump light 161 has an intensity that is at least twice the intensity of signal light 163 and at least twice the intensity of idler light 165. In some examples, the intensity of pump light 161 is at least ten times greater than the intensity of signal light 163 or of idler light 165. Typically, pump light 161 is supplied as an input to optical waveguide structure 100. In some cases, either of signal light 163 and idler light 165 also can be supplied as a second input to optical waveguide structure 100. Either or both of signal light 163 and idler light 165 can be generated through nonlinear optical process 140 that occurs in portions of optical waveguide structure 100 that comprise a nonlinear optical material 104.

First extension optical waveguide 108 can be comprised of one at least one of nonlinear optical material 104 or a non-nonlinear optical material 105. In this example, a light such as a pump light 161 can travel through first extension optical waveguide 108.

Second extension optical waveguide 110 can be comprised of at least one of nonlinear optical material 104 or non-nonlinear optical material 105. A light such as signal light 163 can travel through second extension optical waveguide 110.

Third extension optical waveguide 119 can also be comprised of one of nonlinear optical material 104 and a non-nonlinear optical material 105. In this example, a light such as idler light 165 can travel through third extension optical waveguide 119, which can be a nonlinear optical waveguide.

In one illustrative example, first extension optical waveguide 108, second extension optical waveguide 110, and third extension optical waveguide 119 are not constructed using nonlinear optical material 104. In another illustrative example, at least one of first extension optical waveguide 108, second extension optical waveguide 110 and third extension optical waveguide 119 can be constructed using nonlinear optical material 104. In yet another illustrative example, at least one of first extension optical waveguide 108, second extension optical waveguide 110 and third extension optical waveguide 119 can be constructed using electro-optic material 103. Main nonlinear optical waveguide 106 also can be constructed using electro-optic material 103.

In this illustrative example, wavelength-selective couplers 114 include first wavelength-selective coupler 120, second wavelength-selective coupler 122, third wavelength-selective coupler 133, and fourth wavelength-selective coupler 131. Wavelength-selective couplers 114 can couple light 118 of different wavelengths to different optical waveguides based on the wavelengths in light 118. For example, wavelength-selective couplers 114 can be configured to couple first-wavelength light 132, second-wavelength light 134 and third-wavelength light 136 to selected different routes for travel of light 118 through optical waveguides in optical waveguides 102 based on the wavelengths of the light. For another example, wavelength-selective couplers 114 can be configured to couple at least one of second-wavelength light 134 or third-wavelength light 136 to different selected optical waveguides in optical waveguides 102 based on the wavelengths of the light.

For example, first wavelength-selective coupler 120 optically couples first main location 146 in main nonlinear optical waveguide 106 and primary first extension location 148 in first extension optical waveguide 108 to each other such that first-wavelength light 132 is coupled from main nonlinear optical waveguide 106 at the first main location 146 to first extension optical waveguide 108 at primary first extension location 148.

First-wavelength light 132 can travel from primary first extension location 148 to secondary first extension location 150 through first extension segment 141. In this illustrative example, locations at which first wavelength-selective coupler 120 and second wavelength-selective coupler 122 connect to main nonlinear optical waveguide 106 define the extent of main segment 143 of main nonlinear optical waveguide 106. Further, main nonlinear optical waveguide 106 also can include additional segments. These additional segments can be defined by additional locations in main nonlinear optical waveguide 106 at which those segments are coupled to wavelength-selective couplers.

In this example, second wavelength-selective coupler 122 optically couples second main location 152 in main nonlinear optical waveguide 106 and secondary first extension location 150 in first extension optical waveguide 108 to each other such that first-wavelength light 132 is coupled from first extension optical waveguide 108 at secondary first extension location 150 to main nonlinear optical waveguide 106 at second main location 152.

First-wavelength light 132 can travel from second main location 152 to first main location 146 through main segment 143 in main nonlinear optical waveguide 106.

In this illustrative example, first main location 146 and second main location 152 define main segment 143, which is the portion of main nonlinear optical waveguide 106 through which first-wavelength light 132, second-wavelength light 134, and third-wavelength light 136 can travel. In this example, main segment 143 is comprised of a nonlinear optical material 104 and nonlinear optical processes can occur within main segment 143.

In this example, third wavelength-selective coupler 133 optically couples third secondary location 123 in secondary optical waveguide 113 and primary second extension location 156 in second extension optical waveguide 110 to each other such that second-wavelength light 134 is coupled from secondary optical waveguide 113 at third secondary location 123 to second extension optical waveguide 110 at primary second extension location 156.

In this example, second-wavelength light 134 can travel from primary second extension location 156 to secondary second extension location 158 through second extension segment 145 in second extension optical waveguide 110.

Illustration of waveguide configurations for optical waveguides 102 in FIG. 1, FIG. 2 and FIG. 3 are presented as illustrations of some configurations for optical waveguides 102. These illustrations are not meant to limit the manner in which other illustrative examples can be implemented. For example, one or more waveguide segments can be present in addition to or in place of main segment 143. As yet another example, additional ones of wavelength-selective couplers 114 can be connected to additional segments of main nonlinear optical waveguide 106, additional segments of secondary optical waveguide 113 and additional extension optical waveguides in optical waveguide 102. In other illustrative examples, optical waveguide 102 can omit at least one of second extension optical waveguide 110 or third extension optical waveguide 119.

Figure 4:
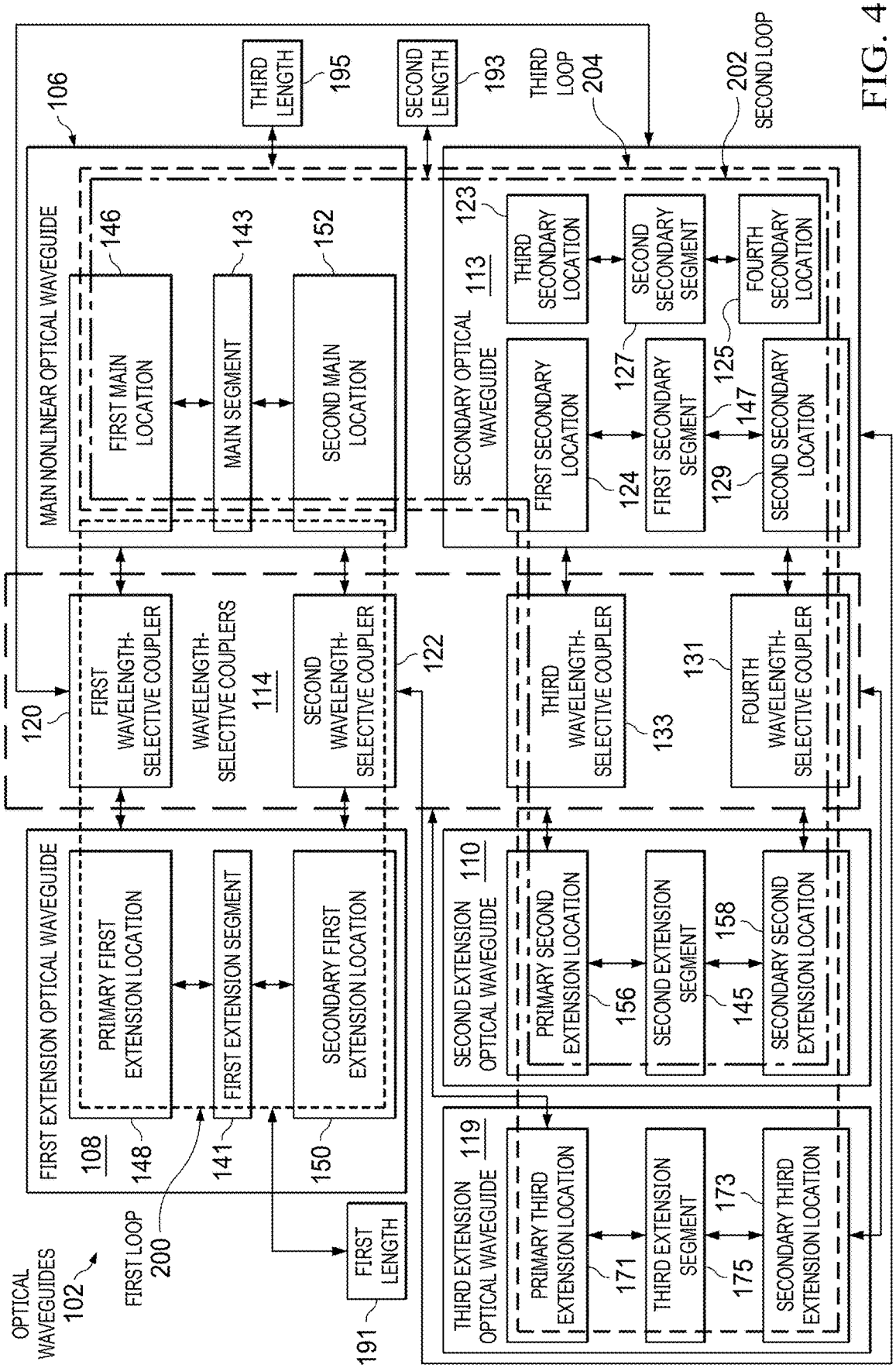
FIG. 4 is an illustration of loops in optical waveguides in accordance with an illustrative embodiment.

Turning to FIG. 4, fourth wavelength-selective coupler 131 optically couples fourth secondary location 125 in the secondary optical waveguide 113 and secondary second extension location 158 in second extension optical waveguide 110 to each other such that second-wavelength light 134 is coupled from second extension optical waveguide 110 at secondary second extension location 158 to secondary optical waveguide 113 at fourth secondary location 125. Second-wavelength light 134 can travel from primary second extension location 156 to secondary second extension location 158 through second extension segment 145 in second extension optical waveguide 110.

Second-wavelength light 134 can travel from first secondary location 124 to third secondary location 123 through first secondary segment 147 (in FIG. 4). Second-wavelength light 134 can travel from fourth secondary location 125 to second secondary location 129 through second secondary segment 127 (in FIG. 4). Similarly, third-wavelength light 136 can travel from first secondary location 124 to third secondary location 123 through second secondary segment 127 (in FIG. 4). Third-wavelength light 136 can travel from fourth secondary location 125 to second secondary location 129 through second secondary segment 127 (in FIG. 4). In this illustrative example, first-wavelength light 132 can be pump light 161, second-wavelength light 134 can be one of signal light 163 and idler light 165.

Additionally, third wavelength-selective coupler 133 can optically couple third secondary location 123 in secondary optical waveguide 113 and primary third extension location 171 in third extension optical waveguide 119 to each other such that third-wavelength light 136 is coupled from secondary optical waveguide 113 at third secondary location 123 to third extension optical waveguide 119 at primary third extension location 171.

Furthermore, fourth wavelength-selective coupler 131 can optically couple fourth secondary location 125 in secondary optical waveguide 113 and secondary third extension location 173 in the third extension optical waveguide 119 to each other such that third-wavelength light 136 is coupled from third extension optical waveguide 119 at secondary third extension location 173 to secondary optical waveguide 113 at fourth secondary location 125. Third-wavelength light 136 can travel from primary third extension location 171 to secondary third extension location 173 through third extension segment 175 in third extension optical waveguide 119. Third-wavelength light 136 can travel from third secondary location 123 to fourth secondary location 125 through second secondary segment 127 (in FIG. 4).

When second extension optical waveguide 110 and third extension optical waveguide 119 are present and coupled to secondary optical waveguide 113, both second-wavelength light 134 and third-wavelength light 136 can travel through secondary optical waveguide 113. In this example, first-wavelength light 132 can be pump light 161, second-wavelength light 134 can be signal light 163, and third-wavelength light 136 can be idler light 165.

With reference now to FIG. 4, an illustration of loops in optical waveguides is depicted in accordance with an illustrative embodiment. In this example, first loop 200, second loop 202, and third loop 204 are examples of loops 116 in FIG. 1.

In this illustrative example, first-wavelength light 132 travels in first loop 200 through main segment 143 between first main location 146 and second main location 152 within the main nonlinear optical waveguide 106 and first extension segment 141 between primary first extension location 148 and secondary first extension location 150 in the first extension optical waveguide 108. In this example, first loop 200 has first length 191.

Second-wavelength light 134 travels in second loop 202 through first secondary segment 147 between first secondary location 124 and third secondary location 123 in secondary optical waveguide 113, second extension segment 145 between primary second extension location 156 and secondary second extension location 158 in second extension optical waveguide 110, second secondary segment 127 between third secondary location 123 and second secondary location 129 in secondary optical waveguide 113, and main segment 143 in main nonlinear optical waveguide 106. In this illustrative example, second loop 202 has second length 193 for second-wavelength light 134.

Third-wavelength light 136 travels in third loop 204 through first secondary segment 147 between first secondary location 124 and third secondary location 123 in secondary optical waveguide 113, third extension segment 175 between primary third extension location 171 and secondary third extension location 173 in third extension optical waveguide 119, second secondary segment 127 between fourth secondary location 125 and second secondary location 129 in secondary optical waveguide 113, and main segment 143 in main nonlinear optical waveguide 106. In this example, third loop 204 as third length 195.

As depicted, first-wavelength light 132 travels within main segment 143 in main nonlinear optical waveguide 106 and first extension segment 141 in first extension optical waveguide 108 in first loop 200. In this example, first loop 200 has first length 191.

As depicted, first length 191 can also comprise the length of first wavelength-selective coupler 120 and the length of second wavelength-selective coupler 122. Second length 193 can also comprise the lengths of third wavelength-selective coupler 133 and fourth wavelength-selective coupler 131 as well as the lengths of first wavelength-selective coupler 120 and second wavelength-selective coupler 122. Third length 195 of third loop 204 can also comprise the lengths of third wavelength-selective coupler 133 and the length of fourth wavelength-selective coupler 131 as well as the lengths of first wavelength-selective coupler 120 and second wavelength-selective coupler 122.

The lengths of first loop 200, second loop 202, and third loop 204 can be selected based on the locations where wavelength-selective couplers 114 connect optical waveguides 102 to each other. First length 191 for first loop 200, second length 193 for second loop 202, and third length 195 for third loop 204 can have different lengths from each other.

For example, first length 191 of first loop 200 can be selected based on a selection of first main location 146 and primary first extension location 148 for first wavelength-selective coupler 120 connecting main nonlinear optical waveguide 106 to first extension optical waveguide 108 and based on a selection of secondary second extension location 158 and second main location 152 for second wavelength-selective coupler 122 connecting first extension optical waveguide 108 to main nonlinear optical waveguide 106.

As another example, second length 193 of second loop 202 can be selected based on a selection of first secondary location 124 in secondary optical waveguide 113, and second secondary location 129 and primary second extension location 156 for third wavelength-selective coupler 133 connecting secondary optical waveguide 113 to second extension optical waveguide 110; and based on a selection of secondary second extension location 158 and third secondary location 123 for fourth wavelength-selective coupler 131 connecting second extension optical waveguide 110 to secondary optical waveguide 113, and fourth secondary location 125 in secondary optical waveguide 113.

As yet another example, third length 195 of third loop 204 can be selected based on a selection of first secondary location 124 in secondary optical waveguide 113, and second secondary location 129 and primary third extension location 171 for third wavelength-selective coupler 133 connecting secondary optical waveguide 113 to third extension optical waveguide 119 and based on a selection of secondary third extension location 173 and third secondary location 123 for fourth wavelength-selective coupler 131 connecting third extension optical waveguide 119 to secondary optical waveguide 113, and fourth secondary location 125 in secondary optical waveguide 113.

Figure 5:
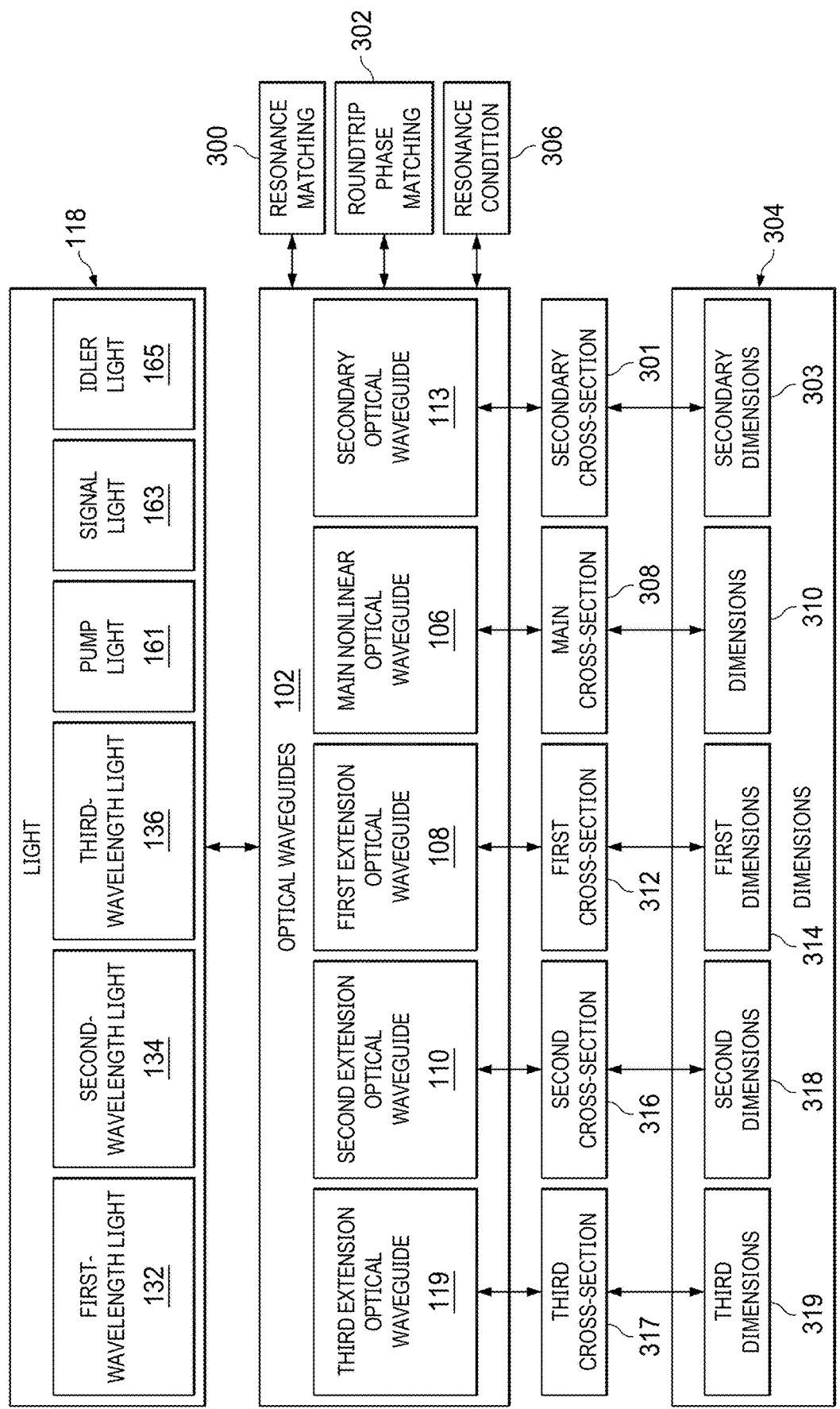
FIG. 5 is an illustration of a block diagram of a configuration for nonlinear optical waveguides in accordance with an illustrative embodiment.

With reference next to FIG. 5, an illustration of a block diagram of a configuration for nonlinear optical waveguides is depicted in accordance with an illustrative embodiment. In illustrative example, at least one of resonance matching 300 or roundtrip phase matching 302 for optical waveguides 102 can be achieved through the selection of dimensions 304 for optical waveguides 102. This selection of dimensions 304 can be made in addition to the selection of lengths, such as first length 191, second length 193, and second length 193 for loops 116 optical waveguides 102 to achieve at least one of resonance matching 300 or roundtrip phase matching 302 for optical waveguides 102.

For example, main nonlinear optical waveguide 106 can have main cross-section 308 with a set of dimensions 310 in dimensions 304 selected to achieve resonance condition 306 for first-wavelength light 132 traveling in main nonlinear optical waveguide 106. In this example, secondary optical waveguide 113 can have secondary cross-section 301 with secondary dimensions 303 selected to achieve resonance condition 306 for one of first-wavelength light 132 and second-wavelength light 134 traveling in secondary optical waveguide 113.

As another example, first extension optical waveguide 108 can have first cross-section 312 with first dimensions 314 selected to achieve resonance condition 306 for first-wavelength light 132 traveling in first extension optical waveguide 108. Further, second extension optical waveguide 110 can have second cross-section 316 with a set of second dimensions 318 selected to achieve resonance condition 306 for second-wavelength light 134 traveling in second extension optical waveguide 110. Also, third extension optical waveguide 119 can have third cross-section 317 with a set of third dimensions 319 selected to achieve resonance condition 306 for third-wavelength light 136 traveling in second extension optical waveguide 110.

Figure 6:
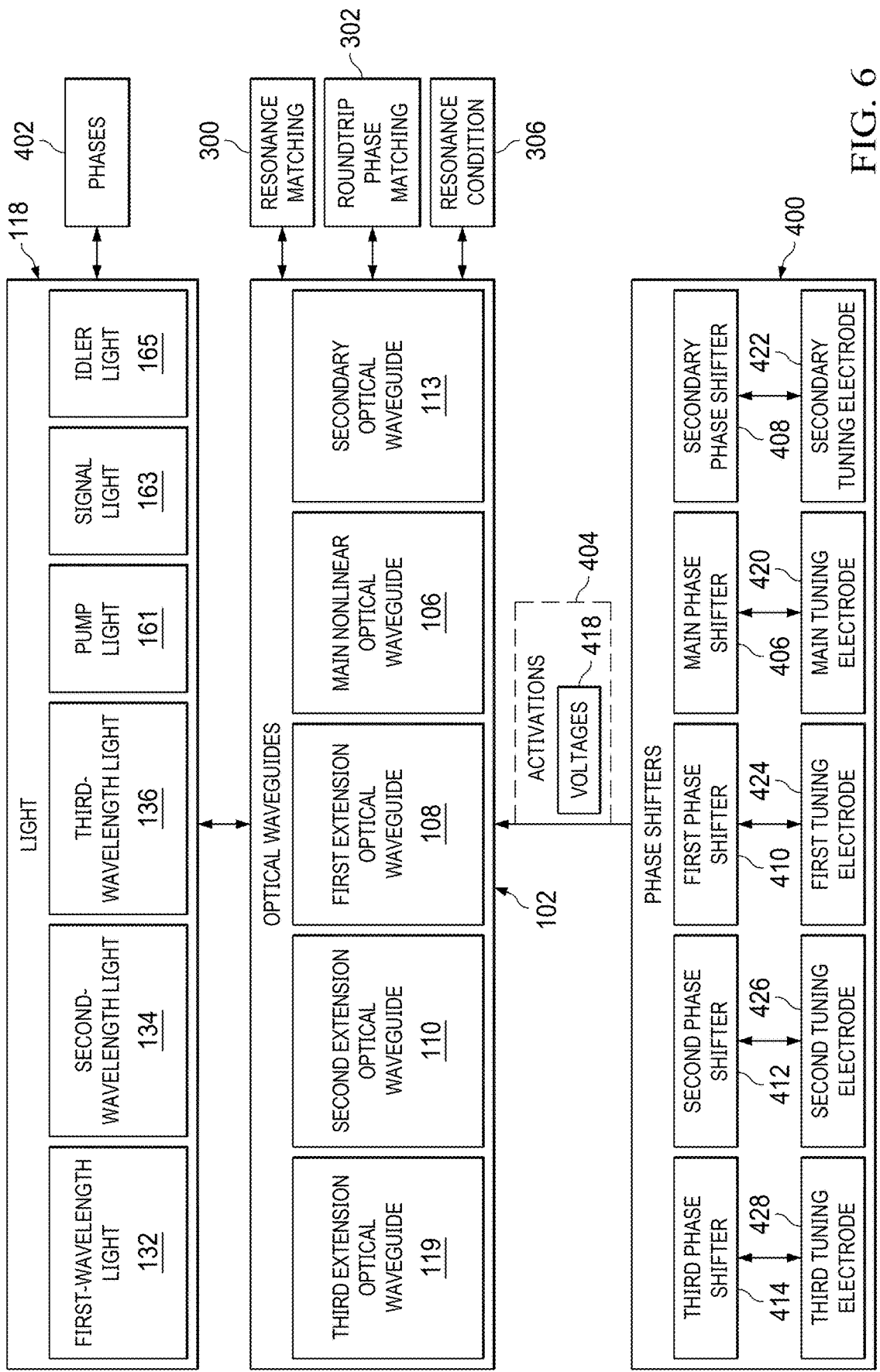
FIG. 6 is an illustration of phase shifters used to obtain at least one of resonance matching or roundtrip phase matching in accordance with an illustrative embodiment.

With reference now to FIG. 6, an illustration of phase shifters used to obtain at least one of resonance matching or roundtrip phase matching is depicted in accordance with an illustrative embodiment. At least one of manufacturing deviations from specifications, environmental factors, or other influences can affect whether a resonance condition is present during the operation of optical waveguide structure 100.

When roundtrip phase matching 302 in FIG. 5 is not present during operation of optical waveguide structure 100, a set of phase shifters 400 can be used to adjust a set of phases 402 for light 118 propagating within optical waveguides 102. In one illustrative example, the set of phase shifters 400 can be structures that are located adjacent to one or more of optical waveguides 102; connected to one or more of optical waveguides 102; include part of one or more of optical waveguides 102; or a combination thereof.

The set of phase shifters 400 can operate to ensure a desired level of roundtrip phase matching 302 is achieved for light 118 that is generated within optical waveguides 102 in optical waveguide structure 100. As depicted, light 118 can be generated in an optical waveguide in optical waveguides 102 that is comprised of nonlinear optical material 104. In the illustrative example, main nonlinear optical waveguide 106 is comprised of nonlinear optical material 104. Optionally, at least one of first extension optical waveguide 108, second extension optical waveguide 110 or third extension optical waveguide 119 can be comprised of nonlinear optical material 104. In an illustrative example, at least one of first extension optical waveguide 108, second extension optical waveguide 110 or third extension optical waveguide 119 can be comprised of electro-optic material 103.

In one illustrative example, a set of phase shifters 400 can be connected to a set of optical waveguides 102 comprising at least one of main nonlinear optical waveguide 106, first extension optical waveguide 108 second extension optical waveguide 110, or third extension optical waveguide 119. The set of phase shifters 400 can apply a set of activations 404 to achieve a change or shift in the phase of at least one of first-wavelength light 132, second-wavelength light 134, or third-wavelength light 136 in light 118 traveling in the set of optical waveguides 102 to which the set of activations 404 is applied.

In one illustrative example, the set of phase shifters 400 comprises a set of elements that can be located adjacent to a waveguide. The set of phase shifters 400 can take a number of different forms. For example, the set of phase shifters 400 can be selected from at least one of a tuning electrode, a thermal element, shape memory alloy element, piezo electric element, or some other element that can change the phase of light of a particular wavelength propagating through the optical waveguide. These elements for the set of phase shifters 400 can be at least one of adjacent to part of an optical waveguide, connected to part of an optical waveguide, or include part of an optical waveguide.

The set of activations 404 can take a number of different forms. For example, the set of activations 404 can be selected from at least one of a voltage, a current, a thermal energy, an electrically induced strain, or some other type of energy that can be applied to an optical waveguide to affect the manner in which light propagates through the optical waveguide. In particular, the energy can be used to affect the phase of light of a particular wavelength propagating through the optical waveguide.

In other words, the set of phase shifters 400 can selectively apply the set of activations 404 to adjust the phase for a particular wavelength of light 118 traveling within loops 116 in optical waveguides 102. This adjustment can be made by applying the activations 404 using a particular phase shifter located adjacent to an optical waveguide in the set of optical waveguides 102 in a loop in loops 116 for a particular wavelength of light to maintain or reach resonance matching 300 for that particular wavelength of light.

For example, a phase shifter, such as main phase shifter 406, can be located adjacent to a portion of main nonlinear optical waveguide 106. Main phase shifter 406 can apply an activation in activations 404 such that a phase shifts in first-wavelength light 132 to achieve resonant condition 306 for first-wavelength light 132 for light traveling in first loop 200.

Another phase shifter, such as secondary phase shifter 408 can be located adjacent to a portion of secondary optical waveguide 113. Secondary phase shifter 408 can apply an activation in activations 404 such that a phase shifts in one or both of second-wavelength light 134 and third-wavelength light 136 to achieve a roundtrip phase matching 302 for the nonlinear optical process.

A phase shifter, such as first phase shifter 410, can be located adjacent to a portion of first extension optical waveguide 108. First phase shifter 410 can apply an activation in activations 404 such that a phase shifts in first-wavelength light 132 to achieve a resonance condition 306 for first-wavelength light 132 in first loop 200. First phase shifter 410 also can apply an activation in activations 404 such that a phase shifts in first-wavelength light 132 to achieve a roundtrip phase matching 302 for the nonlinear optical process.

In another illustrative example, a phase shifter, such as second phase shifter 412, can be located adjacent to a portion of second extension optical waveguide 110. Second phase shifter 412 can apply an activation in activations 404 such that a phase shifts in second-wavelength light 134 to achieve a resonance condition 306 for second-wavelength light 134 in second loop 202.

As another illustrative example, a phase shifter, such as third phase shifter 414, can be located adjacent to a portion of third extension optical waveguide 119. Third phase shifter 414 can an activation in activations 404 such that a phase shifts in third-wavelength light 136 to achieve resonance condition 306 for third-wavelength light 136 in third loop 204.

In one illustrative example, the set of phase shifters 400 can be a set of tuning electrodes that apply a set of activations 404 as a set of voltages 418. With this type of phase shifters in the form of tuning electrodes that apply activations 404 in the form of voltages 418, the optical waveguides associated with the tuning electrodes can be comprised of an electro-optic material 103. One example of an electro-optical material 103 is lithium niobate. This material does not have to be use throughout the entire optical waveguide. Lithium niobate can be used in the sections that are associated with or adjacent to the tuning electrodes.

Lithium niobate is an electro-optic material for which the material refractive index can be changed by applying an electric field to the lithium niobate material. Lithium niobate has a second order nonlinear optical coefficient that is large enough to result in undesired light generation. As a result, in some illustrative examples the regions in a nonlinear optical waveguide containing the lithium niobate containing regions used for electro-optic tuning from the lithium niobate can be separated from regions containing lithium niobate used for the nonlinear optical generation of signal photons and idler photons.

With this example, main phase shifter 406 in the set of phase shifters 400 can be main tuning electrode 420 located adjacent to a portion of main nonlinear optical waveguide 106. Secondary phase shifter 408 in the set of phase shifters 400 can be secondary tuning electrode 422 located adjacent to a portion of secondary optical waveguide 113.

In this illustrative example, first phase shifter 410 can be first tuning electrode 424 located adjacent to a portion of first extension optical waveguide 108. Second phase shifter 412 can be second tuning electrode 426 located adjacent to a portion of second extension optical waveguide 110, and third phase shifter 414 in the set of phase shifters 400 can be third tuning electrode 428 located adjacent to a portion of third extension optical waveguide 119.

First tuning electrode 424, second tuning electrode 426, and third tuning electrode 428 can apply the set of activations 404 in the form of a set of voltages 418 to adjust the set of phases 402 in at least one of first-wavelength light 132, second-wavelength light 134, or third-wavelength light 136 traveling in a set of loops 116 through optical waveguides 102. This shift in the set of phases 402 can be made to maintain or reach resonance condition 306 for one or more of the wavelengths of light 118. These wavelengths of light can be for example, at least one of first-wavelength light 132, second-wavelength light 134, or third-wavelength light 136. This shift in the set of phases 402 also can be made to achieve or maintain roundtrip phase matching 302.

In the illustrative example, when an optical waveguide in the set of optical waveguides 102 comprises an electro-optic material 103, the activation can take the form of a voltage. When the optical waveguide does not comprise an electro-optic material, other forms of energy such as, for example, thermal energy, such as heat, or strain can be used as the set of activations 404. In this illustrative example, heat can be generated by applying electrical current to a resistor that forms a phase shifter in the set of phase shifters 400 such that heat is generated. As another example, a voltage can be applied to a piezo electric element for phase shifter in the set of phase shifters 400 to change the dimensions of the tuning electrode to cause strain in the portion of the optical waveguide adjacent to the phase shifter in the set of phase shifters 400.

The illustration of optical waveguide structure 100 and the different components in FIGS. 1-6 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, additional extension waveguides can be present in optical waveguide structure 100. For example, another extension waveguide can be optically coupled to second extension optical waveguide 110. This coupling can be performed using another pair of wavelength-selective couplers to form a third extension segment for third-wavelength light.

In another illustrative example, fewer components can be present than depicted in optical waveguide structure 100 in FIGS. 1-6. In another illustrative example, third extension optical waveguide 119 can be omitted from optical waveguides 111. In other illustrative examples, phase shifters 400 may be used with some but not all of optical waveguides 102. In one example, only main phase shifter 406 may be present.

Figure 7:
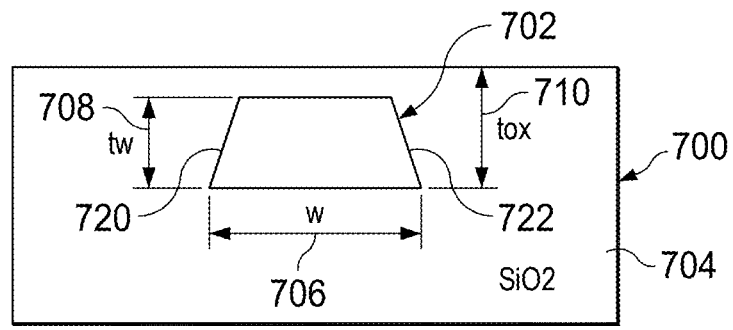
FIG. 7 is an illustration of a cross-section of an optical waveguide in accordance with an illustrative embodiment.

With reference now to FIG. 7, an illustration of a cross-section of an optical waveguide is depicted in accordance with an illustrative embodiment. In this illustrative example, optical waveguide 700 is shown in a cross-sectional view. This cross-section can be used in the optical waveguides in optical waveguide structure 100 in FIGS. 1-6.

As depicted, optical waveguide 700 comprises core region 702 and cladding region 704. Core region 702 can be comprised of a material such as silicon nitride ($Si_3N_4$), silicon (Si) or silicon carbide (SiC) for optical processes based on four wave mixing. Core region 702 can be comprised of a material such as lithium niobate ($LiNbO_3$), gallium phosphide (GaP), aluminum nitride (AlN), aluminum gallium arsenide (AlGaAs), or silicon carbide (Sic) for optical processes based on three-wave mixing. Cladding region 704 can be comprised of silicon dioxide ($SiO_2$) or other material whose refractive index is lower than the refractive index of the material comprising core region 702. The particular material used in optical waveguide 700 can vary in other illustrative examples depending on the optical process used.

In this illustrative example, core region 702 has width w 706 and height tw 708. Cladding region 704 has height tox 710. Cladding region 704 can cover any combination of the top, the two sides and the bottom of core region 702.

Optical waveguide 700 can be adjusted to achieve values for the effective refractive indices (neff) of the wavelengths of light 118 traveling through optical waveguide 700. The effective refractive indices can be adjusted through the selection of the material refractive index at a specific wavelength and varying the waveguide dimensions such as width w 706, height tw 708, and top oxide thickness, height tox 710.

The selection of at least one of the material and dimensions for optical waveguide 700 can be based on the conditions for momentum conservation and phase matching. In the illustrative example, momentum conservation is an automatic consequence of the nonlinear optical interaction. Whether the phase matching associated with the particular waveguide structure is consistent with momentum conservation determines the degree of phase walk-off that results as the light travels in the waveguide over some distance.

For example, an effective refractive index can be a function of the height and width of core region 702. The constructive nonlinear generation length is the propagation length at which the phase walk-off equals π radians. The constructive nonlinear generation length is inversely proportional to the phase mismatch. In an illustrative example, the length of the main nonlinear optical waveguide should be no larger than the constructive nonlinear generation length that can be achieved for the main nonlinear optical waveguide. In illustrative examples, the nonlinear optical interaction occurs in all three loops.

Additionally, the cross-section shown for optical waveguide 700 is provided as an example and is not meant to limit the manner in which other illustrative examples can implement cross-sections for waveguides. For example, optical waveguide 700 is shown with side 720 and side 722 that are angled for core region 702. In other illustrative examples, these two sides can be parallel to each other rather than angled. As another example, other components may be present in this cross-section such as side regions that may be located adjacent to side 720 and side 722. In yet another illustrative example, the cross-section of optical waveguide 700 may also include a phase shifter such as a tuning electrode. As another example, optical waveguide 700 can include a second core region in addition to core region 702 when optical waveguide 700 is used to implement a two-waveguide optical coupler.

Figure 8:
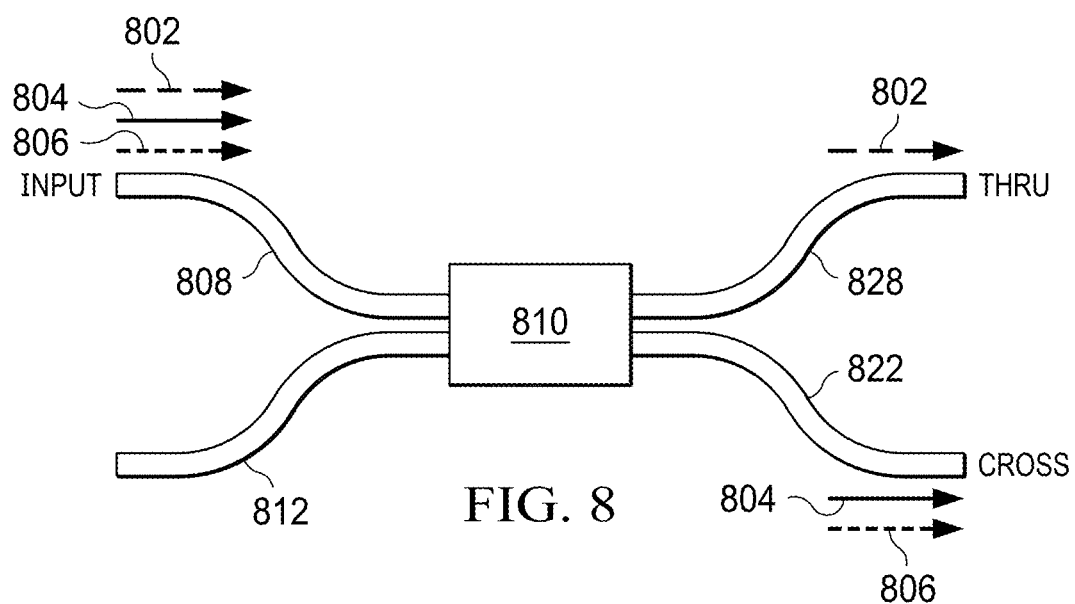
FIG. 8 is an illustration of light coupling by a wavelength-selective coupler in accordance with an illustrative embodiment.

Turning to FIG. 8, an illustration of light coupling by a wavelength-selective coupler is depicted in accordance with an illustrative embodiment. In this illustrative example, pump light 802, signal light 804, and idler light 806 travel through optical waveguide 808 and are input into wavelength-selective coupler 810. Signal light 804 and idler light 806 also travel through optical waveguide 808 and are input into wavelength-selective coupler 810. As depicted, at the output of wavelength-selective coupler 810, pump light 802 continues through to optical waveguide 828. In this example, signal light 804 and idler light 806 cross over from optical waveguide 808 to optical waveguide 822 at the output of wavelength-selective coupler 810. Signal light 804 and idler light 806 also cross over from optical waveguide 812 at the input of wavelength-selective coupler 810 to optical waveguide 828 at the output of wavelength-selective coupler 810. Wavelength-selective coupler 810 is an illustration of an implementation for first wavelength-selective coupler 1220 and second wavelength-selective coupler 1222 in optical waveguide structure 1200 in FIG. 16 and for first wavelength-selective coupler 1320 and second wavelength-selective coupler 1322 in optical waveguide structure 1300 in FIG. 17.

Figure 9:
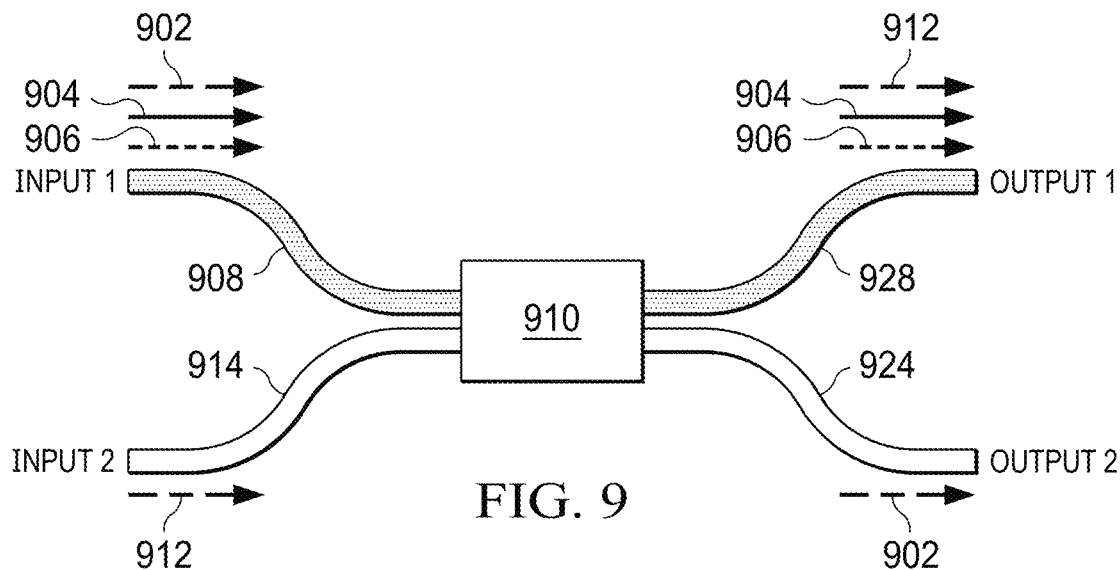
FIG. 9 is an illustration of light coupling by a wavelength-selective coupler in accordance with an illustrative embodiment.

With reference next to FIG. 9, an illustration of light coupling by a wavelength-selective coupler is depicted in accordance with an illustrative embodiment. In this illustrative example, pump light 902, signal light 904, and idler light 906 travel through optical waveguide 908 into wavelength-selective coupler 910. Pump light 912 also travels through optical waveguide 914 and is input into wavelength-selective coupler 910.

As depicted, at the output of wavelength-selective coupler 910, signal light 904 and idler light 906 continues through into optical waveguide 928. Pump light 902 traveling into wavelength-selective coupler 910 from optical waveguide 908 crosses over to optical waveguide 924 at the output of wavelength-selective coupler 910. In a similar fashion, pump light 912 traveling through optical waveguide 914 into wavelength-selective coupler 910 crosses over to optical waveguide 928 at the output of wavelength-selective coupler 910. Wavelength-selective coupler 910 is illustrative of first wavelength-selective coupler 1120 and second wavelength-selective coupler 1122 in optical waveguide structure 1100 in FIG. 13, first wavelength-selective coupler 1020 and second wavelength-selective coupler 1022 in optical waveguide structure 1000 in FIG. 14, first wavelength-selective coupler 1420, second wavelength-selective coupler 1422 in optical waveguide structure 1400 in FIG. 15, and first wavelength-selective coupler 1580, second wavelength-selective coupler 1586, third wavelength-selective coupler 1584 and fourth wavelength-selective coupler 1582 in optical waveguide structure 1500 in FIG. 18, described below.

Figure 10:
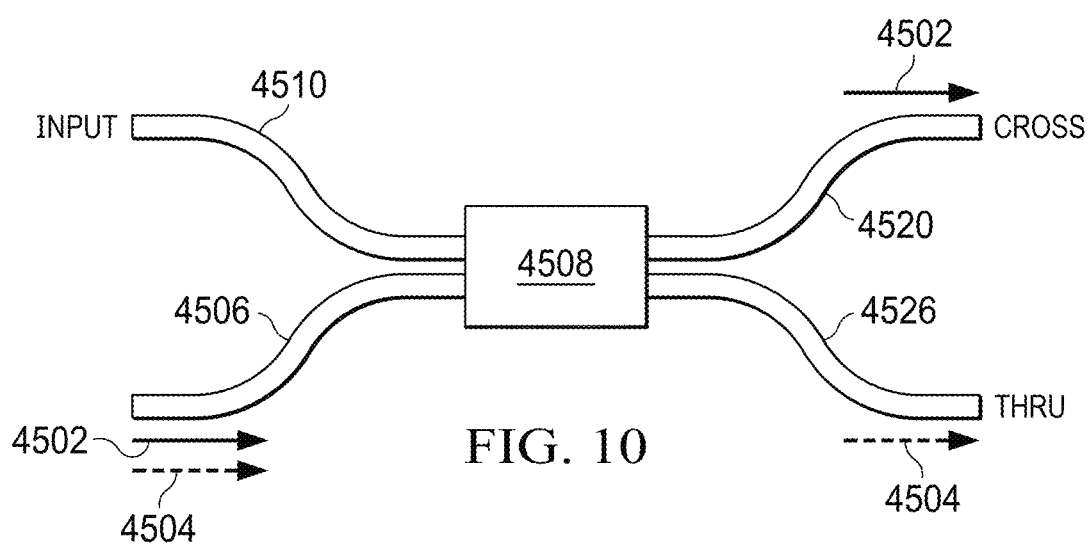
FIG. 10 is an illustration of light coupling by a wavelength-selective coupler in accordance with an illustrative embodiment.

With reference to FIG. 10, an illustration of light coupling by a wavelength-selective coupler is depicted in accordance with an illustrative embodiment. In this illustrative example, signal light 4502 and idler light 4504 travel through optical waveguide 4506 and are input into wavelength-selective coupler 4508. In this depicted example, light is not input into optical waveguide 4510 which is connected to wavelength-selective coupler 4508. As depicted, at the output of wavelength-selective coupler 4508, idler light 4504 continues through into optical waveguide 4526 and signal light 4502 crosses over into optical waveguide 4520.

This crossover of signal light 4502 is caused by the design of wavelength-selective coupler 4508. In illustrative examples, wavelength-selective coupler 4508 can be used for a signal wavelength-selective coupler to selectively couple signal light from a secondary optical waveguide to a signal extension optical waveguide. Wavelength-selective coupler 4508 can also be used to selectively couple signal light from a signal extension optical waveguide to the secondary optical waveguide. Wavelength-selective coupler 4508 is illustrative of wavelength-selective couplers used in optical waveguide structure 1500 in FIG. 18.

Figure 11:
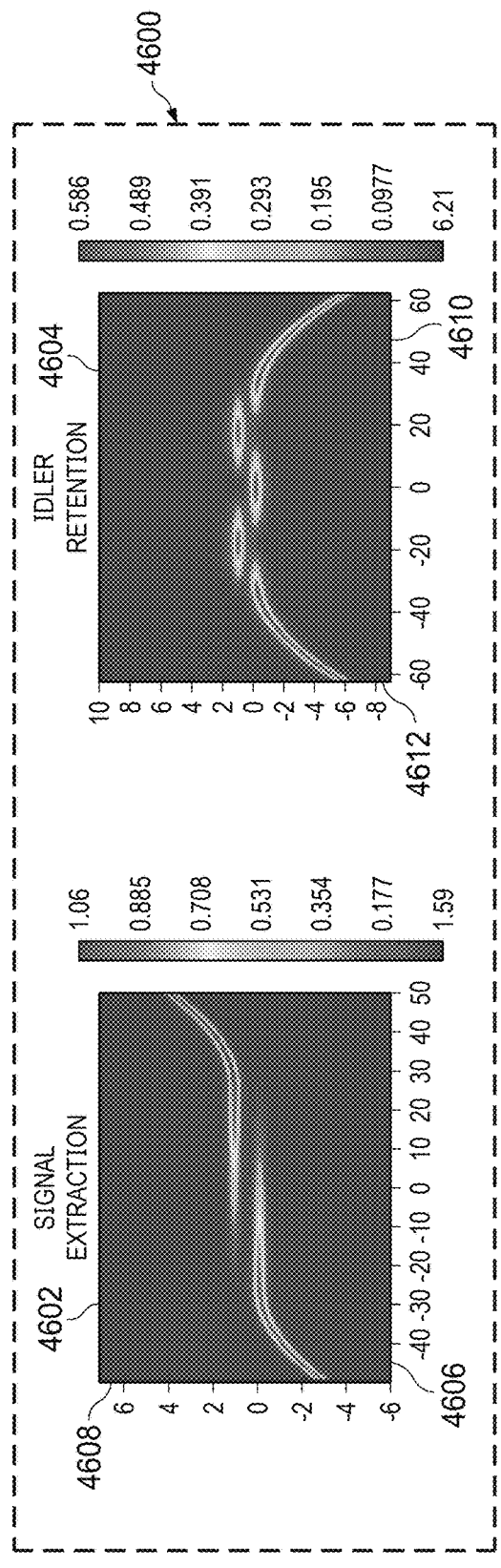
FIG. 11 is an illustration of simulation results of light coupling by a wavelength-selective coupler in accordance with an illustrative embodiment.

In FIG. 11, an illustration of simulation results of light coupling by a wavelength-selective coupler is depicted in accordance with an illustrative embodiment. As depicted, simulation results 4600 comprises plots and. Simulation results 4600 comprise signal extraction plot 4602 for a signal extraction result and idler retention plot 4604 for an idler retention result. These plots are of the optical-field distributions for a signal light and an idler light having different wavelengths from each other.

Simulation results 4600 are generated using a wavelength-selective coupler such as wavelength-selective coupler 4508 in FIG. 10. This wavelength-selective coupler can be implemented as a two-waveguide optical coupler. In this illustrative example, simulation results 4600 are for a case in which signal light 4502, that is coupled and exits from the "cross" output of wavelength-selective coupler 4508, has a larger guided-mode effective index of refraction $n_{\textit{eff}}$ and is confined more strongly than the idler light 4504, that exits from the "through" output of wavelength-selective coupler 4508.

As depicted, signal extraction plot 4602 depicts the electric-field magnitude of the signal light. Plot 4602 has x-axis 4606 that represents the longitudinal direction of the two-guide wavelength-selective coupler structure and y-axis 4608 that represents the transverse direction of the two-guide wavelength-selective coupler structure. Signal extraction plot 4602 in simulation results 4600 shows that signal light is coupled from the lower left waveguide to the upper right waveguide and is illustrative of the cross-state of a coupler.

In this illustrative example, idler retention plot 4604 depicts the electric-field magnitude of the idler light. Idler retention plot 4604 has x-axis 4610 that represents the longitudinal direction of the two-guide wavelength-selective coupler structure and y-axis 4612 that represents the transverse direction of the two-guide wavelength-selective coupler structure. As depicted, idler retention plot 4604 shows that the idler light couples from the lower waveguide to the upper waveguide in a few portions of the coupling region but eventually remains in the lower waveguide away from that coupling section and exits from the lower right waveguide, illustrative of the thru-state of a coupler.

In this example, these simulation results can be obtained using a wavelength-selective coupler that comprises two curved waveguides that are coupled by a section of a straight waveguide of a length and a gap for wavelength-selective coupler that are selected to result in the coupling of the signal light from a first optical waveguide to a second optical waveguide when passing through the wavelength-selective coupler.

Thus, if light of both signal light 4502 and idler light 4504 are supplied to wavelength-selective coupler 4508 through optical waveguide 4506, signal light 4502 exits wavelength-selective coupler 4508 via optical waveguide 4520 and idler light 4504 exits wavelength-selective coupler 4508 via optical waveguide 4526.

For this example, an example length $d_{s|i}$ for the coupling section for wavelength-selective coupler 4508 can be described by the following relation: $\kappa_{s|i}(\lambda_S) \cdot d_{s|i} = \pi$, where $\kappa_{s|i}$ is the coupling coefficient. To achieve the desired wavelength selectivity, wavelength-selective coupler 4508 can also be constrained by another relation: $\kappa_{s|i}(\lambda_I) \cdot d_{s|i} = 2 \cdot \pi \cdot X$, where $\lambda_I$ is the longer wavelength and X is an integer. In the illustrative example, the value of X is 2, such that the photons of signal light wavelength $\lambda_S$ have approximately 100% coupling between the two waveguides being coupled, while the photons of idler light wavelength $\lambda_I$ are coupled back again to the starting waveguide.

Figure 12:
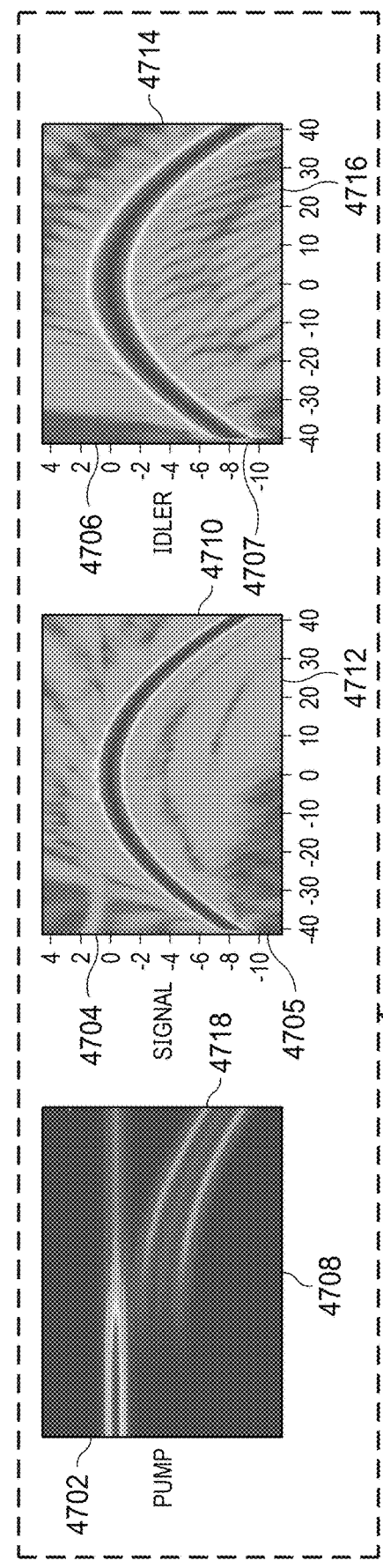
FIG. 12 is an illustration of simulation results of light coupling by a wavelength-selective coupler is in accordance with an illustrative embodiment.

With reference now to FIG. 12, an illustration of simulation results of light coupling by a wavelength-selective coupler is depicted in accordance with an illustrative embodiment. Simulation results 4700 comprise plots that illustrate light coupling using a wavelength-selective coupler such as a two-waveguide optical coupler.

As depicted, simulation results 4700 are for pump light in pump plot 4718, signal light in signal plot 4710, and idler light in idler plot 4714. These simulation results are plots of the electric field magnitude distributions of light at the pump, signal, and idler wavelengths. Pump plot 4718 is a plot for field magnitude distribution in linear scale. As depicted, pump plot 4718 has x-axis 4708 that represents the longitudinal direction of the two-guide wavelength-selective coupler structure and y-axis 4702 that represents the transverse direction of the two-guide wavelength-selective coupler structure.

In this illustrative example, signal plot 4710 and idler plot 4714 are plots for the signal and idler field magnitude distributions in a logarithmic scale. As depicted, signal plot 4710 has x-axis 4712 that represents the longitudinal direction of the two-guide wavelength-selective coupler structure and y-axis 4705 that represents the transverse direction of the two-guide wavelength-selective coupler structure. Idler plot 4714 has x-axis 4716 that represents the longitudinal direction of the two-guide wavelength-selective coupler structure and y-axis 4707 that represents the transverse direction of the two-guide wavelength-selective coupler structure.

In this depicted example, the optical waveguide at the lower portion of the plots for simulation results 4700 has a smaller radius of curvature than the optical waveguide at the upper portion of those plots. The light travels from left to right in these plots for simulation results 4700. Pump light enters in the upper guide from the upper left of pump plot 4718. Signal light and idler light enter in the lower, curved guide from the lower left of signal plot 4704 and idler plot 4706.

In this example, the pump light experiences primarily the "cross" state of this coupler and is coupled into the curved, lower guide and exits from the lower right of the plot. The signal and idler light experience the "through" state of this coupler and remain in the curved guide to also exit from the lower right of the plots. For this example, the pump light is carried by a higher-order transverse mode of the lower, curved guide. Thus, the field magnitude distribution of the pump light in that curved guide has several brighter regions. The signal and idler light, however, are carried by the fundamental transverse modes at those wavelengths. Thus, the intensity distributions for the signal and idler light have just one bright region that is brighter near the center of the guide. In this illustrative example, the pump light is carried in the upper guide by the fundamental transverse mode at the pump wavelength. Thus, the intensity distribution for the pump light in the upper waveguide has just one bright region that is brighter near the center of that upper guide. The simulation results 4700 can be examples of the performance of some implementations of wavelength-selective coupler 910 illustrated in FIG. 9.

The examples of FIGS. 13-18 illustrate different aspects of optical waveguide structure 100 as shown in FIGS. 1-6. These illustrations are intended to be inclusive rather than exclusive. Thus, although only some features are illustrated in one example and other features are illustrated in another example, this difference in features in different figures is used only for the purpose of clarity and to simplify the description of features in the illustrative examples.

Figure 13:
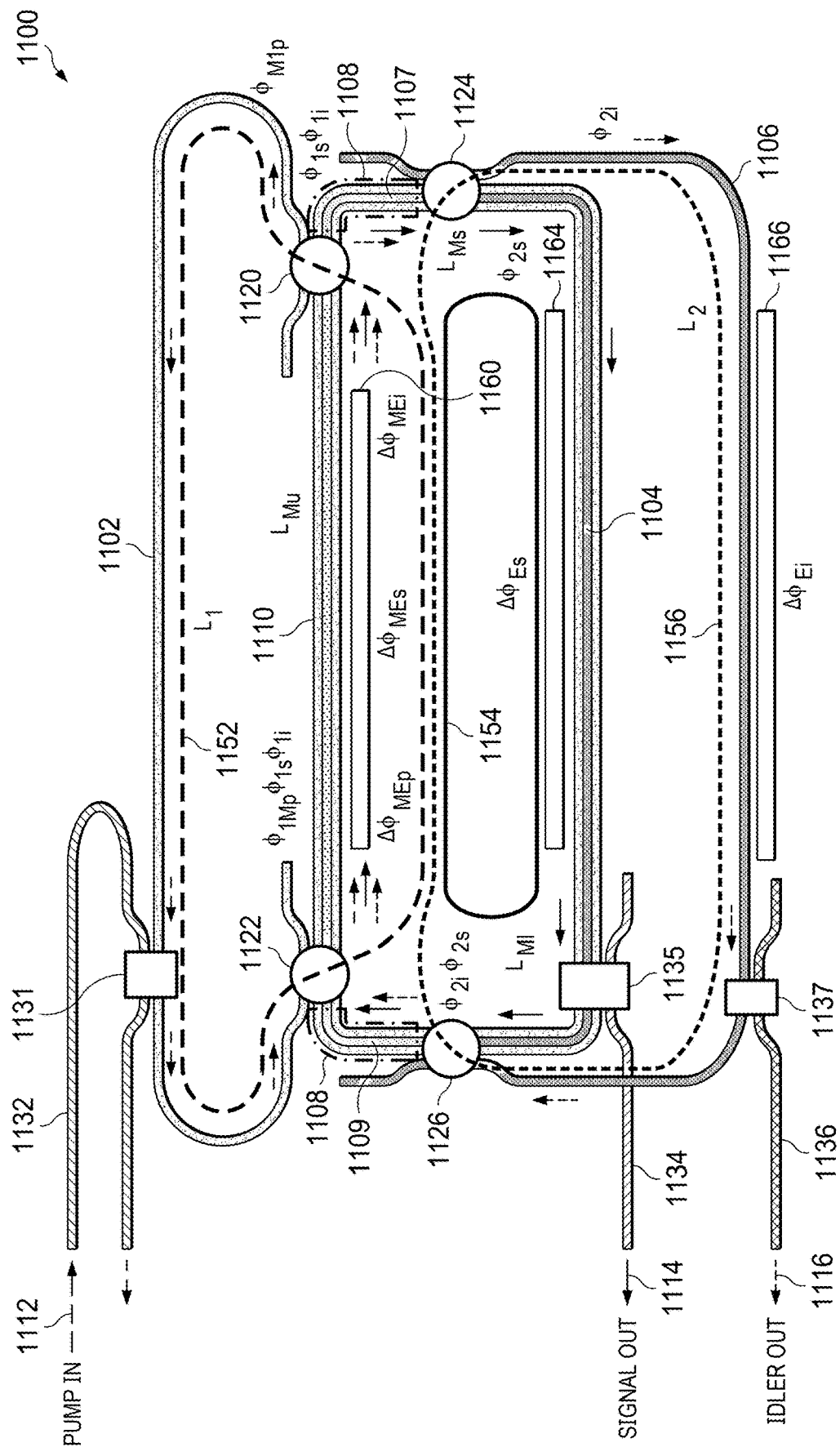
FIG. 13 is an illustration of an optical waveguide structure with five optical waveguides in accordance with an illustrative embodiment.

With reference to FIG. 13, an illustration of an optical waveguide structure with five optical waveguides is depicted in accordance with an illustrative embodiment. In this illustrative example, optical waveguide structure 1100 is an example of an implementation for optical waveguide structure 100 as shown in FIGS. 1-6. More specifically, FIG. 13 is an implementation for optical waveguides 102 as depicted in FIG. 3.

In this illustrative example, optical waveguide structure 1100 can be designed to achieve the concurrent requirements that the three wavelengths are at resonances of their respective resonator loops and also that the phase match condition is met for sustaining the nonlinear optical process over many cycles of travel through the loops.

In this illustrative example, optical waveguide structure 1100 comprises optical waveguides in the form of main nonlinear optical waveguide 1110, segment 1107 in secondary optical waveguide 1108, segment 1109 in secondary optical waveguide 1108, pump loop extension 1102, signal loop extension 1104, and idler loop extension 1106. Main nonlinear optical waveguide 1110 is an example of main nonlinear optical waveguide 106 in FIG. 3 and main nonlinear optical waveguide 106 in FIG. 2. Pump loop extension 1102 is an example of an implementation for first extension optical waveguide 108 in FIG. 3 and first extension optical waveguide 108 in FIG. 2. Signal loop extension 1104 and idler loop extension 1106 are optical waveguides that can be coupled to segments of secondary optical waveguide 113 in FIG. 3 or secondary optical waveguide 113 in FIG. 2. Signal loop extension 1104 and idler loop extension 1106 are examples of second extension optical waveguide 110 and third extension optical waveguide 119, respectively, in FIGS. 3-6.

In these illustrative examples, the individual optical waveguides can be portions or segments from which loops can be established through the use of wavelength selective optical couplers to connect those segments or portions to other segments or portions.

In this illustrative example, main nonlinear optical waveguide 1110 of optical waveguide structure 1100 is comprised of a nonlinear optical material 104. For some second-order nonlinear optical materials, such as x-cut lithium niobate, the nonlinear optical coefficient is much larger for light whose electric-field vector is aligned parallel to one crystallographic axis than for light whose electric-field vector is aligned perpendicular to that crystallographic axis. Thus, for x-cut lithium niobate, a larger second-order nonlinear optical coefficient applies for a nonlinear optical waveguide aligned parallel to the material Y-axis, with the electric-field vector of the propagating transverse-electric (TE) polarized light aligned parallel to the material Z-axis. In this illustrative example, main nonlinear optical waveguide 1110 has a linear shape and is aligned parallel to the lithium niobate material Y-axis. Thus, the propagation direction would be in the ty direction or the −y direction of the lithium niobate crystalline material.

In this illustrative example, pump loop extension 1102 is comprised of a non-nonlinear optical material 105. As depicted, idler loop extension 1106 is comprised of an electro-optic material 103. As depicted, signal loop extension 1104 is comprised of a nonlinear optical material 104 as well as an electro-optic material 103. An electro-optic material is a material with a large electro-optic coefficient. Examples of electro-optic materials that can be used are lithium niobate, gallium arsenide, gallium phosphide and silicon carbide.

In an illustrative example, the use of an electro-optic material can provide desired propagation properties for light. Electro-optical materials often also are nonlinear optical materials having nonlinear optical coefficient.

As depicted, optical waveguide structure 1100 also includes pump input optical waveguide 1132 that inputs pump light 1112. Optical waveguide structure 1100 also includes signal output optical waveguide 1134 and idler output optical waveguide 1136. Signal output optical waveguide 1134 can output signal light 1114. Idler output optical waveguide 1136 can output idler light 1116.

As depicted, first wavelength-selective coupler 1120 and second wavelength-selective coupler 1122 connect pump loop extension 1102 to main nonlinear optical waveguide 1110. In this illustrative example, third wavelength-selective coupler 1124 and fourth wavelength-selective coupler 1126 connect signal loop extension 1104 and idler loop extension 1106 to segment 1107 and segment 1109 of secondary optical waveguide 1108.

In this illustrative example, pump optical coupler 1131 couples pump input optical waveguide 1132 to pump loop extension 1102. Signal optical coupler 1135 couples signal output optical waveguide 1134 to signal loop extension 1104. Idler optical coupler 1137 couples idler output optical waveguide 1136 to idler loop extension 1106.

In this illustrative example, pump light 1112 travels in pump loop 1152 which extends through main nonlinear optical waveguide 1110 and pump loop extension 1102. Signal light 1114 travels in signal loop 1154 which extends through main nonlinear optical waveguide 1110, secondary optical waveguide 1108 and signal loop extension 1104. Idler light 1116 travels in idler loop 1156 which extends through main nonlinear optical waveguide 1110, secondary optical waveguide 1108 and idler loop extension 1106.

As depicted, optical waveguide structure 1100 also includes phase shifters in the form of tuning electrodes. In this illustrative example, tuning electrode 1160 is located adjacent to a portion of main nonlinear optical waveguide 1110. Tuning electrode 1164 is located adjacent to a portion of signal loop extension 1104. Tuning electrode 1166 is located adjacent to a portion of idler loop extension 1106.

In this illustrative example, each wavelength-selective coupler in optical waveguide structure 1100 produces a phase shift for each given wavelength of light at its "thru" state output and a possibly different phase shift for each given wavelength of light at its "cross" state output. For example, first wavelength-selective coupler 1120 extracts pump light 1112 from main nonlinear optical waveguide 1110 into pump loop extension 1102. First wavelength-selective coupler 1120 also extracts signal light 1114 and idler light 1116 from main nonlinear optical waveguide 1110 into segment 1107 of secondary optical waveguide 1108.

In this illustrative example, first wavelength-selective coupler 1120 produces a phase shift of $\phi_{M1p}$ for the pump light 1112 coupled from main nonlinear optical waveguide 1110 to pump loop extension 1102 via a "cross" state output of first wavelength-selective coupler 1120. First wavelength-selective coupler 1120 produces a phase shift of $\phi_{1s}$ for signal light 1114 that is coupled from main nonlinear optical waveguide 1110 into segment 1107 of secondary optical waveguide 1108, and a phase shift of $\phi_{1i}$ for idler light 1116 that is coupled from main nonlinear optical waveguide 1110 into segment 1107 of secondary optical waveguide 1108 via a "thru" state output of first wavelength-selective coupler 1120.

Furthermore, second wavelength-selective coupler 1122 causes a phase shift of $\phi_{1Mp}$ for pump light 1112 coupled from pump loop extension 1102 back to main nonlinear optical waveguide 1110. Second wavelength-selective coupler 1122 produces a phase shift of $\phi_{1s}$ for signal light 1114 that is coupled from segment 1109 of secondary optical waveguide 1108 into main nonlinear optical waveguide 1110, and produces a phase shift of $\phi_{1i}$ for idler light 1116 that is coupled from segment 1109 of secondary optical waveguide 1108 into main nonlinear optical waveguide 1110.

In this illustrative example, third wavelength-selective coupler 1124 and fourth wavelength-selective coupler 1126 between the secondary optical waveguide 1108 and idler loop extension 1106 produce phase shifts of $\phi_{2i}$ and $\phi_{2i}$ for idler light 1116 coupled in their "cross" state output. Third wavelength-selective coupler 1124 and fourth wavelength-selective coupler 1126 between the secondary optical waveguide 1108 and signal loop extension 1104 produce phase shifts of $\phi_{2s}$ and $\phi_{2s}$ for signal light 1114 that exits from their "thru" state outputs.

The light propagating in a waveguide can experience a phase shift associated with the length of the waveguide and with the effective refractive index of the wave-guided mode. For transverse-electric (TE) polarized light in x-cut lithium niobate, the material index depends on the direction of propagation. Thus, the phase shift can be estimated by performing a numerical simulation. The phase shifters, such as tuning electrodes, can contribute an additional phase shift that can either advance the phase or retard the phase, depending on the sign of the applied voltage, for an electro-optic phase shifter.

For the example in optical waveguide structure 1100 in FIG. 13, tuning electrode 1164 for signal loop extension 1104 in signal loop 1154 and tuning electrode 1166 for idler loop extension 1106 in idler loop 1156 can contribute additional phase shifts of $\Delta\phi_{Es}$ and $\Delta\phi_{Ei}$, respectively. These phase shifts can have a positive or negative value.

In this illustrative example, tuning electrode 1160 for main nonlinear optical waveguide 1110 affects pump light 1112, signal light 1114, and idler light 1116 and can produce additional phase shifts of $\Delta\phi_{MEp}$, $\Delta\phi_{MEs}$, and $\Delta\phi_{MEi}$ to the pump light 1112, signal light 1114, and idler light 1116, respectively.

The resonator for pump light 1112 is comprised of components of optical waveguide structure 1100 in pump loop 1152. This pump loop comprises main nonlinear optical waveguide 1110, the cross-state of first wavelength-selective coupler 1120, the cross-state of second wavelength-selective coupler 1122, and pump loop extension 1102. The round-trip phase shift $\phi_{RTp}$ for pump light 1112 at the pump wavelength should be equal to a multiple of $2\pi$ for pump light 1112 to remain circulating for many round-trips through pump loop 1152 and thus circulate for many passes through main nonlinear optical waveguide 1110.

In this illustrative example, the phase shift of the pump light 1112 due to propagation in the pump loop extension 1102 can be described by the expression:

$$\phi_{1p}=2\pi n_{1p}L_1/\lambda_p,$$

where $n_{1p}$ is a net or equivalent effective refractive index of the wave-guided pump light in the pump loop extension 1102; $L_1$ is the length of pump loop extension 1102; and $\lambda_p$ is the wavelength of pump light 1112.

The phase shift of pump light 1112 from propagation through the main nonlinear optical waveguide 1110 can be described as follows:

$$\phi_{Mup}=2\pi n_{Mp}L_M/\lambda_p$$

where $n_{Mp}$ is the effective refractive index of the wave-guided pump mode in main nonlinear optical waveguide 1110, $L_M$ is the length of main nonlinear optical waveguide 1110, which is located between first wavelength-selective coupler 1120 and second wavelength-selective coupler 1122; and $\lambda_p$ is the wavelength of pump light 1112.

Next, the resonance requirement for pump light 1112 can be given by the expression:

$$\phi_{RTp}=\phi_{1p}+\phi_{1Mp}+\phi_{Mup}+\phi_{M1p}+\Delta\phi_{MEp}=2\pi P,$$

where P is an integer. In an illustrative example, P can have values that also result in phase matching to maintain constructive generation of signal and idler from pump light.

This resonance requirement can be met by designing optical waveguide structure 1100 to have suitable values for the length $L_1$ and the phase shift $\phi_{1p}$. The phase shift $\phi_{M1p}$ is due to the first wavelength-selective coupler and the phase shift $\phi_{1Mp}$ is due to the second wavelength-selective coupler.

In this illustrative example, signal loop 1154 extends through main nonlinear optical waveguide 1110. More specifically signal loop 1154 extends through main nonlinear optical waveguide 1110, first wavelength-selective coupler 1120 (in its thru state) and second wavelength-selective coupler 1122 (in its thru state); segment 1107 and segment 1109 of secondary optical waveguide 1108, in which both signal light 1114 and idler light 1116 propagate; third wavelength-selective coupler 1124 (in its thru state) and fourth wavelength-selective coupler 1126 (in its thru state); and signal loop extension 1104. As depicted, only signal light 1114 propagates through signal loop extension 1104.

In this example, main nonlinear optical waveguide 1110 can have length $L_{Mu}$. Pump light 1112, signal light 1114, and idler light 1116 propagate through main nonlinear optical waveguide 1110. Segment 1107 and segment 1109 have a total length of $L_{Mc}$. In this illustrative example, signal loop extension 1104 has a total length of $L_2$.

Signal loop 1154 is a resonator loop in which the signal light 1114 travels. The round-trip phase shift $\phi_{RTs}$ of signal light 1114 traveling in signal loop 1154 can be given by:

$$\phi_{RTs}=2\phi_{1s}+\phi_{Mus}+\Delta\phi_{MEs}+2\phi_{2s}+\phi_{Mcs}+\phi_{Ss}+\Delta\phi_{SEs}=2\pi S.$$

For signal light 1114 to remain circulating for many round-trips in signal loop 1154 and thus circulate for many passes through main nonlinear optical waveguide 1110, the round-trip phase shift should be as close as possible to a multiple of $2\pi$, that is, with S being an integer.

The phase shift of signal light 1114 propagating in main nonlinear optical waveguide 1110 can be described by the expression:

$$\phi_{Mus}=2\pi n_{Ms}L_{Mu}/\lambda_s$$

where $n_{Ms}$ is the effective refractive index of signal light 1114 in the main nonlinear optical waveguide 1110; $L_{Mu}$ is the length of main nonlinear optical waveguide 1110; and $\lambda_s$ is the wavelength of signal light 1114.

Each of the two wavelength-selective couplers coupled to main nonlinear optical waveguide 1110, first wavelength-selective coupler 1120 and second wavelength-selective coupler 1122, in signal loop 1154 operate in its "cross" state for the signal wavelength and produces a phase shift of $\phi_{1s}$ for the signal wavelength. In a similar fashion, each of the two wavelength-selective couplers coupled to signal loop extension 1104, third wavelength-selective coupler 1124 and fourth wavelength-selective coupler 1126, in signal loop 1154 operate in its "thru" state for the signal wavelength and produces a phase shift of $\phi_{2s}$ for the signal light 1114. The net phase shift from the two corner portions, segment 1107 and segment 1109 of the secondary optical waveguide 1108 in signal loop 1154, in which both signal light 1114 and idler light 1116 propagate can be given by $\phi_{Mcs}$. The phase shift from signal loop extension 1104 in signal loop 1154, in which only the signal light propagates, can be given by $\phi_{Ss}$.

In an illustrative example, tuning electrode 1160 used to adjust the phase shift for pump light 1112 in its resonator loop also produces a phase shift for signal light 1114 of $\Delta\phi_{MEs}$. However, tuning electrode 1164 in signal loop extension 1104 affects only signal light 1114. Tuning electrode 1166 produces a phase shift of $\Delta\phi_{SEs}$.

Idler loop 1156 in which idler light 1116 extends through main nonlinear optical waveguide 1110 and idler loop extension 1106. In this depicted example, idler loop 1156 comprises segment 1107 in secondary optical waveguide 1108, first wavelength-selective coupler 1120 and third wavelength-selective coupler 1124; segment 1109 in secondary optical waveguide 1108, fourth wavelength-selective coupler 1126 and second wavelength-selective coupler 1122; and idler loop extension 1106.

Each of the two wavelength-selective couplers, first wavelength-selective coupler 1120 and second wavelength-selective coupler 1122, in idler loop 1156 have a "cross" state for the pump wavelength and a "thru" state for the idler wavelength and produces a phase shift of $\phi_{1i}$ at the "thru" state output of the wavelength-selective coupler. Likewise, each of the two wavelength-selective couplers, third wavelength-selective coupler 1124 and fourth wavelength-selective coupler 1126, have a "cross" state for the idler wavelength and produces a phase shift of $\phi_{2i}$ at its "cross" state output for idler light 1116.

The total phase shift of idler light 1116 from the two corner portions, segment 1107 and segment 1109, in which both signal light 1114 and idler light 1116 propagate, can be given by $\phi_{Mci}$. The phase shift from idler loop extension 1106, in which only idler light 1116 propagates, can be given by $\phi_{Iei}$.

In this illustrative example, tuning electrode 1160 for main nonlinear optical waveguide 1110 used to adjust the phase shift for pump light 1112 will also produce a phase shift for idler light 1116 of $\Delta\phi_{MEi}$. Tuning electrode 1166 for idler loop extension 1106 affects only idler light 1116. Tuning electrode 1166 can produce a phase shift of $\Delta\phi_{IEi}$.

Thus, the round-trip phase shift $\phi_{RTi}$ of idler light 1116 can be given by:

$$\phi_{RTi}=2\phi_{1i}+\phi_{Mui}+\Delta\phi_{MEi}+2\phi_{2i}+\phi_{Mci}+\phi_{Ii}+\Delta\phi_{IEi}=2\pi I.$$

For idler light 1116 to remain circulating for many roundtrips in idler loop 1156 extending through main nonlinear optical waveguide 1110 and thus making many passes through main nonlinear optical waveguide 1110, the round-trip phase shift should be a close as possible to a multiple of $2\pi$, that is, with I being an integer. The length and waveguide cross-sectional structure in main nonlinear optical waveguide 1110 can be designed to achieve phase matching for the nonlinear optical interaction.

Thus, the value for $\phi_{Mui}$ can be determined by the design of the waveguide cross-sectional structure in main nonlinear optical waveguide 1110. However, the length $L_3$ of idler loop extension 1106 can be selected to achieve the desired resonance condition for the idler wavelength in its resonator loop, idler loop 1156. Also, the additional phase shift $\Delta\phi_{IEi}$ produced by the tuning electrode 1166 in the idler loop extension 1106 can be used to further adjust that round-trip phase shift for idler light 1116.

In the illustrative example, main nonlinear optical waveguide 1110 is the location where the desired nonlinear optical photon generation occurs in optical waveguide structure 1100. Main nonlinear optical waveguide 1110 can be designed to achieve a phase matched condition for the nonlinear optical process. This phase matched condition can be achieved through the selection of dimensions of the cross-sectional waveguide structure.

The cross-sectional structure of main nonlinear optical waveguide 1110 as well as the propagation direction of the light determines the effective refractive index of the pump light 1112, signal light 1114 and idler light 1116 in a given portion of main nonlinear optical waveguide 1110. The propagation direction for light guided in main nonlinear optical waveguide 1110, in which the desired nonlinear optical interaction occurs, can be chosen to increase the nonlinear optical generation. For example, a waveguide comprising x-cut lithium niobate could be aligned parallel to the material Y-axis. Thus, the propagation direction would be in the +y direction or the −y direction of the lithium niobate crystalline material.

For the nonlinear optical process to occur constructively over a long interaction distance so that the generation rate or generation efficiency of the signal photons and idler photons from the pump photons continues to increase as the physical interaction distance is increased, the phase matching condition of the nonlinear optical process also should be maintained. This condition includes the round-trip phase shift of pump light 1112 traveling in the main nonlinear optical waveguide 1110 as well as in pump loop extension 1102, the round-trip phase shift of signal light 1114 traveling in main nonlinear optical waveguide 1110, in segment 1107 and segment 1109 of secondary optical waveguide 1108, as well as in signal loop extension 1104, and the round-trip phase shift of idler light 1116 traveling in main nonlinear optical waveguide 1110, in segment 1107 and segment 1109 of secondary optical waveguide 1108, as well as in idler loop extension 1106.

Thus:

$$\phi_{RTp}-\phi_{RTs}-\phi_{RTi}=2\pi A$$

where A is an integer, and can be zero.

Furthermore, to increase the nonlinear optical generation of signal and idler light that occurs in a given round-trip, meeting another phase matching condition is desirable for propagation of the three wavelengths of light through main nonlinear optical waveguide 1110, which is the portion where the nonlinear optical generation occurs. This phase matching condition can be described as follows:

$0 \leq \phi_{Mup}-\phi_{Mus}-\phi_{Mui} \leq \pi$, or $-\pi \leq \phi_{Mup}-\phi_{Mus}-\phi_{Mui} \leq 0$, and is close to zero.

The additional phase shifts that can be achieved by applying bias voltages to the tuning electrodes for optical waveguide structure 1100 can be used to adjust the round-trip phase shifts for pump light 1112 (by adjusting $\Delta\phi_{MEp}$), for the signal light 1114 (by adjusting $\Delta\phi_{SEs}$) and for idler light 1116 (by adjusting $\Delta\phi_{IEi}$). These adjustments can be used to correct or to compensate for departures of the other parameters from their as-designed values in actually fabricated and operating devices.

The phase shift that can be obtained for a given electric field in the electro-optic material (due to a voltage applied to a set of tuning electrodes) can be described by the relation:

$$\Delta\phi_{KEj} = 2\pi r_j n_j^3 E\Gamma_j L_E / \lambda_j$$

where j=p, s, i, and where p indicates pump light 1112, s indicates signal light 1114, and i indicates idler light 1116. Also, K=M, S or P and indicates the optical waveguide with the tuning electrode, such as K=M for main nonlinear optical waveguide 1110, K=S for signal loop extension 1104 and K=I for idler loop extension 1106. Other parameters in this expression are: the electric field E, the electro-optic coefficient $r_j$, the refractive index $n_j$, the overlap of the optical field of pump light 1112, signal light 1114, or idler light 1116 with the electro-optic material $\Gamma_j$, the electrode length (or electro-optic interaction distance) $L_E$, and the wavelength $\lambda_j$ of the pump light 1112, signal light 1114, or idler light 1116. As an example, for an electro-optic material such as lithium niobate and for an electric field applied across the waveguide of $10^6$ V/m, the electrode length needed to achieve a phase shift of $2\pi$ is about 3-10 mm.

Figure 14:
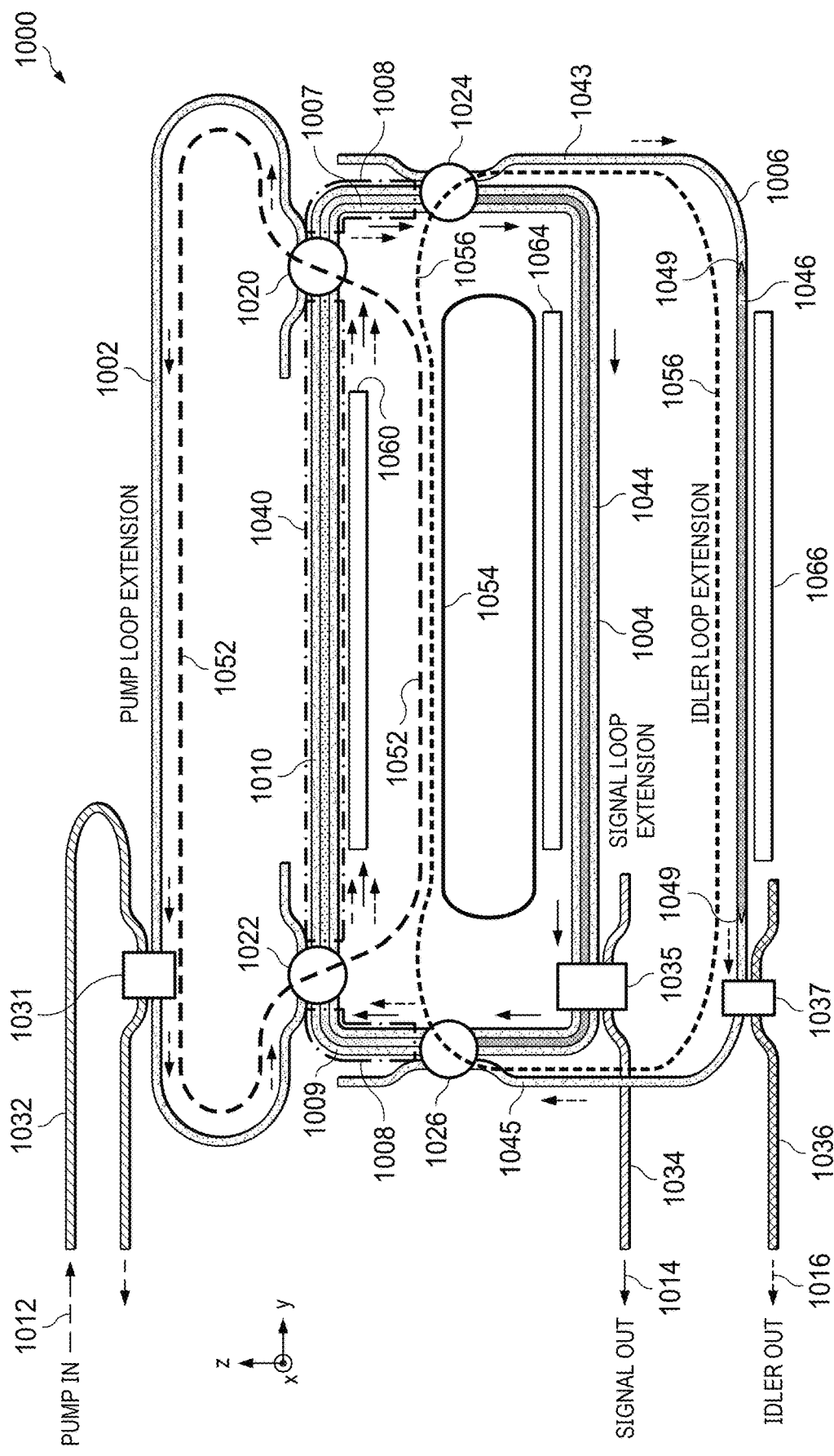
FIG. 14 is an illustration of an optical waveguide structure with five optical waveguides in accordance with an illustrative embodiment.

Turning to FIG. 14, an illustration of an optical waveguide structure with five optical waveguides is depicted in accordance with an illustrative embodiment. In this illustrative example, optical waveguide structure 1000 is an example of an implementation for optical waveguide structure 100 as shown in FIGS. 1-6.

In this illustrative example, optical waveguide structure 1000 comprises optical waveguides. These waveguides include main nonlinear optical waveguide 1010, secondary optical waveguide 1008 having segment 1007 and segment 1009, pump loop extension 1002, signal loop extension 1004, and idler loop extension 1006.

Main nonlinear optical waveguide 1010 is an example of main nonlinear optical waveguide 106 in FIG. 3 and main nonlinear optical waveguide 106 in FIG. 2. Secondary optical waveguide 1008 is an example of an implementation for secondary optical waveguide 113 in FIG. 3 and secondary optical waveguide 113 in FIG. 2.

Pump loop extension 1002 is an example of an implementation for first extension optical waveguide 108 in FIG. 3 and first extension optical waveguide 108 in FIG. 2. Signal loop extension 1004 and idler loop extension 1006 are examples of second extension optical waveguide 110 and third extension optical waveguide 119, respectively, in FIGS. 3-6.

In this illustrative example, main nonlinear optical waveguide 1010 is comprised of a nonlinear optical material, such as nonlinear optical material 104. Secondary optical waveguide 1008 can be comprised of a nonlinear optical material, such as nonlinear optical material 104 or a non-nonlinear optical material, such as non-nonlinear optical material 105.

As depicted, pump loop extension 1002 is comprised of a non-nonlinear optical material. Signal loop extension 1004 is comprised of both a nonlinear optical material and an electro-optic material, such as electro-optic material 103, in this illustrative example. Idler loop extension 1006 has portions comprised of a nonlinear optical material 104 and other portions comprised of a non-nonlinear optical material. In this example, a taper 1049 can join an optical waveguide portion comprising nonlinear optical material and an optical waveguide portion comprising a non-nonlinear optical material. In this illustrative example, section 1043 and section 1045 of idler loop extension 1006 are comprised of a non-nonlinear optical material. Section 1046 of idler loop extension 1006 is comprised of a nonlinear optical material that also is an electro-optic material. Examples of material that have a large second-order nonlinear optical coefficient as well as a large electro-optic coefficient include lithium niobate and gallium arsenide.

In this illustrative example, segment 1007 and segment 1009 of secondary optical waveguide 1008 is comprised of a nonlinear optical material that also is an electro-optic material. In this example, signal loop extension 1004 likewise is comprised of a nonlinear optical material that also is an electro-optic material.

As depicted, optical waveguide structure 1000 also includes pump input optical waveguide 1032 that inputs pump light 1012. Optical waveguide structure 1000 also includes signal output optical waveguide 1034 and idler output optical waveguide 1036. Signal output optical waveguide 1034 can output signal light 1014. Idler output optical waveguide 1036 can output idler light 1016.

As shown in this figure, first wavelength-selective coupler 1020 and second wavelength-selective coupler 1022 connect pump loop extension 1002 to main nonlinear optical waveguide 1010. In this illustrative example, third wavelength-selective coupler 1024 and fourth wavelength-selective coupler 1026 connect idler loop extension 1006 to segment 1007 and segment 1009 of secondary optical waveguide 1008. Third wavelength-selective coupler 1024 and fourth wavelength-selective coupler 1026 also connect signal loop extension 1004 to segment 1007 and segment 1009 of secondary optical waveguide 1008.

In this illustrative example, pump optical coupler 1031 couples pump input optical waveguide 1032 to pump loop extension 1002. Signal optical coupler 1035 couples signal output optical waveguide 1034 to signal loop extension 1004. Idler optical coupler 1037 couples idler output optical waveguide 1036 to idler loop extension 1006.

In this illustrative example, pump light 1012 travels in pump loop 1052 which extends through main nonlinear optical waveguide 1010 and pump loop extension 1002. Signal light 1014 travels in signal loop 1054 which extends through main nonlinear optical waveguide 1010, segment 1007 and segment 1009 in secondary optical waveguide 1008, and signal loop extension 1004. Idler light 1016 travels in idler loop 1056, which extends through main nonlinear optical waveguide 1010, segment 1007 and segment 1009 of secondary optical waveguide 1008, and idler loop extension 1006.

As depicted, optical waveguide structure 1000 also includes phase shifters in the form of tuning electrodes. In this illustrative example, tuning electrode 1060 is located adjacent to a portion of main nonlinear optical waveguide 1010. In this example, the portion of main nonlinear optical waveguide 1010 is segment 1040. Tuning electrode 1064 is located adjacent to a portion of signal loop extension 1004. As depicted, the portion of signal loop extension 1004 is segment 1044. Tuning electrode 1066 is located adjacent to section 1046 of idler loop extension 1006. These tuning electrodes can apply voltages to obtain a desired level of resonance to achieve a resonant condition for the three wavelengths of light traveling within optical waveguide structure 1000. For example, tuning electrode 1060 can adjust the phase for pump light 1012. Tuning electrode 1064 can adjust the phase of signal light 1014. Tuning electrode 1066 can adjust the phase of idler light 1016.

A nonlinear optical process for the generation of photons for signal light 1014 and idler light 1016 from photons of pump light 1012 occurs in main nonlinear optical waveguide 1010 in optical waveguide structure 1000. In this example, the nonlinear optical process does not occur, or negligibly occurs, in other parts of optical waveguide structure 1000. In this depicted example, pump light 1012 supplied through pump input optical waveguide 1032 travels only through main nonlinear optical waveguide 1010, first wavelength-selective coupler 1020, second wavelength-selective coupler 1022 and pump loop extension 1002. Nonlinear optical generation of signal photons and idler photons from pump photons occurs only where pump light travels and interacts with nonlinear optical material in a waveguide. Thus, both pump light and nonlinear optical material must be present for nonlinear optical generation of signal photons and idler photons from pump photons to occur.

In this illustrative example, pump loop extension 1002 is comprised of a material having a negligible second order nonlinear optical coefficient such as $Si_3N_4$ and $SiO_2$. The other portions of optical waveguide structure 1000 through which pump light 1012 does not propagate can contain a material such as lithium niobate, which has a large electro-optic coefficient and also has a large second-order nonlinear optical coefficient. This material is useful for electro-optic tuning.

Additionally, signal light 1014 travels in signal loop 1054 that traverses through main nonlinear optical waveguide 1010, segment 1007 and segment 1009 of secondary optical waveguide 1008 and signal loop extension 1004, as well as through first wavelength-selective coupler 1020 and second wavelength-selective coupler 1022 and third wavelength-selective coupler 1024 and fourth wavelength-selective coupler 1026. In this example, this combination of optical waveguides can also serve as a resonator for signal light 1014. Tuning electrode 1064 for signal loop extension 1004 is located along signal loop 1054 and can operate to achieve electrically controlled optical phase shifting for signal light 1014.

In this depicted example, idler light 1016 travels in idler loop 1056. Idler loop 1056 extends through idler loop extension 1006, and tuning electrode 1066 for idler loop extension 1006 can operate to achieve an electrically controlled optical phase shifting for idler light 1016. Lithium niobate is an electro-optic material for which the material refractive index can be changed by applying an electrical field. A material such as lithium niobate can be used in the segment 1044 of signal loop extension 1004 adjacent to tuning electrode 1064 and in the section 1046 of idler loop extension 1006 adjacent to tuning electrode 1066.

In this illustrative example, pump loop extension 1002 does not have a tuning electrode. Tuning electrode 1060 can be used adjacent to main nonlinear optical waveguide 1010 and can operate to achieve some electrical control of the optical phase shift for pump light 1012. However, the use of tuning electrode 1060 can affect the round-trip phase shift of pump light 1012, as well as the round-trip phase shifts of signal light 1014 and idler light 1016.

These tuning electrodes in optical waveguide structure 1000 can apply voltages to obtain desired levels of phase shifts for the pump light 1012, signal light 1014 and idler light 1016 to achieve resonance matching 300 in FIG. 5 for those three wavelengths of light traveling within optical waveguide structure 1000. These tuning electrodes in optical waveguide structure 1000 also can apply voltages to obtain desired levels of phase shifts for the pump light 1012, signal light 1014 and idler light 1016 to achieve roundtrip phase matching 302 for the combination of those three wavelengths of light traveling within optical waveguide structure 1000.

Figure 15:
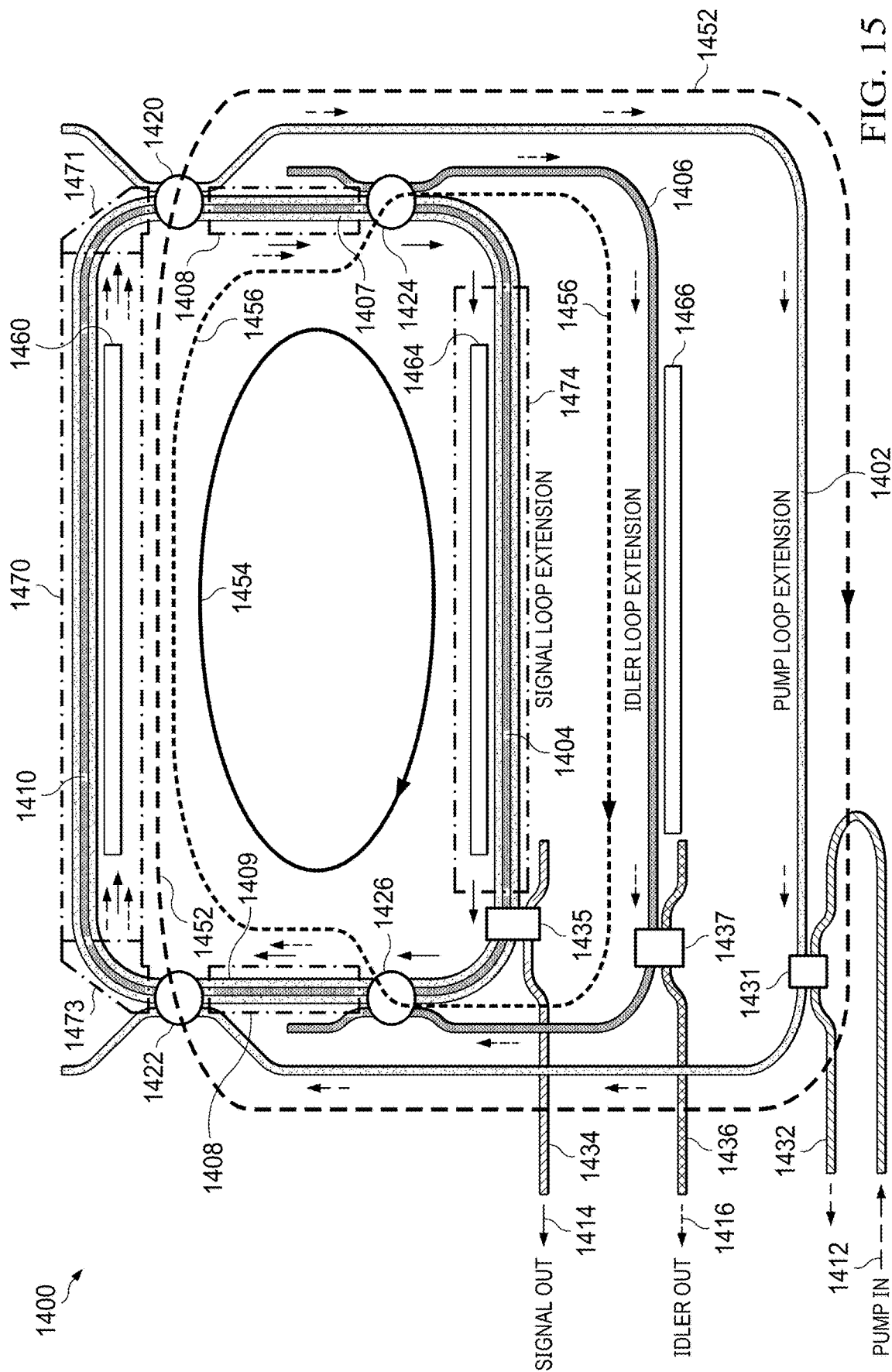
FIG. 15 is an illustration of an optical waveguide structure with five optical waveguides in accordance with an illustrative embodiment.

With reference now to FIG. 15, an illustration of an optical waveguide structure with five optical waveguides is depicted in accordance with an illustrative embodiment. In this illustrative example, optical waveguide structure 1400 is an example of an implementation for optical waveguide structure 100 as shown in FIGS. 1-6. As depicted, optical waveguide structure 1400 comprises optical waveguides in the form of main nonlinear optical waveguide 1410, segments of secondary optical waveguide 1408, pump loop extension 1402, signal loop extension 1404, and idler loop extension 1406.

In this illustrative example, main nonlinear optical waveguide 1410 is comprised of a nonlinear optical material 104.

As depicted, pump loop extension 1402 is comprised of a non-nonlinear optical material, such as non-nonlinear optical material 105. In this example, idler loop extension 1406 is comprised of an electro-optic material 103 that also can have a large second-order nonlinear optical coefficient. In this example, signal loop extension 1404 is comprised of a nonlinear optical material, such as nonlinear optical material 104, that also has a large electro-optic coefficient.

As depicted, optical waveguide structure 1400 includes pump input optical waveguide 1432 that inputs pump light 1412. Optical waveguide structure 1400 also includes signal output optical waveguide 1434 and idler output optical waveguide 1436. Signal output optical waveguide 1434 can output signal light 1414. Idler output optical waveguide 1436 can output idler light 1416.

As depicted, first wavelength-selective coupler 1420 and second wavelength-selective coupler 1422 connect pump loop extension 1402 to main nonlinear optical waveguide 1410. In this illustrative example, third wavelength-selective coupler 1424 and fourth wavelength-selective coupler 1426 connect idler loop extension 1406 to segment 1407 and segment 1409 of secondary optical waveguide 1408. In this illustrative example, third wavelength-selective coupler 1424 and fourth wavelength-selective coupler 1426 also connect signal loop extension 1404 to segment 1407 and segment 1409 of secondary optical waveguide 1408.

In this illustrative example, pump input coupler 1431 couples pump input optical waveguide 1432 to pump loop extension 1402. Signal output coupler 1435 couples signal output optical waveguide 1434 to signal loop extension 1404. Idler output coupler 1437 couples idler output optical waveguide 1436 to idler loop extension 1406.

In this depicted example, pump loop 1452 is present for pump light 1412. This pump loop 1452 is a resonator loop in which pump light 1412 travels in pump loop extension 1402 and in main nonlinear optical waveguide 1410.

In this example, signal light 1414 travels in signal loop 1454. As depicted, signal loop 1454 extends through main nonlinear optical waveguide 1410, through segments 1407 and 1409 of secondary optical waveguide 1408, and through signal loop extension 1404. As shown in the figure, idler light 1416 travels in idler loop 1456. Further, in this example, idler loop 1456 extends through main nonlinear optical waveguide 1410, through segments 1407 and segment 1409 of secondary optical waveguide 1408, and through idler loop extension 1406.

As depicted, optical waveguide structure 1400 also includes phase shifters in the form of tuning electrodes. In this illustrative example, tuning electrode 1460 is located adjacent to main nonlinear optical waveguide 1410. Tuning electrode 1464 is located adjacent to signal loop extension 1404. Tuning electrode 1466 is located adjacent to idler loop extension 1406.

In this illustrative example, a nonlinear optical process occurs in main nonlinear optical waveguide 1410 in optical waveguide structure 1400. Main nonlinear optical waveguide 1410 is constructed using a material such as x-cut lithium niobate, which can have both a large second order nonlinear optical coefficient and a large electro-optic coefficient.

As depicted, main nonlinear optical waveguide 1410 has a straight segment 1470 and two corner segments, corner segment 1471 and corner segment 1473. In this illustrative example, straight segment 1470 is aligned parallel to the y-axis of the x-cut lithium niobate crystal. Segment 1407 and segment 1409 are part of secondary optical waveguide 1408. In this illustrative example, segment 1407 and segment 1409 are aligned parallel to the z-axis of the x-cut lithium niobate crystal.

In this depicted example, transverse-electric (TE) polarized light propagating in main nonlinear optical waveguide 1410 can encounter the largest electro-optic coefficient 733 when the light travels in straight segment 1470 in main nonlinear optical waveguide 1410. TE polarized light also encounters the largest electro-optic coefficient 733 of x-cut lithium niobate when the light travels in segment 1474 of signal loop extension 1404 adjacent to tuning electrode 1464 and when the light travels in the portion of idler loop extension 1406 adjacent to tuning electrode 1466.

As depicted, light travels in a clockwise direction through main nonlinear optical waveguide 1410, pump loop extension 1402, signal loop extension 1404, and idler loop extension 1406. This direction is selected by the configuration of the input and output couplers, such as pump input coupler 1431, signal output coupler 1435, and idler output coupler 1437. However, these three input and output couplers could be configured to have the light travel in a counter-clockwise direction through main nonlinear optical waveguide 1410, pump loop extension 1402, signal loop extension 1404, and idler loop extension 1406, and by where pump light 1412 is supplied to pump input optical waveguide 1432. Counter-clockwise travel is established by supplying pump light into the opposite end of pump input coupler 1431, extracting signal light out from the opposite end of signal output coupler 1435, and extracting idler light out from the opposite end of idler output coupler 1437.

As depicted, first wavelength-selective coupler 1420 connects corner segment 1471 of main nonlinear optical waveguide 1410 to segment 1407 of secondary optical waveguide 1408. Second wavelength-selective coupler 1422 connects segment 1409 of secondary optical waveguide 1408 to corner segment 1473 of main nonlinear optical waveguide 1410.

As depicted, third wavelength-selective coupler 1424 and fourth wavelength-selective coupler 1426 operate to establish a resonator loop, idler loop 1456, for idler light 1416 and also to establish a resonator loop, signal loop 1454, for signal light 1414. In this illustrative example, third wavelength-selective coupler 1424 extracts idler light 1416 away from segment 1407 of secondary optical waveguide 1408 and into the idler loop extension 1406. Fourth wavelength-selective coupler 1426 returns idler light 1416 back into segment 1409 of secondary optical waveguide 1408 after idler light 1416 has propagated through idler loop extension 1406 while traveling in idler loop 1456.

In this illustrative example, third wavelength-selective coupler 1424 also extracts signal light 1414 away from segment 1407 of secondary optical waveguide 1408 and into the signal loop extension 1404. Fourth wavelength-selective coupler 1426 also returns signal light 1414 back into segment 1409 of secondary optical waveguide 1408 after signal light 1414 has propagated through signal loop extension 1404 while traveling in idler loop 1456. Signal light 1414 travels to a thru-state output of third wavelength-selective coupler 1424 and travels to a thru-state output of fourth wavelength-selective coupler 1426. Idler light 1416 travels to a cross-state output of third wavelength-selective coupler 1424 and travels to a cross-state output of fourth wavelength-selective coupler 1426, as discussed before with reference to FIG. 10.

In this illustrative example, first wavelength-selective coupler 1420 and second wavelength-selective coupler 1422 operate to establish a resonator loop, pump loop 1452 for pump light 1412. As depicted, first wavelength-selective coupler 1420 extracts pump light 1412 away from main nonlinear optical waveguide 1410 and into pump loop extension 1402 to travel in pump loop 1452. Second wavelength-selective coupler 1422 returns pump light 1412 to main nonlinear optical waveguide 1410 after pump light 1412 has propagated through pump loop extension 1402 while traveling in pump loop 1452.

In this illustrative example, the material for idler loop extension 1406 and the material for signal loop extension 1404 can be a material such as lithium niobate for which the electro-optic coefficient is large. The large electro-optic coefficient allows the phase shifters in the signal loop extension and the idler loop extension to be more efficient, producing a larger phase shift for a given applied voltage. But for lithium niobate, the second order nonlinear optical coefficient also is large. However, pump light 1412 is not supplied to these portions of optical waveguide structure 1400, resulting in an absence of undesired nonlinear optical generation of additional signal or idler photons in these portions. In this illustrative example, pump loop extension 1402 is comprised of a non-nonlinear optical material.

As depicted, pump light 1412 propagates primarily only in main nonlinear optical waveguide 1410 and pump loop extension 1402. The second order nonlinear optical coefficient is largest $d_{33}$ for light propagating in straight segment 1470 of main nonlinear optical waveguide 1410 and is smaller for light propagating in corner segment 1471 and corner segment 1473. Also, the sign of a component $d_{22}$ of the second order nonlinear optical coefficient in corner segment 1471 is opposite from the sign of that component of the second order nonlinear optical coefficient in corner segment 1473. As a result, the generation of signal light 1414 and idler light 1416 occurs mainly in straight segment 1470 and occurs much less in other portions of optical waveguide structure 1400 because of the manner in which pump light 1412 is introduced and removed from main nonlinear optical waveguide 1410.

In this illustrative example, pump light 1412 can be extracted from main nonlinear optical waveguide 1410 before idler light 1416 is extracted from main nonlinear optical waveguide 1410 through secondary optical waveguide 1408 into idler loop extension 1406. Also in this example, pump light 1412 is re-supplied to main nonlinear optical waveguide 1410 from pump loop extension 1402 after idler light 1416 is re-supplied to main nonlinear optical waveguide 1410 from idler loop extension 1406 through secondary optical waveguide 1408. A similar arrangement applies for the pump light 1412 in relation to the signal light 1414.

As a result, although the nonlinear optical material is present along the entire length of the signal loop 1054 for signal light 1414 and idler loop 1456 for idler light 1416, the nonlinear optical generation of photons for signal light 1414 and idler light 1416 from photons for pump light 1412 occurs only in main nonlinear optical waveguide 1410. Nonlinear optical generation of signal light 1414 and idler light 1416 is absent in secondary optical waveguide 1408, idler loop extension 1406 and signal loop extension 1404. The absence of nonlinear optical generation is because pump light 1412 is supplied only to main nonlinear optical waveguide 1410.

A nonlinear optical generation process can result in generation of lower intensity light from higher intensity light. A nonlinear optical generation process also can operate in reverse and result in the generation of a higher intensity light from a lower intensity light. The efficiency of the nonlinear optical generation process depends on the intensity of the source light involved in that generation process, or the intensities of the source light of several different wavelengths if source light of multiple wavelengths is involved in that process. For spontaneous parametric down conversion as an illustrative example of a nonlinear optical generation process, the pump light, which is the input or source light, has an intensity that is at least twice the intensity of the generated signal light and at least twice the intensity of the generated idler light.

In many examples of spontaneous parametric down conversion, the intensity of the pump light is at least ten times greater than the intensity of the signal light or of the idler light. Thus, even when a phase-matched condition is present, if the pump light is absent from an optical waveguide comprising nonlinear optical material and only signal and idler light are present, the reverse process in which pump light, or light at the pump wavelength, is generated from the weaker source light at the signal and idler wavelengths is much less efficient and may produce very little or possibly even negligible light at the pump wavelength.

Figure 16:
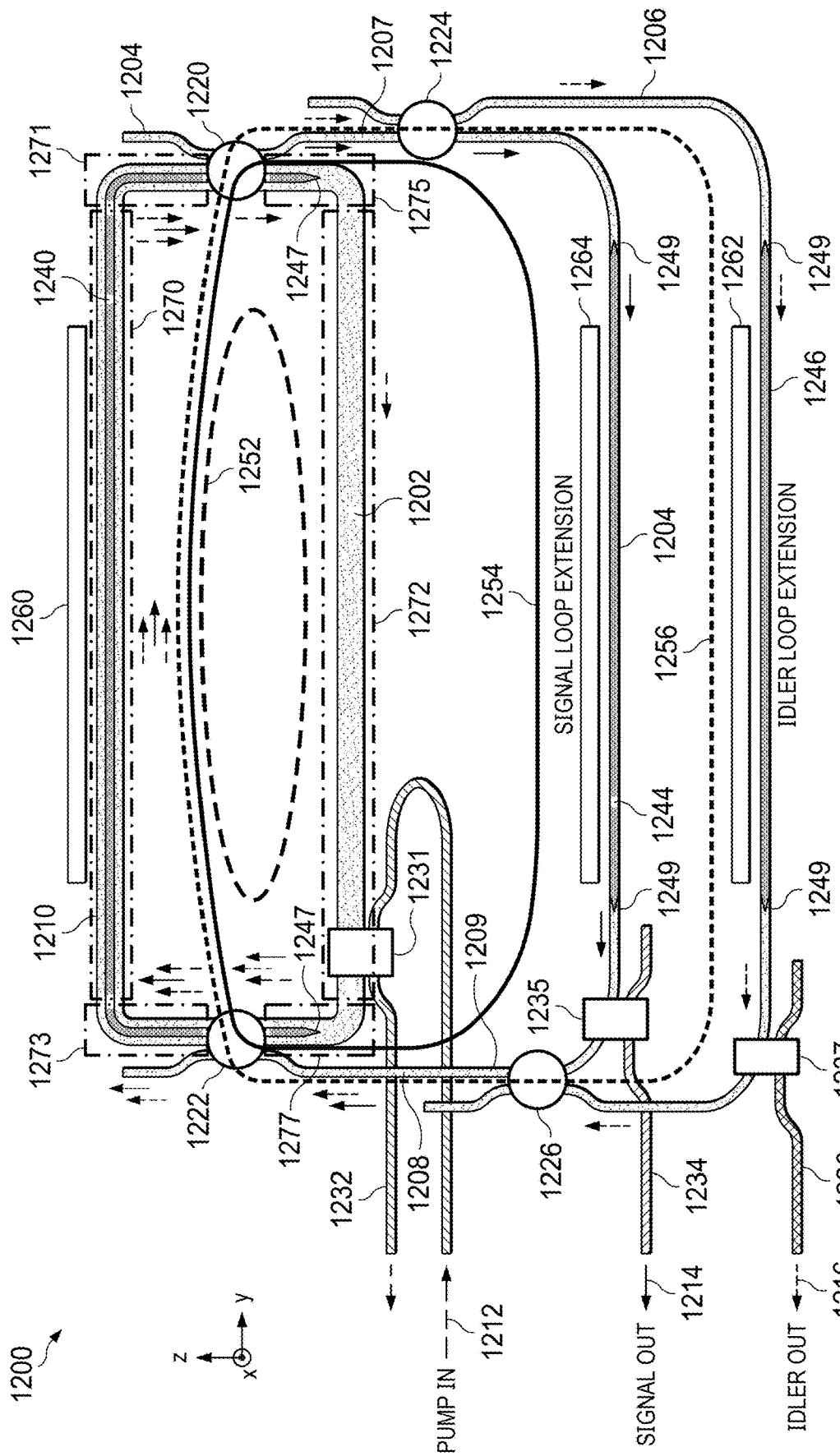
FIG. 16 is an illustration of an optical waveguide structure with five optical waveguides in accordance with an illustrative embodiment

With reference next to FIG. 16, an illustration of an optical waveguide structure with five optical waveguides is depicted in accordance with an illustrative embodiment. In this illustrative example, optical waveguide structure 1200 is an example of an implementation for optical waveguide structure 100 as shown in FIGS. 1-6.

As depicted, optical waveguide structure 1200 comprises optical waveguides in the form of main nonlinear optical waveguide 1210, pump loop extension 1202, secondary optical waveguide 1208, signal loop extension 1204, and idler loop extension 1206. Main nonlinear optical waveguide 1210 is an example of main nonlinear optical waveguide 106 in FIG. 3 and main nonlinear optical waveguide 106 in FIG. 2. Pump loop extension 1202 is an example of an implementation for first extension optical waveguide 108 in FIG. 3 and first extension optical waveguide 108 in FIG. 2. Idler loop extension 1206 and signal loop extension 1204 are optical waveguides that can be coupled to secondary optical waveguide 113 in FIG. 3 or coupled to secondary optical waveguide 113 in FIG. 2.

In this illustrative example, first loop 1252 through main nonlinear optical waveguide 1210 and pump loop extension 1202 has a rectangular shape with curved corners and may also be referred to as a racetrack shape. First loop 1252 for the pump light is a closed path route.

As depicted in this example, first loop 1252 for pump light 1212 through main nonlinear optical waveguide 1210 and through pump loop extension 1202 traverses segments of waveguide comprised of nonlinear optical material 104 and segments of waveguide comprised of non-nonlinear optical material 105. The nonlinear optical material is present in main nonlinear optical waveguide 1210, which includes straight segment 1270 corner segment 1271, and corner segments 1273. The nonlinear optical material also is present in portions of corner segment 1275 and corner segment 1277 of pump loop extension 1202. A non-nonlinear optical material 105 is present in segment 1272 of pump loop extension 1202.

A non-nonlinear optical material also can be present in corner segment 1275 and corner segment 1277 of pump loop extension 1202 instead of the nonlinear optical material. As depicted in this figure, a tapered transition 1247 can be present between the portion of corner segment 1275 and corner segment 1277 that contains a nonlinear optical material and the portion of corner segment 1275 and corner segment 1277 that does not contain a nonlinear optical material but rather comprises only non-nonlinear optical material.

In this illustrative example, both signal loop extension 1204 and idler loop extension 1206 have portions that comprise an electro-optic material 103 that also is a non-linear optical material 104 and other portions that comprise a non-nonlinear optical material 105. The electro-optic material is located in section 1244 of signal loop extension 1204 and in section 1246 of idler loop extension 1206. To reduce optical losses and reflections, there can be a tapered transition 1249 between a waveguide portion comprising an electro-optic material and a waveguide portion comprising a non-nonlinear optical material.

As depicted, optical waveguide structure 1200 also includes pump input optical waveguide 1232 that inputs pump light 1212. Optical waveguide structure 1200 also includes signal output optical waveguide 1234 and idler output optical waveguide 1236. Signal output optical waveguide 1234 can output signal light 1214. Idler output optical waveguide 1236 can output idler light 1216.

In this illustrative example, pump optical coupler 1231 couples pump input optical waveguide 1232 to pump loop extension 1202. Signal optical coupler 1235 couples signal output optical waveguide 1234 to signal loop extension 1204. Idler optical coupler 1237 couples idler output optical waveguide 1236 to idler loop extension 1206.

In this illustrative example, first wavelength-selective coupler 1220 and second wavelength-selective coupler 1222 connect pump loop extension 1202 to main nonlinear optical waveguide 1210. Pump light 1212 is coupled via the thru-state outputs of first wavelength-selective coupler 1220 and second wavelength-selective coupler 1222. As depicted, first wavelength-selective coupler 1220 and second wavelength-selective coupler 1222 also connect signal light 1214 and idler light 1216 between main nonlinear optical waveguide 1210 and segments of secondary optical waveguide 1208. Signal light 1214 and idler light 1216 are coupled via the cross-state outputs of first wavelength-selective coupler 1220 and second wavelength-selective coupler 1222. In this illustrative example, third wavelength-selective coupler 1224 and fourth wavelength-selective coupler 1226 connect idler loop extension 1206 to segment 1207 and segment 1209 of secondary optical waveguide 1208. Third wavelength-selective coupler 1224 and fourth wavelength-selective coupler 1226 also connect signal loop extension 1204 to segment 1207 and segment 1209 of secondary optical waveguide 1208. Signal light 1214 is coupled via the thru-state outputs of third wavelength-selective coupler 1224 and fourth wavelength-selective coupler 1226. Idler light 1216 is coupled via the cross-state outputs of third wavelength-selective coupler 1224 and fourth wavelength-selective coupler 1226.

In this illustrative example, first loop 1252 is present for pump light 1212. This first loop is a resonator loop in which pump light 1212 travels in main nonlinear optical waveguide 1210 and in pump loop extension 1202. Signal light 1214 travels in second loop 1254. As depicted, second loop 1254 extends through main nonlinear optical waveguide 1210, through segment 1207 and segment 1209 of secondary optical waveguide 1208 and through signal loop extension 1204. In this illustrative example, idler light 1216 travels in third loop 1256. As depicted, third loop 1256 extends through main nonlinear optical waveguide 1210, through segment 1207 and segment 1209 of secondary optical waveguide 1208, and through idler loop extension 1206.

As depicted, optical waveguide structure 1200 also includes phase shifters in the form of tuning electrodes. In this illustrative example, tuning electrode 1260 is located adjacent to section 1240 in main nonlinear optical waveguide 1210. Tuning electrode 1264 is located adjacent to section 1244 in signal loop extension 1204 and tuning electrode 1266 is located adjacent to section 1246 in idler loop extension 1203. These tuning electrodes can apply voltages to obtain a desired level of resonance to achieve a resonant condition for light traveling within optical waveguide structure 1200.

In this illustrative example of optical waveguide structure 1200 having triple partially overlapping loop resonators for entanglement with direction dependent material, pump light 1212, signal light 1214, and idler light 1216 travel in different resonator loops, first loop 1252, second loop 1254, and third loop 1256, respectively. First loop 1252 is a resonator loop for the pump light 1212 and extends through main nonlinear optical waveguide 1210, first wavelength-selective coupler 1220 (via its thru-state output), second wavelength-selective coupler 1222 (via its thru-state output), pump loop extension 1202, and pump optical coupler 1231 (via its thru-state output).

In this illustrative example, second loop 1254 is a resonator loop for signal light 1214. Second loop 1254 extends through main nonlinear optical waveguide 1210, first wavelength-selective coupler 1220 (via its cross-state output), segment 1207 of secondary optical waveguide 1208, third wavelength-selective coupler 1224 (via its thru-state output), signal loop extension 1204, and signal optical coupler 1235 (via its thru-state output) fourth wavelength-selective coupler 1226 (via its thru-state output), segment 1209 of secondary optical waveguide 1208, and second wavelength-selective coupler 1222 (via its cross-state output), looping again to main nonlinear optical waveguide 1210.

As depicted, third loop 1256 is a resonator loop for idler light 1216. This third loop 1256 extends through main nonlinear optical waveguide 1210, first wavelength-selective coupler 1220 (via its cross-state output); segment 1207 of secondary optical waveguide 1208 located between first wavelength-selective coupler 1220 and third wavelength-selective coupler 1224; third wavelength-selective coupler 1224 (via its cross-state output); idler loop extension 1206; idler optical coupler 1237 (via its thru-state output); fourth wavelength-selective coupler 1226 (via its cross-state output); segment 1209 of secondary optical waveguide 1208 located between fourth wavelength-selective coupler 1226 and second wavelength-selective coupler 1222; and second wavelength-selective coupler 1222 (via its cross-state output); looping back to main nonlinear optical waveguide 1210.

In this illustrative example of optical waveguide structure 1200 having triple partially overlapping loop resonators for entanglement constructed from a direction dependent material, main nonlinear optical waveguide 1210 is common to and overlaps all three loop resonators. Also, first wavelength-selective coupler 1220 and second wavelength-selective coupler 1222 are encountered by the light in all three loops. However, first loop 1252 for pump light 1212 encounters the thru-state of these couplers. In this example, second loop 1254 and third loop 1256 for signal light 1214 and idler light 1216, respectively, encounter the cross-state of these couplers.

In this illustrative example, a second-order nonlinear optical process such as spontaneous parametric down conversion occurs in optical waveguide structure 1200. Nonlinear optical generation of signal photons and idler photons from pump photons, which is a result of spontaneous parametric down conversion, occurs when pump light propagates in an optical waveguide comprising nonlinear optical material such as lithium niobate which has a large second-order nonlinear optical coefficient. Optical waveguide structure 1200 includes main nonlinear optical waveguide 1210. Main nonlinear optical waveguide 1210 is the primary part of optical waveguide structure 1200 for which pump light 1212 is present and propagates in a waveguide comprising nonlinear optical material. As result, most of the generation of signal photons and idler photons from pump photons occurs in main nonlinear optical waveguide 1210. Essentially, negligible generation of signal photons and idler photons occurs in other portions of optical waveguide structure 1200. As depicted, main nonlinear optical waveguide 1210 comprises a nonlinear optical material. Most of the pump loop extension 1202, such as portion or segment 1272 of pump loop extension 1202 does not comprise a nonlinear optical material.

The various optical waveguides in optical waveguide structure 1200 can be fabricated using x-cut lithium niobate and in particular, from x-cut thin-film lithium niobate. In this illustrative example, straight segment 1270 in main nonlinear optical waveguide 1210 and segment 1272 in pump loop extension 1202 can be considered long legs of a rectangular-shaped path with curved corners or of a racetrack shaped path. These two segments are oriented to be aligned parallel to the y-axis of the x-cut lithium niobate crystal. As depicted, corner segments 1271 and 1273 of main nonlinear optical waveguide 1210 together with corner segment 1275 and corner segment 1277 of pump loop extension 1202 are the short legs of this rectangular-shaped or racetrack shaped path. The straight portions of corner segment 1271 and corner segment 1275 closest to first wavelength-selective coupler 1220 and the straight portions of corner segment 1273 and corner segment 1277 closest to second wavelength-selective coupler 1222 are aligned parallel to the z-axis of the x-cut lithium niobate crystal. In this example, transverse-electric (TE) polarized light propagating in main nonlinear optical waveguide 1210 encounters the largest second order nonlinear optical coefficient $d_{33}$ when the light travels in straight segment 1270 in main nonlinear optical waveguide 1210.

In this example, when phase matching is achieved, most of the nonlinear optical generation of signal light 1214 and idler light 1216 occurs in straight segment 1270 of main nonlinear optical waveguide 1210. Some nonlinear optical generation of signal and idler photons also occurs in corner segments 1271 and 1273 of main nonlinear optical waveguide 1210. Some generation of signal light 1214 and idler light 1216 also can occur in portions of corner segment 1275 and corner segment 1277 of pump loop extension 1202 because these portions comprise nonlinear optical material, as depicted in FIG. 16. However, the second order nonlinear optical coefficient $d_{22}$ for transverse-electric (TE) polarized light in these portions is more than one order of magnitude smaller than the second order nonlinear optical coefficient $d_{33}$ for transverse-electric (TE) polarized light in straight segment 1270 in this illustrative example. Moreover, the nonlinear optical generation of signal and idler photons that occurs in corner segment 1275 is partially counter-acted by the nonlinear optical generation of signal and idler photons that occurs in corner segment 1277. This is because the second order nonlinear optical coefficient $d_{22}$ in these two segments have opposite sign. Segment 1272 in pump loop extension 1202 comprises a non-nonlinear optical material. Thus, no generation of signal and idler photons occurs in that segment.

Figure 17:
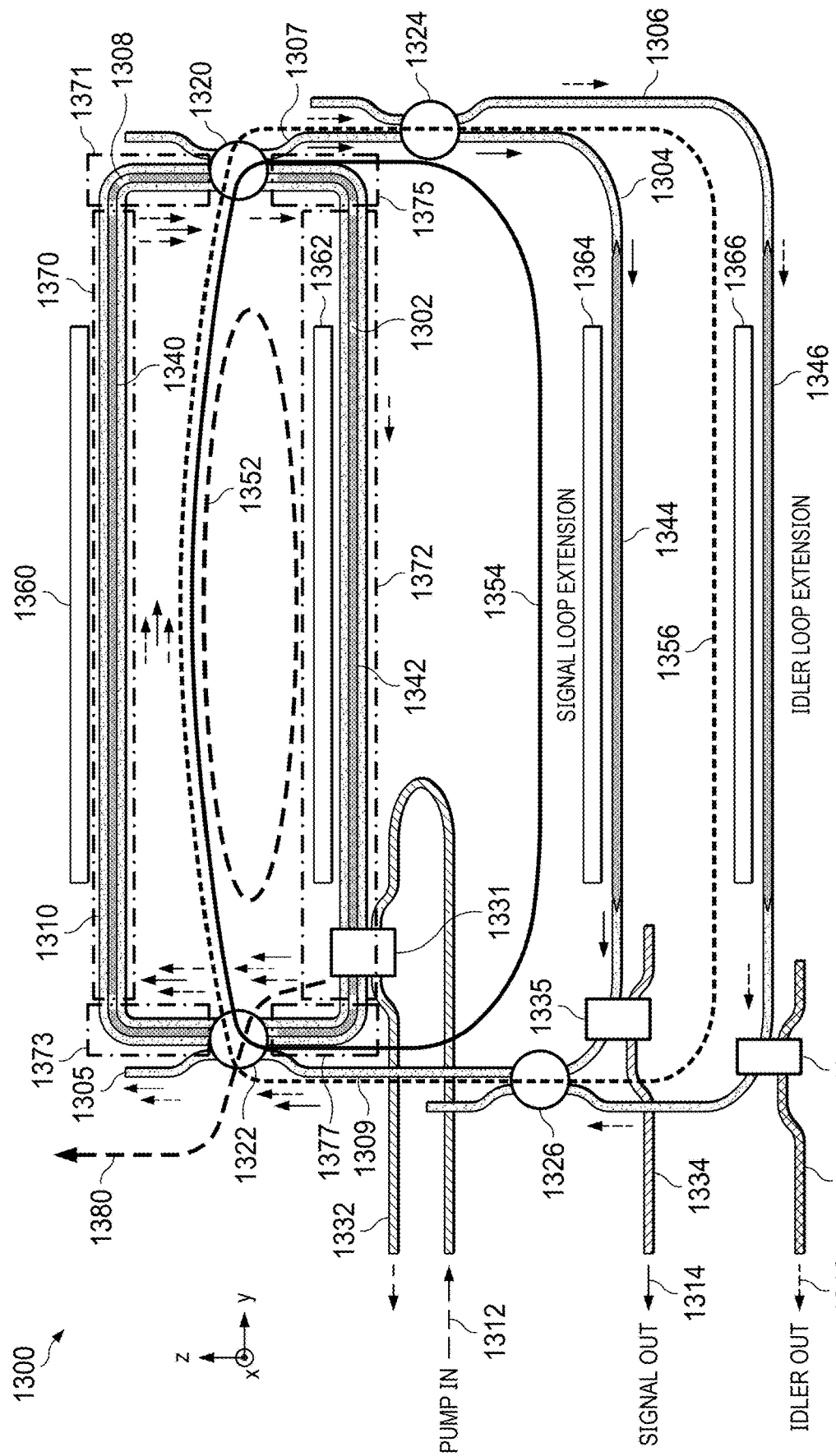
FIG. 17 is an illustration of an optical waveguide structure with five optical waveguides in accordance with an illustrative embodiment.

Turning next to FIG. 17, an illustration of an optical waveguide structure with five optical waveguides is depicted in accordance with an illustrative embodiment. In this illustrative example, optical waveguide structure 1300 is an example of an implementation for optical waveguide structure 100 as shown in FIGS. 1-6. As depicted, optical waveguide structure 1300 comprises optical waveguides in the form of main nonlinear optical waveguide 1310, secondary optical waveguide 1308 having segment 1307 and segment 1309, pump loop extension 1302, signal loop extension 1304, and idler loop extension 1306.

In this illustrative example, main nonlinear optical waveguide 1310 and pump loop extension 1302 form a path that has a rectangular shape with curved corners and may also be referred to as a racetrack shape. Main nonlinear optical waveguide 1310 is comprised of a nonlinear optical material 104. Pump loop extension 1302 also is comprised of a nonlinear optical material 104. Optical waveguide structure 1300 is similar to optical waveguide structure 1200 in FIG. 16 but with the entire length of pump loop extension 1302 being comprised of nonlinear optical material 104 rather than having a portion of its length being comprised of a non-nonlinear optical material 105. In this example, main nonlinear optical waveguide 1310 has at least portion 1340 that comprises an electro-optic material 103. Also, pump loop extension 1302 has at least portion 1342 that comprises an electro-optic material.

As depicted in this illustrative example, both signal loop extension 1304 and idler loop extension 1306 have a portion of their length comprising a nonlinear optical material 104 and another portion of their length comprising a non-nonlinear optical material 105. Nonlinear optical material 104 is included in these waveguides because nonlinear optical material 104 is electro-optic material 103 that is efficient with a large electro-optic coefficient. The portion of waveguide with the electro-optic (and nonlinear optical) material is located in section 1344 of signal loop extension 1304 and in section 1346 of idler loop extension 1306.

As depicted, optical waveguide structure 1300 includes pump input optical waveguide 1332 that inputs pump light 1312. Optical waveguide structure 1300 also includes signal output optical waveguide 1334 and idler output optical waveguide 1336. Signal output optical waveguide 1334 can output signal light 1314. Idler output optical waveguide 1336 can output idler light 1316.

In this illustrative example, pump optical coupler 1331 couples pump input optical waveguide 1332 to pump loop extension 1302. Signal optical coupler 1335 couples signal output optical waveguide 1334 to signal loop extension 1304. Idler optical coupler 1337 couples idler output optical waveguide 1336 to idler loop extension 1306.

As depicted, first wavelength-selective coupler 1320 and second wavelength-selective coupler 1322, operated in their thru-state, connect pump loop extension 1302 to main nonlinear optical waveguide 1310. In this illustrative example, first wavelength-selective coupler 1320 and second wavelength-selective coupler 1322 operated in their cross-state connect the segments of secondary optical waveguide 1308 to main nonlinear optical waveguide 1310. In this illustrative example, third wavelength-selective coupler 1324 and fourth wavelength-selective coupler 1326 operated in their thru-state connect signal loop extension 1304 to segments of secondary optical waveguide 1308. In this illustrative example, third wavelength-selective coupler 1324 and fourth wavelength-selective coupler 1326 operated in their cross-state connect idler loop extension 1306 to segments of secondary optical waveguide 1308.

In this illustrative example, first loop 1352 is present for pump light 1312. This first loop is a resonator loop in which pump light 1312 travels in a route that extends through main nonlinear optical waveguide 1310 and pump loop extension 1302. Signal light 1314 travels in second loop 1354. As depicted, second loop 1354 extends through main nonlinear optical waveguide 1310, through segments of secondary optical waveguide 1308 and through signal loop extension 1304. In this illustrative example, idler light 1316 travels in third loop 1356. As depicted, third loop 1356 extends through main nonlinear optical waveguide 1310, through segments of secondary optical waveguide 1308, and through idler loop extension 1306.

In this illustrative example, first wavelength-selective coupler 1320 operating in its thru-state connects segment 1371 of main nonlinear optical waveguide 1310 and segment 1375 of pump loop extension 1302, and second wavelength-selective coupler 1322 connects segment 1377 of pump loop extension 1302 and segment 1373 of main nonlinear optical waveguide 1310. As depicted, first wavelength-selective coupler 1320, operating in its thru-state, couples pump light 1312 away from main nonlinear optical waveguide 1310 and into pump loop extension 1302 and second wavelength-selective coupler 1322, operating in its thru-state, couples pump light 1312 away from pump loop extension 1302 and into main nonlinear optical waveguide 1310 such that pump light 1312 travels in first loop 1352.

In this illustrative example, first wavelength-selective coupler 1320, operating in its cross-state, extracts signal light 1314 and idler light 1318 away from main nonlinear optical waveguide 1310 and into segment 1307 of secondary optical waveguide 1308 such that signal light 1314 generated in main nonlinear optical waveguide 1310 does not travel in first loop 1352 but instead travels in second loop 1354 and idler light 1316 generated in main nonlinear optical waveguide 1310 does not travel in first loop 1352 but instead travels in third loop 1356. In this illustrative example, second wavelength-selective coupler 1322, operating in its cross-state, returns signal light 1314 traveling in second loop 1354 and idler light 1316 traveling in third loop 1356 back through main nonlinear optical waveguide 1310.

In this illustrative example, signal light 1314 reaches signal loop extension 1304 by passing through a segment 1307 of secondary optical waveguide 1308 before being coupled by third wavelength-selective coupler 1324, operating in its thru-state, into signal loop extension 1304. Additionally, signal light 1314 is returned from signal loop extension 1304 into a segment 1309 of secondary optical waveguide 1308 by fourth wavelength-selective coupler 1326, operating in its thru-state. In this example, signal light 1314 passes through another portion, segment 1309, of secondary optical waveguide 1308 before being coupled back into main nonlinear optical waveguide 1310 by second wavelength-selective coupler 1322, operating in its cross-state.

In this illustrative example, idler light 1316 reaches idler loop extension 1306 by passing through a segment 1307 of secondary optical waveguide 1308 before being coupled by third wavelength-selective coupler 1324, operating in its cross-state, into the idler loop extension 1306. Additionally, idler light 1316 is returned from idler loop extension 1306 into another segment 1309 of secondary optical waveguide 1308 by fourth wavelength-selective coupler 1326, operating in its cross-state. In this example, idler light 1316 passes through another portion of secondary optical waveguide 1308 before being coupled back into main nonlinear optical waveguide 1310 by second wavelength-selective coupler 1322, operating in its cross-state.

In this illustrative example, pump light 1312, signal light 1314, and idler light 3016 travel in different resonator loops. In this illustrative example, first loop 1352 is a resonator loop for pump light 1312. First loop 1352 extends through main nonlinear optical waveguide 1310, pump loop extension 1302, first wavelength-selective coupler 1320, and second wavelength-selective coupler 1322.

Second loop 1354 is resonator loop for signal light 1314. This second loop extends through main nonlinear optical waveguide 1310, first wavelength-selective coupler 1320 and second wavelength-selective coupler 1322; segments 1307, 1309 of secondary optical waveguide 1308, third wavelength-selective coupler 1324; fourth wavelength-selective coupler 1326; and signal loop extension 1304.

Third loop 1356 is a resonator loop for idler light 1316. Third loop 1356 comprises main nonlinear optical waveguide 1310; first wavelength-selective coupler 1320; a segment 1307 of secondary optical waveguide 1308 between first wavelength-selective coupler 1320 and third wavelength-selective coupler 1324; third wavelength-selective coupler 1324; idler loop extension 1306; fourth wavelength-selective coupler 1326; a segment 1309 of secondary optical waveguide 1308 between fourth wavelength-selective coupler 1326 and second wavelength-selective coupler 1322.

As depicted, optical waveguide structure 1300 also includes phase shifters in the form of tuning electrodes. In this illustrative example, tuning electrode 1360 is located adjacent to a portion 1340 of main nonlinear optical waveguide 1310. Tuning electrode 1362 is located adjacent to a portion 1342 of pump loop extension 1302. Tuning electrode 1364 is located adjacent to section 1344 of signal loop extension 1304 and tuning electrode 1366 is located adjacent to section 1346 of idler loop extension 1306. These tuning electrodes can apply voltages to obtain desired level of resonance to achieve a resonant condition for light traveling within optical waveguide structure 1300. These tuning electrodes also can apply voltages to obtain a desired round-trip phase matching condition for the nonlinear optical generation process that occurs in optical waveguide structure 1300.

Compared to optical waveguide structure 1200 of FIG. 16, optical waveguide structure 1300 has four tuning electrodes rather than three tuning electrodes. The additional tuning electrode (or set of tuning electrodes) provides greater flexibility for simultaneously achieving resonance conditions for all three wavelengths of light-pump light 1312, signal light 1314, and idler light 1316 in their respective resonator loops, first loop 1352, second loop 1354 and third loop 1356 as well as to achieve round-trip phase matching. For example, tuning electrode 1360 can be used to adjust the round-trip phase $\phi_{RTp}$ of pump light 1312 in first loop 1352. Tuning electrode 1364 can be used to adjust the round-trip phase $\phi_{RTs}$ of signal light 1314 in second loop 1354, which is a signal loop. Tuning electrode 1366 can be used to adjust the round-trip phase $\phi_{RTi}$ of idler light 1316 in third loop 1356, which is an idler loop. Tuning electrode 1362 can be used to further adjust the round-trip phase $\phi_{RTp}$ of pump light 1312 in order to achieve round-trip phase matching for the nonlinear optical process that occurs in main nonlinear optical waveguide 1310. Using the terminology defined with reference to optical waveguide structure 1100 shown in FIG. 13, the round-trip phase matching condition is achieved when:

$$\phi_{RTp} - \phi_{RTs} - \phi_{RTi} = 2\pi A$$

where A is an integer, and can be zero. This means: P−S−I=A with the integers P, S and I defined earlier with reference to optical waveguide structure 1100 shown in FIG. 13. Thus, for the example of optical waveguide structure 1300, the four conditions for achieving integer values for the parameters P, S, I and A can be satisfied by adjusting the four tuning electrodes, tuning electrode 1360, tuning electrode 1364, tuning electrode 1366 and tuning electrode 1362.

In this illustrative example, electrically controlled phase shifts are provided in optical waveguide structure 1300. In this illustrative example, portions of optical waveguide structure 1300 can be fabricated in x-cut lithium niobate. As depicted, the main nonlinear optical waveguide 1310 and pump loop extension 1302 through which the first loop 1352 extends form a rectangular shape with rounded corners. The orientation of optical waveguide structure 1300 can be such that segment 1370 in main nonlinear optical waveguide 1310 and segment 1372 in pump loop extension 1302 are aligned parallel to the y-axis of the lithium niobate crystal in the x-cut lithium niobate. These two segments—segment 1370 of main nonlinear optical waveguide 1310 and segment 1372 of pump loop extension 1302—can be referred to as the long legs of the rectangular shape.

The other portions of optical waveguides in the rectangular shaped waveguide structure defined by first loop 1352 include segment 1371 and segment 1373 of main nonlinear optical waveguide 1310 as well as segment 1375 and segment 1377 of pump loop extension 1302. These segments are part of what can be referred to as the corners and short legs of the rectangular shaped or race-track shaped path traversed by first loop 1352. In this illustrative example, segment 1371, segment 1373, segment 1375 and segment 1377 together with first wavelength-selective coupler 1320 and second wavelength-selective coupler 1322 are aligned mainly parallel with the z-axis of the x-cut lithium niobate crystal.

In this illustrative example, orientation for optical waveguide structure 1300, transverse-electric (TE) polarized light propagating in the optical waveguides traversed by first loop 1352 encounters the largest electro-optic coefficient of x-cut lithium niobate when the light travels in portion 1340 and portion 1342 of main nonlinear optical waveguide 1310 and pump loop extension 1302, respectively. Portion 1340 and portion 1342 portions in which tunable phase shifts can occur. As depicted, the light travels in a clockwise direction around first loop 1352. Furthermore, TE polarized signal light traversing portion in section 1344 of signal loop extension 1304 and TE polarized idler light traversing portion in section 1346 of idler loop extension 1306 also encounter the largest electro-optic coefficient of x-cut lithium niobate. Thus, the orientation depicted in FIG. 17 for optical waveguide structure 1300 can achieve efficient voltage-controlled electro-optic phase shifting.

In this illustrative example, a nonlinear optical light generation process occurs in main nonlinear optical waveguide 1310. Furthermore, to increase the nonlinear optical generation of signal and idler light that occurs in a given round-trip, it is desirable to meet another phase matching condition for propagation of the three wavelengths of light through segment 1370 of main nonlinear optical waveguide 1310, which is the portion where most of the desired nonlinear optical generation occurs. This phase matching can be as follows:

$0 \leq \phi_{Mup} - \phi_{Mus} - \phi_{Mui} \leq \pi$, or $-\pi \leq \phi_{Mup} - \phi_{Mus} - \phi_{Mui} \leq 0$, and is close to zero.

Many materials such as lithium niobate that have a large electro-optic coefficient for a certain orientation also have a large second-order nonlinear optical coefficient. In this illustrative example, transverse-electric (TE) polarized light propagating in the optical waveguides traversed by first loop 1352, which is a pump loop, encounters the largest second order nonlinear optical coefficient when the light travels in segment 1370 of main nonlinear optical waveguide 1310 and in segment 1372 of pump loop extension 1302. In this illustrative example, the entire length of the optical waveguides traversed by the light in first loop 1352, which includes main nonlinear optical waveguide 1310 and pump loop extension 1302, comprises a nonlinear optical material. As a result, photons for signal light 1314 and idler light 1316 can be generated both in segment 1370 of main nonlinear optical waveguide 1310 and in segment 1372 of pump loop extension 1302. Some, albeit typically less, generation of signal and idler light also occurs in the corner segments, segment 1371, segment 1373, segment 1375 and segment 1377.

In this illustrative example, the optical fields of signal light 1314 and idler light 1316 generated in an optical waveguide segment that comprises nonlinear optical material can be described by expressions such as:

$$A_i(L) = \frac{\omega_i^2}{k_i c^2} \int_A^B \frac{2id_{eff} A_p A_s}{1} e^{i\Delta k z} dz \sim \frac{2id_{eff} \omega_i^2 A_p A_s L}{k_i c^2} \left( \frac{e^{i(\phi_{Mup} - \phi_{Mus} - \phi_{Mui})} - 1}{i(\phi_{Mup} - \phi_{Mus} - \phi_{Mui})} \right)$$

and $$A_s(L) = \frac{\omega_s^2}{k_s c^2} \int_A^B \frac{2id_{eff} A_p A_i}{1} e^{i\Delta k z} dz \sim \frac{2id_{eff} \omega_s^2 A_p A_i L}{k_s c^2} \left( \frac{e^{i(\phi_{Mup} - \phi_{Mus} - \phi_{Mui})} - 1}{i(\phi_{Mup} - \phi_{Mus} - \phi_{Mui})} \right).$$

In these expression, A and B are the starting and ending points of a segment, such as segment 1370 of main nonlinear optical waveguide 1310 or segment 1372 of pump loop extension 1302, with L being the length of that segment. The subscripts i, s, and p indicate pump, signal, and idler, respectively. The second order nonlinear optical coefficient $d_{eff}$ in segment 1370 has the opposite sign from the second order nonlinear optical coefficient $d_{eff}$ in segment 1372. As a result, the contributions to the signal and idler optical fields from segment 1370 of main nonlinear optical waveguide 1310 and segment 1372 of pump loop extension 1302 can counteract each other, or the optical fields can interfere in a destructive manner, if the optical fields from these two segments are combined together, assuming the phase matching is perfect.

Optical waveguide structure 1300 avoids the interaction of signal and idler light generated in segment 1370 with signal and idler light generated in segment 1372. First wavelength-selective coupler 1320 functions to couple signal light 1314 and idler light 1316 generated in segment 1370 away from pump loop extension 1302 and thus away from segment 1372 by diverting that light into segment 1307 of secondary optical waveguide 1308. Similarly, second wavelength-selective coupler 1322 functions to couple signal light 1314 and idler light 1316 generated in segment 1372 away from main nonlinear optical waveguide 1310 and thus away from segment 1370, as shown by arrow 1380 into output optical waveguide 1305. This coupling function done by second wavelength-selective coupler 1322 is performed in addition to coupling signal light 1314 in second loop 1354 and idler light 1316 in third loop 1356 from segment 1309 of secondary optical waveguide 1308 into main nonlinear optical waveguide 1310. Thus, the signal light 1314 and idler light 1316 coupled back into main nonlinear optical waveguide 1310 through second wavelength-selective coupler 1322 is generated in a prior pass through main nonlinear optical waveguide 1310 and is not generated in the pump loop extension 1302.

As a result, any destructive interaction between signal light 1314 and idler light 1316 generated in segment 1370 and generated in segment 1372 is absent. Thus, signal light 1314 and idler light 1316 that result from circulation through many round-trips in the optical waveguide structure 1300 are those photons for signal light 1314 and idler light 1316 generated primarily in segment 1370 in main nonlinear optical waveguide 1310.

Figure 18:
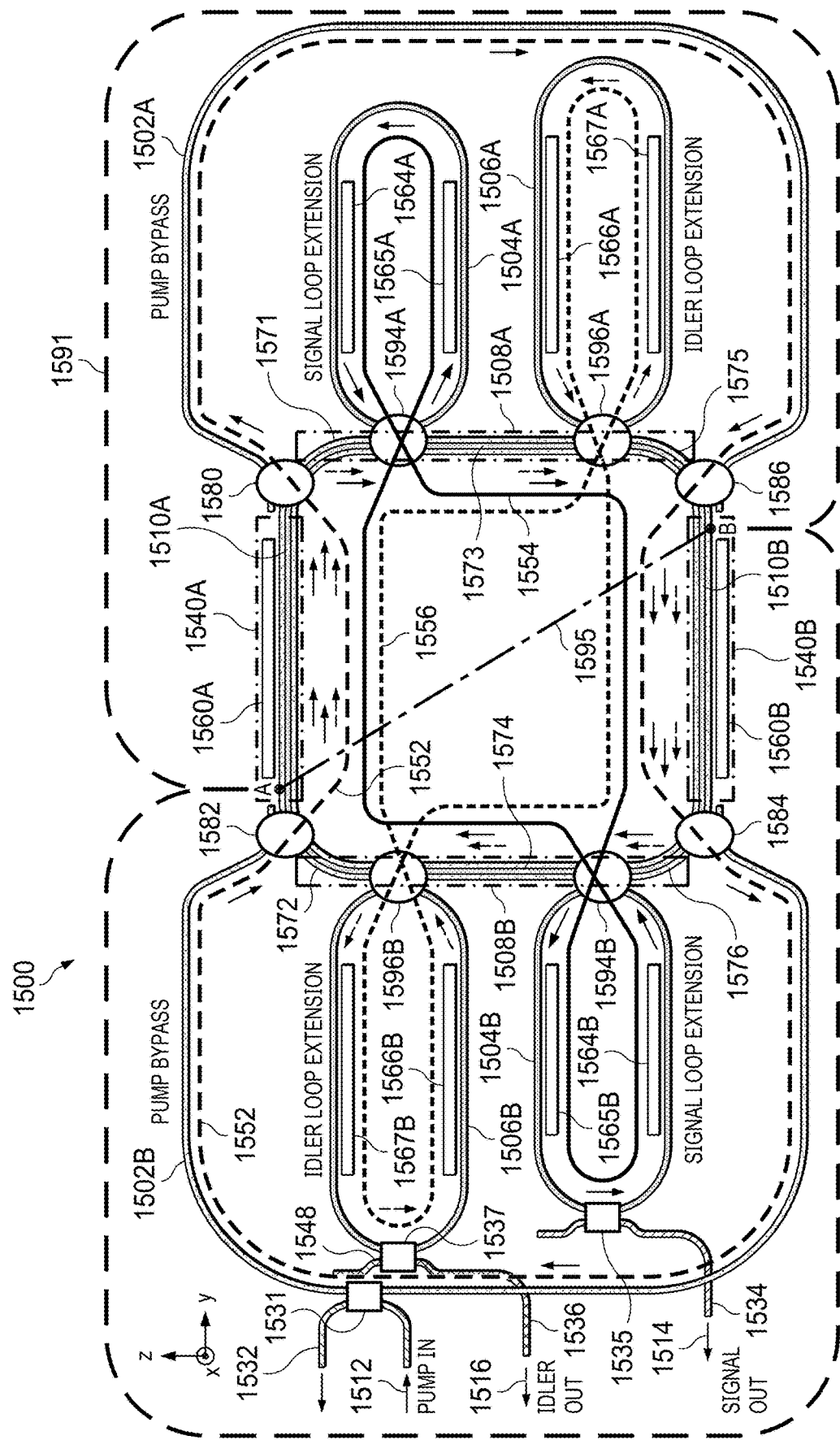
FIG. 18 is an illustration of an optical waveguide structure with ten optical waveguides in accordance with an illustrative embodiment.

Next, FIG. 18 is an illustration of an optical waveguide structure with ten optical waveguides is depicted in accordance with an illustrative embodiment. In this illustrative example, optical waveguide structure 1500 is an example of an implementation for optical waveguide structure 100 as shown in FIGS. 1-6. More specifically, FIG. 18 is an implementation for optical waveguides 102 as depicted in FIG. 2.

As depicted, optical waveguide structure 1500 comprises optical waveguides in the form of first main nonlinear optical waveguide segment 1510A, second main nonlinear optical waveguide segment 1510B, first pump bypass optical waveguide 1502A, second pump bypass optical waveguide 1502B, first secondary optical waveguide portion 1508A, second secondary optical waveguide portion 1508B, first signal loop extension 1504A, second signal loop extension 1504B, first idler loop extension 1506A, and second idler loop extension 1506B. First main nonlinear optical waveguide segment 1510A and second main nonlinear optical waveguide segment 1510B of main nonlinear optical waveguide 1510 are examples of main nonlinear optical waveguide 106 in FIG. 2. First pump bypass optical waveguide 1502A and second pump bypass optical waveguide 1502B are examples of an implementation for first extension optical waveguide 108 in FIG. 2. First secondary optical waveguide portion 1508A and second secondary optical waveguide portion 1508B are examples of an implementation of secondary optical waveguide 113 in FIG. 2.

As depicted in the detailed illustrative example of FIG. 18, main nonlinear optical waveguide 1510 comprises two separate segments, first main nonlinear optical waveguide segment 1510A and second main nonlinear optical waveguide segment 1510B. Secondary optical waveguide 1508 comprises multiple segments that are part of first secondary optical waveguide portion 1508A and second secondary optical waveguide portion 1508B. In this example, extension optical waveguide 1502 has two distinct portions, called pump bypass waveguides. In this illustrative example, first pump bypass optical waveguide 1502A and second pump bypass optical waveguide 1502B are connected to optical couplers at each of the two ends of each of those optical waveguides. These optical waveguides are comprised of a non-nonlinear optical material 105 in this example.

First secondary optical waveguide portion 1508A is connected to first signal loop extension 1504A and first idler loop extension 1506A. Second secondary optical waveguide portion 1508B is connected to second signal loop extension 1504B and second idler loop extension 1506B. These connections from the secondary optical waveguide portions to the various signal loop extensions and idler loop extensions are made through wavelength-selective couplers such as first signal loop coupler 1594A, first idler loop coupler 1596A, second signal loop coupler 1594B, and second idler loop coupler 1596B. Connections between first main nonlinear optical waveguide segment 1510A and second main nonlinear optical waveguide segment 1510B of the main nonlinear optical waveguide and first secondary optical waveguide portion 1508A and second secondary optical waveguide portion 1508B of the secondary optical waveguide are made through wavelength selective optical couplers, such as first wavelength-selective coupler 1580, second wavelength-selective coupler 1586, third wavelength-selective coupler 1584, and fourth wavelength-selective coupler 1582.

In this illustrative example, optical waveguide structure 1500 also includes pump input optical waveguide 1532, signal output optical waveguide 1534, and idler output optical waveguide 1536. Pump input optical waveguide 1532 can input pump light 1512 into second pump bypass optical waveguide 1502B. Signal output optical waveguide 1534 can output signal light 1514 from second signal loop extension 1504B. Idler output optical waveguide 1536 can output idler light 1516 from second idler loop extension 1506B.

In this illustrative example, pump optical coupler 1531 couples pump input optical waveguide 1532 to second pump bypass optical waveguide 1502B. Signal optical coupler 1535 couples second signal loop extension 1504B to signal output optical waveguide 1534. Idler optical coupler 1537 couples second idler loop extension 1506B to idler output optical waveguide 1536.

As depicted, first wavelength-selective coupler 1580 and second wavelength-selective coupler 1586 connect pump bypass optical waveguide 1502A to two different segments, first main nonlinear optical waveguide segment 1510A and second main nonlinear optical waveguide segment 1510B, of main nonlinear optical waveguide 1510. In this illustrative example, third wavelength-selective coupler 1584 and fourth wavelength-selective coupler 1582 connect second pump bypass optical waveguide 1502B to the opposite ends of those two segments, first main nonlinear optical waveguide segment 1510A and second main nonlinear optical waveguide segment 1510B, of main nonlinear optical waveguide 1510.

In this illustrative example, pump light 1512 travels in pump loop 1552. Pump loop 1552 is a resonator loop that extends through first main nonlinear optical waveguide segment 1510A of main nonlinear optical waveguide; first wavelength-selective coupler 1580; first pump bypass optical waveguide 1502A; second wavelength-selective coupler 1586; second main nonlinear optical waveguide segment 1510B of main nonlinear optical waveguide; third wavelength-selective coupler 1584; second pump bypass optical waveguide 1502B; and fourth wavelength-selective coupler 1582; and continues again through first main nonlinear optical waveguide segment 1510A of main nonlinear optical waveguide 1510. The lengths of the various waveguides through which pump light 1512 of pump wavelength travels in pump loop 1552 can be selected so that pump wavelength matches a resonance condition for pump loop 1552.

Pump light 1512, signal light 1514 and idler light 1516 all travel through first main nonlinear optical waveguide segment 1510A and second main nonlinear optical waveguide segment 1510B of main nonlinear optical waveguide 1510. As depicted, first wavelength-selective coupler 1580 couples pump light 1512 into first pump bypass optical waveguide 1502A. First wavelength-selective coupler 1580 also couples signal light 1514 and idler light 1516 into first secondary optical waveguide portion 1508A. Thus, only signal light 1514 and idler light 1516 travel through second secondary optical waveguide portion 1508B. First signal loop coupler 1594A couples signal light from segment 1571 of first secondary optical waveguide portion 1508A into first signal loop extension 1504A. First signal loop coupler 1594A also couples signal light that has propagated through first signal loop extension 1504A into segment 1573 of first secondary optical waveguide portion 1508A. Signal light 1514 then continues to propagate through first secondary optical waveguide portion 1508A, being coupled by first idler loop coupler 1596A from segment 1573 to segment 1575 of first secondary optical waveguide portion 1508A. Second wavelength-selective coupler 1586 couples signal light 1514 from first secondary optical waveguide portion 1508A into second main nonlinear optical waveguide segment 1510B. Second wavelength-selective coupler 1586 also couples pump light from first pump bypass optical waveguide 1502A into second main nonlinear optical waveguide segment 1510B.

As with first main nonlinear optical waveguide segment 1510A of main nonlinear optical waveguide 1510, pump light 1512, signal light 1514 and idler light 1516 all travel through second main nonlinear optical waveguide segment 1510B of main nonlinear optical waveguide 1510. As depicted, third wavelength-selective coupler 1584 couples pump light 1512 into second pump bypass optical waveguide 1502B. Third wavelength-selective coupler 1584 also couples signal light 1514 and idler light 1516 into second secondary optical waveguide portion 1508B. Thus, only signal light 1514 and idler light 1516 travel through second secondary optical waveguide portion 1508B.

Second signal loop coupler 1594B couples signal light from segment 1576 of second secondary optical waveguide portion 1508B into second signal loop extension 1504B. Second signal loop coupler 1594B also couples signal light that has propagated through second signal loop extension 1504B into segment 1574 of second secondary optical waveguide portion 1508B. Signal light 1514 then continues to propagate through second secondary optical waveguide portion 1508B, being coupled by second idler loop coupler 1596B from segment 1574 to segment 1572 of second secondary optical waveguide portion 1508B. Fourth wavelength-selective coupler 1582 couples signal light 1514 from second secondary optical waveguide portion 1508B again into first main nonlinear optical waveguide segment 1510A. Fourth wavelength-selective coupler 1582 also couples pump light 1512 from first pump bypass optical waveguide 1502A into first main nonlinear optical waveguide segment 1510A.

In this illustrative example, signal light 1514 travels in signal loop 1554. Signal loop 1554 is a resonator loop that can be thought of as comprising two halves. One half of signal loop 1554 extends through first main nonlinear optical waveguide segment 1510A of main nonlinear optical waveguide 106; first wavelength-selective coupler 1580 (in its thru state); segment 1571 of first secondary optical waveguide portion 1508A; first signal loop coupler 1594A (in its cross state); first signal loop extension 1504A; a second pass through first signal loop coupler 1594A (again in its cross state); segment 1573 of first secondary optical waveguide portion 1508A; first idler loop coupler 1596A (in its thru state); segment 1575 of first secondary optical waveguide portion 1508A; and second wavelength-selective coupler 1586 (in its thru state). A second half of signal loop 1554 extends through second main nonlinear optical waveguide segment 1510B of main nonlinear optical waveguide 1510; third wavelength-selective coupler 1584 (in its thru state); segment 1576 of second secondary optical waveguide portion 1508B; second signal loop coupler 1594B (in its cross state); second signal loop extension 1504B; a second pass through second signal loop coupler 1594B (again in its cross state); segment 1574 of second secondary optical waveguide portion 1508B; second idler loop coupler 1596B (in its thru state); segment 1572 of second secondary optical waveguide portion 1508B; and fourth wavelength-selective coupler 1582 (in its thru state). The lengths of the various waveguides through which signal light 1514 of a signal wavelength travels in signal loop 1554 can be selected so that signal wavelength matches a resonance condition for signal loop 1554.

Additionally, besides coupling signal light 1514, first wavelength-selective coupler 1580 also couples idler light 1516 into first secondary optical waveguide portion 1508A. Thus, only signal light 1514 and idler light 1516 travel through first secondary optical waveguide portion 1508A. Idler light 1516 then continues to propagate through first secondary optical waveguide portion 1508A, being coupled by first signal loop coupler 1594A from segment 1571 to segment 1573 of first secondary optical waveguide portion 1508A.

In this illustrative example, first idler loop coupler 1596A couples idler light 1516 from segment 1573 of first secondary optical waveguide portion 1508A into first idler loop extension 1506A. First idler loop coupler 1596A also couples idler light that has propagated through first idler loop extension 1506A into segment 1575 of first secondary optical waveguide portion 1508A. Second wavelength-selective coupler 1586 couples idler light 1516 from first secondary optical waveguide portion 1508A into second main nonlinear optical waveguide segment 1510B. Pump light 1512, signal light 1514 and idler light 1516 all travel through second main nonlinear optical waveguide segment 1510B of main nonlinear optical waveguide 1510. Besides coupling pump light 1512 into second pump bypass optical waveguide 1502B, third wavelength-selective coupler 1584 also couples idler light 1516 and signal light 1514 into second secondary optical waveguide portion 1508B. Thus, only idler light 1516 and signal light 1514 travel through second secondary optical waveguide portion 1508B. Idler light 1516 then continues to propagate through second secondary optical waveguide portion 1508B, being coupled by second signal loop coupler 1594B from segment 1576 to segment 1574 of second secondary optical waveguide portion 1508B.

As depicted, second idler loop coupler 1596B couples idler light 1516 from segment 1574 of second secondary optical waveguide portion 1508B into second idler loop extension 1506B. Second idler loop coupler 1596B also couples idler light that has propagated through second idler loop extension 1506B into segment 1572 of second secondary optical waveguide portion 1508B. Fourth wavelength-selective coupler 1582 couples idler light 1516 from second secondary optical waveguide portion 1508B into first main nonlinear optical waveguide segment 1510A.

In this illustrative example, idler light 1516 travels in idler loop 1556. Idler loop 1556 is a resonator loop that can be thought of as comprising two halves. One half of idler loop 1556 extends through first main nonlinear optical waveguide segment 1510A of main nonlinear optical waveguide 1510; first wavelength-selective coupler 1580 (in its thru state); segment 1571 of first secondary optical waveguide portion 1508A; first signal loop coupler 1594A (in its thru state); segment 1573 of first secondary optical waveguide portion 1508A; first idler loop coupler 1596A (in its cross state); first idler loop extension 1506A; a second pass through first idler loop coupler 1596A (again in its cross state); segment 1575 of first secondary optical waveguide portion 1508A; and second wavelength-selective coupler 1586 (in its thru state). A second half of idler loop 1556 extends through second main nonlinear optical waveguide segment 1510B of main nonlinear optical waveguide 1510; third wavelength-selective coupler 1584 (in its thru state); segment 1576 of second secondary optical waveguide portion 1508B; second signal loop coupler 1594B (in its thru state); segment 1574 of second secondary optical waveguide portion 1508B; second idler loop coupler 1596B (in its cross state); second idler loop extension 1506B; a second pass through second idler loop coupler 1596B (again in its cross state); segment 1572 of second secondary optical waveguide portion 1508B; and fourth wavelength-selective coupler 1582 (in its thru state). The lengths of the various waveguides through which idler light 1516 of idler wavelength travels in idler loop 1556 can be selected so that the idler wavelength matches a resonance condition for idler loop 1556.

As depicted, the resonator loops, pump loop 1552, signal loop 1554, and idler loop 1556, have portions that overlap each other and portions that do not overlap each other. All three loops include nonlinear optical waveguide segments, such as first main nonlinear optical waveguide segment 1510A and second main nonlinear optical waveguide segment 1510B. Signal loop 1554 and idler loop 1556 further overlap each other through portions, such as first secondary optical waveguide portion 1508A and second secondary optical waveguide portion 1508B. Phase shifters can be placed at the non-overlapping portions of pump loop 1552, signal loop 1554, and idler loop 1556 to produce phase shifts for pump light 1512, idler light 1516, and signal light 1514 that can be adjusted separately from each other.

The signal loop 1554, idler loop 1556, and pump loop 1552 can each be considered as having two halves. These halves can be distinguished in the illustration of FIG. 18 by their location relative to the reference line 1595. A first half includes the components to the right of reference line 1595. A second half includes the components to the left of reference line 1595.

As depicted, optical waveguide structure 1500 includes phase shifters in the form of tuning electrodes. In this example, tuning electrode 1564A and tuning electrode 1565A are located adjacent to first signal loop extension 1504A. These tuning electrodes enable adjustment of the phase of signal light 1514 in the first half of signal loop 1554. Tuning electrode 1566A and tuning electrode 1567A are located adjacent to first idler loop extension 1506A.

These tuning electrodes enable adjustment of the phase of idler light 1516 in the first half of idler loop 1556. Tuning electrode 1564B and tuning electrode 1565B are located adjacent to second signal loop extension 1504B. These tuning electrodes enable adjustment of the phase of signal light 1514 in the second half of signal loop 1554. Tuning electrode 1566B and tuning electrode 1567B are located adjacent to second idler loop extension 1506B. These tuning electrodes enable adjustment of the phase of idler light 1516 in the second half of idler loop 1556.

Tuning electrode 1560A is located adjacent to first main nonlinear optical waveguide segment 1510A. Tuning electrode 1560A can be used to adjust the phase of pump light 1512 in the first half of pump loop 1552. Tuning electrode 1560B is located adjacent to second main nonlinear optical waveguide segment 1510B. Tuning electrode 1560B can be used to adjust the phase of pump light 1512 in the second half of pump loop 1552. Since signal light 1514 and idler light 1516 also propagate through first main nonlinear optical waveguide segment 1510A and second main nonlinear optical waveguide segment 1510B for main nonlinear optical waveguide 1510, tuning electrode 1560A and tuning electrode 1560B also affect the phase of signal light 1514 and idler light 1516. The use of tuning electrodes to accomplish resonance matching and round-trip phase matching was described with reference to FIG. 13, as an example.

In optical waveguide structure 1500, nonlinear optical generation of signal light 1514 and idler light 1516 from pump light 1512 occurs only in first main nonlinear optical waveguide segment 1510A and second main nonlinear optical waveguide segment 1510B of main nonlinear optical waveguide 1510. First main nonlinear optical waveguide segment 1510A can be considered as part of the first half of optical waveguide structure 1500. Second main nonlinear optical waveguide segment 1510B can be considered as part of the second half of optical waveguide structure 1500.

In this example, signal light 1514 and idler light 1516 propagate in first secondary optical waveguide portion 1508A and second secondary optical waveguide portion 1508B of secondary optical wavelength and in first signal loop extension 1504A and second signal loop extension 1504B as well as in first idler loop extension 1506A and second idler loop extension 1506B without further nonlinear optical generation of signal photons or idler photons. Pump light 1512, from which the signal light 1514 and idler light 1516 are generated, is absent from those waveguides.

In this illustrative example, the phases of the pump light 1512, signal light 1514 and idler light 1516 in the two halves of optical waveguide structure 1500 can be adjusted to achieve a constructive interaction between the signal light and idler light generated in the first half of optical waveguide structure 1500 and the signal light and idler light generated in the second half of optical waveguide structure 1500. This constructive interaction can be achieved even though the nonlinear optical coefficient can have a first sign in first main nonlinear optical waveguide segment 1510A of the first half and a second sign, opposite to the first sign, in second main nonlinear optical waveguide segment 1510B of the second half.

In this illustrative example, the nonlinear optical coefficient for light propagating in the first main nonlinear optical waveguide segment 1510A of the upper-right half-structure 1591 of optical waveguide structure 1500 has one sign for the nonlinear optical coefficient 112. The light propagating in second main nonlinear optical waveguide segment 1510B in lower-left half-structure 1592 of optical waveguide structure 1500 has an opposite sign for the nonlinear optical coefficient.

In other words, the two segments, first main nonlinear optical waveguide segment 1510A and second main nonlinear optical waveguide segment 1510B, of main nonlinear optical waveguide 1510 can be considered as part of two half-structures, upper-right half-structure 1591 and lower-left half-structure 1592. As depicted, these two half-structures are separated by reference line 1595 extending from the upper left corner of optical waveguide structure 1500 to the lower right corner of optical waveguide structure 1500. As shown, reference line 1595 intersects optical waveguide structure 1500 at a location A between second wavelength-selective coupler 1586 for reinserting pump light 1512 in second main nonlinear optical waveguide segment 1510B of main nonlinear optical waveguide 1510 and the tuning electrode 1560B in second main nonlinear optical waveguide segment 1510B and at another location B between fourth wavelength-selective coupler 1582 for reinserting pump light 1512 into first main nonlinear optical waveguide segment 1510A of main nonlinear optical waveguide 1510 and tuning electrode 1560A in first main nonlinear optical waveguide segment 1510A.

For the upper-right half-structure 1591, the relative phase walk-off for travel from upper left to lower right (i.e., from location A to location B) of upper-right half-structure 1591 should preferably be an odd multiple of $\pi$ radians. Also, the relative phase walk-off from travel through first main nonlinear optical waveguide segment 1510A of main nonlinear optical waveguide 1510, where the nonlinear optical generation occurs, is preferably less than $\pi$ radians and as close to zero as possible. The cross-sectional structure of first main nonlinear optical waveguide segment 1510A can be designed to achieve the desired phase match (and minimal relative phase walk-off) for travel through first main nonlinear optical waveguide segment 1510A. Similarly, for lower-left half-structure 1592, the relative phase walk-off for travel from lower right to upper left (i.e., from location B to location A) of lower-left half-structure 1592 should be an odd multiple of $\pi$ radians. Also, the relative phase walk-off from travel through the second main nonlinear optical waveguide segment 1510B, where the nonlinear optical generation occurs, is less than $\pi$ radians and as close to zero as possible. The cross-sectional structure of second main nonlinear optical waveguide segment 1510B can be designed to achieve the desired phase match (and minimal relative phase walk-off) for travel through second main nonlinear optical waveguide segment 1510B.

Thus, the lengths of the pump loop 1552, the signal loop 1554, and idler loop 1556 in each of the upper-right half-structure 1591 and the lower-left half-structure 1592, as well as the cross-sectional structures of the waveguides in each of those two half-structures can be designed to achieve the desired relative phase walk-off that is preferably an odd multiple of $\pi$ radians. Also, the relative phase walk-off from travel through first main nonlinear optical waveguide segment 1510A for main nonlinear optical waveguide 1510, where additional nonlinear optical generation occurs, is preferably less than $\pi$ radians and ideally is zero. Similarly, the relative phase walk-off from travel through second main nonlinear optical waveguide segment 1510B, where additional nonlinear optical generation again occurs, is preferably less than $\pi$ radians and ideally is zero. Furthermore, the lengths and the cross-sectional structure of the waveguides traversed in both upper-right half-structure 1591 and the lower-left half-structure 1592 can be selected to also achieve round-trip phase matching for the nonlinear optical generation that occurs in the combination of two halves of optical waveguide structure 1500. Thus, the round-trip phase for the nonlinear optical interaction of the pump, signal and idler light is preferably a multiple of 360 degrees or 2π radians.

Making the phase walk-off for each half-structure, such as upper-right half-structure 1591 and lower-left half-structure 1592, have a value that is an odd multiple of 180 degrees or π radians compensates for the reversal in sign of the nonlinear optical coefficient of the nonlinear optical material in the nonlinear optical waveguide segments, such as first main nonlinear optical waveguide segment 1510A and second main nonlinear optical waveguide segment 1510B, of those two half-structures. First main nonlinear optical waveguide segment 1510A is in upper-right half-structure 1591 and second main nonlinear optical waveguide segment 1510B is in lower-left half-structure 1592. The nonlinear optical coefficient 112 in first main nonlinear optical waveguide segment 1510A has a first sign 107 and the nonlinear optical coefficient 112 in second main nonlinear optical waveguide segment 1510B has a second sign 109 that is opposite from the first sign. The configuration of two half-structures is especially useful for optical waveguide structures 1500 that comprise second-order nonlinear optical material. An example of such material is x-cut lithium niobate. This configuration of two half-structures is especially useful when the nonlinear optical waveguide segments, such as first main nonlinear optical waveguide segment 1510A and second main nonlinear optical waveguide segment 1510B containing x-cut lithium niobate are oriented parallel to the material Y-axis, with the propagating optical fields of the pump light 1512, signal light 1514 and idler light 1516 having transverse electric (TE) components that are aligned parallel to the material X-axis.

Besides meeting the phase matching conditions for the two half-structures, upper-right half-structure 1591 and lower-left half-structure 1592 that form optical waveguide structure 1500, the other optical waveguides in optical waveguide structure 1500 can be designed to enable the pump light 1512, signal light 1514, and idler light 1516 to match resonances of their respective resonator loops, pump loop 1552, signal loop 1554, and idler loop 1556.

Figure 19:
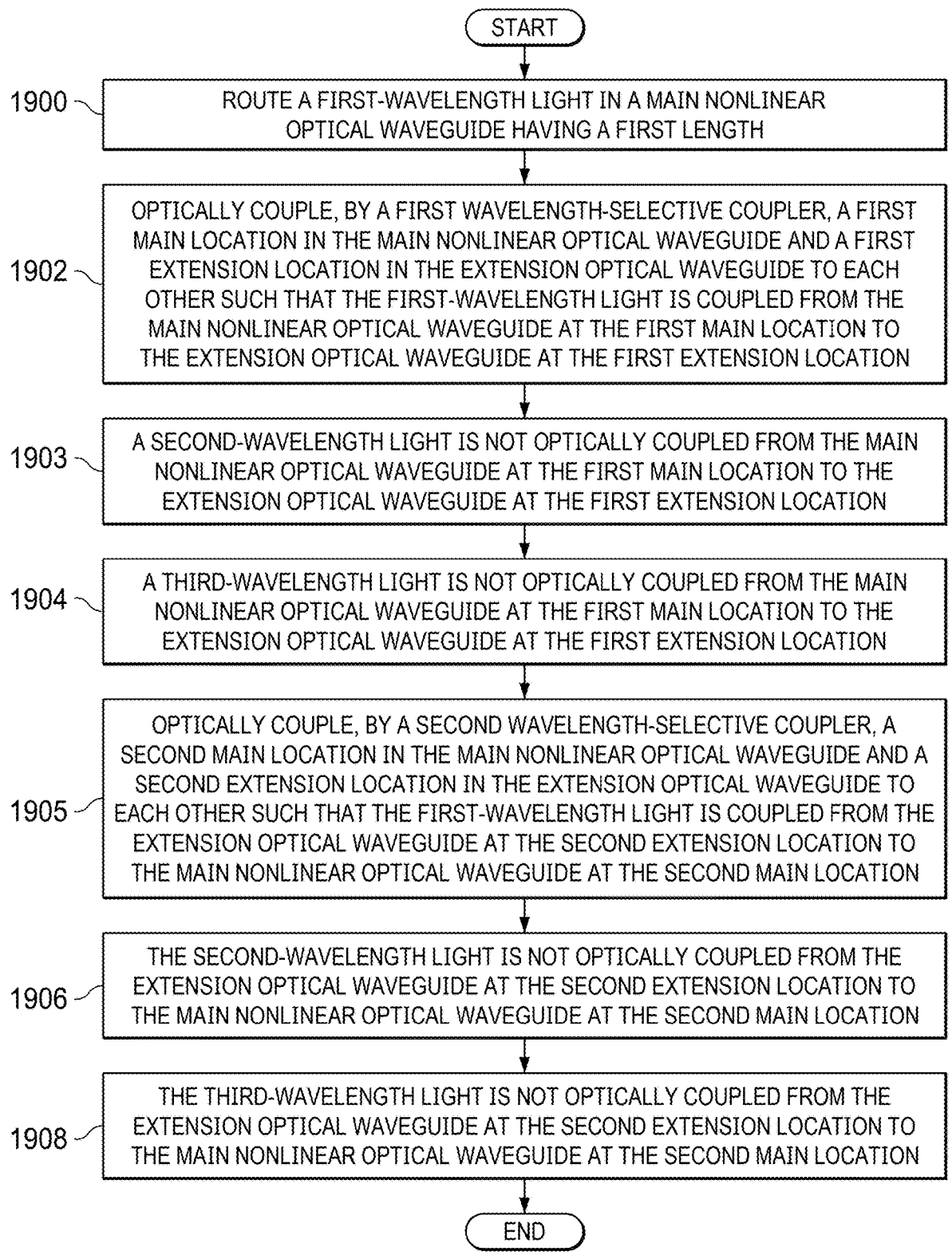
FIG. 19 is an illustration of a flowchart of a process for a non-linear optical process in accordance with an illustrative embodiment.

Turning next to FIG. 19, an illustration of a flowchart of a process for a non-linear optical process is depicted in accordance with an illustrative embodiment. The process in this flowchart can be implemented in optical waveguide structure 100 in FIG. 1 as well the other optical waveguide structures depicted in other figures.

The process begins by routing a first-wavelength light in a main nonlinear optical waveguide having a first length (operation 1900). The process optically couples, by a first wavelength-selective coupler, a first main location in the main nonlinear optical waveguide and a first extension location in the extension optical waveguide to each other such that the first-wavelength light is coupled from the main nonlinear optical waveguide at the first main location to the extension optical waveguide at the first extension location (operation 1902). The process does not optically couple a second-wavelength light from the main nonlinear optical waveguide at the first main location to the extension optical waveguide at the first extension location (operation 1903). The process does not optically couple a third-wavelength light from the main nonlinear optical waveguide at the first main location to the extension optical waveguide at the first extension location (operation 1904).

The process optically couples, by a second wavelength-selective coupler, a second main location in the main nonlinear optical waveguide and a second extension location in the extension optical waveguide to each other such that the first wavelength-light is coupled from the extension optical waveguide at the second extension location to the main nonlinear optical waveguide at the second main location (operation 1905). The process does not optically couple the second-wavelength light from the extension optical waveguide at the second extension location to the main nonlinear optical waveguide at the second main location (operation 1906). The process does not optically couple the third-wavelength light from the extension optical waveguide at the second extension location to the main nonlinear optical waveguide at the second main location (operation 1908). The process terminates thereafter.

Figure 20:
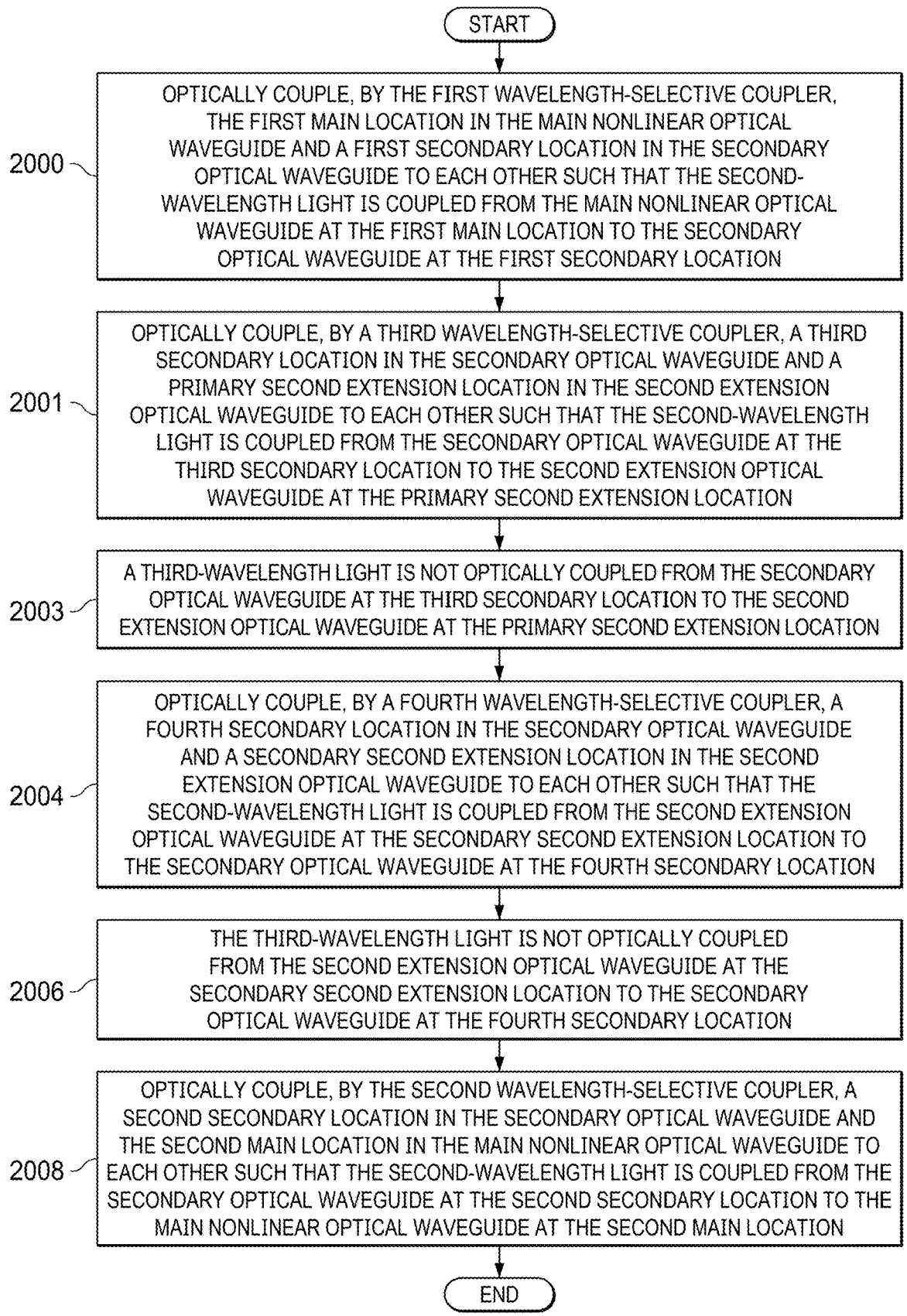
FIG. 20 is an illustration of a flowchart of additional operations for a process for a non-linear optical process in accordance with an illustrative embodiment.

With reference to FIG. 20, an illustration of a flowchart of additional operations for a process for a non-linear optical process is depicted in accordance with an illustrative embodiment. The process in this flowchart depicts additional operations that can be performed in addition to the operations in FIG. 19.

The process optically couples, by the first wavelength-selective coupler the first main location in the main nonlinear optical waveguide and a first secondary location in the secondary optical waveguide to each other such that the second-wavelength light is coupled from the main nonlinear optical waveguide at the first main location to the secondary optical waveguide at the first secondary location (operation 2000). The process optical couples, by a third wavelength-selective coupler, a third secondary location in the secondary optical waveguide and a primary second extension location in the second extension optical waveguide to each other such that the second-wavelength light is coupled from the secondary optical waveguide at the third secondary location to the second extension optical waveguide at the primary second extension location (operation 2001). The process does not optically couple a third-wavelength light from the secondary optical waveguide at the third secondary location to the second extension optical waveguide at the primary second extension location (operation 2003). The process optically couples, by a fourth wavelength-selective coupler, a fourth secondary location in the secondary optical waveguide and a secondary second extension location in the second extension optical waveguide to each other such that the second-wavelength light is coupled from the second extension optical waveguide at the secondary second extension location to the secondary optical waveguide at the fourth secondary location (operation 2004). The process does not optically couple the third-wavelength light from the second extension optical waveguide at the secondary second extension location to the secondary optical waveguide at the fourth secondary location (operation 2006). The process optically couples, by the second wavelength-selective coupler, a second secondary location in the secondary optical waveguide and the second main location in the main nonlinear optical waveguide to each other such that the second-wavelength light is coupled from the secondary optical waveguide at the second secondary location to the main nonlinear optical waveguide at the second main location (operation 2008). The process terminates thereafter.

Figure 21:
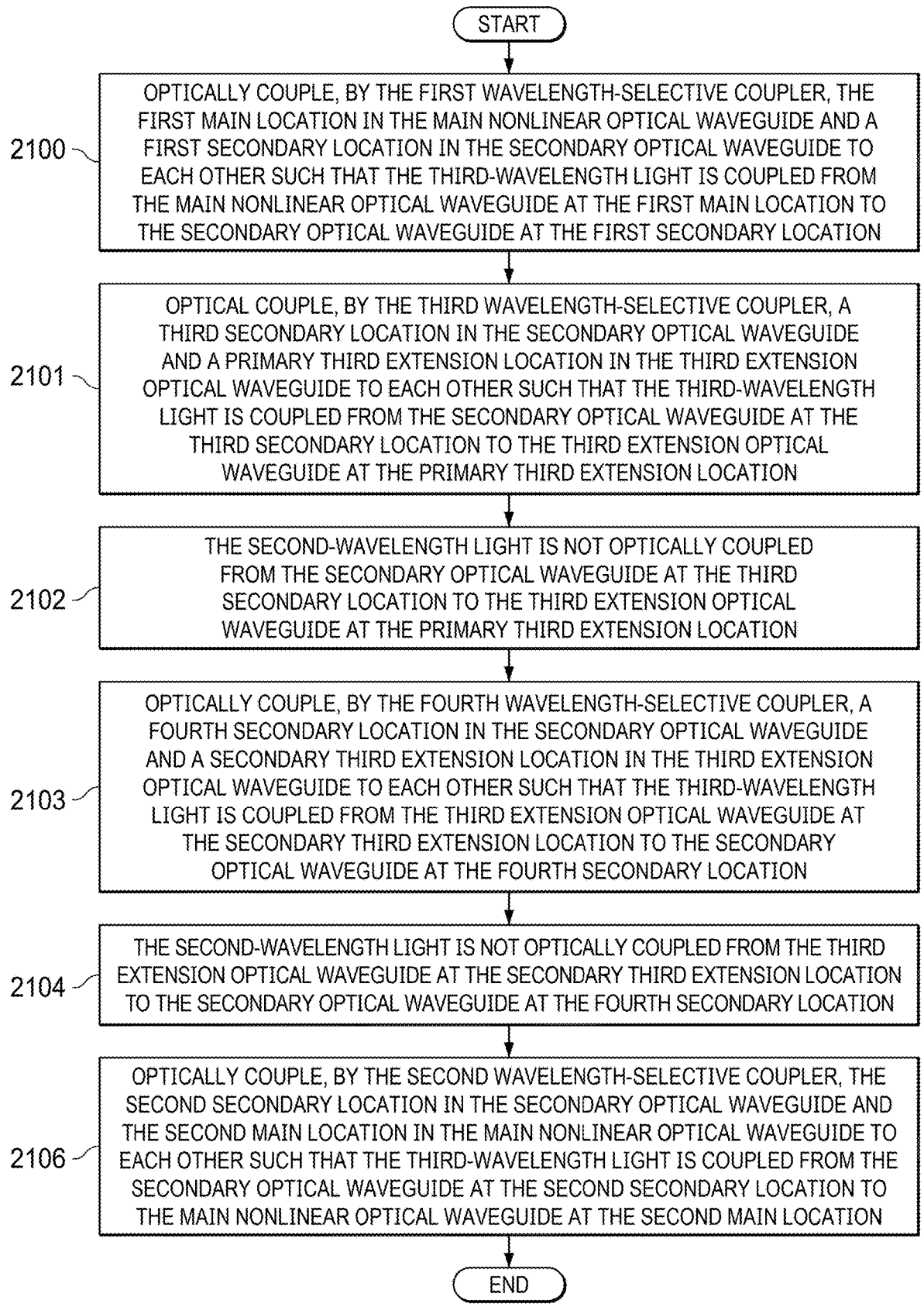
FIG. 21 is an illustration of a flowchart of additional operations for a process for a non-linear optical process in accordance with an illustrative embodiment.

Turning to FIG. 21, an illustration of a flowchart of additional operations for a process for a non-linear optical process is depicted in accordance with an illustrative embodiment. The process in this flowchart depicts additional operations that can be performed in addition to the operations in FIG. 19.

The process optically couples, by the first wavelength-selective coupler, the first main location in the main nonlinear optical waveguide and a first secondary location in the secondary optical waveguide to each other such that the third-wavelength light is coupled from the main nonlinear optical waveguide at the first main location to the secondary optical waveguide at the first secondary location (operation 2100). Also, the process optical couples, by the third wavelength-selective coupler, a third secondary location in the secondary optical waveguide and a primary third extension location in the third extension optical waveguide to each other such that the third-wavelength light is coupled from the secondary optical waveguide at the third secondary location to the third extension optical waveguide at the primary third extension location (operation 2101). The process does not optically couple the second-wavelength light from the secondary optical waveguide at the third secondary location to the third extension optical waveguide at the primary third extension location (operation 2102). The process optically couples, by the fourth wavelength-selective coupler, a fourth secondary location in the secondary optical waveguide and a secondary third extension location in the third extension optical waveguide to each other such that the third-wavelength light is coupled from the third extension optical waveguide at the secondary third extension location to the secondary optical waveguide at the fourth secondary location (operation 2103). The process does not optically couple the second-wavelength light from the third extension optical waveguide at the secondary third extension location to the secondary optical waveguide at the fourth secondary location (operation 2104). The process optically couples, by the second wavelength-selective coupler, the second secondary location in the secondary optical waveguide and the second main location in the main nonlinear optical waveguide to each other such that the third-wavelength light is coupled from the secondary optical waveguide at the second secondary location to the main nonlinear optical waveguide at the second main location (operation 2106). The process terminates thereafter.

Figure 22:
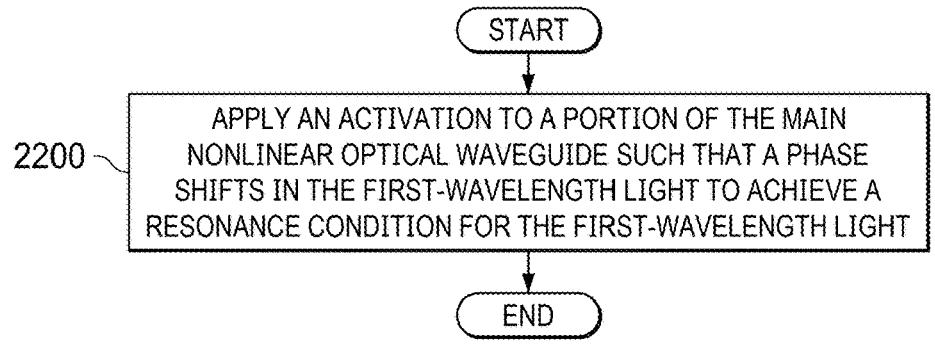
FIG. 22 is an illustration of a flowchart of an additional operation for a process for a non-linear optical process in accordance with an illustrative embodiment.

Turning to FIG. 22, an illustration of a flowchart of an additional operation for a process for a non-linear optical process is depicted in accordance with an illustrative embodiment. The process in this flowchart depicts additional operations that can be performed in addition to the operations in FIGS. 19-21.

The process applies an activation to a portion of the main nonlinear optical waveguide such that a phase shifts in the first-wavelength light to achieve a resonance condition for the first-wavelength light (operation 2200). The process terminates thereafter.

Figure 23:
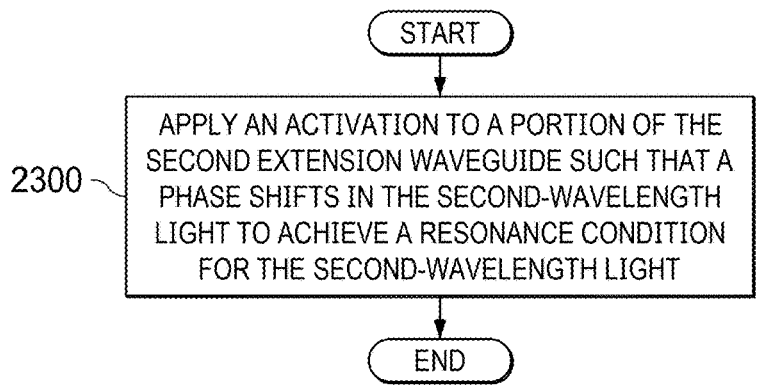
FIG. 23 is an illustration of a flowchart of additional operation for a process for a non-linear optical process in accordance with an illustrative embodiment.

With reference next to FIG. 23, an illustration of a flowchart of an additional operation for a process for a non-linear optical process is depicted in accordance with an illustrative embodiment. The process in this flowchart depicts additional operations that can be performed in addition to the operations in FIG. 21 and FIG. 22.

The process applies an activation to a portion of the second extension waveguide such that a phase shifts in the second-wavelength light to achieve a resonance condition for the second-wavelength light (operation 2300). The process terminates thereafter.

Figure 24:
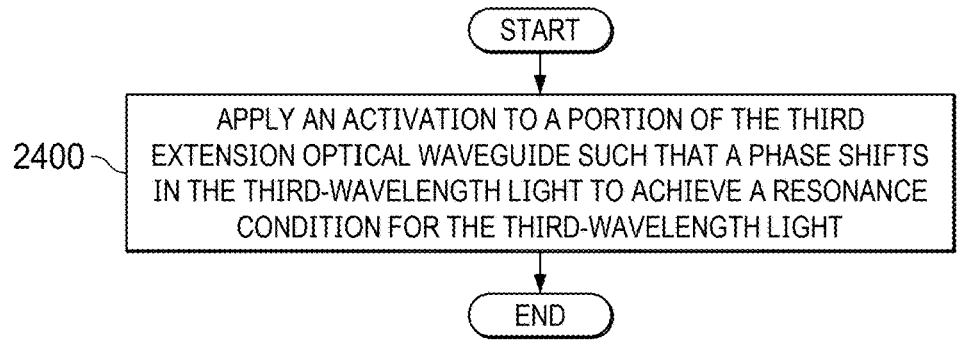
FIG. 24 is an illustration of a flowchart of an additional operation for a process for a non-linear optical process in accordance with an illustrative embodiment.

Turning now to FIG. 24, an illustration of a flowchart of an additional operation for a process for a non-linear optical process is depicted in accordance with an illustrative embodiment. The process in this flowchart depicts additional operations that can be performed in addition to the operations in FIG. 21 and FIG. 23.

The process applies an activation to a portion of the third extension optical waveguide such that a phase shifts in the third-wavelength light to achieve a resonance condition for the third-wavelength light (operation 2400). The process terminates thereafter.

Figure 25:
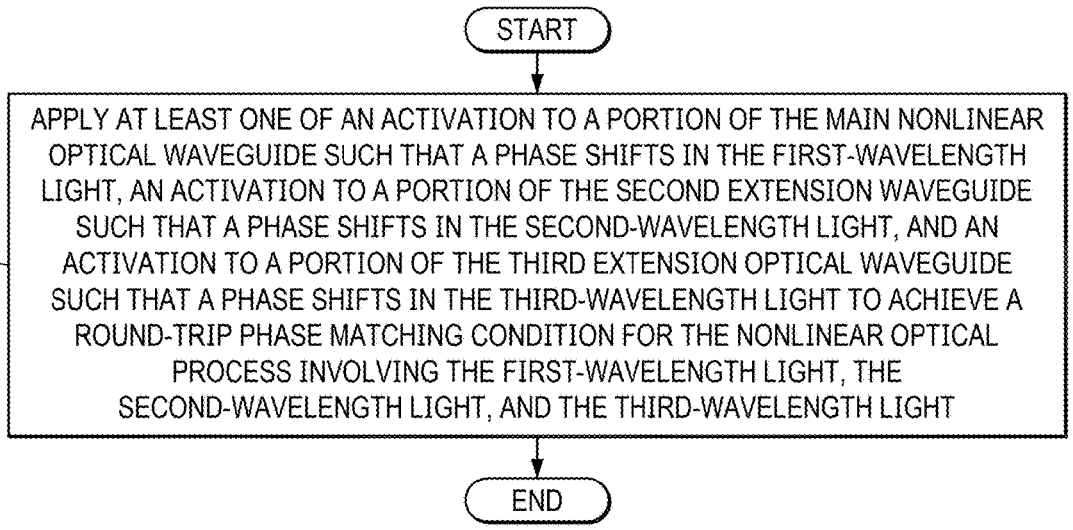
FIG. 25 is an illustration of a flowchart of an additional operation for a process for a non-linear optical process in accordance with an illustrative embodiment.

Turning now to FIG. 25, an illustration of a flowchart of an additional operation for a process for a non-linear optical process is depicted in accordance with an illustrative embodiment. The process in this flowchart depicts additional operations that can be performed in addition to the operations in FIGS. 22-24.

The process applies at least one of an activation to a portion of the main nonlinear optical waveguide such that a phase shifts in the first-wavelength light, an activation to a portion of the second extension waveguide such that a phase shifts in the second-wavelength light, and an activation to a portion of the third extension optical waveguide such that a phase shifts in the third-wavelength light to achieve a round-trip phase matching condition for the nonlinear optical process involving the first-wavelength light, the second-wavelength light, and the third-wavelength light (operation 2500). The process terminates thereafter.

To achieve phase matching, the activation does not necessarily need to be applied to all three of the main nonlinear optical waveguide, the second extension waveguide, and the third extension waveguide. The activation can be applied to one of some combination of the three waveguides or waveguide portions.

Figure 26:
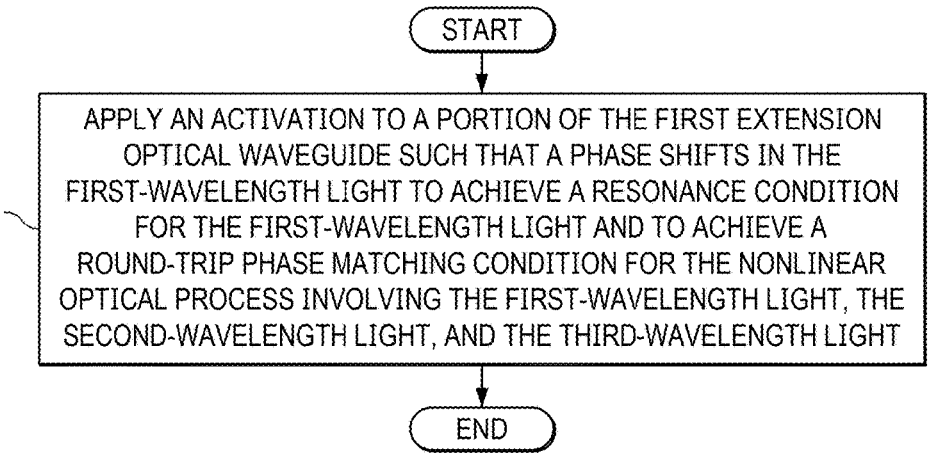
FIG. 26 is an illustration of a flowchart of an additional operation for a process for a non-linear optical process in accordance with an illustrative embodiment.

Turning now to FIG. 26, an illustration of a flowchart of an additional operation for a process for a non-linear optical process is depicted in accordance with an illustrative embodiment. The process in this flowchart depicts additional operations that can be performed in addition to the operations in FIGS. 22-25.

The process applies an activation to a portion of the first extension optical waveguide such that a phase shifts in the first-wavelength light to achieve a resonance condition for the first-wavelength light and to achieve a round-trip phase matching condition for the nonlinear optical process involving the first-wavelength light, the second-wavelength light, and the third-wavelength light (operation 2600). The process terminates thereafter. In operation 2600, this activation can be accomplished by tuning electrode 1362 in FIG. 17.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 27:
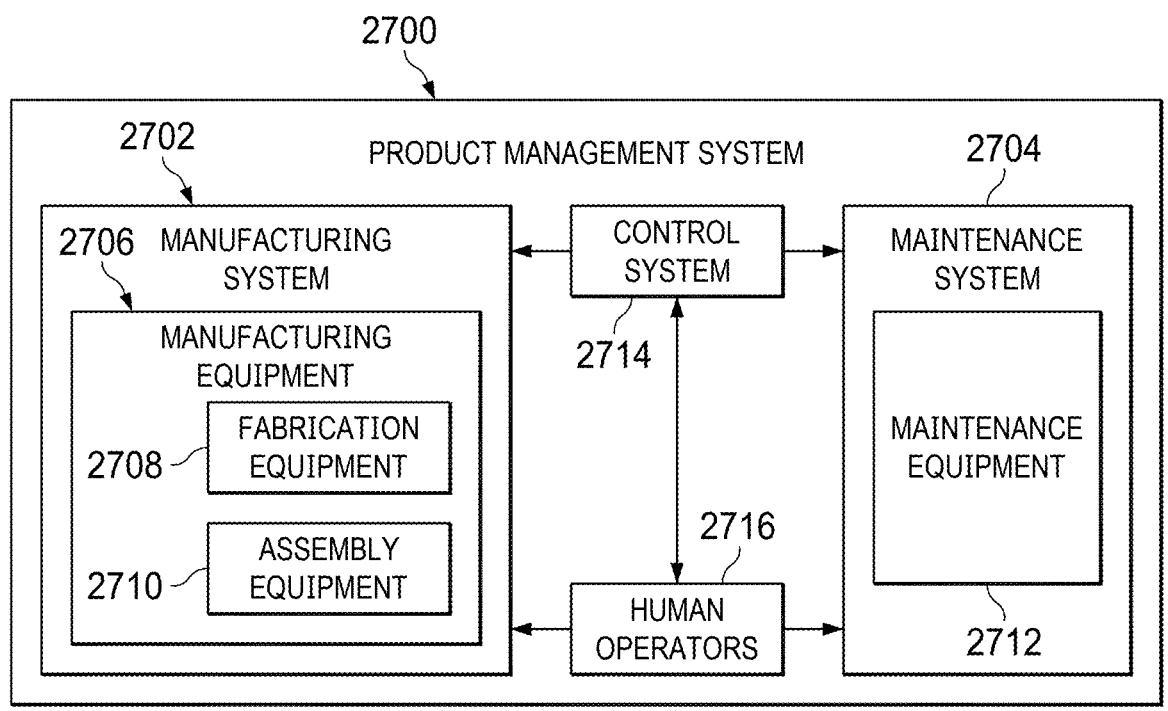
FIG. 27 is an illustration of a block diagram of a product management system in accordance with an illustrative embodiment.

Turning now to FIG. 27, an illustration of a block diagram of a product management system is depicted in accordance with an illustrative embodiment. Product management system 2700 is a physical hardware system. In this illustrative example, product management system 2700 includes at least one of manufacturing system 2702 or maintenance system 2704.

Manufacturing system 2702 is configured to manufacture products. As depicted, manufacturing system 2702 includes manufacturing equipment 2706. Manufacturing equipment 2706 includes at least one of fabrication equipment 2708 or assembly equipment 2710.

Fabrication equipment 2708 is equipment that used to fabricate the nonlinear optical waveguide structure. Multiple copies or multiple versions of nonlinear optical waveguide structures can be fabricated on a substrate wafer.

The substrate wafer can comprise a material such as silicon, lithium niobate, quartz, sapphire, silicon carbide, or some other suitable substrate. Fabrication equipment 2708 can be used to fabricate at least one of optical waveguide structures, nonlinear optical waveguides, optical couplers, optical waveguide segments, laser transmitters, ultraviolet transmission systems, point-to-point communication devices, laser infrared countermeasure sources, through water optical communication devices, or other suitable devices, antennas, or other suitable types of parts. For example, fabrication equipment 2708 can include machines and tools.

With respect to fabricating semiconductor components and optical waveguide components, fabrication equipment 2708 can comprise at least one of an epitaxial reactor, an oxidation system, a diffusion system, an etching system, a cleaning system, a bonding machine, a dicing machine, a wafer saw, an ion implantation system, a physical vapor deposition system, a chemical vapor deposition system, a photolithography system, an electron-beam lithography system, a plasma etcher, a die attachment machine, a wire bonder, a die overcoat system, molding equipment, a hermetic sealer, an electrical tester, a burn-in oven, a retention bake oven, a UV erase system, or other suitable types of equipment that can be used to manufacture semiconductor structures.

Assembly equipment 2710 is equipment used to assemble parts to form a product such as a chip, an integrated circuit, a multi-chip module, a computer, a signal processor, an aircraft, or some other product. Assembly equipment 2710 also can include machines and tools. These machines and tools may be at least one of a robotic arm, a spinner system, a sprayer system, and elevator system, a rail-based system, or a robot.

In this illustrative example, maintenance system 2704 includes maintenance equipment 2712. Maintenance equipment 2712 can include any equipment needed to perform maintenance on and evaluation of a product. Maintenance equipment 2712 may include tools for performing different operations on parts on a product. These operations can include at least one of disassembling parts, refurbishing parts, inspecting parts, reworking parts, manufacturing replacement parts, or other operations for performing maintenance on the product. These operations can be for routine maintenance, inspections, upgrades, refurbishment, or other types of maintenance operations.

In the illustrative example, maintenance equipment 2712 may include optical inspection devices, electron-beam imaging systems, x-ray imaging systems, surface-profile measurement systems, drills, vacuum leak checkers, and other suitable devices. In some cases, maintenance equipment 2712 can include fabrication equipment 2708, assembly equipment 2710, or both to produce and assemble parts that needed for maintenance.

Product management system 2700 also includes control system 2714. Control system 2714 is a hardware system and may also include software or other types of components. Control system 2714 is configured to control the operation of at least one of manufacturing system 2702 or maintenance system 2704. In particular, control system 2714 can control the operation of at least one of fabrication equipment 2708, assembly equipment 2710, or maintenance equipment 2712.

The hardware in control system 2714 can be implemented using hardware that may include computers, circuits, networks, and other types of equipment. The control may take the form of direct control of manufacturing equipment 2706. For example, robots, computer-controlled machines, and other equipment can be controlled by control system 2714. In other illustrative examples, control system 2714 can manage operations performed by human operators 2716 in manufacturing or performing maintenance on a product. For example, control system 2714 can assign tasks, provide instructions, display models, or perform other operations to manage operations performed by human operators 2716. In these illustrative examples, the different processes for fabricating semiconductor structures, optical structures, nonlinear optical waveguides, laser transmitters, photon generators, photon transmitters, photon detectors, ultraviolet transmission systems, point-to-point communication devices, laser infrared countermeasure sources, through water optical communication devices, or other suitable devices can be manufactured using processes implemented in control system 2714.

In the different illustrative examples, human operators 2716 can operate or interact with at least one of manufacturing equipment 2706, maintenance equipment 2712, or control system 2714.

This interaction can occur to manufacture semiconductor structures and other components for products such as semiconductor devices or components for use in products such as aircraft, spacecraft, communications systems, computation systems, and sensor systems.

Further, control system 2714 can be used to adjust manufacturing of nonlinear optical waveguides, optical waveguides, optical couplers, phase shifters, and other components dynamically in or by the waveguides during the manufacturing process. For example, many points in the process of fabricating the optical waveguide structure including the nonlinear optical waveguide as well as other components are present at which adjustments can be made to control characteristics of components in an optical waveguide structure.

Some features of the illustrative examples are described in the following clauses. These clauses are examples of features not intended to limit other illustrative examples.

Clause 1

An optical waveguide structure comprising:
 a main nonlinear optical waveguide, wherein a first-wavelength light and a second-wavelength light travel in the main nonlinear optical waveguide;
 a first extension optical waveguide;
 a secondary optical waveguide;
 a first wavelength-selective coupler that optically couples the main nonlinear optical waveguide and the first extension optical waveguide to each other such that the first-wavelength light is coupled from the main nonlinear optical waveguide to the first extension optical waveguide, and that optically couples the main nonlinear optical waveguide and the secondary optical waveguide to each other such that the second-wavelength light is coupled from the main nonlinear optical waveguide to the secondary optical waveguide; and a second wavelength-selective coupler that optically couples the main nonlinear optical waveguide and the first extension optical waveguide to each other such that the first-wavelength light is coupled from the first extension optical waveguide to the main nonlinear optical waveguide, and that optically couples the main nonlinear optical waveguide and the secondary optical waveguide to each other such that the second-wavelength light is coupled from the secondary optical waveguide to the main nonlinear optical waveguide.

Clause 2

The optical waveguide structure according to clause 1 further comprising:

a second extension optical waveguide;

a third wavelength-selective coupler that optically couples the secondary optical waveguide and the second extension optical waveguide to each other such that the second-wavelength light is coupled from the secondary optical waveguide to the second extension optical waveguide; and a fourth wavelength-selective coupler that optically couples the secondary optical waveguide and the second extension optical waveguide to each other such that the second-wavelength light is coupled from the second extension optical waveguide to the secondary optical waveguide.

Clause 3

The optical waveguide structure according to clause 2 further comprising:

a third extension optical waveguide;

wherein the third wavelength-selective coupler optically couples the secondary optical waveguide and the third extension optical waveguide to each other such that a third-wavelength light is coupled from the secondary optical waveguide to the third extension optical waveguide and the second-wavelength light is not coupled into the third extension optical waveguide; and wherein the fourth wavelength-selective coupler optically couples the secondary optical waveguide and the third extension optical waveguide to each other such that the third-wavelength light is coupled from the third extension optical waveguide to the secondary optical waveguide.

Clause 4

The optical waveguide structure according to any of clauses 2-4, wherein the first-wavelength light travels in a first loop through a main segment between a first main location and a second main location within the main nonlinear optical waveguide, through the first extension optical waveguide, and through the first wavelength-selective coupler and the second wavelength-selective coupler, in which the first loop has a first length, and wherein the second-wavelength light travels in a second loop through the main segment between the first main location and the second main location within the main nonlinear optical waveguide, through a secondary segment in the secondary optical waveguide, through the second extension optical waveguide, and through the first wavelength-selective coupler and the second wavelength-selective coupler, in which the second loop has a second length for the second-wavelength light.

Clause 5

The optical waveguide structure according to clause 3, wherein the first-wavelength light travels in a first loop through a main segment within the main nonlinear optical waveguide, through and a first extension segment, through the first wavelength-selective coupler and the second wavelength-selective coupler, in which the first loop has a first length;

wherein the second-wavelength light travels in a second loop through a secondary segment in the secondary optical waveguide, through the second extension optical waveguide, through the first wavelength-selective coupler and the second wavelength-selective coupler, through the third wavelength-selective coupler and the fourth wavelength-selective coupler, and through the main segment in the nonlinear optical waveguide, in which the second loop has a second length for the second-wavelength light; and wherein the third-wavelength light travels in a third loop through the secondary segment in the secondary optical waveguide, through the third extension optical waveguide, through the first wavelength-selective coupler and the second wavelength-selective coupler, through the third wavelength-selective coupler and the fourth wavelength-selective coupler, and through the main segment in the nonlinear optical waveguide, in which the third loop has a third length for the third-wavelength light.

Clause 6

The optical waveguide structure according to any of clauses 2-6, wherein the first-wavelength light is a pump light and the second-wavelength light is one of a signal light and an idler light, and wherein an intensity of the first-wavelength light is greater than an intensity of the second-wavelength light.

Clause 7

The optical waveguide structure according to any of clauses 3 or 5 wherein the first-wavelength light is a pump light, the second-wavelength light is a signal light, and the third-wavelength light is an idler light; and wherein an intensity of the first-wavelength light is greater than an intensity of the second-wavelength light and is greater than an intensity of the third-wavelength light.

Clause 8

The optical waveguide structure according to any of clauses 1-7, wherein the main nonlinear optical waveguide is comprised of an electro-optic material.

Clause 9

The optical waveguide structure according to any of clauses 2-8, wherein the second extension optical waveguide is comprised of at least one of an electro-optic material, a nonlinear optical material or a non-nonlinear optical material Clause 10

The optical waveguide structure according to any of clauses 3, 5, or 7, wherein the third extension optical waveguide is comprised of at least one of an electro-optic material, a nonlinear optical material or a non-nonlinear optical material Clause 11

The optical waveguide structure according to any of clauses 1-10, wherein the main nonlinear optical waveguide is comprised of a nonlinear optical material.

Clause 12

The optical waveguide structure according to any of clauses 2-11, wherein the second extension optical waveguide is comprised of an electro-optic material.

Clause 13

The optical waveguide structure according to any of clauses 3, 5, 7, or 10, wherein the third extension optical waveguide is comprised of an electro-optic material.

Clause 14

The optical waveguide structure according to any of clauses 2-13, wherein the first wavelength-selective coupler, the second wavelength-selective coupler, the third wavelength-selective coupler, and the fourth wavelength-selective coupler are selected from at least one of a two-waveguide coupler, a multi-mode interference coupler, a pulley coupler, a Mach-Zehnder interferometer, or a 4-port micro-optical waveguide resonator coupler.

Clause 15

The optical waveguide structure according to any of clauses 3, 5, 7, 10, or 13 further comprising:
- a set of output optical waveguides that outputs output light out of at least one of the first extension optical waveguide, the second extension optical waveguide, or the third extension optical waveguide.

Clause 16

The optical waveguide structure according to any of clauses 3, 5, 7, 10, 13, or 15 further comprising:
- a set of input optical waveguides that inputs input light into at least one of the first extension optical waveguide, the second extension optical waveguide, or the third extension optical waveguide.

Clause 17

The optical waveguide structure according to clause 4 further comprising:
- a phase shifter located adjacent to a portion of the main nonlinear optical waveguide, wherein the phase shifter applies an activation such that a phase shifts in the first-wavelength light to achieve a resonance condition for the first-wavelength light.

Clause 18

The optical waveguide structure according to any of clauses 4 or 17 further comprising:
- a phase shifter located adjacent to a portion of the second extension optical waveguide, wherein the phase shifter applies an activation such that a phase shifts in the second-wavelength light to achieve a resonance condition for the second-wavelength light.

Clause 19

The optical waveguide structure according to clause 5 further comprising:
- a phase shifter located adjacent to a portion of the third extension optical waveguide, wherein the phase shifter applies an activation such that a phase shifts in the third-wavelength light to achieve the resonance condition for the third-wavelength light.

Clause 20

The optical waveguide structure according to any of clauses 1-19 further comprising:
- a phase shifter located adjacent to a portion of the main nonlinear optical waveguide, wherein the phase shifter applies an activation such that a phase shifts in the first-wavelength light to achieve a round-trip phase matching condition for a nonlinear optical process involving the first-wavelength light.

Clause 21

The optical waveguide structure according to any of clauses 2-20 further comprising:
- a phase shifter located adjacent to a portion of the second extension optical waveguide, wherein the phase shifter applies an activation such that a phase shifts in the second-wavelength light to achieve a round-trip phase matching condition for a nonlinear optical process involving the second-wavelength light.

Clause 22

The optical waveguide structure according to any of clauses 3, 5, 7, 10, 13, 15, or 16 further comprising:
- a phase shifter located adjacent to a portion of the third extension optical waveguide, wherein the phase shifter applies an activation such that a phase shifts in the third-wavelength light to achieve a round-trip phase matching condition for a nonlinear optical process involving the third-wavelength light.

Clause 23

The optical waveguide structure according to any of clauses 1-24 further comprising:
- a phase shifter located adjacent to a portion of the main nonlinear optical waveguide, wherein the phase shifter applies an activation such that a phase shifts in the first-wavelength light to achieve a phase walk-off that is an odd multiple of 180 degrees.

Clause 24

The optical waveguide structure according to any of clauses 2-23 further comprising:
- a phase shifter located adjacent to a portion of the second extension optical waveguide, wherein the phase shifter applies an activation such that a phase shifts in the second-wavelength light to achieve a phase walk-off that is an odd multiple of 180 degrees.

Clause 25

The optical waveguide structure according to any of clauses 35, 7, 10, 13, 15, 16, or 22 further comprising:
- a phase shifter located adjacent to a portion of the third extension optical waveguide, wherein the phase shifter applies an activation such that a phase shifts in the third-wavelength light to achieve a phase walk-off that is an odd multiple of 180 degrees.

Clause 26

A method for facilitating a non-linear optical process comprising:
- routing a first-wavelength light and a second-wavelength light in a main nonlinear optical waveguide;
- optically coupling, by a first wavelength-selective coupler, the main nonlinear optical waveguide and an extension optical waveguide to each other such that the first-wavelength light is coupled from the main nonlinear optical waveguide to the extension optical waveguide and the second-wavelength light is not coupled from the main nonlinear optical waveguide to the extension optical waveguide but rather is coupled to a secondary optical waveguide; and
- optically coupling, by a second wavelength-selective coupler, the main nonlinear optical waveguide and the extension optical waveguide to each other such that the first-wavelength light is coupled from the extension optical waveguide to the main nonlinear optical waveguide.

Clause 27

The method of according to clause 26 further comprising:
- optically coupling, by a third wavelength-selective coupler, the secondary optical waveguide and a second extension optical waveguide to each other such that the second-wavelength light is coupled from the secondary optical waveguide to the second extension optical waveguide, and such that a third-wavelength light is not coupled from the secondary optical waveguide to the second extension optical waveguide; and optically coupling, by a fourth wavelength-selective coupler, the secondary optical waveguide and the second extension optical waveguide to each other such that the second-wavelength light is coupled from the second extension optical waveguide to the secondary optical waveguide.

Clause 28

The method of according to clause 27 comprising:

routing the third-wavelength light in the main nonlinear optical waveguide;

optically coupling, by the third wavelength-selective coupler, the secondary optical waveguide and a third extension optical waveguide to each other such that the third-wavelength light is coupled from the secondary optical waveguide to the third extension optical waveguide and the second-wavelength light is not coupled from the secondary optical waveguide to the third extension optical waveguide; and optically coupling, by the fourth wavelength-selective coupler, the secondary optical waveguide and the third extension optical waveguide to each other such that the third-wavelength light is coupled from the third extension optical waveguide to the secondary optical waveguide.

Clause 29

The method according to clause 27, wherein the first-wavelength light travels in a first loop through a main segment between a first main location and a second main location within the main nonlinear optical waveguide and through a first extension segment, in which the first loop has a first length selected to achieve a resonance condition for the first-wavelength light; and wherein the second-wavelength light travels in a second loop through a secondary segment in the secondary optical waveguide, through the second extension optical waveguide, and through the main segment in the main nonlinear optical waveguide, in which the second loop has a second length for the second-wavelength light selected to achieve the resonance condition for the second-wavelength light.

Clause 30

The method according to clause 27, wherein the first-wavelength light travels in a first loop through a main segment between a first main location and a second main location within the main nonlinear optical waveguide and through a first extension optical waveguide, in which the first loop has a first length selected to achieve a resonance condition for the first-wavelength light;

wherein the second-wavelength light travels in a second loop through a segment in the secondary optical waveguide, through the second extension optical waveguide, and through the main segment in the nonlinear optical waveguide, in which the second loop has a second length for the second-wavelength light selected to achieve the resonance condition for the second-wavelength light; and wherein the third-wavelength light travels in a third loop through the segment in the secondary optical waveguide, through the third extension optical waveguide, and through the main segment in the nonlinear optical waveguide, in which the third loop as a third length selected to achieve a resonance condition for the third-wavelength light.

Clause 31

The method according to any of clauses 27-30, wherein the first-wavelength light is a pump light, the second-wavelength light is one of a signal light and an idler light.

Clause 32

The method according to any of clauses 27-30, wherein the first-wavelength light is one of a signal light and an idler light and the second-wavelength light is a pump light.

Clause 33

The method according to any of clauses 27-30, wherein the first-wavelength light is a pump light, the second-wavelength light is a signal light, and the third-wavelength light is an idler light.

Clause 34

The method according to any of clauses 26-33 further comprising:

applying an activation to a portion of the main nonlinear optical waveguide such that a phase shifts in the first-wavelength light to achieve a resonance condition for the first-wavelength light.

Clause 35

The method according to any of clauses 27-34 further comprising:

applying an activation such to a portion of the second extension optical waveguide such that a phase shifts in the second-wavelength light to achieve a resonance condition for the second-wavelength light.

Clause 36

The method according to clause 30 further comprising:

applying an activation to a portion of the third extension optical waveguide such that such that a phase shifts in the third-wavelength light to achieve a resonance condition for the third-wavelength light.

Clause 37

The method according to any of clauses 27-36 further comprising:

applying an activation to a portion of the second extension optical waveguide such that a phase shifts in the second-wavelength light.

Clause 38

The method according to any of clauses 27-37 further comprising:

applying an activation to a portion of the main nonlinear optical waveguide such that a phase shifts in the first-wavelength light to achieve a round trip phase matching condition for a nonlinear optical process involving the first-wavelength light, the second-wavelength light, and the third-wavelength light.

Thus, the illustrative examples include the wavelength-selective couplers that enable selective coupling of light in a manner that establishes loops in which light of different wavelengths can travel. Additionally, optical waveguides in the illustrative examples are designed to manage a reversal in the sign of the nonlinear optical coefficient that occurs for the two halves of an optical waveguide structure for which the light travels in opposite directions in portions of those two halves. The optical waveguide structures in this optical waveguide structure can avoid undesired effects of the sign reversal in the nonlinear optical coefficient by removing the pump light or by having an absence of a non-linear optical material in part of the structure.

In another illustrative embodiment, loops formed from optical waveguides is unnecessary. For example, the non-linear optical waveguide structure in the different illustrative examples described above in FIGS. 1-27 can comprise triple partially overlapping loops for entanglement (TriPOLE). In this illustrative example, these partially overlapping loops for entanglement are unnecessary to obtain a desired level of performance.

In this illustrative example, phase adjustment is provided to control the phases of different wavelengths of light traveling through optical waveguide structures that do not include closed loops. The illustrative embodiments recognize and take into account a number of different considerations. Some of these considerations are recognized and taken into account as described below.

For example, maintenance of phase matching is important for achieving nonlinear optical processes that are efficient in terms of usage of input source power and that can produce high power of the light generated by the nonlinear optical process. Higher efficiency and higher generated power can be achieved by using a longer nonlinear optical waveguide. However, imperfect phase matching can limit the length of nonlinear optical waveguide for which the nonlinear optical generation process continues to be effective in producing additional light.

Further, in a nonlinear optical process, such as parametric down conversion (PDC) or difference frequency generation (DFG) and parametric up conversion (PUC) or sum frequency generation (SFG), the phase of the idler light generated at a given location in the nonlinear optical waveguide is determined by the phases of the source pump wave and signal wave at that location. With perfect phase matching, the wave-vector of the generated idler light continues to be matched with the wave-vectors of the source pump light and signal light so that the phase of the idler light generated at a first location and then propagated to a second location match the phase of the idler light generated at the second location.

As a result, a constructive nonlinear optical interaction occurs at the second location between the previously generated idler light and the pump and signal waves at that second location to produce additional generation of idler light at the second location. Thus, the intensity of the idler light can increase for longer nonlinear optical waveguides.

Alternatively, the efficiency of nonlinear optical generation, such as by spontaneous parametric down conversion (SPDC), can increase as the nonlinear optical waveguide becomes longer. However, when the phases for the light are not matched, the phase walk-off between the signal and idler light generated at different locations can result in destructive nonlinear optical interaction at the second location between those components of the signal light and the idler light and the pump light.

As a result, the additional generation of signal and idler light at the second location can be reduced or, for some values of the phase walk-off, the signal and idler light at the second location can even be consumed to produce pump light. This situation reverses the nonlinear optical generation process. Thus, increasing the length of the nonlinear optical waveguide does not continue to increase the nonlinear optical generation efficiency or the intensity of the generated signal and idler light.

The illustrative embodiments recognize and take into account that in a nonlinear optical (NLO) generation process, the phase(s) of the generated light is determined by the phase(s) of the source light(s). A nonlinear optical waveguide structure can be designed to achieve a condition of matching of the phases for the source light and the previously generated light. This type of matching enables the nonlinear optical generation process to become more efficient and to produce more power in the generated light for longer nonlinear optical waveguides. However, current nonlinear optical waveguide structures are not fabricated with perfect matching of the wave vectors needed to sustain efficient nonlinear optical generation over a long nonlinear optical waveguide. When a nonlinear optical waveguide does not have the wave-vector match to achieve perfect phase matching for sustaining a nonlinear optical process, the phase walk-off of the light generated can result in destructive interference. The generated light can be, for example, signal and idler light generated in spontaneous parametric down conversion (SPDC) from different locations in the nonlinear optical waveguide. Thus, the nonlinear optical interaction between source and generated light can be constructive for producing more generated light at some locations and destructive at other locations Some approaches to compensate for imperfect phase matching are based on quasi-phase-matching (QPM). Quasi-phase-matching involves a periodic change in the structure of a nonlinear optical waveguide. Some examples of quasi-phase-matching involve changing a transverse dimension of the nonlinear optical waveguide, such as the waveguide width. Other examples of quasi-phase-matching involve changing the polarization direction of the nonlinear optical material in the nonlinear optical waveguide. With quasi-phase-matching the longitudinal period of the structural or material change in the nonlinear optical waveguide must exactly the longitudinal distance over which the imperfect phase match results in a phase walk-off of $2\pi$ radians or 360 degrees.

Yet other examples involve using a nonlinear optical waveguide structure that comprises two parallel and optically coupled nonlinear optical waveguides. For these two-coupled-waveguide structures, either the generated light or the source light, but not both, is gradually and continuously coupled from a first waveguide of the two parallel waveguides to the second waveguide and then back from the second waveguide to the first waveguide. The length over which the round-trip coupling from first waveguide to second waveguide and back to first waveguide occurs is matched to the length over which phase walk-off of the generated light reaches $2\pi$ radians or 360 degrees.

For one example with a two-coupled-waveguide structure, the light generated in a first location in the first waveguide does not propagate to a second location in the first waveguide at which the light generated in the first location and the light generated in the second location would have a phase walk-off of $\pi$ radians (180 degrees) and would otherwise result in a fully destructive interaction. Instead, the light generated in the first location becomes fully coupled into the second waveguide by that point and does not interfere with the light generated at that second location in the first waveguide. The light generated in the first location becomes fully coupled back from the second waveguide to the first waveguide at a third location in the first waveguide for which the light generated in the first location would have a phase walk-off of $2\pi$ radians (360 degrees) and would result in a fully constructive interaction. This gradual and continuous coupling of the generated light from the first waveguide into the second waveguide and then back again from the second waveguide into the first waveguide can be designed, by designing the coupling coefficient of the two-guide coupling structure, to occur in a periodic manner with the longitudinal period selected to avoid a periodically destructive interaction in the nonlinear optical generation process and to reinforce a periodically constructive interaction in the nonlinear optical generation process. In practice, it is difficult to achieve accurate control of the coupling coefficient for a two-guide coupling structure that exactly matches the phase walk-off, especially when the actual values obtained for the various wave vectors and for the two-guide coupling coefficient can change depending on fabrication-related tolerances and variations in the operational environment.

In the following examples of the illustrative embodiments, a nonlinear optical waveguide structure includes tuning optical waveguides that can operate to adjust the phase of light traveling through these tuning optical waveguides. In these illustrative examples, phase shifters are associated with the tuning optical waveguides. These phase shifters can adjust the phases of the light and the resulting phase match to enable the full length of the fabricated nonlinear optical waveguide to be useful for increasing the nonlinear optical generation efficiency and increasing the power in the light generated by the nonlinear optical process.

In the illustrative examples of these illustrative embodiments, a nonlinear optical waveguide structure provides one or more benefits that are not present with nonlinear optical waveguide structures that do not use phase tuning optical waveguides. For example, without phase tuning optical waveguides, an ability to have controlled adjustment of the light and thus of the phase matching to compensate for fabrication or operational tolerances is not present.

Further, when phase tuning optical waveguides are present for adjusting the phases of the generated light, the use of closed-loop nonlinear optical waveguide structures results in the source light cycling repeatedly through the closed-loop nonlinear optical waveguide. Also, the generated light propagates in other closed loop waveguides. These types of nonlinear optical waveguides can have challenges in using the phase shifters to both adjust the source and generated light to achieve phase matching of the nonlinear optical process as well as adjust the source and generated light to achieve a match to a spectral resonance of a closed-loop path. The need to match two constraints limits the flexibility of these types of nonlinear optical waveguide structures to compensate for different tolerances.

Thus, this example of these illustrative embodiments, provides phase adjustments to control the phases of different wavelengths of light traveling through optical waveguide structures without a need for closed loops.

Figure 28:
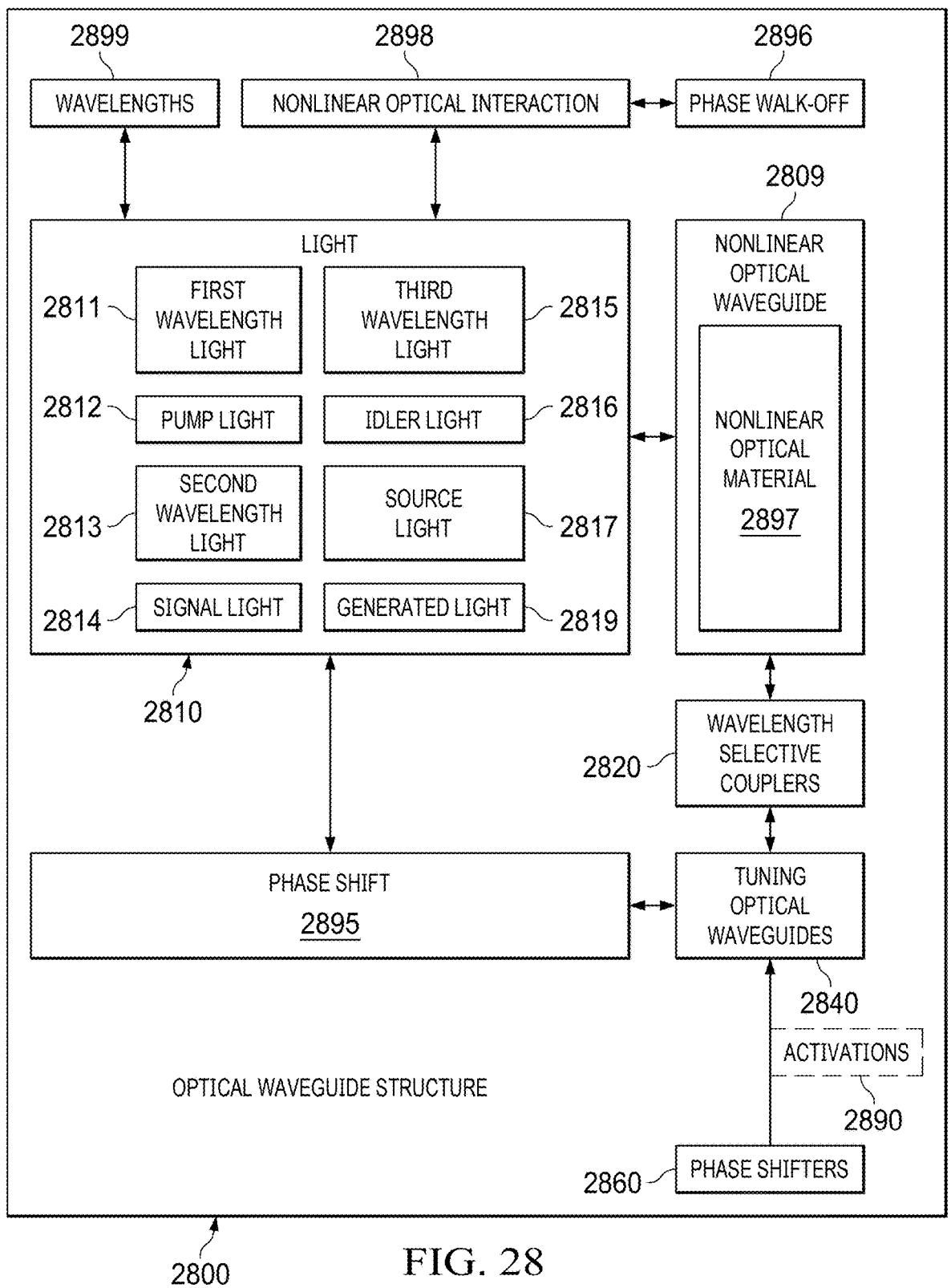
FIG. 28 is an illustration of a block diagram of an optical waveguide structure in accordance with an illustrative embodiment.

With reference now to the figures describing this illustrative example and in particular with reference to FIG. 28, an illustration of a block diagram of an optical waveguide structure is depicted in accordance with an illustrative embodiment. In this example, optical waveguide structure 2800 comprises a number of different components. As depicted, optical waveguide structure 2800 comprises nonlinear optical waveguide 2809, a set of tuning optical waveguides 2840, a set of wavelength selective couplers 2820, and a set of phase shifters 2860.

Nonlinear optical waveguide 2809 and the set of tuning optical waveguides 2840 are optical waveguides in optical waveguide structure 2800. Nonlinear optical waveguide 2809 is comprised of nonlinear optical material 2897 and can include other types of materials. In some illustrative examples, a tuning optical waveguide, a portion of the tuning optical waveguide, or multiple tuning optical waveguides can be comprised of nonlinear optical material 2897. With nonlinear optical material 2897 present, light generation can occur while light 2810 travels through nonlinear optical waveguide 2809.

In this illustrative example, light 2810 has a set of wavelengths 2899 and comprises first wavelength light 2811. Further, light 2810 can also include at least one of second wavelength light 2813 or third wavelength light 2815. One or both of second wavelength light 2813 and third wavelength light 2815 can have a different wavelength in wavelengths 2899 from the wavelength of first wavelength light 2811. Further, second wavelength light 2813 and third wavelength light 2815 can have values for their wavelengths in wavelengths 2899 that are different from each other or second wavelength light 2813 and third wavelength light 2815 can the same value for their wavelength in wavelengths 2899. This condition of second wavelength light 2813 and third wavelength light 2815 having the same wavelength occurs when degenerate down conversion is the nonlinear optical process. Further, first wavelength light 2811 and second wavelength light 2813 can have the same wavelength, or first wavelength light 2811 and third wavelength light 2815 can have the same wavelength in another example. This condition occurs in up-conversion processes such as second harmonic generation.

At least one of second wavelength light 2813 or third wavelength light 2815 can be produced from first wavelength light 2811 through nonlinear optical interaction 2898 within nonlinear optical waveguide 2809 caused by nonlinear optical material 2897 in nonlinear optical waveguide 2809. In one example, first wavelength light 2811 is pump light 2812 and second wavelength light 2813 can be signal light 2814 or idler light 2816. In another example, first wavelength light 2811 is pump light 2812 and second wavelength light 2813 is signal light 2814, and third wavelength light 2815 is idler light 2816.

A nonlinear optical process involves a nonlinear optical interaction 2898 between source light 2817 and nonlinear optical material 2897 in a portion of nonlinear optical waveguide 2809 that can produce generated light 2819.

In these examples, source light 2817 includes first wavelength light 2811. When source light comprises only first wavelength light 2811, such as in a spontaneous parametric down conversion (SPDC) process, generated light 2819 could include second wavelength light 2813 as well as third wavelength light 2815. In some nonlinear optical processes such as parametric up-conversion or parametric down-conversion, source light could further include second wavelength light 2813 or third wavelength light 2815. When source light further comprises second wavelength light 2813, such as in a parametric frequency-conversion (up-conversion or down-conversion) process, generated light 2819 would comprise third wavelength light 2815. Similarly, when source light 2817 further comprises third wavelength light 2815, generated light 2819 would comprise second wavelength light 2813.

The set of wavelength selective couplers 2820 couples light 2810 between nonlinear optical waveguide 2809 and the set of tuning optical waveguides 2840 based on wavelengths 2899 of light 2810. The set of wavelength selective couplers 2820 route first wavelength light 2811, second wavelength light 2813, and third wavelength light 2815 in light 2810 between segments of nonlinear optical waveguide 2809 and the set of tuning optical waveguides 2840 based on wavelengths 2899 of first wavelength light 2811, second wavelength light 2813, and third wavelength light 2815.

As a result, some components of light 2810 can be routed to one or more of the set of tuning optical waveguides 2840 while routing other components of light 2810 to continue to traverse through nonlinear optical waveguide 2809. In the illustrative example, a component of light 2810 light 2810 having a particular wavelength. For example, first wavelength light 2811 and second wavelength light 2813 are two components in light 2810.

In this example, first wavelength light 2811 can continue to travel in nonlinear optical waveguide 2809 while at least one of second wavelength light 2813 or third wavelength light 2815 can be routed between nonlinear optical waveguide 2809 and the set of tuning optical waveguides 2840.

The set of phase shifters 2860 can be located along the set of tuning optical waveguides 2840. In other words, a single phase shifter or multiple phase shifters in the set of phase shifters 2860 can be associated with a tuning optical waveguide in the set of tuning optical waveguides 2840 or multiple phase shifters can be associated with one or more of tuning optical waveguides 2840.

The set of phase shifters 2860 can be located along nonlinear optical waveguide 2809 or the set of tuning optical waveguides 2840 by being at least one of adjacent to part of nonlinear optical waveguide 2809 or the set of tuning optical waveguides 2840, connected to part of the nonlinear optical waveguide 2809 or the set of tuning optical waveguides 2840, or integrated as part of the nonlinear optical waveguide 2809 or the set of tuning optical waveguides 2840.

The set of phase shifters 2860 can apply a set of activations 2890 to the nonlinear optical waveguide 2809 or to the set of tuning optical waveguides 2840 to change phase shift 2895 for different wavelengths of light 2810 in the nonlinear optical waveguide 2809 or the set of tuning optical waveguides 2840. In the illustrative examples, activations 2890 as applied to tuning optical waveguide 2840 can change the refractive index of tuning optical waveguides 2840. This change in the refractive index can changes the phase shift of light traveling in tuning optical waveguides 2840. Activations 2890 that change the refractive index can be for example, heat or an electric field.

The particular wavelength of light 2810 for which phase shift occurs can be selected based on the set of activations 2890 applied to light 2810 traveling through the set of tuning optical waveguides 2840. The set of activations 2890 can be applied to cause phase shift 2895 to light 2810 propagating in the set of the set of tuning optical waveguides 2840 that results in phase walk-off 2896 for nonlinear optical interaction 2898 having a desired value. In these illustrative examples, a phase shift is a change in the phase of the light, such as the phase of one component of the light wave. This component, such as first wavelength light 2811 or second wavelength light 2813, can have a single wavelength.

For example, the set of activations 2890 can be applied such that particular wavelengths of light 2810 have phase shift 2895 that result in the nonlinear optical interaction 2898 having values for the phase walk-off 2896 of zero or an even multiple of $\pi$ radians. In other examples, phase walk-off 2896 can be close to zero or close to an even multiple of $\pi$ radians. For example, the phase walk-off can be within 0.25 $\pi$ radians or 0.5 $\pi$ radians. The desired value of phase walk-off 2896 achieved using the set of activations 2890 can depend on the amount of light generation desired.

For example, one or more phase shifters can also be associated with nonlinear optical waveguide 2809 in addition to being associated with the set of tuning optical waveguides 2840 or in place of being associated with the set of tuning optical waveguides 2840.

Figure 29:
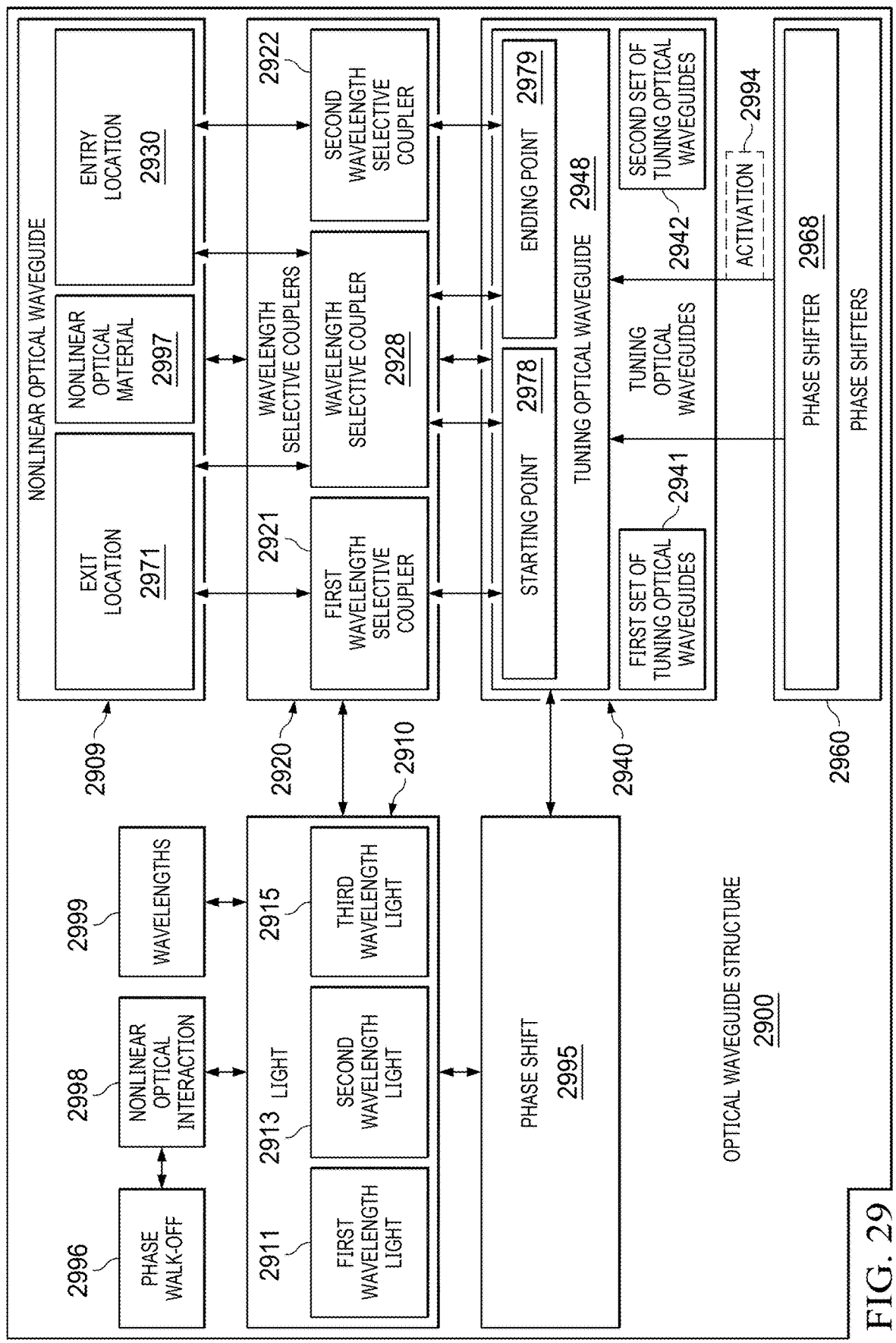
FIG. 29 is an illustration of an optical waveguide structure in accordance with an illustrative embodiment.

With reference to FIG. 29, an illustration of an optical waveguide structure is depicted in accordance with an illustrative embodiment. In this illustrative example, optical waveguide structure 2900 comprises nonlinear optical waveguide 2909, tuning optical waveguide 2948, a set of wavelength selective couplers 2920, and a set of phase shifters 2960.

In this illustrative example, light 2910 can comprise first wavelength light 2911 and second wavelength light 2913. Second wavelength light 2913 is produced from first wavelength light 2911 through nonlinear optical interaction 2998 occurring within nonlinear optical waveguide 2909. In other words, second wavelength light 2913 is produced within nonlinear optical waveguide 2909 through nonlinear optical interaction 2998 of first wavelength light 2911 and second wavelength light 2913 with nonlinear optical material 2997 in nonlinear optical waveguide 2909. The light generated in a preceding segment of a nonlinear optical waveguide can participate in the nonlinear optical interaction that produces additional generated light in a subsequent segment of the nonlinear optical waveguide. Thus, the phase of the previously generated second wavelength light should be considered in order to have constructive light generation when second wavelength light generated in different segments are included.

In this example, the set of wavelength selective couplers 2920 couples light 2910 between nonlinear optical waveguide 2909 and a set of tuning optical waveguides 2940 based on wavelengths 2999 of light 2910 and in particular for wavelengths 2999 of first wavelength light 2911, second wavelength light 2913, and third wavelength light 2915 in light 2910. In this example, the set of tuning optical waveguides 2940 includes first set of tuning optical waveguides 2941 and second set of tuning optical waveguides 2942. A set of phase shifters 2960 is located along the set of tuning optical waveguides 2940. For example, one or more phase shifters 2960, such a phase shifter 2968, in the set of phase shifters 2960 is located along tuning optical waveguide 2948 in the set of tuning optical waveguides 2940.

In this example, wavelength selective coupler 2928 in the set of wavelength selective couplers 2920 couples second wavelength light 2913 from exit location 2971 in nonlinear optical waveguide 2909 to starting point 2978 in tuning optical waveguide 2948. Wavelength selective coupler 2928 also couples second wavelength light 2913 from ending point 2979 in tuning optical waveguide 2948 back into nonlinear optical waveguide 2909 at entry location 2930. Wavelength selective coupler 2928 does not couple first wavelength light 2911 from the nonlinear optical waveguide 2909 into tuning optical waveguide 2948. Instead, first wavelength light 2911 is coupled from exit location 2971 in nonlinear optical waveguide 2909 to a different location in nonlinear optical waveguide 2909.

Phase shifter 2968 in the set of phase shifters 2960 is located between starting point 2978 and ending point 2979 in the tuning optical waveguide 2948. In this example, phase shifter 2968 applies activation 2994 to tuning optical waveguide 2948 to change phase shift 2995 of second wavelength light 2913 in tuning optical waveguide 2948.

In another illustrative example, optical waveguide structure 2900 can have another configuration that includes first wavelength selective coupler 2921, second wavelength selective coupler 2922 in the set of wavelength selective couplers 2920, tuning optical waveguide 2948 in the set of tuning optical waveguides 2940, and phase shifter 2968 in the set of phase shifters 2960.

In yet another illustrative example, optical waveguide structure 2900 can have another configuration that includes a combination of wavelength selective coupler 2928 with a pair of first wavelength selective coupler 2921 and second wavelength selective coupler 2922.

In this example, first wavelength selective coupler 2921 in the set of wavelength selective couplers 2920 couples second wavelength light 2913 from exit location 2971 in the nonlinear optical waveguide to starting point 2978 in tuning optical waveguide 2948. Second wavelength selective coupler 2922 in the set of wavelength selective couplers 2920 couples second wavelength light 2913 from ending point 2979 in tuning optical waveguide 2948 to entry location 2930 in nonlinear optical waveguide 2909.

Further, phase shifter 2968 in the set of phase shifters 2960 is located between starting point 2978 and ending point 2979 in tuning optical waveguide 2948. In this example, phase shifter 2968 applies activation 2994 to tuning optical waveguide 2948 to change phase shift 2995 of second wavelength light 2913 in tuning optical waveguide 2948. Thus, optical waveguide structure 2800 in FIG. 28 and optical waveguide structure 2900 illustrated in FIG. 29 enable adjusting light traveling through optical waveguides such as tuning optical waveguides to obtain a desired level of light generation within the optical waveguide structures. The set of phase shifters 2960 provides the ability to adjust parameters such as phase shift 2995 of one or more components of light 2910. As are result, adjusting phase walk-off 2996 for nonlinear optical interaction 2998 can enable the manufacture of devices such as optical sources that are more compact and can be produced at a lower cost as compared to current devices because these devices comprise nonlinear optical waveguides. In other words, the use of optical waveguides comprising nonlinear optical materials instead of propagating "unguided" light through nonlinear optical material enables the devices in the illustrative examples to be more compact and also to be produced at lower cost as compared to currently available devices. These devices can be designed without partially overlapping loops for entanglement when those loops are unnecessary to obtain a desired level of performance and physical size.

Figure 30A:
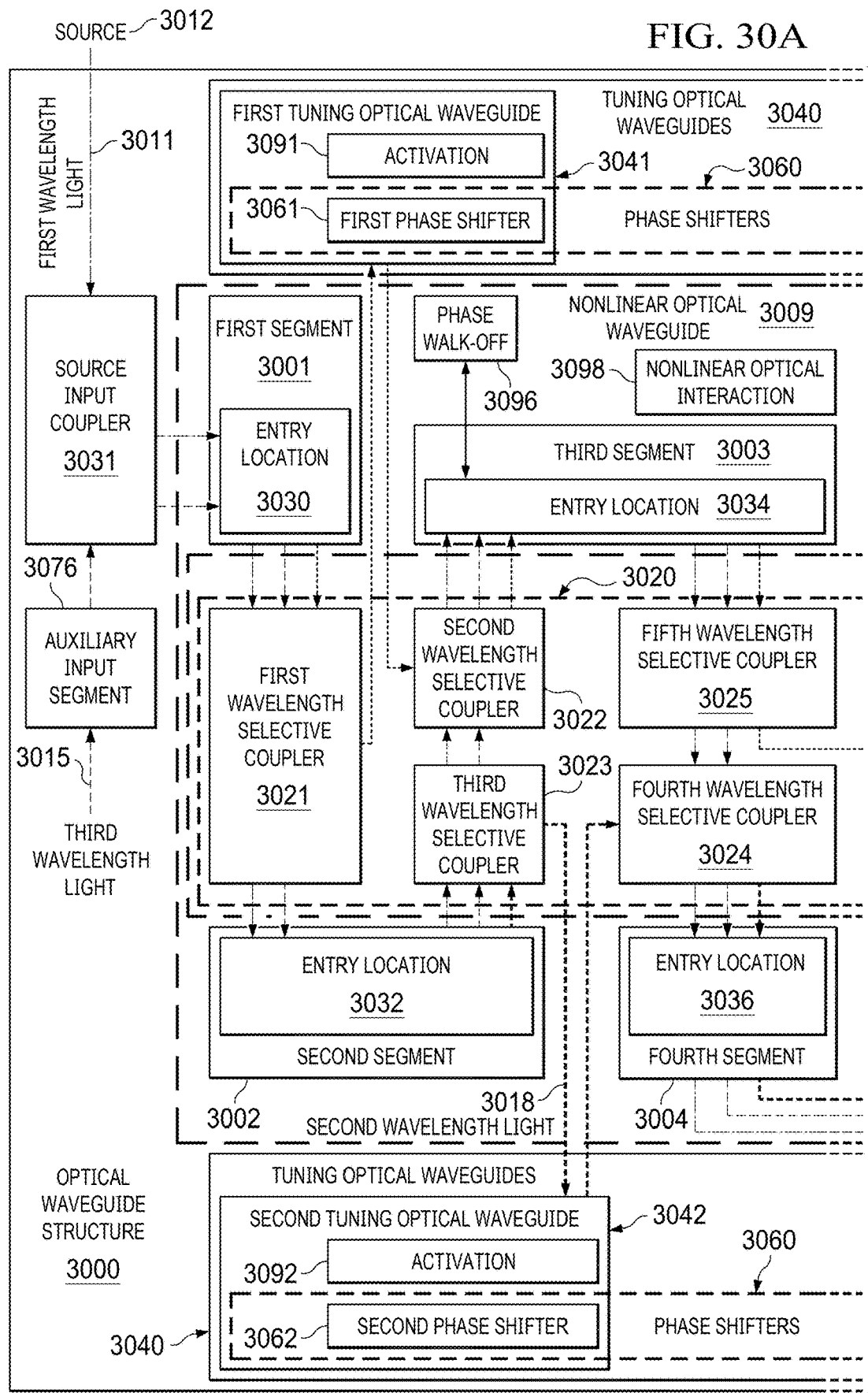
FIGS. 30A and 30B are illustrations of an optical waveguide structure in accordance with an illustrative embodiment.
Figure 30B:
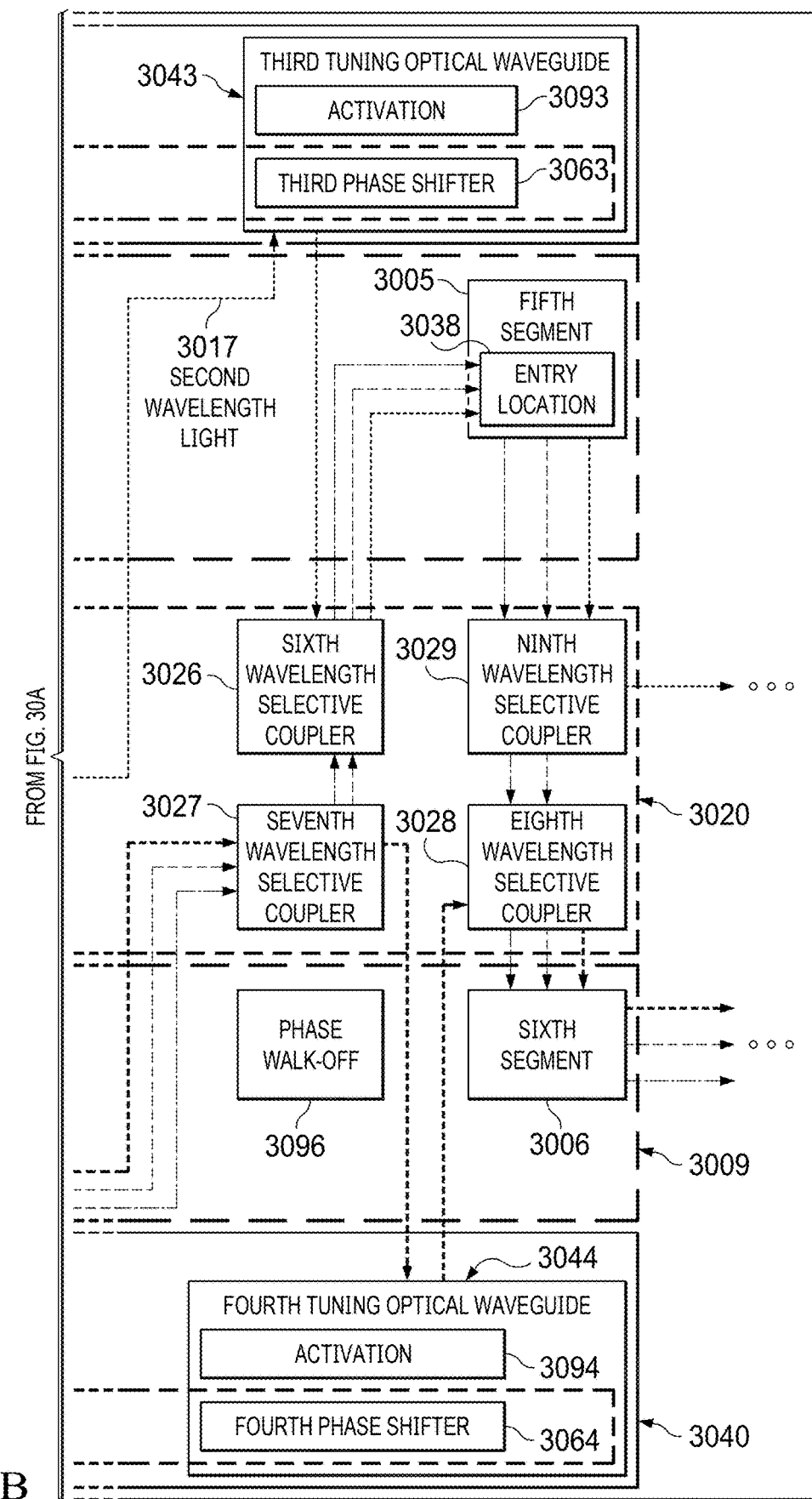

With reference to FIGS. 30A and 30B, illustrations of an optical waveguide structure are depicted in accordance with an illustrative embodiment. This figure illustrates cascading of many segments in nonlinear optical waveguide 3009 that increases the physical length of nonlinear optical waveguide 3009.

In this depicted example, optical waveguide structure 3000 is comprised as first segment 3001 in nonlinear optical waveguide 3009, second segment 3002 in nonlinear optical waveguide 3009, third segment 3003 in nonlinear optical waveguide 3009, first tuning optical waveguide 3041 in the set of tuning optical waveguides 3040, first wavelength selective coupler 3021 in the set of wavelength selective couplers 3020, and first phase shifter 3061 in a set of phase shifters 3060. First phase shifter 3061 is located along first tuning optical waveguide 3041.

In this example, first segment 3001 and second segment 3002 in nonlinear optical waveguide 3009 are physically separated from each other by first wavelength selective coupler 3021. In this example, second segment 3002 and third segment 3003 in nonlinear optical waveguide 3009 are physically separated from each other by second wavelength selective coupler 3022 and by third wavelength selective coupler 3023. In the illustrative example, first wavelength light 3011 can be supplied to first segment 3001 at first entry location 3030

With this example, first wavelength selective coupler 3021 couples first wavelength light 3011 from first segment 3001 in nonlinear optical waveguide 3009 into second segment 3002 in nonlinear optical waveguide 3009 at entry location 3032. First wavelength selective coupler 3021 couples second wavelength light 3017, which is generated in first segment 3001, from first segment 3001 into first tuning optical waveguide 3041. Further, second wavelength light 3017 in first tuning optical waveguide 3041 is coupled from first tuning optical waveguide 3041 to third segment 3003 by second wavelength selective coupler 3022. In this example, second wavelength light 3017 is coupled away from third segment 3003 in nonlinear optical waveguide 3009 by second wavelength selective coupler 3022.

In this example, second wavelength light 3017 generated in first segment 3001 goes through first tuning optical waveguide 3041 and then to third segment 3003 after having its phase shift adjusted to again re-establish a phase-matching condition. Additionally, second wavelength light 3018 generated in second segment 3002 is intentionally not coupled into third segment 3003 but rather is diverted into second tuning optical waveguide 3042.

In this example, second wavelength light 3017 generated in first segment 3001 is coupled by second wavelength selective coupler 3022 into entry location 3034 of third segment 3003.

In this depicted example, second wavelength selective coupler 3022 in the set of wavelength selective couplers 3020 couples first wavelength light 3011 from the second segment 3002 into the third segment 3003. Second wavelength light 3017 in first tuning optical waveguide 3041 is coupled from first tuning optical waveguide 3041 to third segment 3003 by second wavelength selective coupler 3022.

In the illustrative example, optical waveguide structure 3000 further comprises second tuning optical waveguide 3042 in the set of tuning optical waveguides 3040; second phase shifter 3062 in the set of phase shifters 3060, and third wavelength selective coupler 3023 in the set of wavelength selective couplers 3020. Second phase shifter 3062 is located along second tuning optical waveguide 3042.

Second wavelength light 3018 generated in second segment 3002 in nonlinear optical waveguide 3009 is not coupled into third segment 3003 in nonlinear optical waveguide 3009 by second wavelength selective coupler 3022. Instead, second wavelength light 3018 generated in second segment 3002 is coupled by third wavelength selective coupler 3023 into second tuning optical waveguide 3042. Second wavelength light 3018 generated in second segment 3002 is coupled by third wavelength selective coupler 3023 from second segment 3002 into second tuning optical waveguide 3042, and thus does not even enter second wavelength selective coupler 3022.

Second wavelength light 3017 is generated in first segment 3001 and second wavelength light 3018 is generated in second segment 3002. Second wavelength light 3017 and second wavelength light 3018 can have different phases relative to each other. Second wavelength light 3017 and second wavelength light 3018 will experience an interference if they are combined into the same optical waveguide. This interference can result in an increase or a decrease in the intensity or power of the combined second wavelength light, depending, respectively, on whether the interference is constructive or destructive. In this example, second wavelength light 3017 and second wavelength light 3018 are intentionally kept separate until they both reach combiner 3188 in FIG. 31B as described below. In the examples, different tuning optical waveguides and different phase shifters can be used to adjust the phases of these two components of second wavelength light 3017 and 3018 to reduce their destructive interference and enhance their constructive interference when second wavelength light 3017 and second wavelength light 3018 are combined at combiner 3188 in FIG. 31B as described below.

In this example, third wavelength selective coupler 3023 couples second wavelength light 3018, generated in second segment 3002, from second segment 3002 into second tuning optical waveguide 3042. Third wavelength selective coupler 3023 also couples first wavelength light 3011 from second segment 3002 into third segment 3003 through second wavelength selective coupler 3022.

In this illustrative example, optical waveguide structure 3000 can further comprise fourth segment 3004 in nonlinear optical waveguide 3009 and fourth wavelength selective coupler 3024 in the set of wavelength selective couplers 3020. With this example, fourth wavelength selective coupler 3024 couples second wavelength light 3018, generated in second segment 3002, from second tuning optical waveguide 3042 into fourth segment 3004. Additionally, fourth wavelength selective coupler 3024 couples the first wavelength light 3011 from third segment 3003 into fourth segment 3004.

In this illustrative example, optical waveguide structure 3000 can further comprise third tuning optical waveguide 3043 in the set of tuning optical waveguides 3040 and fifth wavelength selective coupler 3025 in the set of wavelength selective couplers 3020. In this example, fifth wavelength selective coupler 3025 in the set of wavelength selective couplers 3020 couples second wavelength light 3017 from third tuning optical waveguide 3043 and couples first wavelength light 3011 from third segment 3003 into fourth segment 3004 through fourth wavelength selective coupler 3024. In this illustrative example, third phase shifter 3063 in the set of phase shifters 3060 can be located along third tuning optical waveguide 3043 and can apply activation 3093 to second wavelength light 3017 in third tuning optical waveguide 3043.

In this example, additional second wavelength light can be produced as a result of the nonlinear optical interaction that occurs in third segment 3003. Thus, the second wavelength light 3017 that is coupled from third segment 3003 by fifth wavelength selective coupler 3025 could comprise a combination of second wavelength light generated in first segment 3001 and additional second wavelength light generated in third segment 3003. First phase shifter 3061 in first tuning optical waveguide 3041 adjusts the phase of the second wavelength light 3017 coupled into entry location 3034 of third segment 3003 in order to achieve a phase walk-off 3096 with a value of zero or a multiple of 2π radians for the nonlinear optical interaction 3098 occurring up through entry location 3034 in the third segment 3003. As a result, the second wavelength light 3017 exiting the third segment and coupled through fifth wavelength selective coupler 3025 can be greater than the second wavelength light 3017 exiting the first segment 3001 and coupled into third segment 3003.

Further, optical waveguide structure 3000 can include other optical components. For example, optical waveguide structure 3000 can include source input coupler 3031 that supplies first wavelength light 3011, such as pump light 3012, from a location external to optical waveguide structure 3000 into first segment 3001 of nonlinear optical waveguide 3009. The first wavelength light 3011 can be supplied, via source input coupler 3031, to first entry location 3030 in first segment 3001.

The phase walk-off of interest at entry location 3034 in third segment 3003 is the phase walk-off for the cumulative nonlinear optical interaction that occurs through nonlinear optical waveguide 3009 from first entry location 3030 in first segment 3001 to entry location 3034 in third segment 3003. The additional generation of second wavelength light 3017 that occurs in third segment 3003 depends on this phase walk-off, which is affected by the first phase shifter 3061 that adjusts the phase of the second wavelength light 3017 generated in first segment 3001, as discussed above. However, second wavelength light 3018 generated in second segment 3002 is diverted away from third segment 3003 by third wavelength selective coupler 3023. Thus, the phase of second wavelength light 3018 is not a factor in determining the phase walk-off of interest at entry location 3034 in third segment 3003.

In this illustrative example, optical waveguide structure 3000 can further comprise fifth segment 3005 in nonlinear optical waveguide 3009, fourth tuning optical waveguide 3044 in the set of tuning optical waveguides 3040 and seventh wavelength selective coupler 3027 as well as sixth wavelength selective coupler 3026 in the set of wavelength selective couplers 3020. In this example, seventh wavelength selective coupler 3027 in the set of wavelength selective couplers 3020 couples second wavelength light 3018 from fourth segment 3004 into fourth tuning optical waveguide 3044 and also couples first wavelength light 3011 from fourth segment 3004 into fifth segment 3005 through seventh wavelength selective coupler 3027 and then through sixth wavelength selective coupler 3026. In this illustrative example, fourth phase shifter 3064 in the set of phase shifters 3060 can be located along fourth tuning optical waveguide 3044 and can apply activation 3094 to second wavelength light 3018 in fourth tuning optical waveguide 3044.

In this example, additional second wavelength light can be produced as a result of the nonlinear optical interaction that occurs in fourth segment 3004. Thus, the second wavelength light 3018 that is coupled by seventh wavelength selective coupler 3027 could comprise a combination of second wavelength light generated in second segment 3002 and additional second wavelength light generated in fourth segment 3004. Second phase shifter 3062 in second tuning optical waveguide 3042 adjusts the phase of the second wavelength light 3018 coupled into entry location 3036 of fourth segment 3004 in order to achieve a phase walk-off 3096 with a value of zero or a multiple of 2π radians for the nonlinear optical interaction 3098 occurring up through entry location 3036 in the fourth segment 3004. As a result, the second wavelength light 3018 exiting the fourth segment and coupled through seventh wavelength selective coupler 3027 can be greater than the second wavelength light 3018 exiting the second segment 3002 and coupled into fourth segment 3004.

In this illustrative example, different phase shifters can apply different activations depending on the phase adjustment desired. In this depicted example, first phase shifter 3061 in set of phase shifters 3060 applies activation 3091 to second wavelength light 3017 in first tuning optical waveguide 3041 to change the phase shift for second wavelength light 3017 in first tuning optical waveguide 3041 such that the phase walk-off 3096 for the nonlinear optical interaction 3098 in nonlinear optical waveguide 3009 from first entry location 3030 in first segment 3001 where first wavelength light 3011 is supplied to first segment 3001 to entry location 3034 in third segment 3003 has a value of zero or an even multiple of π radians. In other examples, the phase walk-off 3096 can have a value close to zero or close to an even multiple of π radians. For example, the value for the phase walk-off can be within 0.25 π radians or 0.5 π radians. Entry location 3034 is where second wavelength selective coupler 3022 and third segment 3003 connect to each other.

Further in this example, second phase shifter 3062 can apply activation 3092 to second wavelength light 3018 in second tuning optical waveguide 3042. The second wavelength light 3018 in second tuning optical waveguide 3042 was generated in second segment 3002. Activation 3092 is applied to this second wavelength light 3018 in second tuning optical waveguide 3042 such that the phase walk-off 3096 for nonlinear optical interaction 3098 in nonlinear optical waveguide 3009 from entry location 3032, at which first wavelength selective coupler 3021 connects to second segment 3002, to entry location 3036, at which fourth wavelength selective coupler 3024 connects to fourth segment 3004 has a value that is zero or is an even multiple of π radians.

In other examples, the phase walk-off 3096 can have a value close to zero or close to an even multiple of π radians. For example, the value for the phase walk-off can be within 0.25 π radians or 0.5 π radians. Entry location 3036 is where fourth wavelength selective coupler 3024 and fourth segment 3004 connect to each other.

In this example, the order of components in optical waveguide structure 3000 can be first segment 3001, first wavelength selective coupler 3021, second segment 3002, third wavelength selective coupler 3023, second wavelength selective coupler 3022, and third segment 3003. To continue with this order of components, additional components can be fifth wavelength selective coupler 3025, fourth wavelength selective coupler 3024, fourth segment 3004, seventh wavelength selective coupler 3027, sixth wavelength selective coupler 3026 and fifth segment 3005.

In this illustrative example, additional phase shifters can apply additional activations depending on the phase adjustment desired to achieve effective nonlinear optical interactions in segments of the nonlinear optical waveguide 3009 beyond the first segment 3001 and the second segment 3002. In this depicted example, third phase shifter 3063 in set of phase shifters 3060 applies activation 3093 to second wavelength light 3017 in third tuning optical waveguide 3043 to change the phase shift for second wavelength light 3017 in third tuning optical waveguide 3043 such that the phase walk-off 3096 for the nonlinear optical interaction 3098 in nonlinear optical waveguide 3009 from first entry location 3030 in first segment 3001 where first wavelength light 3011 is supplied to first segment 3001 to entry location 3038 in fifth segment 3005 has a value of zero or an even multiple of π radians. The second wavelength light 3017 in the third tuning optical waveguide 3043 can be generated in the first segment 3001 and in the third segment 3003. In other examples, the phase walk-off 3096 can have a value close to zero or close to an even multiple of π radians. For example, the value for the phase walk-off can be within 0.25 π radians or 0.5 π radians. Entry location 3038 is where sixth wavelength selective coupler 3026 and fifth segment 3005 connect to each other.

Likewise, as depicted in FIGS. 30A and 30B, fourth phase shifter 3064 can apply activation 3094 to second wavelength light 3018 in fourth tuning optical waveguide 3044. The second wavelength light 3018 in fourth tuning optical waveguide 3044 was generated in second segment 3002 and in fourth segment 3004. Activation 3094 is applied to this second wavelength light 3018 in fourth tuning optical waveguide 3044 such that the phase walk-off 3096 for nonlinear optical interaction 3098 in nonlinear optical waveguide 3009 from entry location 3032, at which first wavelength selective coupler 3021 connects to second segment 3002, to an entry location (not shown), at which fourth wavelength selective coupler 3024 connects to a sixth segment 3006 through eighth wavelength selective coupler 3028 of nonlinear optical waveguide 3009 has a value that is zero or is an even multiple of π radians.

In this example, first segment 3001 and second segment 3002 in nonlinear optical waveguide 3009 are physically separated from each other by first wavelength selective coupler 3021. In this example, second segment 3002 and third segment 3003 in nonlinear optical waveguide 3009 are physically separated from each other by second wavelength selective coupler 3022 and by third wavelength selective coupler 3023. In this example, third segment 3003 and fourth segment 3004 are physically separated from each other by fourth wavelength selective coupler 3024 and by fifth wavelength selective coupler 3025. In the illustrative example, first wavelength light 3011 can be supplied to first segment 3001 at first entry location 3030. In this example, first wavelength light 3011 can be pump light 3012.

Figure 31A:
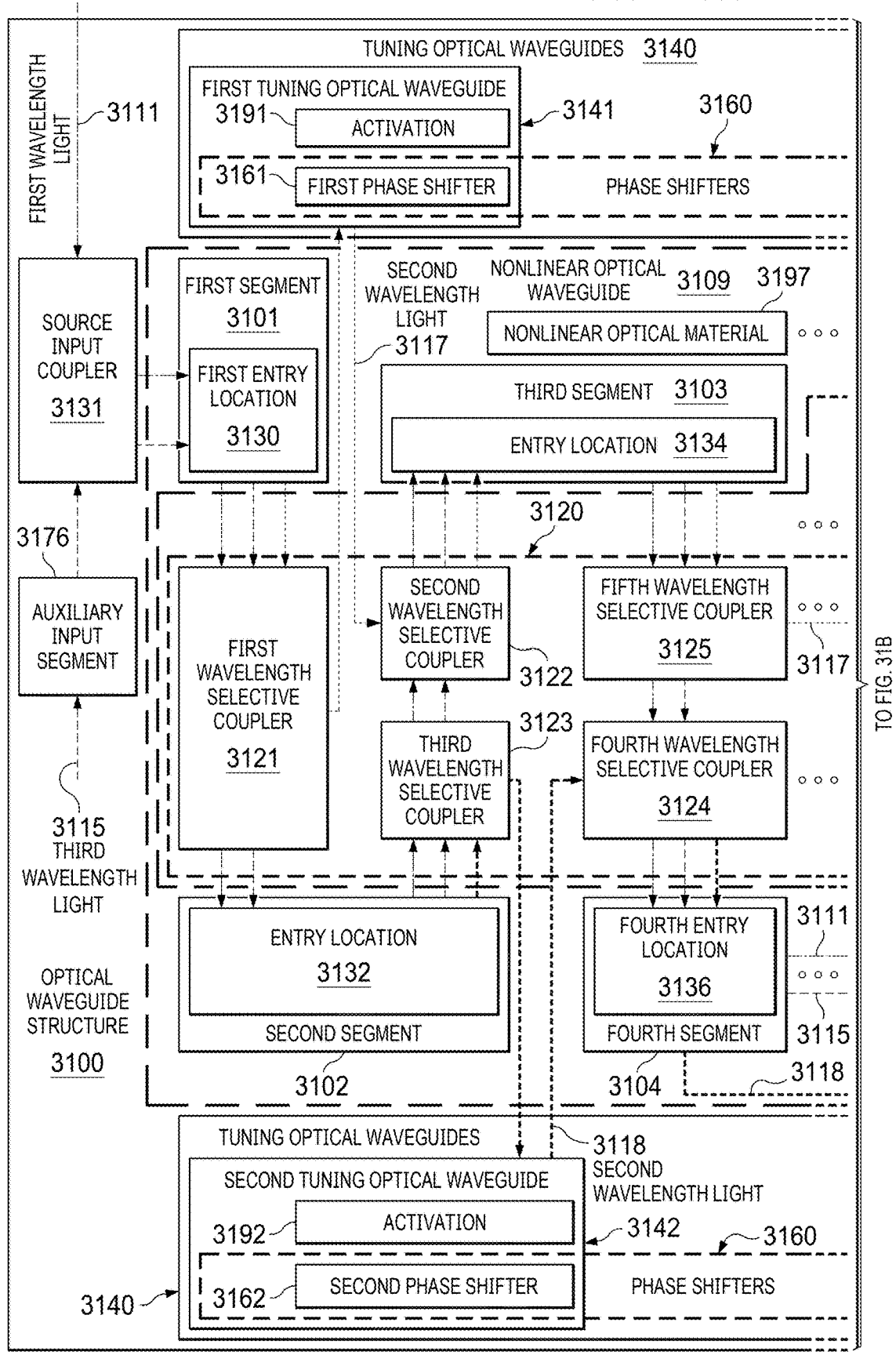
FIGS. 31A and 31B are illustrations of an optical waveguide structure in accordance with an illustrative embodiment.
Figure 31B:
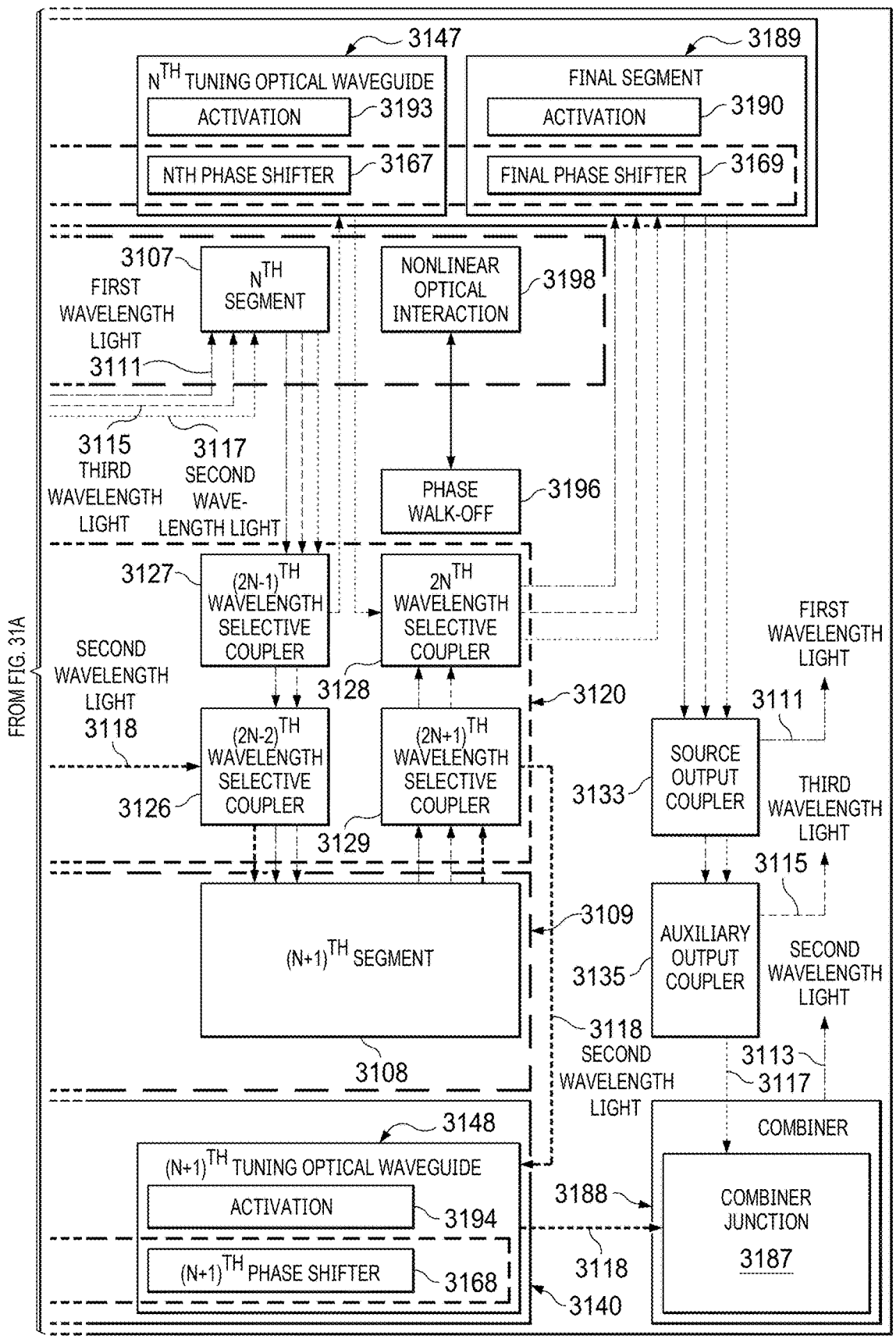

With reference to FIGS. 31A and 31B, illustrations of an optical waveguide structure is depicted in accordance with an illustrative embodiment. This figure illustrates how the two components for generated light, such as second wavelength light 3117 and second wavelength light 3118 can be combined such that constructive interference of second wavelength light 3117 and second wavelength light 3118 occurs.

In this illustrative example, optical waveguide structure 3100 comprises nonlinear optical waveguide 3109, a set of wavelength selective couplers 3120, a set of phase shifters 3160, and a set of tuning optical waveguides 3140. Like the example in FIGS. 30A and 30B, the example illustrated in FIGS. 31A and 31B has a first segment 3101 of nonlinear optical waveguide 3109 into which first wavelength light 3111 is supplied and in which second wavelength light 3117 can be generated by a nonlinear optical interaction occurring in the first segment 3101. The example illustrated in FIGS. 31A and 31B further has a second segment 3102 of nonlinear optical waveguide 3109 into which first wavelength light is supplied, through first wavelength selective coupler 3121, and in which second wavelength light 3118 can be generated by a nonlinear optical interaction occurring in the second segment 3102.

In this example, the nonlinear optical interaction can be extended to more and more segments of nonlinear optical waveguide 3109. Second wavelength light 3117 generated in first segment 3101 is coupled through first wavelength selective coupler 3121 to first tuning optical waveguide 3141 and then through second wavelength selective coupler 3122 to third segment 3103. In third segment 3103, additional second wavelength light 3117 can be generated by nonlinear optical interaction of the first wavelength light 3111 and the second wavelength light present in the third segment 3103, which can include the second wavelength light generated in the first segment.

In this example, second wavelength light 3118 generated in second segment 3102 is coupled through third wavelength selective coupler 3123 to second tuning optical waveguide 3142 and then through fourth wavelength selective coupler 3124 to fourth segment 3104. In fourth segment 3104, additional second wavelength light 3118 can be generated by nonlinear optical interaction of the first wavelength light 3111 and the second wavelength light present in the fourth segment 3104, which can include the second wavelength light generated in the second segment 3102.

The example illustrated in FIGS. 31A and 31B shows that more and more segments of nonlinear optical waveguide can be cascaded in this manner. Second wavelength light 3117 can be coupled from Nth segment 3107 through (2N−1)th wavelength selective coupler 3127 and Nth tuning optical waveguide 3147. (2N−1)th wavelength selective coupler 3127 couples second wavelength light 3117 from Nth segment 3107 to Nth tuning optical waveguide 3147 and couples first wavelength light 3111 from Nth segment 3107 to (2N−2)th wavelength selective coupler 3126, which then couples first wavelength light 3111 to (N+1)th segment 3108. Second wavelength light 3118 can be coupled from (N−1)th tuning optical waveguide (not shown) through (2N−2)th tuning optical waveguide 3126 to (N+1)th segment 3108. Second wavelength light 3118 can be coupled through (N+1)th segment 3108 of nonlinear optical waveguide 3109 and (N+1)th tuning optical waveguide 3148. (2N+1)th wavelength selective coupler 3129 couples second wavelength light 3118 from (N+1)th segment 3108 into (N+1)th tuning optical waveguide 3148. (2N+1)th wavelength selective coupler 3129 also couples first wavelength light 3111 from (N+1)th segment 3108 through 2Nth wavelength selective coupler 3128 to final segment 3189.

The example illustrated in FIGS. 31A and 31B also shows a way in which the two cascades can be terminated. 2Nth wavelength selective coupler 3128 couples second wavelength light 3117 from Nth tuning optical waveguide 3147 into final segment 3189 of optical waveguide structure 3100. Second wavelength light 3117 travels through final segment 3189 is connected to combiner junction 3187 of combiner 3188. As depicted, (2N+1)th wavelength selective coupler 3129 couples second wavelength light 3118 from (N+1)th segment 3108 into (N+1)th tuning optical waveguide 3148 in tuning optical waveguides 3140. Second wavelength light 3118 travels through (N+1)th tuning optical waveguide 3148 to combiner junction 3187 of combiner 3188.

In a simplified example of optical waveguide structure 3100, Nth tuning optical waveguide 3147 can be a third tuning optical waveguide and (N+1)th tuning optical waveguide 3148 can be a fourth tuning optical waveguide. For this example, Nth segment would be third segment 3103. For this example, (N−1)th segment would be second segment 3102 and (N+1)th segment would be fourth segment 3104. For this example, (2N−1)th wavelength selective coupler 3127 would be fifth wavelength selective coupler 3125 and (2N−2)th wavelength selective coupler 3126 would be fourth wavelength selective coupler 3124.

In one example of optical waveguide structure 3100, as illustrated in FIGS. 31A and 31B, source output coupler 3133 is connected to final segment 3189. For this example, final segment 3189 does not comprise a substantial amount of nonlinear optical material 3197, so that no nonlinear optical interaction would occur. Source output coupler 3133 removes first wavelength light 3111, which could be pump light 2812 to a source out port or waveguide of the structure. Source output coupler 3133 also couples second wavelength light 3117 to combiner junction 3187 of combiner 3188.

In other examples (not depicted), final segment 3189 could comprise nonlinear optical material 3197. For these other examples, source output coupler 3133 is located between 2Nth wavelength selective coupler 3128 and final segment 3189. In these cases, source output coupler 3133 couples first wavelength light 3111 from Nth tuning optical waveguide 3147 away from final segment 3189. Thus, first wavelength light 3111 is removed and does not propagate through final segment 3189 of optical waveguide structure 3100 when final segment 3189 comprises nonlinear optical material 3197. As a result, no additional generation of second wavelength light occurs in final segment 3189 even if that final segment comprises nonlinear optical material, since the first wavelength light 3111, which serves as the pump light for the nonlinear optical interactions that occur in the nonlinear optical waveguide 3109, is absent.

In these examples, no first wavelength light 3111 is supplied to optical waveguide structure 3100 besides first wavelength light 3111 supplied to first segment 3101 through source input coupler 3131. First wavelength light 3111 in second segment 3102 is supplied through first segment 3101. First wavelength light 3111 in third segment 3103 is supplied through first segment 3101, and travels through second segment 3102 to third segment 3103.

In the illustrated example, optical waveguide structure 3100 further comprises combiner 3188. Second wavelength light 3117 is supplied through final segment 3189 to a combiner junction 3187 of combiner 3188. In addition, second wavelength light 3118 is supplied through (N+1)th tuning optical waveguide 3148 to the combiner junction 3187 of combiner 3188. The phase of second wavelength light 3117 at the combiner junction 3187 and the phase of second wavelength light 3118 at the combiner junction 3187 are adjusted to produce a constructive interference condition for these two components of second wavelength light 3117 and second wavelength light 3118. The combining of second wavelength light 3117 from the route through first segment 3101 and other odd-numbered segments and second wavelength light 3118 from the route through second segment 3102 and other even-numbered segments form combined second wavelength light 3113. In this example, combined second wavelength light 3113 is an idler light.

In the example of FIGS. 31A and 31B, an optional final phase shifter 3169 can be located along final segment 3189. This final phase shifter 3169 of the set of phase shifters 3160 applies activation 3190 to adjust the phase of second wavelength light 3117 traveling in final segment 3189.

In the illustrated example, the optical waveguide structure 3100 also can comprise an optional auxiliary input segment 3176 into which third wavelength light 3115 is supplied. This third wavelength light 3115 serves as an auxiliary source light for nonlinear optical processes such as parametric up-conversion and parametric down-conversion that occur in nonlinear optical waveguide 3109. The third wavelength light 3115 can be signal light or can be idler light, depending on whether second wavelength light is signal light or idler light. If second wavelength light is idler light, then third wavelength light would be signal light. Conversely, if second wavelength light is signal light, then third wavelength light would be idler light. When supplied as a source light, third wavelength light 3115 is coupled via source input coupler 3131 into nonlinear optical waveguide 3109. In this example, third wavelength light 3115 is directed through the segments of nonlinear optical waveguide 3109 in the same route followed by first wavelength light 3111. Optical waveguide structure 3100 can further comprise optional auxiliary output coupler 3135. In this example, source output coupler 3133 couples third wavelength light 3115 from final segment 3189 to auxiliary output coupler 3135. Auxiliary output coupler 3135 then couples third wavelength light 3115 away to an output waveguide or port of the structure. In some variations of this example, auxiliary output coupler 3135 can be located between source output coupler 3133 and combiner 3188. In those variations, auxiliary output coupler also couples second wavelength light 3117 from source output coupler 3133 to combiner 3188. As a result, only second wavelength light 3117 and second wavelength light 3118, which would be components of combined second wavelength light 3113, are supplied to combiner 3188.

In this illustrative example, different phase shifters can apply different activations depending on the phase adjustment desired. In this depicted example, first phase shifter 3161 in set of phase shifters 3160 applies activation 3191 to first tuning optical waveguide 3141 to change the phase shift for second wavelength light 3117 in first tuning optical waveguide 3141 such that the phase walk-off 3196 for the nonlinear optical interaction 3198 in nonlinear optical waveguide 3109 from first entry location 3130 in first segment 3101 where first wavelength light 3111 is supplied to first segment 3101 to entry location 3134 in third segment 3103 has a value of zero or an even multiple of π radians. In other examples, phase walk-off 3196 can have a value close to zero or close to an even multiple of π radians. For example, the value for the phase walk-off can be within 0.25 π radians or 0.5 π radians. Entry location 3134 is where second wavelength selective coupler 3122 and third segment 3103 connect to each other.

Further in this example, second phase shifter 3162 can apply activation 3192 to second tuning optical waveguide 3142 to change the phase shift for second wavelength light 3118 in second tuning optical waveguide 3142. The second wavelength light 3118 in second tuning optical waveguide 3142 was generated in second segment 3102. Activation 3192 is applied to second tuning optical waveguide 3142 such that the phase walk-off 3196 for nonlinear optical interaction 3198 in nonlinear optical waveguide 3109 from entry location 3132, at which first wavelength selective coupler 3121 connects to second segment 3102, to entry location 3136, at which fourth wavelength selective coupler 3124 connects to fourth segment 3104 has a value that is zero or is an even multiple of π radians. In other examples, the phase walk-off 3196 can have a value close to zero or close to an even multiple of π radians. For example, the value for the phase walk-off can be within 0.25 π radians or 0.5 π radians.

FIGS. 31A and 31B illustrates additional functions of the embodiment of optical waveguide structure 3100 depicted in FIG. 31A. With reference to FIGS. 31A and 31B, optical waveguide structure 3100 further comprises combiner 3188. First component of combined second wavelength light 3113 is second wavelength light 3117. This component is supplied through Nth tuning optical waveguide 3147 and final segment 3189 to the combiner junction 3187 of combiner 3188. In addition, second component of combined second wavelength light 3113 is second wavelength light 3118, which is supplied through (N+1)th tuning optical waveguide 3148 to the combiner junction 3187 of combiner 3188. The phase of second wavelength light 3117 of combined second wavelength light 3113 at the combiner junction 3187 and the phase of the second wavelength light 3118 of combined second wavelength light 3113 at the combiner junction 3187 are adjusted to produce a constructive interference condition for second wavelength light 3117 and second wavelength light 3118.

In this example, Nth phase shifter 3167 applies activation 3193 to second wavelength light 3117 in Nth tuning optical waveguide 3147 to change the phase shift for second wavelength light 3117 in Nth tuning optical waveguide 3147. Second wavelength light 3117 further traverses through final segment 3189. Optional final phase shifter 3169 in final segment 3189 can apply activation 3190 to second wavelength light 3117 to further change the phase of second wavelength light 3117 presented at combiner junction 3187 of combiner 3188.

Further in this example, (N+1)th phase shifter 3168 can apply activation 3194 to second wavelength light 3118 in (N+1)th tuning optical waveguide 3148. Second wavelength light 3118 is generated in the even-numbered segments of nonlinear optical waveguide 3109. Activation 3194 is applied to second wavelength light 3118 in (N+1)th tuning optical waveguide 3148 to change the phase of second wavelength light 3118 presented at combiner junction 3187 of combiner 3188.

In this depicted example, combiner junction 3187 of combiner 3188 functions as an optical interferometer. Combined second wavelength light 3113, the combined output from combiner 3188, has the greatest intensity when the relative phases of second wavelength light 3117 and second wavelength light 3118 are the same or are an even multiple of π radians. Thus, for this example, Nth phase shifter 3167 and optional final phase shifter 3169 apply activation 3193 and activation 3190 to second wavelength light 3117 and (N+1)th phase shifter 3168 applies activation 3194 to second wavelength light 3118 such that, ideally, the relative phases of second wavelength light 3117 and second wavelength light 3118 are the same or are different by an even multiple of π radians when second wavelength light 3117 and second wavelength light 3118 are presented at combiner junction 3187 of combiner 3188. In other examples, the relative phases of second wavelength light 3117 and second wavelength light 3118 presented at the combiner junction 3187 can be within 0.25 π radians or 0.5 π radians. In other words, the phase difference between second wavelength light 3117 and second wavelength light 3118 can be as large as 0.25 π radians or even as large as 0.5 π radians.

With reference to FIGS. 30A, 30B, 31A, and 31B, optical waveguide structure 3000 and optical waveguide structure 3100 can have as few as only two segments of nonlinear optical waveguide 3009 and nonlinear optical waveguide 3109. These two segments would be first segment 3001 and first segment 3101 and second segment 3002 and second segment 3102. Second wavelength light 3017 and second wavelength light 3117 is generated by nonlinear optical interaction of first wavelength light 3011 and first wavelength light 3111 in first segment 3001 and first segment 3101 and second wavelength light 3018 and second wavelength light 3118 is generated by nonlinear optical interaction of first wavelength light 3011 and first wavelength light 3111 in second segment 3002 and second segment 3102.

In one example, N=1. Thus, Nth tuning optical waveguide 3147 is first tuning optical waveguide 3041, (2N−1)th wavelength selective coupler 3127 is first wavelength selective coupler 3021, and 2Nth wavelength selective coupler 3128 is second wavelength selective coupler 3022 in FIG. 30A. Also, (N+1)th tuning optical waveguide 3148 is second tuning optical waveguide 3042 in FIG. 30A, (2N+1)th wavelength selective coupler 3129 is third wavelength selective coupler 3023 in FIG. 30A. Second wavelength light 3017 and second wavelength light 3117 from first tuning optical waveguide 3041 are coupled through final segment 3189 to combiner 3188; and second wavelength light 3018 and second wavelength light 3118 from second tuning optical waveguide 3042 in FIGS. 30A and 30B also would be coupled to combiner 3188.

In another illustrative example, again with reference to FIGS. 30A and 30B and FIGS. 31A and 31B, optical waveguide structure 3000 and optical waveguide structure 3100 can have just four segments of nonlinear optical waveguide 3009 and nonlinear optical waveguide 3109. These four segments would be first segment 3001, second segment 3002, third segment 3003 and fourth segment 3004. Second wavelength light 3017 and second wavelength light 3117 are generated by nonlinear optical interaction of first wavelength light 3011 and first wavelength light 3111 in first segment 3001 and first segment 3101 and in third segment 3003 and third segment 3103. Second wavelength light 3018 and second wavelength light 3118 is generated by nonlinear optical interaction of first wavelength light 3011 and first wavelength light 3111 in second segment 3002 and second segment 3102 and in fourth segment 3004 and fourth segment 3104.

In this example in FIGS. 31A and 31B, N is equal to 3. Thus, Nth tuning optical waveguide 3147 is third tuning optical waveguide 3043 in FIG. 30B, (2N−1)th wavelength selective coupler 3127 can be a fifth wavelength selective coupler 3025 in FIG. 30A, and 2Nth wavelength selective coupler 3128 is a sixth wavelength selective coupler 3026. Also, (N+1)th tuning optical waveguide 3148 is fourth tuning optical waveguide 3044 in FIG. 30B, (2N+1)th wavelength selective coupler 3129 is seventh wavelength selective coupler 3027 in FIG. 30B. Second wavelength light 3017 from third tuning optical waveguide 3043 and second wavelength light 3018 from fourth tuning optical waveguide 3044 are coupled to combiner 3188.

Figure 32A:
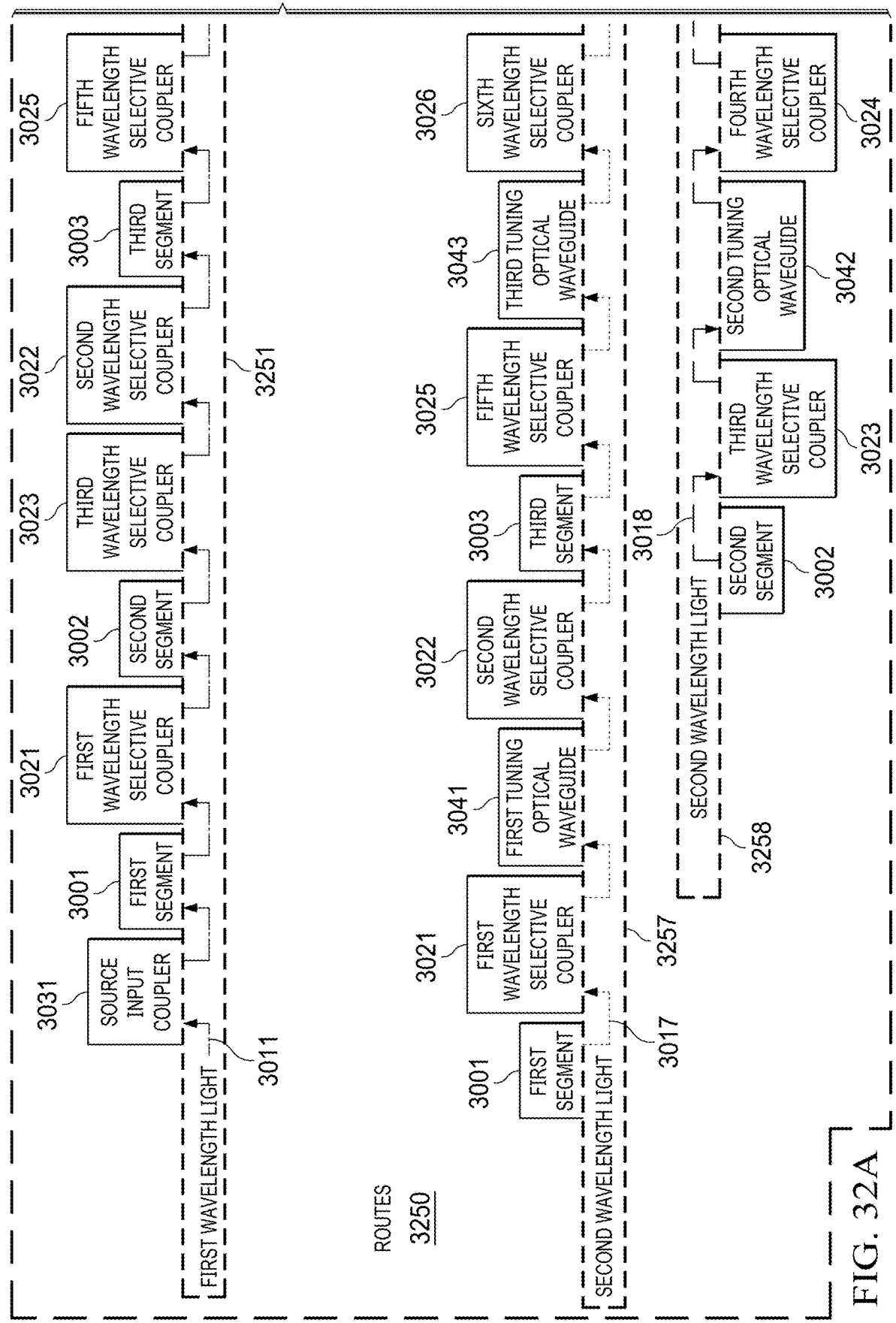
FIGS. 32A and 32B are illustrations of a block diagram of routes for light traveling through an optical waveguide structure in accordance with an illustrative embodiment.
Figure 32B:
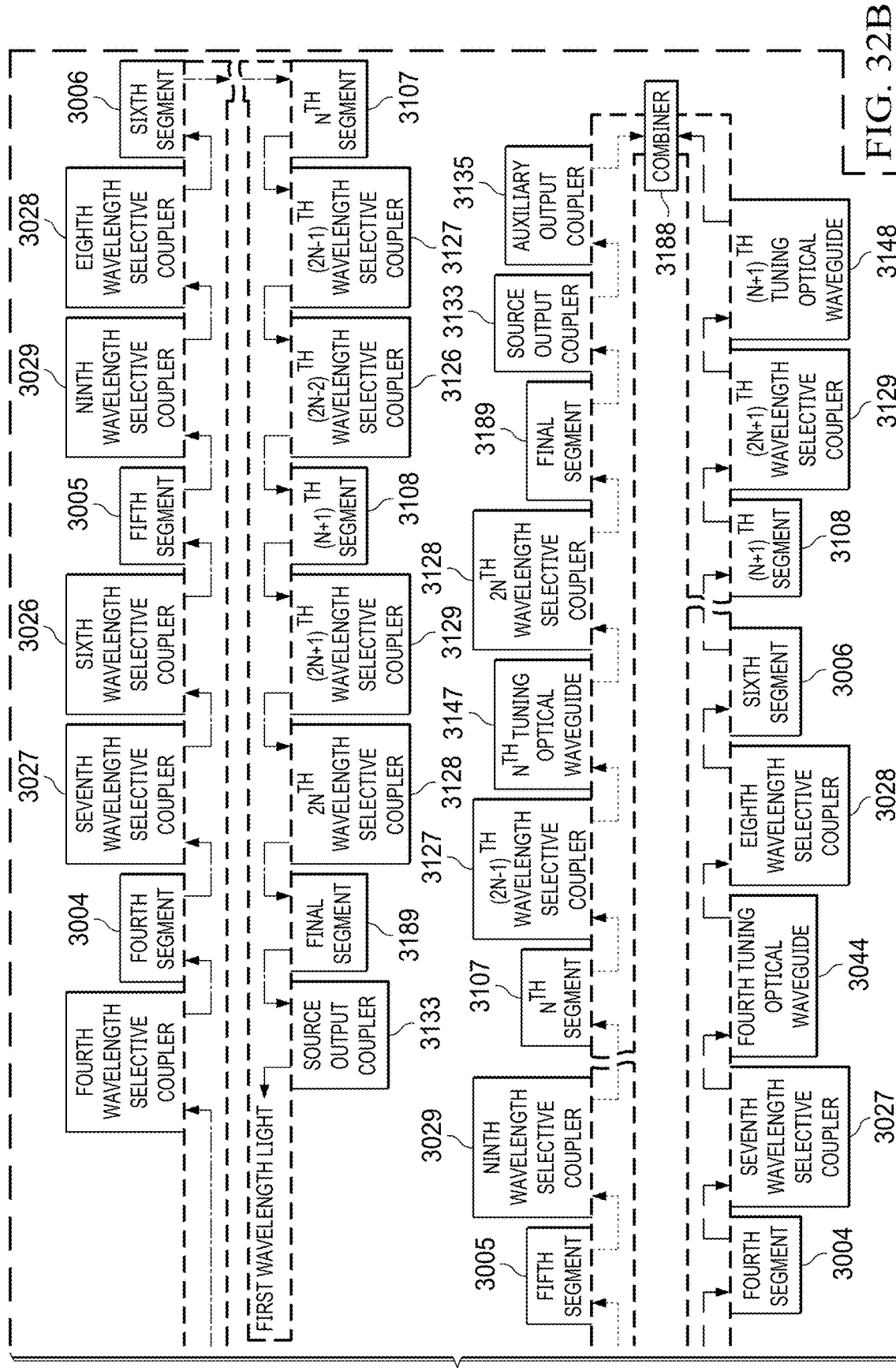

With reference to FIGS. 32A and 32B, illustrations of a block diagram of routes for light traveling through an optical waveguide structure is depicted in accordance with an illustrative embodiment. In this example, routes 3250 are depicted for light traveling through optical waveguide structure 3000 in FIG. 30A and for light traveling through optical waveguide structure 3100 in FIG. 31A.

First wavelength light 3011 travels in route 3251 that traverses, in sequence, source input coupler 3031, first segment 3001, first wavelength selective coupler 3021, second segment 3002, third wavelength selective coupler 3023, second wavelength selective coupler 3022, third segment 3003, fifth wavelength selective coupler 3025, fourth wavelength selective coupler 3024, and fourth segment 3004. Route 3251 for first wavelength light 3011 can be extended to pass through additional segments of nonlinear optical waveguide 3109 and additional wavelength selective couplers of the set of wavelength selective couplers 3120 as illustrated in FIG. 31A. These additional segments and couplers include, in sequence, Nth segment 3107, (2N−1)th wavelength selective coupler 3127, (2N−2)th wavelength selective coupler 3126, (N+1)th segment 3108, (2N+1)th wavelength selective coupler 3129, 2Nth wavelength selective coupler 3128, final segment 3189, and source output coupler 3133.

In this illustrative example, odd index route 3257 and even index route 3258 are present in optical waveguide structure 3100. Odd index route 3257 comprises odd numbered segments and their associated components. Even index route 3258 comprises even numbered segments and their associated components.

Two different components of second wavelength light traverse these two different routes through optical waveguide structure 3000. For example, second wavelength light 3017 can be generated in first segment 3001 as well in third segment 3003. Odd index route 3257 for second wavelength light 3017 traverses, in sequence, first segment 3001, first wavelength selective coupler 3021, first tuning optical waveguide 3041, second wavelength selective coupler 3022, third segment 3003, and fifth wavelength selective coupler 3025.

Odd index route 3257 for second wavelength light 3017 can be further extended, as illustrated in FIGS. 31A and 31B, to traverse through additional segments of nonlinear optical waveguide 3109, additional wavelength selective couplers of the set of wavelength selective couplers 3120, and additional tuning optical waveguides of the set of tuning optical waveguides 3140 as illustrated in FIG. 31A. These additional segments and couplers can include, in sequence, Nth segment 3107, (2N−1)th wavelength selective coupler 3127, Nth tuning optical waveguide 3147, 2Nth wavelength selective coupler 3128, final segment 3189, source output coupler 3133, auxiliary output coupler 3135, and combiner 3188. As depicted, second wavelength light 3117 is generated in the odd-indexed segments of nonlinear optical waveguide 3109.

As depicted, second wavelength light 3018 is generated in second segment 3002. Second wavelength light 3018 travels in even index route 3258 that is different from odd index route 3257 traveled by second wavelength light 3017. In even index route 3258, second wavelength light 3018 traverses, in sequence, second segment 3002, third wavelength selective coupler 3023, second tuning optical waveguide 3042, fourth wavelength selective coupler 3024, and fourth segment 3004.

In the illustrative example, even index route 3258 for second wavelength light 3018 can be further extended, as illustrated in FIGS. 31A and 31B, to traverse through additional segments of nonlinear optical waveguide 3109, additional wavelength selective couplers of the set of wavelength selective couplers 3120, and additional tuning optical waveguides of the set of tuning optical waveguides 3140 as illustrated in FIGS. 31A and 31B. These additional segments and couplers can include, in sequence, (N+1)th segment 3108, (2N+1)th wavelength selective coupler 3129, (N+1)th tuning optical waveguide 3148, and combiner 3188. The second wavelength light 3018 of second wavelength light is generated in the even-numbered segments of nonlinear optical waveguide 3109.

Figure 33:
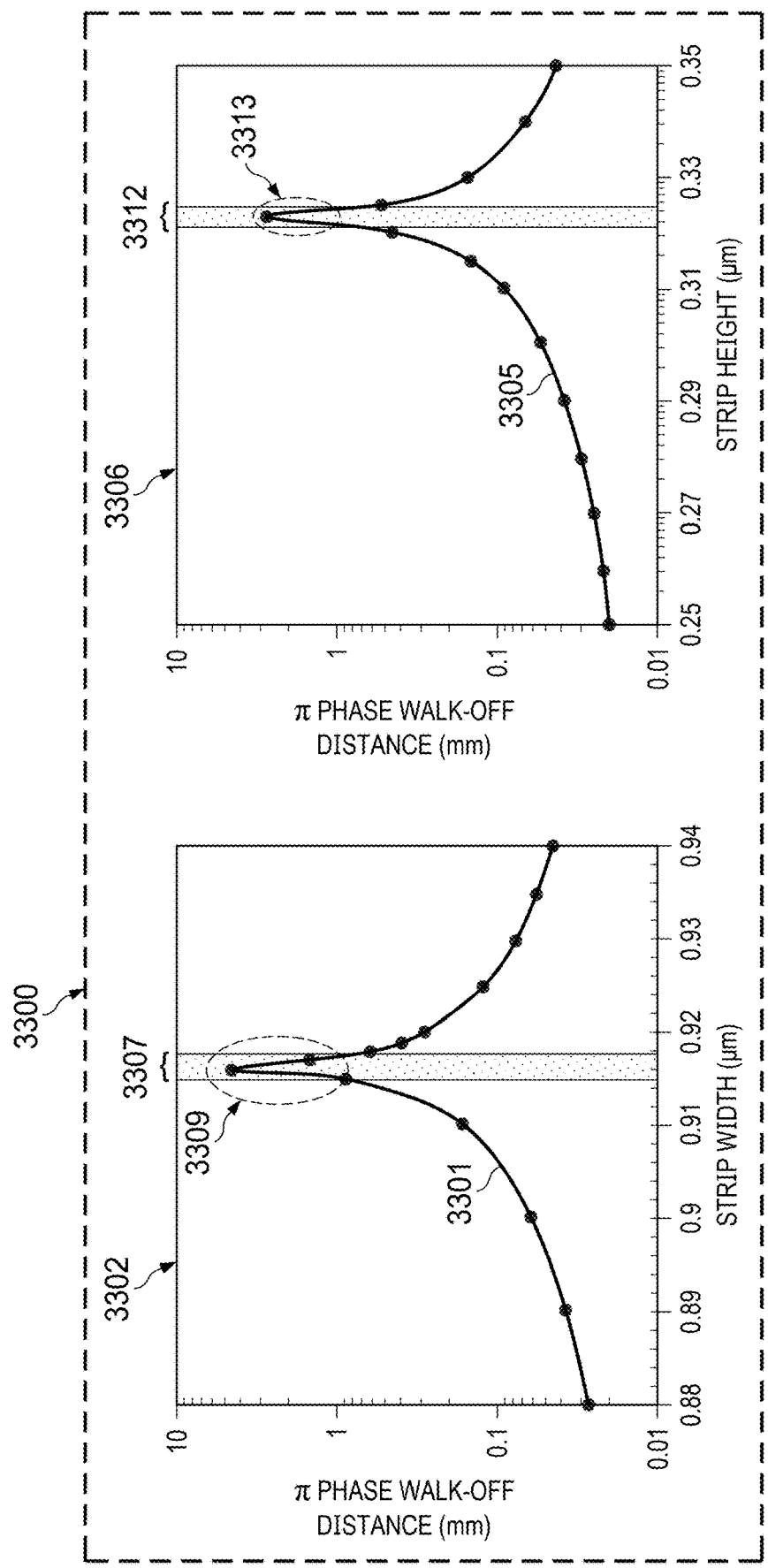
FIG. 33 is an illustration of graphs of the effect of waveguide cross-sectional dimensions on the phase walk-off associated with imperfect wave vector matching in accordance with an illustrative embodiment.

Turning next to FIG. 33, an illustration of graphs of the effect of waveguide cross-sectional dimensions on the phase walk-off associated with imperfect wave vector matching is depicted in accordance with an illustrative embodiment. Graphs 3300 are for a nonlinear optical waveguide structure comprising a nonlinear optical waveguide using cross-sections 3700 shown in FIGS. 37A-37G and described below. As depicted, graphs 3300 show the dependence of the $\pi$ phase walk-off distance on the values for different features in a waveguide. Graphs 3300 illustrate tolerances for variations in different dimensions in nonlinear optical waveguides. These dimensions shown in graphs 3300 have ranges in which normal operating regions are present that have a desired level of performance. Although the designs can have dimensions within these normal operating ranges, the environment during operation of the waveguides and deviations in fabrication can result in the values of these dimensions being out of tolerance for the desired level of performance within an operating region.

The length selected for a nonlinear optical waveguide segment can depend on the desired fabrication and operational variations that can be tolerated by the nonlinear optical waveguide structure. Graphs 3300 give some examples of expected values for the nonlinear optical interaction distance at which a phase walk-off of $\pi$ radians is obtained and the dependence of this $\pi$ phase walk-off distance on variations in some examples of different types of waveguide dimensions.

Line 3301 in graph 3302 and line 3305 in graph 3306 show the distance for a nonlinear optical interaction at which the phase walk-off reaches $\pi$ radians. Line 3301 in graph 3302 shows this phase walk-off distance for different values of the strip width. Line 3305 in graph 3306 shows this phase walk-off distance for different values of the strip height.

In this example, the portion of line 3301 within desired fabrication tolerance 3307 of strip widths in graph 3302 is desired operating region 3309. Likewise, the portion of line 3305 within desired operating region 3312 of strip heights in graph 3306 is desired operating region 3313. This desired operating region constrains the tolerable variation in strip width or strip height that provides the desired operation for a waveguide in which the cross section is implemented. For example, if a nonlinear optical waveguide is 1 mm long, this degree of variation can be tolerated in the strip width or strip height. But, if greater nonlinear optical interaction distance than 1 mm is desired, phase shifters can be used to provide desired levels of constructive nonlinear optical interaction the result in an increased amount of the generated light.

In other words, the portion of line 3305 within desired operating region 3312 constrains a desired operating region 3312 for the strip height. Likewise, the portion of line 3301 within desired operating region 3309 constrains desired fabrication tolerance 3307 for the strip width. In desired operating region 3309 and 3312, the distance for nonlinear optical interaction can be 1 mm or greater before the phase walk-off of that nonlinear optical interaction reaches or exceeds $\pi$ radians. As discussed above, when the phase walk-off has a value smaller than $\pi$ radians, the nonlinear optical generation process continues to be constructive and produces more and more generated light from the source light. However, when the phase walk-off has a value greater than $\pi$ radians and up to a value of $2\pi$ radians, the nonlinear optical generation process becomes destructive and reduces the amount of generated light, converting some previously generated light back to source light. Thus, it is desirable to keep the phase walk-off between zero and $\pi$ radians, and as close to zero as possible.

In these illustrative examples, fabrication tolerances of approximately ±1 nm (or ±0.001 µm) in waveguide dimensions such as the strip width and the strip height reduce the distance at which the phase walk-off reaches $\pi$ radians from being infinite (for perfect wave vector matching) to being on the order of 1 mm. If the departure of the fabricated waveguide dimensions such as the strip width and the strip height from the specified values is greater than ±1 nm, the maximum distance at which the phase walk-off reaches $\pi$ radians can be much smaller than 1 mm.

To achieve longer nonlinear optical interaction distances, the examples in FIGS. 29-31 as well as the following examples couple the generated light into a phase tuning path that contains a phase shifter. An activation applied by the phase shifter can change the phase of the light propagating through the phase tuning path. This change in the phase of the generated light that is diverted to propagate through the phase tuning path and then is coupled back into the nonlinear optical waveguide can be used to adjust the phase walk-off observed at the point where the generated light is coupled back into the nonlinear optical waveguide so that the phase walk-off has a value that is zero or an even multiple of $\pi$ radians.

To produce the desired amount of adjustable phase change, the length of a phase tuning path formed by a tuning optical waveguide can be selected to have a length to accommodate the desired applicable length of the phase shifter associated with that phase tuning path. For example, with phase shifters that are based on electro-optic (EO) control of the wave vector, the change in the effective index achieved by an electro-optic phase shifter for light such as idler light can be described by an expression such as $\Delta n_I = n_I^3 r_{eff} \Delta E_{applied}$. The change in phase for the idler light can be described by an expression such as $$\Delta \vartheta_i = \left(\frac{2\pi}{\lambda_I}\right) \Delta n_I D_i.$$

In these expressions, $\Delta E_{applied}$ is the applied electric field, $r_{eff}$ is the value of the relevant electro-optic coefficient, $n_I$ is the refractive of the electro-optic material for the idler light, $\lambda_I$ is the wavelength of the idler light, and $D_i$ is the applicable length of the phase shifter, with i being an index that indicates a specific phase shifter and tuning optical waveguide.

In this illustrative example, the "activation" applied by the phase shifter upon the tuning optical waveguide is the electric field. This applied electric field results in a change of the effective index of that waveguide that changes the phase of the light traveling through that waveguide.

For practical widths of the electro-optic material in the phase shifter, the maximum E-field that can be applied before risking breakdown can be on the order of 10 V/µm. For an electro-optic material such as x-cut lithium niobate and TE polarized light in the phase shifter, the value for $n_I^3 r_{eff}$ is on the order of $3 \times 10^{-4}$ µm/V. To achieve a maximum electrically controlled phase shift of $\pm\pi$ radians, the applicable length of the phase shifter should be at least $$\left(\frac{D_i}{\lambda_I}\right) \sim 1.5 \times 10^3.$$

As an example, if the idler wavelength is 1.5 µm, the applicable length of the phase shifter should be approximately 3 mm.

A phase shifter can comprise multiple sections. For appropriate supply of the electrical control signals to these multiple phase shifter sections, the applicable length of the phase shift adjustment can be as long as the total length of the multiple phase shifter sections. If the phase shifter comprises a material that has a large thermo-optic coefficient, such a thermo-optic phase shifter can have a shorter length than an electro-optic phase shifter.

The phase shifters in the final tuning optical waveguide and the phase shifters in the next-to-final tuning optical waveguide are used to control the phases of the two components of generated light that are combined together. These two phase shifters can be operated in a push-pull manner, with one tuning optical waveguide producing a positive phase shift and the other tuning optical waveguide producing a negative phase shift. Thus, the resulting net phase shift between the outputs from these two tuning optical waveguides can be two times as large as the phase shift applied in tuning optical waveguide. As a result, the phase shifters of the final and the next-to-final tuning optical waveguide can have a smaller applicable length than the phase shifters in the preceding tuning optical waveguide of the nonlinear optical waveguide structure and still achieve a maximum electrically adjustable phase shift of $\pm\pi$ radians.

Figure 34:
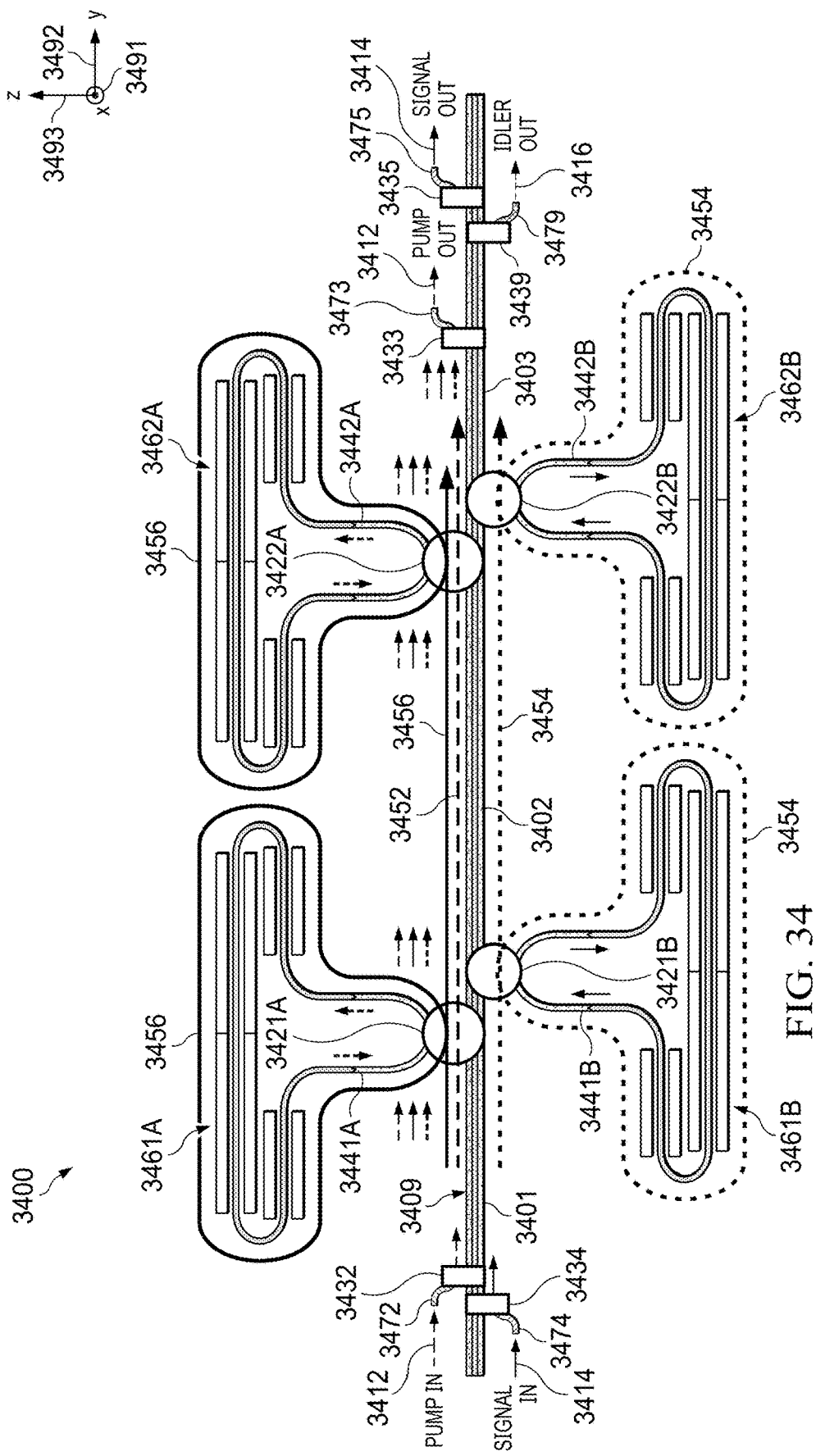
FIG. 34 is an illustration of an optical waveguide structure with phase shifters for tuning light in separate tuning optical waveguides for signal light and for idler light in accordance with an illustrative example.

Turning now to FIG. 34, an illustration of an optical waveguide structure is depicted in accordance with an illustrative example. In this example, optical waveguide structure 3400 is an open-ended nonlinear optical waveguide structure. In other words, loops for recirculating light are not used.

As depicted, optical waveguide structure 3400 comprises nonlinear optical waveguide 3409, first idler tuning optical waveguide 3441A, first signal tuning optical waveguide 3441B, second idler tuning optical waveguide 3442A, second signal tuning optical waveguide 3442B, first idler wavelength selective coupler 3421A, first signal wavelength selective coupler 3421B, second idler wavelength selective coupler 3422A, second signal wavelength selective coupler 3422B, pump input waveguide 3472, signal input waveguide 3474, pump output waveguide 3473, signal output waveguide 3475, idler output waveguide 3479, pump input coupler 3432, signal input coupler 3434, pump output coupler 3433, signal output coupler 3435, idler output coupler 3439, first idler phase shifter 3461A, first signal phase shifter 3461B, second idler phase shifter 3462A, second signal phase shifter 3462B.

In this illustrative example, nonlinear optical waveguide 3409, has nonlinear optical waveguide segments. As depicted, these nonlinear optical waveguide segments are first segment 3401, second segment 3402, and third segment 3403.

As depicted, pump input coupler 3432 couples pump light 3412 introduced through pump input waveguide 3472 to first segment 3401. Optional signal input coupler 3434 couples signal light 3414 introduced in signal input waveguide 3474 to first segment 3401. Pump output coupler 3433 couples pump light 3412 from third segment 3403 to pump output waveguide 3473. Signal output coupler 3435 couples signal light 3414 from third segment 3403 to signal output waveguide 3475. Idler output coupler 3439 couples idler light 3416 from third segment 3403 to idler output waveguide 3479.

As depicted, nonlinear optical waveguide 3409 and other components are formed on a yz plane defined by z-axis 3493 and y-axis 3492 in which an x-axis 3491 is perpendicular to the plane. In an illustrative example, nonlinear optical waveguides can be fabricated from a nonlinear optical material such as x-cut lithium niobate. In this example, the x-axis of the nonlinear optical material is perpendicular to the yz plane of the structure of nonlinear optical waveguide 3409 and the other components.

In this illustrative example, first idler wavelength selective coupler 3421A couples idler light 3416 by extracting idler light 3416 from first segment 3401 into first idler tuning optical waveguide 3441A and reinserting idler light 3416 into second segment 3402 after activations have been applied using first idler phase shifter 3461A associated with first idler tuning optical waveguide 3441A. Each phase shifter is comprised of three pairs of electrodes in this example. First signal wavelength selective coupler 3421B couples signal light 3414 by extracting signal light 3414 from first segment 3401 into first signal tuning optical waveguide 3441B and reinserting signal light 3414 into second segment 3402 after activations have been applied using first signal phase shifter 3461B associated with first signal tuning optical waveguide 3441B.

In this illustrative example, second idler wavelength selective coupler 3422A couples idler light 3416 by extracting idler light 3416 from second segment 3402 into second idler tuning optical waveguide 3442A and reinserting idler light 3416 into third segment 3403 after activations have been applied using second idler phase shifter 3462A associated with second idler tuning optical waveguide 3442A. Second signal wavelength selective coupler 3422B couples signal light 3414 by extracting signal light 3414 from second segment 3402 into second signal tuning optical waveguide 3442B and reinserting signal light 3414 into third segment 3403 after activations have been applied using second signal phase shifter 3462B associated with second signal tuning optical waveguide 3442B.

In this example, the phase shifters for the different tuning optical waveguides can apply activations to the light traveling through the tuning optical waveguides. The application of the activations can adjust the phase of the light to obtain a desired phase walk-off when at least one of the environment or fabrication inconsistencies result in a dimension of the nonlinear optical waveguide being out of tolerance for design level performance. In other words, the phase shifters can be used when the length of the tuning optical waveguides do not provide a desired phase walk-off for a nonlinear optical interaction involving light that has traveled through the tuning optical waveguides. In this example, both the length of a tuning optical waveguide and a phase shifter associated with the tuning optical waveguide can be used to obtain a desired phase walk-off. The phase shifter essentially adjusts the effective length of the tuning waveguide by applying an activation to change the tuning optical waveguide in a manner that changes the phase shift of light traveling through the tuning optical waveguide.

Consider an illustrative implementation of optical waveguide structure 3400, nonlinear optical waveguide 3409 that has strip width and strip height designed to achieve perfect phase matching, so that the $\pi$ phase walk-off distance for nonlinear optical waveguide 3409 is essentially infinite. Realistic fabrication tolerances may cause the achieved $\pi$ phase walk-off distance to be at least 1 mm. Thus, this implementation has the lengths of first segment 3401, second segment 3402 and third segment 3403 no larger than 1 mm. This implementation also sets the length of first idler tuning optical waveguide 3441A and the length of first signal tuning optical waveguide 3441B so that the phase walk-off for the nonlinear optical interaction occurring in nonlinear optical waveguide 3409 from a starting point of first segment 3401 to a starting point of second segment 3402 has a value of zero or an even multiple of $\pi$ radians. The starting point of first segment 3401 is where pump input coupler 3432 connects with first segment 3401. The starting point of second segment 3402 is where first signal wavelength selective coupler 3421B connects with second segment 3402. For this illustrative implementation, first segment 3401 connects with first idler wavelength selective coupler 3421A, which connects with first signal wavelength selective coupler 3421B, which then connects with second segment 3402.

This implementation also sets the length of second idler tuning optical waveguide 3442A and the length of second signal tuning optical waveguide 3442B so that the phase walk-off for the nonlinear optical interaction occurring in nonlinear optical waveguide 3409 from the starting point of second segment 3402 to a starting point of third segment 3403 has a value of zero or an even multiple of $\pi$ radians. The starting point of third segment 3403 is where second signal wavelength selective coupler 3422B connects with third segment 3403. For this illustrative implementation, second segment 3402 connects with second idler wavelength selective coupler 3422A, which connects with second signal wavelength selective coupler 3422B, which then connects with third segment 3403.

This illustrative implementation also has first idler phase shifter 3461A designed to apply activations to first idler tuning optical waveguide 3441A and has first signal phase shifter 3461B designed to apply activations to first signal tuning optical waveguide 3441B so that the phase walk-off for the nonlinear optical interaction occurring in nonlinear optical waveguide 3409 from the starting point of first segment 3401 to the starting point of second segment 3402 has a value of zero or an even multiple of $\pi$ radians even when the strip width and strip height of first idler tuning optical waveguide 3441A, first signal tuning optical waveguide 3441B and first segment 3401 depart from their as-designed values as a result of fabrication tolerances or of a variation in an operating condition such as temperature.

This implementation also has second idler phase shifter 3462A designed to apply activations to second idler tuning optical waveguide 3442A and has second signal phase shifter 3462B designed to apply activations to second signal tuning optical waveguide 3442B so that the phase walk-off for the nonlinear optical interaction occurring in nonlinear optical waveguide 3409 from the starting point of second segment 3402 to the starting point of third segment 3403 has a value of zero or an even multiple of π radians even when the strip width and strip height of second idler tuning optical waveguide 3442A, second signal tuning optical waveguide 3442B and second segment 3402 depart from their as-designed values as a result of fabrication tolerances or of a variation in an operating condition.

Each segment in nonlinear optical waveguide 3409 except the last segment is associated with a tuning optical waveguide for the generated idler light and a different tuning optical waveguide for the generated signal light. In some examples of optical structures, the two wavelength selective couplers, for the signal light and for the idler light, are located near the end of a given segment and just before the start of the next segment. As depicted, pump removing coupler is located at the end of the last segment. Pump input coupler 3432 and the pump output coupler 3433 establish the overall length of the nonlinear optical interaction that produces the generated light.

Optical waveguide structure 3400 can be used for nonlinear optical processes such as spontaneous parametric down conversion (SPDC) by omitting the optional signal input coupler 3434 and by using both the idler-phase tuning paths and the signal-phase tuning paths. The structure of FIG. 34 also can be used for dual-source nonlinear optical processes such as difference frequency generation (DFG) with signal light 3414 as an auxiliary source or input light that is supplied to optical waveguide structure 3400 in addition to the pump light. In this case, optical waveguide structure can include optional signal input coupler 3434 and signal light can be supplied to the structure through signal input waveguide 3474. The overall length of a segment and including the lengths of the two wavelength-selective couplers (for the idler light and for the signal light) associated with that segment is selected to be sufficiently small that the magnitude of the phase walk-off resulting from anticipated fabrication and operational tolerances is no greater than π radians.

The phase shifters in a phase tuning path are configured to have a length sufficiently large to achieve an electrically controlled phase shift as much as ±π radians or greater. The overall length of a phase tuning path is selected to achieve a relative phase shift that is 0 or a multiple of 2π radians between the previously generated light reinserted from the phase tuning path into the subsequent segment and the newly generated light in the subsequent segment.

In this example, the generation of light by a nonlinear optical process in optical waveguide structure can include difference-frequency generation (DFG) and spontaneous parametric down conversion (SPDC). However, the elements of optical waveguide structure 3400 described in this example can apply to generation of light by other nonlinear optical processes such as sum-frequency generation and four-wave mixing. These nonlinear optical processes in optical waveguide structure 3400 can involve second-order nonlinearity, such as for the examples discussed, as well as third order nonlinearity.

Further in FIG. 34, in optical waveguide structure 3400, first route 3452 includes first segment 3401, second segment 3402 and third segment 3403. First route 3452 is traversed by the pump light 3412. Second route 3456 includes first segment 3401, first idler tuning optical waveguide 3441A, second segment 3402, second idler tuning optical waveguide 3442A, and third segment 3403. Second route 3456 is traversed by the idler light 3416. Third route 3454 includes first segment 3401, first signal tuning optical waveguide 3441B, second segment 3402, second signal tuning optical waveguide 3442B, and third segment 3403. Third route 3454 is traversed by signal light 3414. In this example, the generated light is idler light 3416.

For the example depicted in FIG. 34, the same wavelength selective coupler functions as both an extracting out-coupler from a nonlinear optical waveguide segment and an inserting in-coupler to a different nonlinear optical waveguide segment. For some examples of optical waveguide structure 3400, the idler coupler is located as close as feasible to the signal coupler for the same index value. This proximity of the two couplers reduces the length of nonlinear optical waveguide 3409 between them so that the additional phase shifts applied to the idler light and the signal light are done at essentially the same point on the nonlinear optical waveguide.

As depicted, nonlinear optical waveguide 3409 in waveguide structure 3400 has a series of nonlinear optical waveguide segments coupled to a series of tuning optical waveguides. As depicted, nonlinear optical waveguide 3409 has only one group of nonlinear optical waveguide segments and tuning optical waveguides. Optical waveguide structure 3400 is suitable for nonlinear optical processes such as ones involving TE polarized light in x-cut lithium niobate. As depicted in FIG. 34, optical waveguide structure 3400 has a single wavelength-selective coupler for each tuning optical waveguide. In this example, each of these wavelength selective couplers functions both as an out-coupler to couple a generated idler or signal light from nonlinear optical waveguide 3409 into a tuning optical waveguide and also as an in-coupler to couple phase-shifted idler or signal light from the tuning optical waveguide back into nonlinear optical waveguide 3409. In other examples, discussed below, the optical waveguide structure has two wavelength-selective couplers for each phase tuning path. In this example, a first wavelength selective coupler functions as an out-coupler to couple generated idler light or signal light into a tuning optical waveguide and a second wavelength selective coupler functions as an in-coupler to couple phase-shifted idler or phase shifted signal light from the tuning optical waveguide back into nonlinear optical waveguide 3409.

Figure 35:
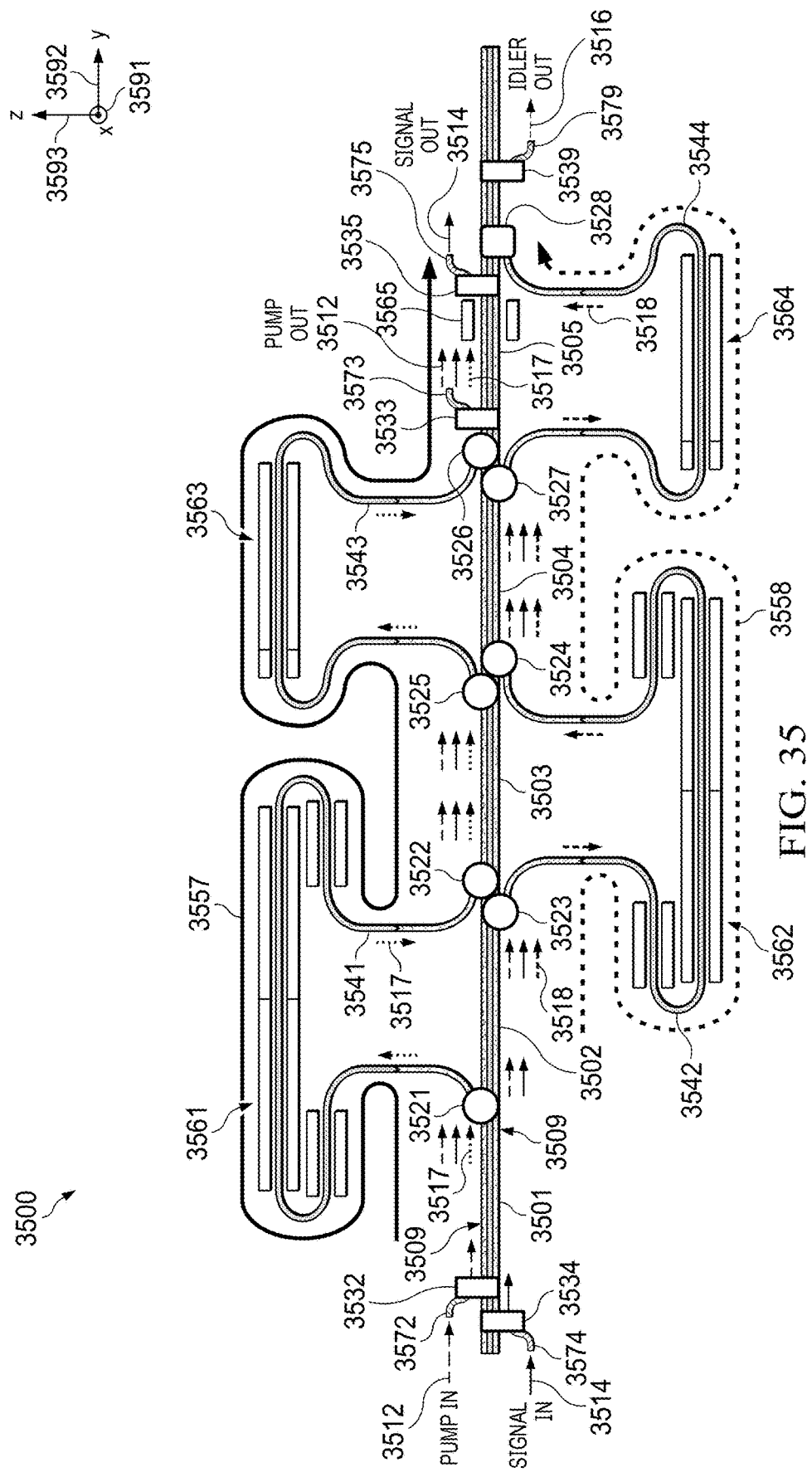
FIG. 35 is an illustration of an optical waveguide structure with phase shifters for tuning light in accordance with an illustrative example.

Turning to FIG. 35, an illustration of an optical waveguide structure with phase shifters for tuning light is depicted in accordance with an illustrative example. In this illustrative example, optical waveguide structure 3500 comprises a number of different components. As depicted, optical waveguide structure 3500 comprises nonlinear optical waveguide 3509 first tuning optical waveguide 3541, second tuning optical waveguide 3542, third tuning optical waveguide 3543, fourth tuning optical waveguide 3544, first idler out wavelength selective coupler 3521, second idler in wavelength selective coupler 3522, third idler out wavelength selective coupler 3523, fourth idler in wavelength selective coupler 3524, fifth idler out wavelength selective coupler 3525, sixth idler in wavelength selective coupler 3526, seventh idler out wavelength selective coupler 3527, and idler combiner 3528, pump input waveguide 3572, signal input waveguide 3574, pump output waveguide 3573, signal output waveguide 3575, idler output waveguide 3579, pump input coupler 3532, signal input coupler 3534, pump output coupler 3533, signal output coupler 3535, idler output coupler 3539, first phase shifter 3561, second phase shifter 3562, third phase shifter 3563, fourth phase shifter 3564, and fifth phase shifter 3565.

In this illustrative example, nonlinear optical waveguide 3509, has nonlinear optical waveguide segments. As depicted, these nonlinear optical waveguide segments are first segment 3501, second segment 3502, third segment 3503, fourth segment 3504, and fifth segment 3505. In this example, fifth segment 3505 can be considered a "final segment" having a nonlinear optical material.

In this example, pump input coupler 3532 couples pump light 3512 introduced through pump input waveguide 3572 to first segment 3501. Signal input coupler 3534 couples signal light 3514 introduced in signal input waveguide 3574 to first segment 3501. Pump output coupler 3533 couples pump light 3512 from fifth segment 3505 to pump output waveguide 3573. As a result, pump light 3512 does not travel through fifth segment 3505. Idler output coupler 3539 couples a combination of idler light 3517 from fifth segment 3505 and idler light 3518 from fourth tuning optical waveguide 3544 to form idler light 3516. Idler output coupler 3539 couples idler light 3516 from fifth segment 3505 to idler output waveguide 3579. Optional signal output coupler 3535 couples signal light 3514 to signal output waveguide 3575.

In this example, signal output coupler 3535 can be an optional component because idler output coupler 3539 typically can be designed to separate signal light 3514 from idler light 3516. Thus, the two outputs for idler output coupler 3539 can be connected to idler output waveguide 3579 and signal output waveguide 3575.

As depicted, nonlinear optical waveguide 3509 and other components are formed on a yz plane defined by z-axis 3593 and y-axis 3592 in which x-axis 3591 for the nonlinear optical material is perpendicular to the yz plane. In an illustrative example, nonlinear optical waveguide 3509 can be fabricated from a nonlinear optical material such as x-cut lithium niobate. In this example, nonlinear optical waveguide 3509 is aligned parallel to the y-axis 3592 of the nonlinear optical material and is aligned perpendicular to the z-axis 3593 of the nonlinear optical material, with the light propagating in nonlinear optical waveguide 3509 being in a TE mode of nonlinear optical waveguide 3509.

For this example, both pump light 3512 and signal light 3514 can be supplied at the input end of the nonlinear optical waveguide 3509 in optical waveguide structure 3500. The generated idler light is obtained from the output end of nonlinear optical waveguide 3509 in optical waveguide structure 3500. The portion of nonlinear optical waveguide 3509 between the pump input coupler 3532 and first idler out wavelength selective coupler 3521 is considered first segment 3501. Idler light 3517 generated in first segment 3501 is diverted into first tuning optical waveguide 3541 by the first idler out wavelength selective coupler 3521. This wavelength selective coupler diverts idler light 3517 into first tuning optical waveguide 3541 but couples pump light 3512 and signal light 3514 to travel through second segment 3502 in nonlinear optical waveguide 3509.

As depicted in this example, optical waveguide structure 3500 can be used in a difference-frequency generation (DFG) process or a sum-frequency generation (SFG) process, such as second harmonic generation, in which source light in the form of both pump light 3512 and signal light 3514 are used to produce generated light in the form of idler light 3516. In this example, idler light 3516 results from combining idler light 3517 and idler light 3518, which travel through the two different routes for the generated light.

Pump light 3512 and signal light 3514 continue to propagate in the nonlinear optical waveguide 3509 and are not diverted into the tuning optical waveguides. In this example, only the generated idler light is diverted into the tuning optical waveguides.

In this example, idler light 3517 propagates through first tuning optical waveguide 3541 and is inserted back into the third segment 3503 in nonlinear optical waveguide 3509 by second idler in wavelength selective coupler 3522. This idler in wavelength selective coupler, like the other idler in wavelength selective couplers in the nonlinear optical waveguide 3509, is a wavelength-selective coupler, and is similar to the idler out wavelength selective couplers. In this example second idler in wavelength selective coupler 3522 is located at the beginning of third segment 3503.

The portion of nonlinear optical waveguide 3509 between first idler out wavelength selective coupler 3521, second idler in wavelength selective coupler 3522 is second segment 3502. Since pump light 3512, as well as signal light 3514, still travels in the nonlinear optical waveguide 3509, additional idler light can be generated in second segment 3502.

In this example, idler light 3518 generated in second segment 3502 is diverted into second tuning optical waveguide 3542 by third idler out wavelength selective coupler 3523. This wavelength selective coupler keeps the generated idler light 3518 from interacting with the nonlinear optical process that occurs in third segment 3503. The diverted idler light 3518 propagates through the second tuning optical waveguide 3542 and is inserted back into nonlinear optical waveguide 3509 by fourth idler in wavelength selective coupler 3524. This fourth idler in wavelength selective coupler is located at the beginning of fourth segment 3504. As depicted, fourth idler in wavelength selective coupler 3524 functions as an idler in coupler and is connected to the beginning of fourth segment 3504 and couples idler light 3518 from second tuning optical waveguide 3542 into fourth segment 3504 at the beginning of fourth segment 3504.

In this illustrative example, third segment 3503 and fifth idler out wavelength selective coupler 3525 are similar to first segment 3501 and the first idler out wavelength selective coupler 3521. Likewise, fourth segment 3504 and seventh idler out wavelength selective coupler 3527 are similar to second segment 3502 and third idler out wavelength selective coupler 3522. In this illustrative example, first segment 3501 and third segment 3503 form part of a first, odd index, group of segments. Second segment 3502 and fourth segment 3504 form part of a second, even index, group of segments.

The final portion of the nonlinear optical waveguide 3509 is used to combine constructively the generated light of the odd indexed segments with the generated light of the even indexed segments. In this illustrative example, this final portion includes fifth segment 3505, fourth tuning optical waveguide 3544, and third tuning optical waveguide 3543. In this example, sixth idler in wavelength selective coupler 3526 re-inserts idler light 3517 from third tuning optical waveguide 3543 into nonlinear optical waveguide 3509 at the starting point of fifth segment 3505. Just prior to sixth idler in wavelength selective coupler 3526, seventh idler out wavelength selective coupler 3527 extracts idler light 3518 from fourth segment 3504, coupling idler light 3518 into fourth tuning optical waveguide 3544.

Shortly following sixth idler in wavelength selective coupler 3526, pump output coupler 3533 removes pump light 3512 into pump output waveguide 3573. Thus, since pump light 3512 is absent, nonlinear optical generation of additional idler light in fifth segment 3505 does not occur. Idler light 3517 inserted into and propagating through the fifth segment 3505 was generated in third segment 3503 and in first segment 3501. Both third tuning optical waveguide 3543 and fifth segment 3505 conduct idler light 3517 generated in third segment 3503 and first segment 3501 with no additional generation of idler light 3517. Since no additional idler light is generated, fifth segment 3505 functions like an extension of the third tuning optical waveguide 3543.

Light from the final segment, which in this case is fifth segment 3505, and light from the final tuning optical waveguide, which in this case is fourth tuning optical waveguide 3544, are combined together at the final in-coupling point. Idler combiner 3528 at the final in-coupling point couples together light that has been generated from two different routes. In optical waveguide structure 3500, first route 3557 includes first segment 3501, first tuning optical waveguide 3541, third segment 3503, the third tuning optical waveguide 3543, and fifth segment 3505. Second route 3558 includes second segment 3502, second tuning optical waveguide 3542, fourth segment 3504, and fourth tuning optical waveguide 3544.

In the illustrative example, two differences are present between the generated idler light 3517 from first route 3557 and the generated idler light 3518 from second route 3558. The first difference is that the two routes have different values for the phases of the source light contributing to the generation of idler light 3517 and idler light 3518. Thus, the phase of idler light 3517 supplied from fifth segment 3505 into idler combiner 3528 is different from the phase of idler light 3518 supplied from fourth tuning optical waveguide 3544 into idler combiner 3528. Idler light 3517 is supplied through fifth idler out wavelength selective coupler 3525 and through third tuning optical waveguide 3543. Idler light 3518 is supplied through seventh idler out wavelength selective coupler 3527 and through fourth tuning optical waveguide 3544. The difference between the phase of idler light 3517 inserted by the sixth idler in wavelength selective coupler 3526 to idler combiner 3528 and idler light 3518 inserted from fourth tuning optical waveguide 3544 to idler combiner 3528 is approximately the difference between the phase of the source light at the end of first segment 3501 and the source light at the end of second segment 3502. The magnitude of this difference, modulo $2\pi$, can be as large as $\pi$ radians.

The second difference is that first route 3557 has one segment more than second route 3558. In optical waveguide structure 3500, first route 3557 has three segments, but second route 3558 has only two segments. Thus, first route 3557 is longer than second route 3558, assuming the corresponding segments and phase tuning paths of the two routes are matched in their lengths. The additional length of first route 3557 is designed to at least partially compensate for the difference between the phases of the source light for the two routes, and thus the difference between the phases of the generated light.

In this example, the length of the final segment, fifth segment 3505, and the lengths of the final tuning optical waveguide, fourth tuning optical waveguide 3544, and the next-to-final tuning optical waveguide, third tuning optical waveguide 3543 can be selected such that constructive interference is present between the light from the final segment, fifth segment 3505, and the light from the final tuning optical waveguide, fourth tuning optical waveguide 3544 when they are combined together at the final in-coupling point at coupler, also called idler combiner 3528, which couples together the light that has been generate in these two different routes.

In optical waveguide structure 3500, The final in-coupling point in nonlinear optical waveguide 3509 is unlike any of the other coupling points in nonlinear optical waveguide 3509. As depicted, the fourth tuning optical waveguide 3544 terminates at idler combiner 3528. Fifth segment 3505 also terminates at idler combiner 3528. A wavelength selective coupler, like the idler out wavelength selective couplers, such as first idler out wavelength selective coupler 3521, third idler out wavelength selective coupler 3523, fifth idler out wavelength selective coupler 3525 and seventh idler out wavelength selective coupler 3527 and the idler in wavelength selective couplers, such as second idler in wavelength selective coupler 3522, fourth idler in wavelength selective coupler 3524, and sixth idler in wavelength selective coupler 3526, is designed to be in a "cross" state for the wavelength of idler light 3517 or idler light 3518 but to be in a "thru" state for the wavelength of pump light 3512 and for the wavelength of signal light 3514. The idler combiner 3528 in the final portion, following fifth segment 3505 of nonlinear optical waveguide 3509, is designed to combine equally the idler light supplied to that combiner from the fourth tuning optical waveguide 3544 and from fifth segment 3505. This idler combiner 3528 functions more like a 50-50 coupler that couples "in phase" light into one output of that coupler and couples "out of phase" light into another output of that coupler. The "in phase" idler light is coupled to an output segment of nonlinear optical waveguide 3509. Idler output coupler 3539 can extract the combined idler light to idler output waveguide 3579 of optical waveguide structure 3500, leaving residual signal light in nonlinear optical waveguide 3509. In an alternative implementation, optional signal output coupler 3535 can extract signal light 3514 from nonlinear optical waveguide 3509 before the signal light 3514 reaches idler combiner 3528.

In the illustrative example of optical waveguide structure 3400 in FIG. 34 and optical waveguide structure 3500 in FIG. 35, optical waveguide structure 3400 has a single route, second route 3456 for idler light 3416 that is generated. As depicted second route 3456 extends through all of the successive segments and idler tuning waveguides. In contrast, optical waveguide structure 3500 in FIG. 35 has two routes for idler light 3517 and 3518 that are generated and then combined to comprise idler light 3516. These routes are first route 3557 and second route 3558. Each of these two routes extends through every other segment and tuning waveguide in optical waveguide structure 3500. In this example, idler light 3516 is present in optical waveguide structure 3500 only after idler combiner 3528. Before idler combiner 3528, idler light 3517 and idler light 3518 are present.

Figure 36:
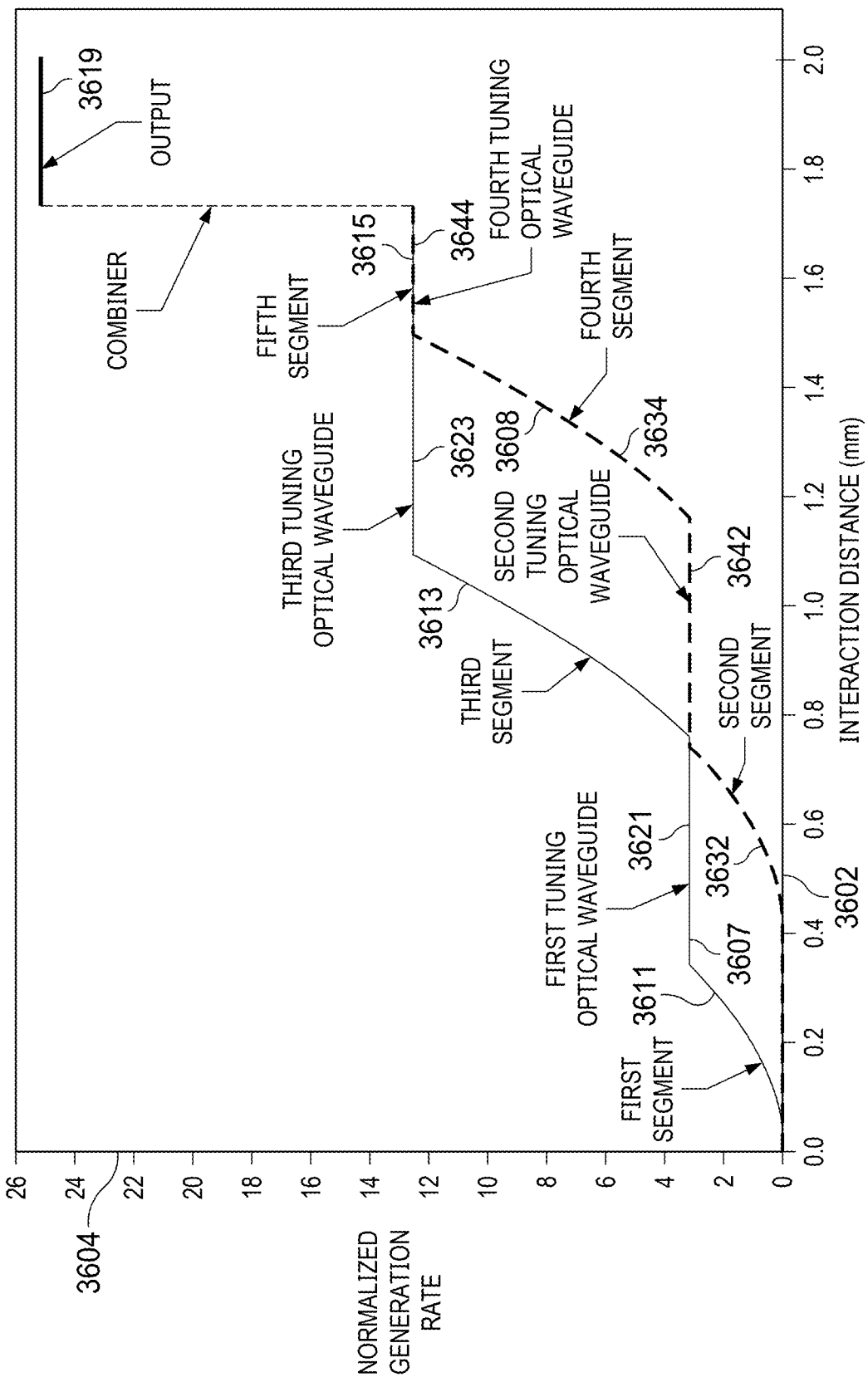
FIG. 36 is an illustration of a graph of light generation in accordance with an illustrative embodiment.
Figure 37A:
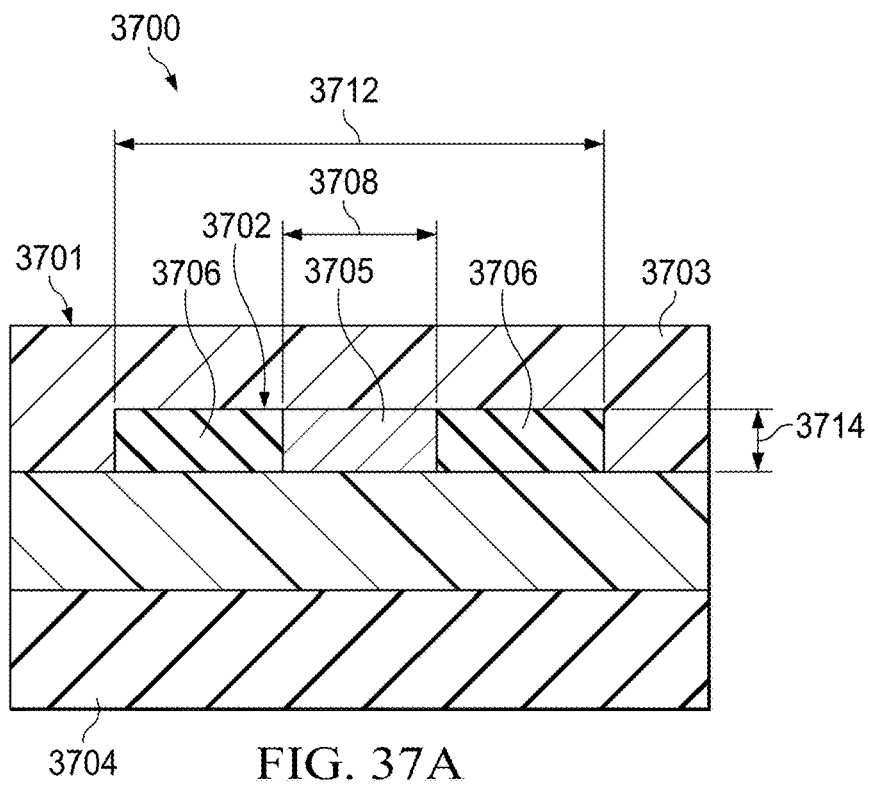
FIGS. 37A-37G are illustrations of cross-sections for nonlinear optical waveguide structures in accordance with an illustrative embodiment.
Figure 37B:
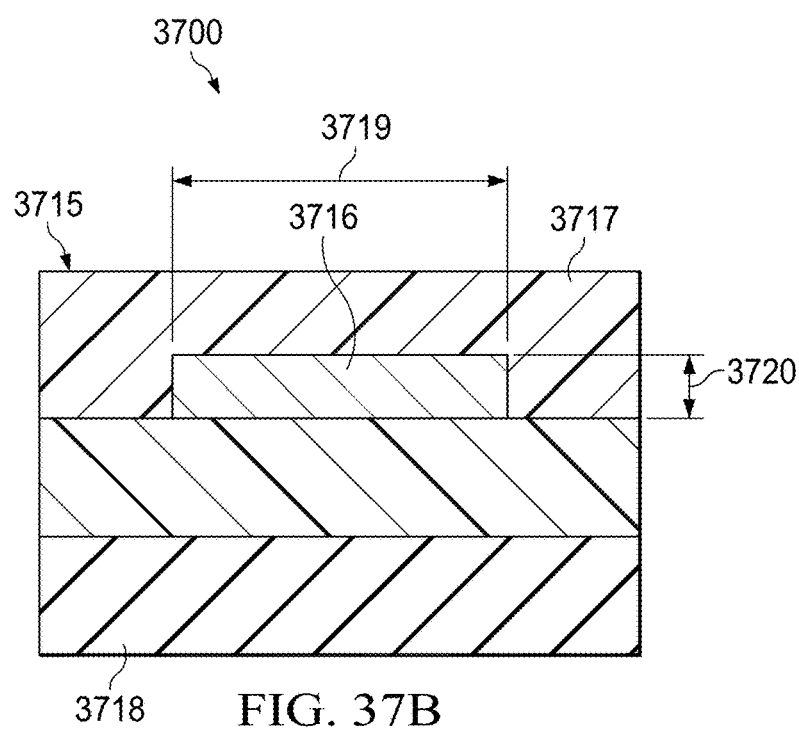
Figure 37C:
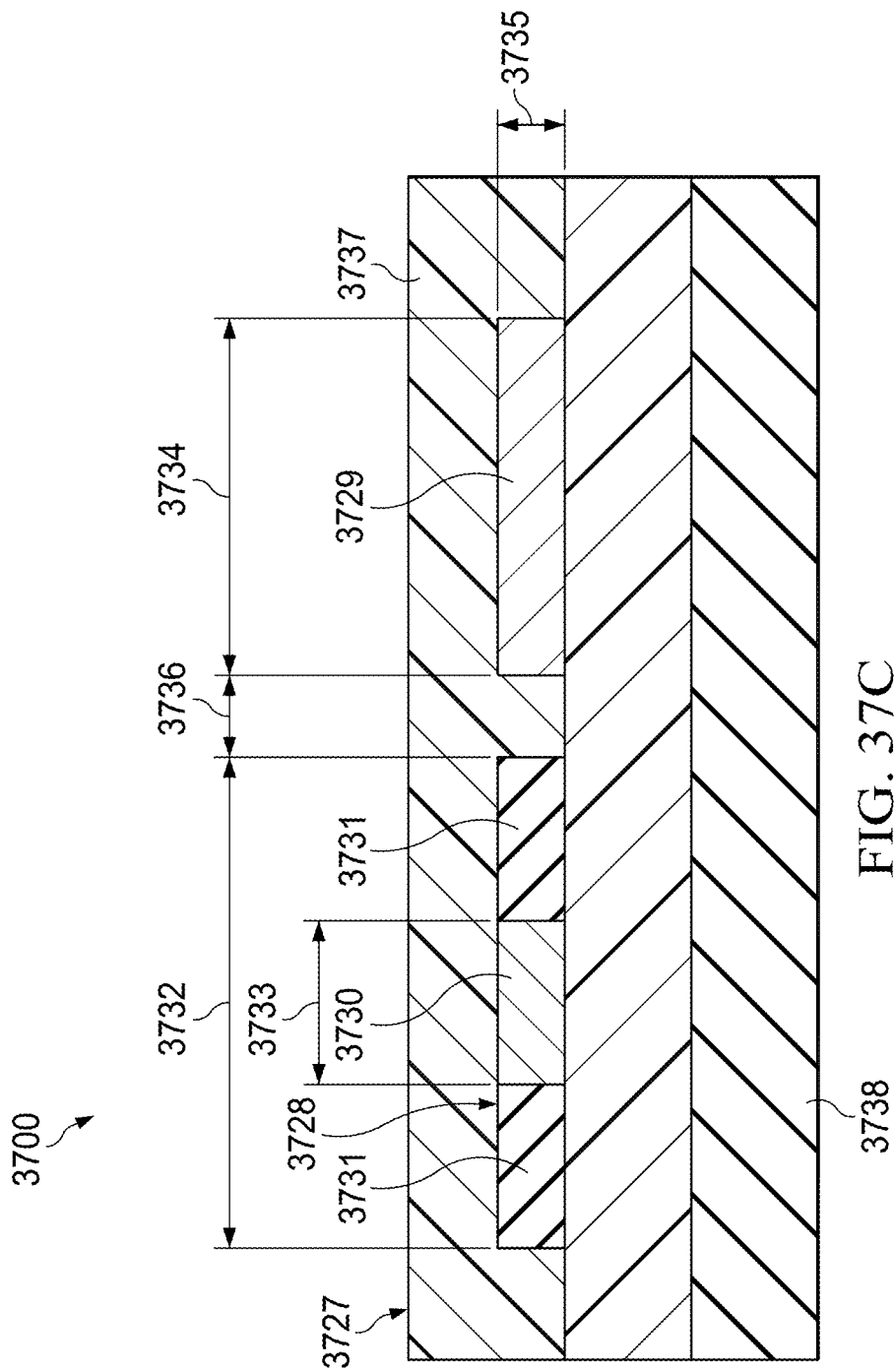
Figure 37D:
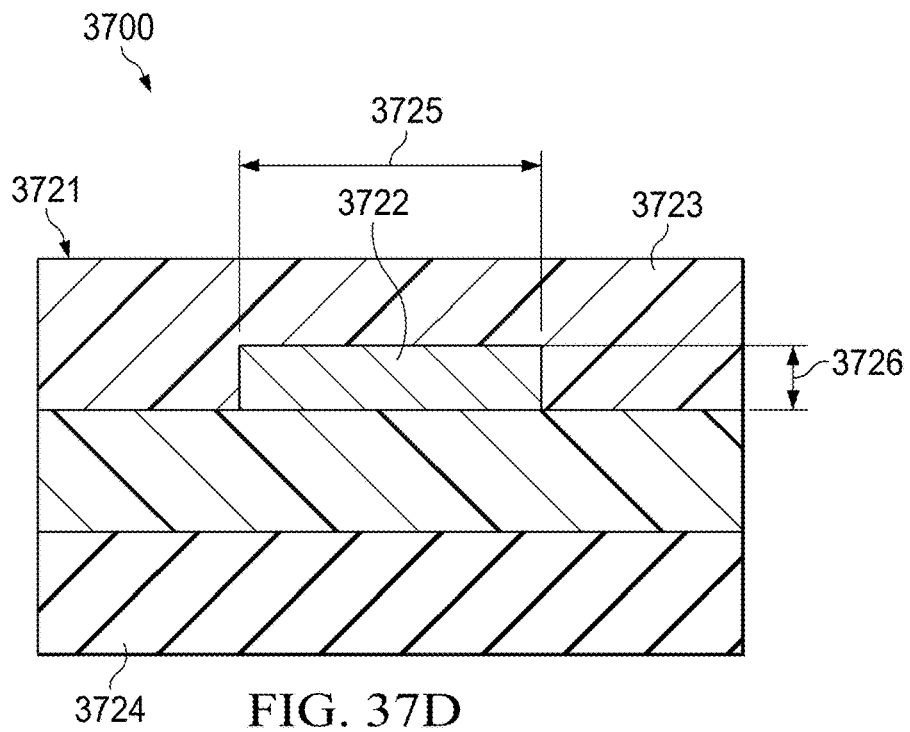
Figure 37E:
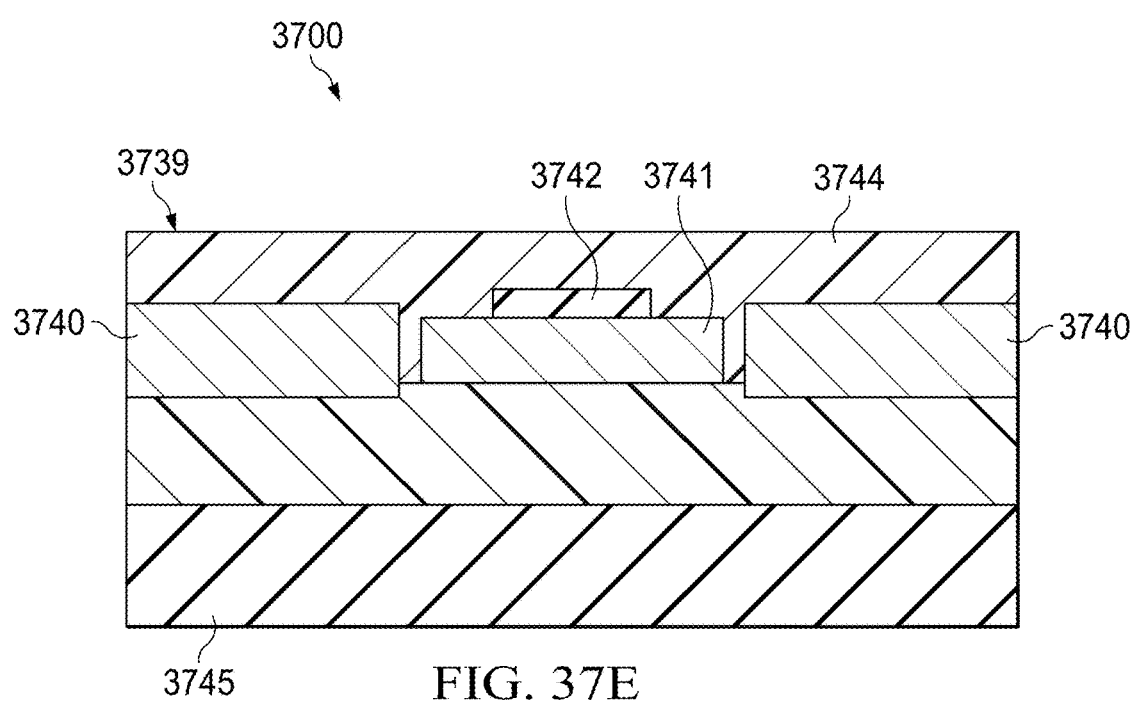
Figure 37F:
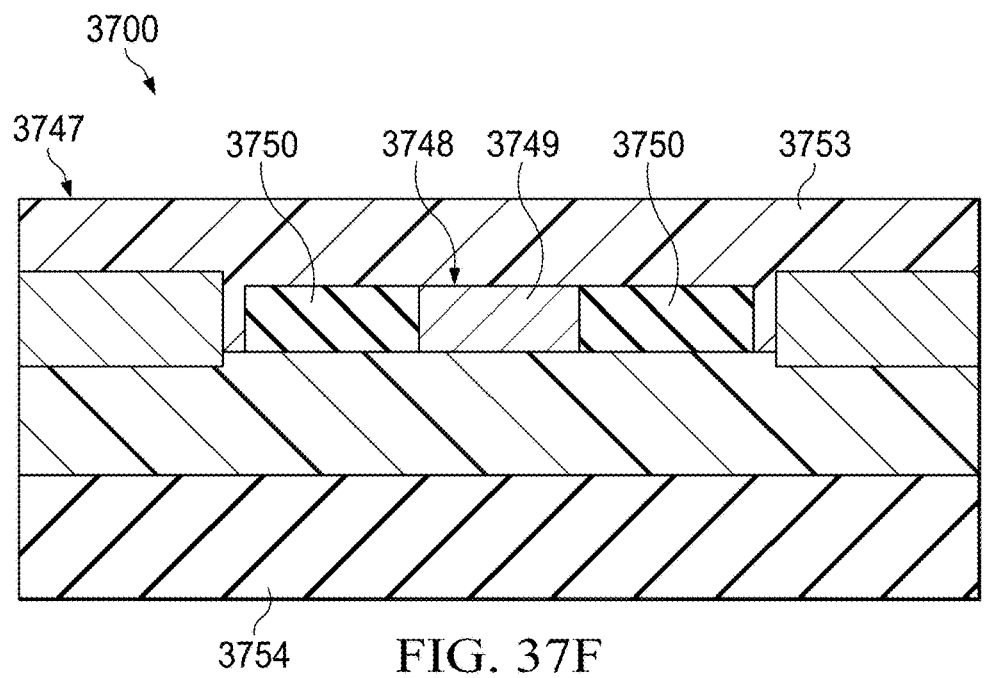
Figure 37G:
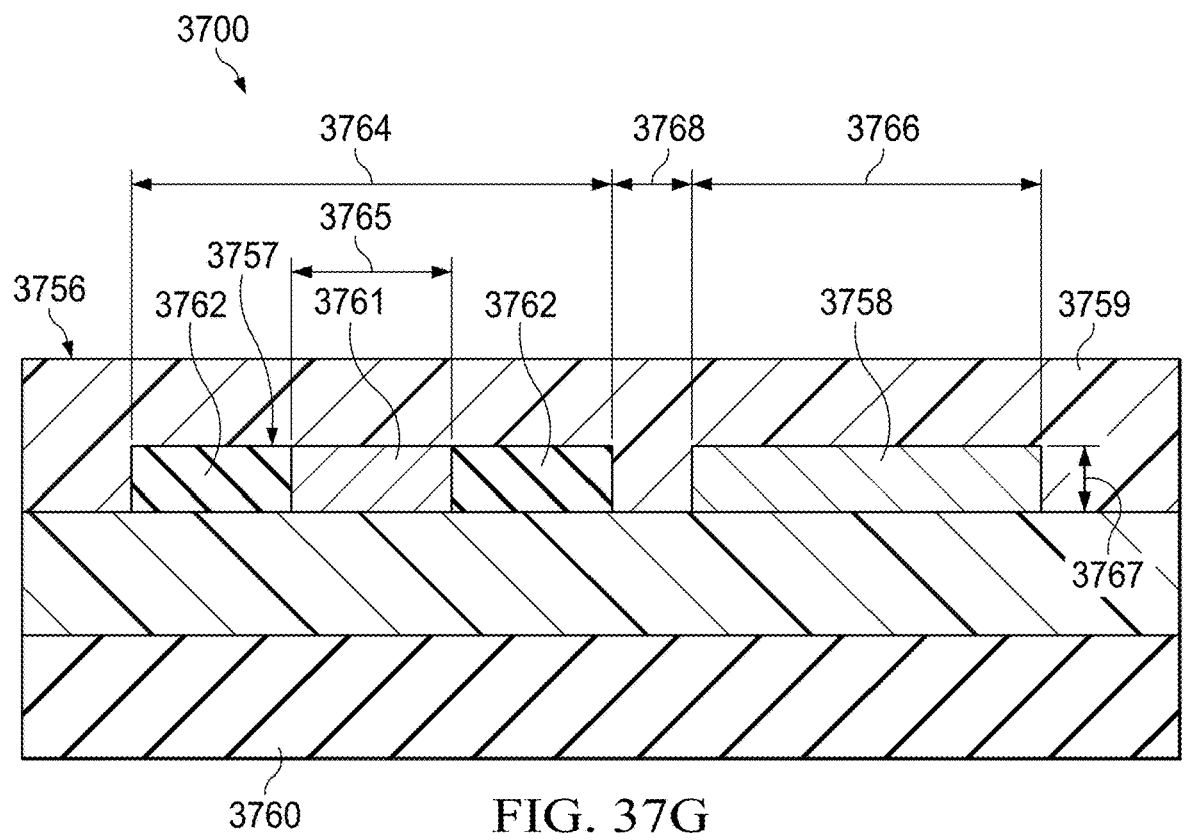

Turning now to FIG. 36, an illustration of a graph of light generation is depicted in accordance with an illustrative embodiment. In graph 3600, an illustration of normalized light generation rates based on distances of nonlinear optical interactions are shown. This light generation can be for a light such as idler light or signal light traveling through an optical waveguide structure having a nonlinear optical waveguide with segments and tuning optical waveguides coupled to segments of nonlinear optical waveguide. In this example, the light generation depicted occurs in an optical waveguide structure such as optical waveguide structure 3500 in FIG. 35.

As depicted in graph 3600, x-axis 3602 illustrates the nonlinear optical interaction distance for light and nonlinear optical waveguide while y-axis 3604 illustrates the normalized generation rate of light as a result of that nonlinear optical interaction. As depicted, line 3607 and line 3608 illustrates light generation for light traveling through different routes within the optical waveguide structure. In this illustrative example, line 3607 illustrates the light generation rates for light traveling through first route 3557 through odd indexed segments of optical waveguide structure 3500. Line 3608 illustrates light generation rates for light traveling through second route 3558 using even index segments in optical waveguide structure 3500 in FIG. 35. As can be seen, line 3607 and line 3608 have a stair stepped shape in which light generation rates increase as the light travels though segments and tuning optical waveguides in optical waveguide structure 3500.

Line 3607 and line 3608 both have sections that corresponding to structures in optical waveguide structure 3500. These sections include horizontal sections and angled sections relative to x-axis 3602. As depicted, line 3607 has angled section 3611, horizontal section 3621, angled section 3613, horizontal section 3623, and horizontal section 3615. For line 3607, angled section 3611 corresponds to light generation that occurs in first segment 3501; horizontal section 3621 corresponds to light generation that occurs in first tuning optical waveguide 3541, angled section 3613 corresponds to light generation that occurs in third segment 3503, horizontal section 3623 corresponds to light generation that occurs in third tuning optical waveguide 3543, and horizontal section 3615 corresponds to light generation that occurs in fifth segment 3505, fifth segment 3505 can be a final segment. For line 3608, angled section 3632 corresponds to light generation that occurs in second segment 3502, horizontal section 3642 corresponds to light generation that occurs in second tuning optical waveguide 3542, angled section 3634 corresponds to light generation that occurs in fourth segment 3504, and horizontal section 3644 corresponds to light generation that occurs in fourth tuning optical waveguide 3544. As indicated by the sections of lines 3607 and 3608, light generation occurs only in the nonlinear optical waveguide segments, such as first segment 3501, second segment 3502, third segment 3503, and fourth segment 3504. These are segments comprised of nonlinear optical material and through which pump light 3512 also travels. Light generation does not occur in tuning optical waveguides, such as first tuning optical waveguide 3541, second tuning optical waveguide 3542, third tuning optical waveguide 3543, and fourth tuning optical waveguide 3544. Pump light 3512 does not travel through these tuning optical waveguides. Light generation also does not occur in fifth segment 3505 because pump light is removed at the start of fifth segment 3505 and thus does not travel through fifth segment 3505.

As depicted a jump occurs from horizontal section 3615 and horizontal section 3644 to horizontal section 3619 because of the idler light 3517 from first, odd index, first route 3557 being combined with the idler light 3518 from second, even index, second route 3558 by idler combiner 3528, which is located after fifth segment 3505 and prior to idler output waveguide 3579.

With reference to FIGS. 37A-37G, illustrations of cross-sections for nonlinear optical waveguide structures are depicted in accordance with an illustrative embodiment. As depicted, cross-sections 3700 can be used to implement optical waveguide structures such as nonlinear optical waveguides, tuning optical waveguides, optical couplers such as wavelength selective couplers and input or output couplers as well as combiners, and phase shifters.

As depicted, cross-section 3701 (FIG. 37A) can be used to implement a nonlinear optical waveguide. Cross-section 3701 comprises core region 3702 within cladding 3703 formed from silicon oxide ($SiO_2$) and cladding 3703 is located on silicon substrate 3704. Core region 3702 comprises lithium niobate center section 3705 and side sections 3706 formed from silicon nitride. As depicted, center width 3708 is the width of lithium niobate center section 3705. Strip width 3712 is the width of core region 3702. The height of core region 3702 is strip height 3714.

As depicted, cross-section 3715 (FIG. 37B) has core region 3716 comprised of silicon nitride located within cladding 3717 formed from silicon oxide. Cladding 3717 is located on silicon substrate 3718. In this illustrative example, core region 3716 has strip width 3719 and strip height 3720. Cross-section 3721 (FIG. 37D) has core region 3722 comprised of lithium niobate ($LiNbO_3$) located within cladding 3723 formed from on silicon oxide. Cladding 3723 is located on silicon substrate 3724. As depicted, core region 3721 has strip width 3725 and strip height 3726.

These two cross-sections can be used to implement tuning optical waveguides. For example, tuning optical waveguides using cross-section 3715 and cross-section 3721 can have tapers that transition gradually between waveguide portions with the silicon nitride core and with the lithium niobate core in these cross-sections.

In this illustrative example, cross-section 3727 (FIG. 37C) is a cross-section for an optical coupler between a nonlinear optical waveguide and another waveguide such as a tuning optical waveguide or an input waveguide or an output waveguide. As depicted, core region 3728 can be for the nonlinear optical waveguide while core region 3729 is for another optical waveguide. Core region 3728 is comprised of lithium niobate center section 3730 with silicon nitride sides 3731. Core region 3729 is comprised of silicon nitride.

As depicted, core region 3728 has strip width 3732 and lithium niobate center section 3730 has center width 3733. Core region 3729 has strip width 3734. In this illustrative example, both core regions have strip height 3735. Gap 3736 is present between core region 3728 and core region 3729. These components are within cladding 3737 formed using silicon oxide, which is located on silicon substrate 3738.

The coupler using cross-section 3727 can be, for example, a wavelength selective out-coupler, a wavelength selective in-coupler, or a combiner. This coupler also can be a pump input coupler, signal input coupler or idler input coupler, a pump removal coupler, a signal output coupler, or an idler output coupler. Further, lithium niobate can be present in core region 3728 when core region 3728 is for a nonlinear optical waveguide.

In this example, cross-section 3739 (FIG. 37E) is an example of the cross-section that can be used for a phase shifter. In this illustrative example, cross-section 3739 comprises electrodes 3740 for the phase shifter located on each side of core region 3741. Core region 3741 is comprised of lithium niobate, which is an electro-optic material for an electro-optically activated optical waveguide phase shifter. In this example, silicon nitride structure 3742 is located on core region 3741. These components are located within cladding 3744 which is comprised of silicon oxide. Cladding 3744 is located on silicon substrate 3745. The phase shifter using cross-section 3739 is an electro-optic phase shifter.

Cross-section 3747 (FIG. 37F) is an example of a cross section that can be used in a phase shifter for phase tuning for a nonlinear optical waveguide. Core region 3748 is for a nonlinear optical waveguide.

In this example, core region 3748 is comprised of lithium niobate center section 3749 and silicon nitride sides 3750. These components are located within cladding 3753. Cladding 3753 is comprised of silicon oxide and is located on silicon substrate 3754.

Cross-section 3756 (FIG. 37G) is a cross-section for an optical coupler between a nonlinear optical waveguide and a tuning optical waveguide. As depicted, core region 3728 can be for the nonlinear optical waveguide while core region 3729 is for another optical waveguide.

As depicted, cross section 3756 is a cross-section for an optical coupler between a nonlinear optical waveguide and another waveguide. As depicted, core region 3757 can be for the nonlinear optical waveguide while core region 3758 is for a tuning optical waveguide. Core region 3757 is comprised of lithium niobate center section 3761 with silicon nitride sides 3762. Core region 3758 is comprised of lithium niobate.

As depicted, core region 3757 has strip width 3764 and lithium niobate center section 3761 has center width 3765. Core region 3758 has strip width 3766. In this illustrative example, both core regions have strip height 3767. Gap 3768 is present between core region 3757 and core region 3758. These components are within cladding 3759 formed using silicon oxide, which is located on silicon substrate 3760 in cross-section 3756. Whether a wavelength selective coupler is implemented with cross-section 3756 or cross-section 3727 is dependent on the specific values for the wavelengths of the pump light, signal light and idler light as well as on whether the wavelength selective coupler couples only idler light (which typically has the longest wavelength) between a nonlinear optical waveguide segment and a tuning optical waveguide or couples both idler light and signal light, of differing wavelengths, between the nonlinear optical waveguide and the tuning optical waveguide. The wavelength selective coupler of these exemplary cross-sections would couple pump light from one nonlinear optical waveguide segment to another nonlinear optical waveguide segment.

Although cross-sections 3700 depicted in FIGS. 37A-37G are for waveguides with core regions comprising lithium niobate and silicon nitride and cladding regions comprising silicon dioxide, other materials and combinations of materials could be used for the core regions and the cladding regions. For example, other materials can include at least one of gallium arsenide, aluminum gallium arsenide, silicon carbide, titanium dioxide, aluminum nitride, or gallium nitride.

In the illustrative examples, the different examples of optical waveguide structures can be scaled to a large number of segments and tuning optical waveguides. The particular configurations used can depend on the desired length of components such as phase shifters used with the tuning optical waveguides. Design specifications can limit the length of a single pair of electrodes of a phase shifter associated with a tuning optical waveguide. As a result, tuning optical waveguide can have folds with phase shifters having electrodes on the folds. In some examples, folds are used in the tuning optical waveguides to provide the amount of activation desired from phase shifters associated with tuning optical waveguides.

Figure 38:
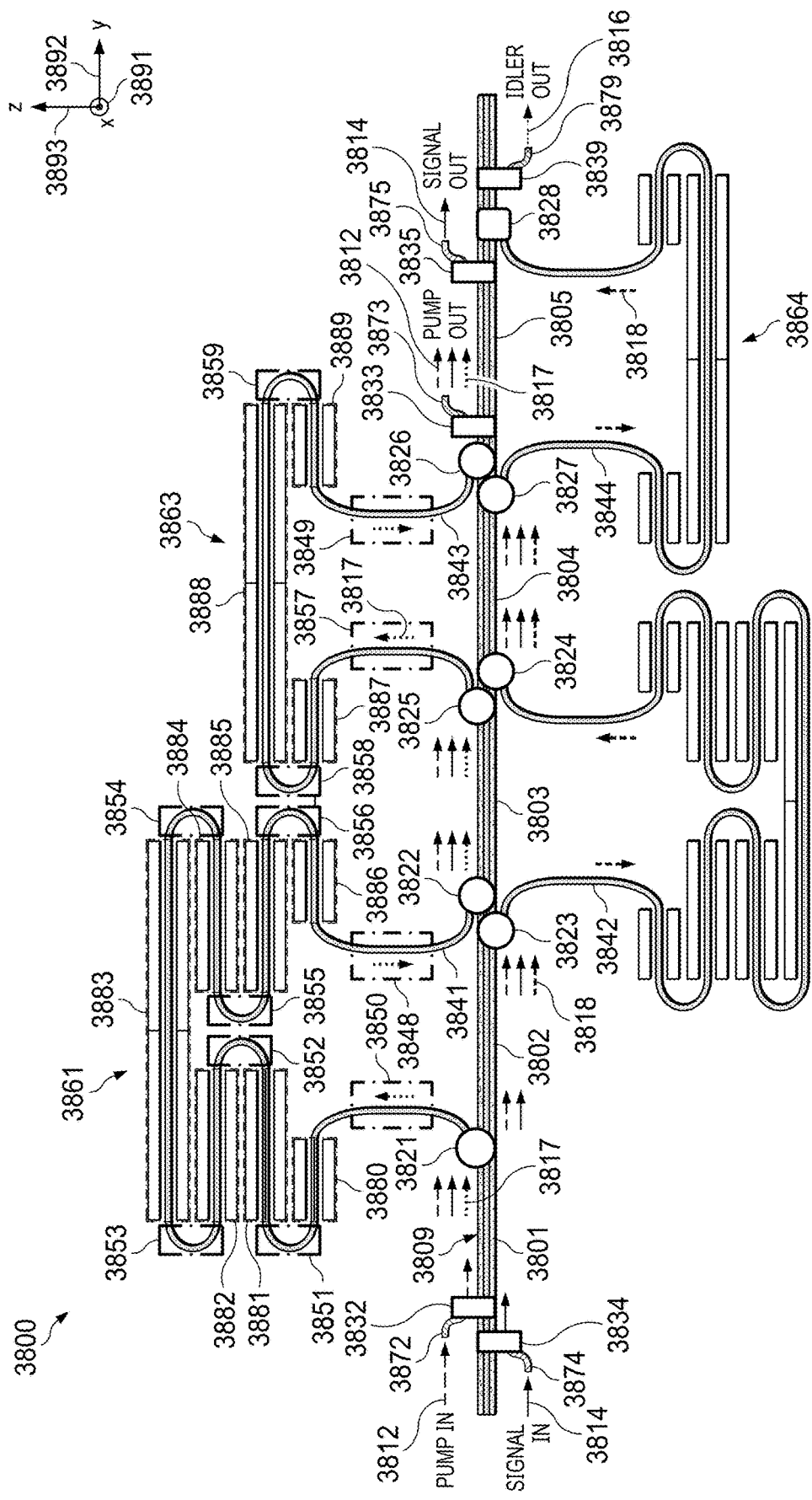
FIG. 38 is an illustration of an optical waveguide structure in accordance with an illustrative embodiment.

With reference to FIG. 38, an illustration of an optical waveguide structure is depicted in accordance with an illustrative embodiment. As depicted, optical waveguide structure 3800 comprises nonlinear optical waveguide 3809, first tuning optical waveguide 3841, second tuning optical waveguide 3842, third tuning optical waveguide 3843, fourth tuning optical waveguide 3844, first idler out wavelength selective coupler 3821, second idler in wave selective coupler 3822, third idler out wavelength selective coupler 3823, fourth idler in wavelength selective coupler 3824, fifth idler out wavelength selective coupler 3825, sixth idler in wavelength selective coupler 3826, seventh idler out wavelength selective coupler 3827, combiner 3828, pump input waveguide 3872, signal input waveguide 3874, pump output waveguide 3873, signal output waveguide 3875, idler output waveguide 3879, pump input coupler 3832, signal input coupler 3834, pump output coupler 3833, signal output coupler 3835, idler output coupler 3839, first phase shifter 3861, second phase shifter 3862, third phase shifter 3863, and fourth phase shifter 3864.

In this illustrative example, nonlinear optical waveguide 3809 has nonlinear optical waveguide segments. As depicted, these nonlinear optical waveguide segments are first segment 3801, second segment 3802, third segment 3803, fourth segment 3804, and fifth segment 3805

In this example, pump input coupler 3832 couples pump light 3812 introduced through pump input waveguide 3872 to first segment 3801. Signal input coupler 3834 couples signal light 3814 introduced in signal input waveguide 3874 to first segment 3801. Pump output coupler 3833 couples pump light 3812 from fifth segment 3805 to pump output waveguide 3873. Signal output coupler 3835 couples signal light 3814 from fifth segment 3805 to signal output waveguide 3875. Combiner 3828 combines idler light 3817 from fifth segment 3805 and idler light 3818 from fourth tuning optical waveguide 3844 to form idler light 3816. Idler output coupler 3839 couples idler light 3816 from fifth segment 3805 to idler output waveguide 3879.

As depicted, nonlinear optical waveguide 3809 and other components are formed on a yz plane defined by z-axis 3893 and y-axis 3892, with x-axis 3891 perpendicular to the yz plane. In an illustrative example, nonlinear optical waveguides can be fabricated from a nonlinear optical material such as x-cut lithium niobate. In this example, y-axis 3892 of the nonlinear optical material is parallel to the direction in which the nonlinear optical waveguide segments are oriented and z-axis 3893 of the nonlinear optical material is perpendicular to the propagation direction of the light in the nonlinear optical waveguide segments. For nonlinear optical materials such as x-cut lithium niobate, this orientation of the nonlinear optical waveguides allows a nonlinear optical interaction such as spontaneous parametric down conversion, or parametric down conversion or up conversion, or second harmonic generation to make use of the largest second order nonlinear optical coefficient $d_{33}$ of the lithium niobate material when the light is in a TE mode of the waveguide. For an accompanying phase shifter formed in a tuning optical waveguide comprising an electro-optic material such as x-cut lithium niobate, orienting the phase shifter parallel to the material's y-axis and perpendicular to the material's z-axis also allows an electro-optic phase shifter to make use of the largest electro-optic coefficient $r_{33}$ of the lithium niobate material when the light is in a TE mode of the waveguide.

In this illustrative example, the phase shifters have more electrodes than used in optical waveguide structure 3500 in FIG. 35. The additional electrodes can be placed on the folds of the tuning optical waveguides.

In this example, a phase shifter has a pair of electrodes on the portion of tuning optical waveguide following a fold of the tuning optical waveguide. These folds allow for a longer length on the combined electrodes in each phase shifter while reducing the length needed for nonlinear optical waveguide 3809 along y-axis 3892.

As depicted, first tuning optical waveguide 3841 has eight folds, second tuning optical waveguide 3842 has eight folds, third tuning optical waveguide 3843 has four folds, and fourth tuning optical waveguide 3844 has four folds. For example, the eight folds of first tuning optical waveguide 3841 are first fold 3850, second fold 3851, third fold 3852, fourth fold 3853, fifth fold 3854, sixth fold 3855, seventh fold 3856 and eighth fold 3848. In this example, first phase shifter 3861 comprises electrode pair 3880 located between first fold 3850 and second fold 3851; electrode pair 3881 located between second fold 3851 and third fold 3852; electrode pair 3882 located between third fold 3852 and fourth fold 3853; electrode pair 3883 located between fourth fold 3853 and fifth fold 3854; electrode pair 3884 located between fifth fold 3854 and sixth fold 3855; electrode pair 3885 located between sixth fold 3855 and seventh fold 3856; and electrode pair 3886 located between seventh fold 3856 and eighth fold 3848 of the first tuning optical waveguide 3841. In this example, the four folds of third tuning optical waveguide 3843 are first fold 3857, second fold 3858, third fold 3859 and fourth fold 3849. Third phase shifter 3863 comprises electrode pair 3887 located between first fold 3857 and second fold 3858; electrode pair 3888 located between second fold 3858 and third fold 3859; and electrode pair 3889 located between third fold 3859 and fourth fold 3849 of the third tuning optical waveguide 3843.

Thus, the phase shifters in optical waveguide structure 3800 can have a larger applicable length for a given segment length in a segment in nonlinear optical waveguide 3809. The number of folds can be increased from those shown in optical waveguide structure 3800 as needed to provide an over length of a phase shifter with multiple electrode pairs placed in the folds of the tuning optical waveguide.

The number of segments in a nonlinear optical waveguide in an optical waveguide structure can affect the configuration of tuning optical waveguides used in the optical waveguide structure. For example, if the number of segments is relatively small number, such as 11 or fewer segments, optical waveguide structure can have a configuration that comprises an offset arrangement of tuning optical waveguides that each have 4 folds.

Figure 39:
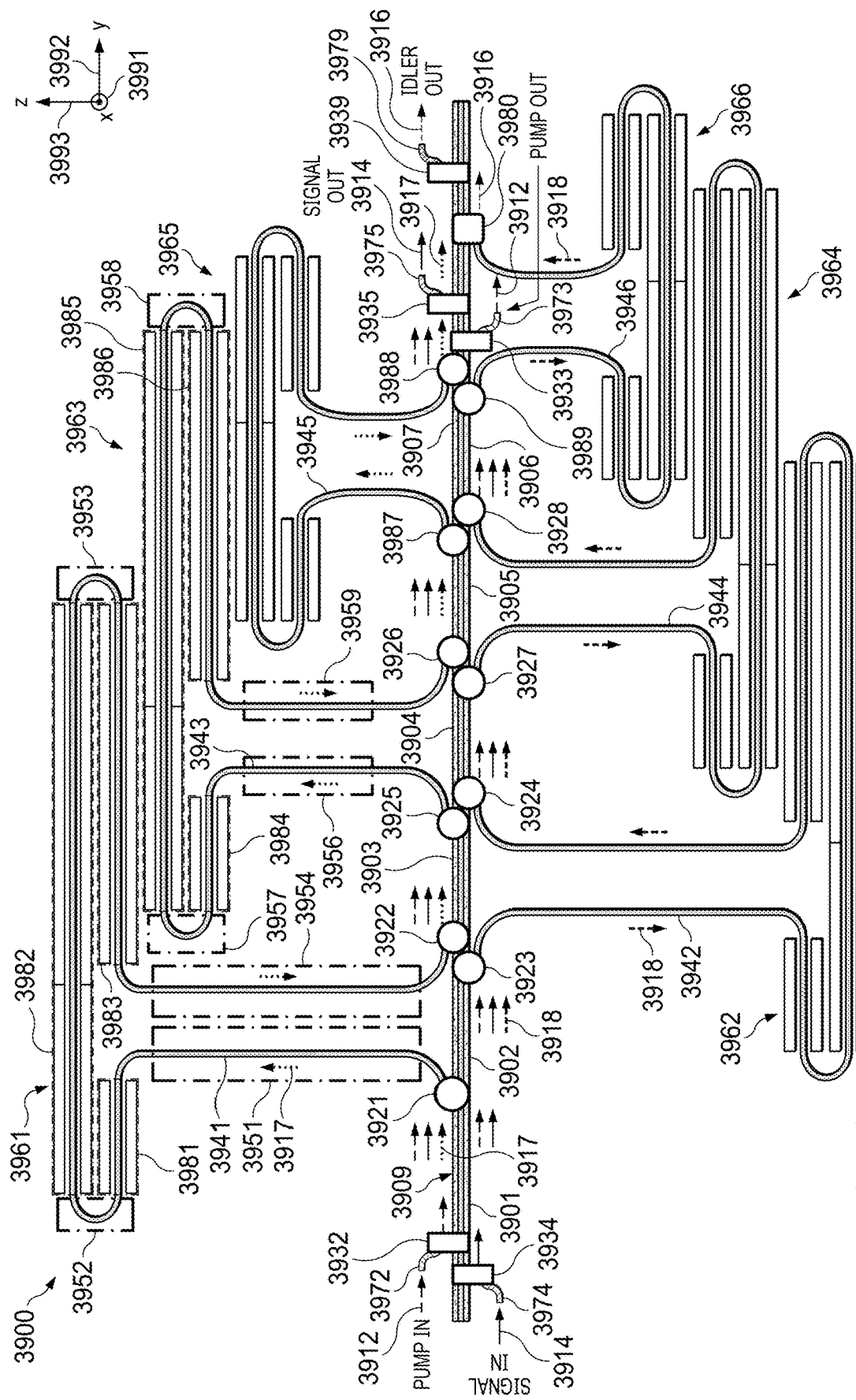
FIG. 39 is an illustration of an optical waveguide structure with offset tuning optical waveguides in accordance with an illustrative embodiment.

With reference to FIG. 39, an illustration of an optical waveguide structure with offset tuning optical waveguides is depicted in accordance with an illustrative embodiment. As depicted, optical waveguide structure 3900 comprises nonlinear optical waveguide 3909, first tuning optical waveguide 3941, second tuning optical waveguide 3942, third tuning optical waveguide 3943, fourth tuning optical waveguide 3944, fifth tuning optical waveguide 3945, sixth tuning optical waveguide 3946, first idler out wavelength selective coupler 3921, second idler in wave selective coupler 3922, third idler out wavelength selective coupler 3923, fourth idler in wavelength selective coupler 3924, fifth idler out wavelength selective coupler 3925, sixth idler in wavelength selective coupler 3926, seventh idler out wavelength selective coupler 3927, eighth idler in wavelength selective coupler 3928, ninth idler out wavelength selective coupler 3987, tenth idler in wavelength selective coupler 3988, eleventh idler out wavelength selective coupler 3989, combiner 3980, pump input waveguide 3972, signal input waveguide 3974, pump output waveguide 3973, signal output waveguide 3975, idler output waveguide 3979, pump input coupler 3932, signal input coupler 3934, pump output coupler 3933, signal output coupler 3935, idler output coupler 3939, first phase shifter 3961, second phase shifter 3962, third phase shifter 3963, fourth phase shifter 3964, fifth phase shifter 3965, and sixth phase shifter 3966.

In this illustrative example, nonlinear optical waveguide 3909, has nonlinear optical waveguide segments. As depicted, these nonlinear optical waveguide segments are first segment 3901, second segment 3902, third segment 3903, fourth segment 3904, fifth segment 3905, sixth segment 3906, and seventh segment 3907.

In this example, pump input coupler 3932 couples pump light 3912 introduced through pump input waveguide 3972 to first segment 3901. Signal input coupler 3934 couples signal light 3914 introduced in signal input waveguide 3974 to first segment 3901. Pump output coupler 3933 couples pump light 3912 from sixth segment 3906 to pump output waveguide 3973 so that pump light 3912 does not travel in seventh segment 3907. Signal output coupler 3935 couples signal light 3914 from seventh segment 3907 to signal output waveguide 3975 prior to combiner 3980. Combiner 3980 combines idler light 3917 from seventh segment 3907 and idler light 3918 from sixth tuning optical waveguide 3946 to form idler light 3916. Optional idler output coupler 3939 couples idler light 3916 from seventh segment 3907 to idler output waveguide 3979.

As depicted, nonlinear optical waveguide 3909 and other components are formed on a yz plane defined by z-axis 3993 and y-axis 3992 in which x-axis 3991 is perpendicular to the plane. In an illustrative example, nonlinear optical waveguides can be fabricated from a nonlinear optical material such as x-cut lithium niobate. In this example, x-axis 3991 of the nonlinear optical material is perpendicular to the yz plane of the structure of nonlinear optical waveguide 3909 and the other components In this example, each tuning optical waveguide in optical waveguide structure 3900 can extend over more than two segments. Furthermore, each tuning optical waveguide has four folds with an electrode pair placed in the portion of the tuning optical waveguide after three of the four folds of the tuning optical waveguide. In this example, first tuning optical waveguide 3941 has first fold 3951, second fold 3952, third fold 3953 and fourth fold 3954. First phase shifter 3961 comprises first electrode pair 3981 located between first fold 3951 and second fold 3952, second electrode pair 3982 located between second fold 3952 and third fold 3953, and third electrode pair 3983 located between third fold 3953 and fourth fold 3954. Thus, the phase shifters in optical waveguide structure 3900 can have a larger applicable length for a given segment length in a segment in nonlinear optical waveguide 3909. The length of the second electrode pair 3982 and the portion of first tuning optical waveguide 3941 between second fold 3952 and third fold 3953 can be increased as shown in optical waveguide structure 3900 as needed to provide a desired overall length for first phase shifter 3961. For example, second electrode pair 3982 extends over first segment 3901, second segment 3902, third segment 3903, fourth segment 3904, and fifth segment 3905.

Likewise, third tuning optical waveguide 3943 has first fold 3956, second fold 3957, third fold 3958 and fourth fold 3959. Third phase shifter 3963 comprises first electrode pair 3984 located between first fold 3956 and second fold 3957, second electrode pair 3985 located between second fold 3957 and third fold 3958, and third electrode pair 3986 located between third fold 3958 and fourth fold 3959. The length of the second electrode pair 3985 of third phase shifter 3963 and the portion of third tuning optical waveguide 3943 between second fold 3957 and third fold 3958 can be increased as needed to provide a desired overall length for third phase shifter 3963. For example, second electrode pair 3985 extends over third segment 3903, fourth segment 3904, fifth segment 3905, sixth segment 3906, and seventh segment 3907.

In this example a first group of odd index segments comprises first segment 3901, third segment 3903, fifth segment 3905, and seventh segment 3907. A second group of even index segments comprises second segment 3902, fourth segment 3904, and sixth segment 3906.

Each of these groups of segments and tuning optical waveguides forms a route. As a result, 2 routes are present through which idler light 3917 and idler light 3918 travel within optical waveguide structure 3900. For example, first route is traveled by idler light 3917 and is formed by the odd index segments and the associated tuning optical waveguides. In this example first route is comprised of first segment 3901, third segment 3903, fifth segment 3905, first tuning optical waveguide 3941, third tuning optical waveguide 3943, and fifth tuning optical waveguide 3945. Second route is traveled by idler light 3918 and is formed by even index segments and the associated tuning optical waveguides. In this example, second route comprises second segment 3902, fourth segment 3904, sixth segment 3906, second tuning optical waveguide 3942, fourth tuning optical waveguide 3944, and sixth tuning optical waveguide 3946.

In this example, the tuning optical waveguides in same group can have configurations that are different from each other. For example, in the first group of the odd index segments, first tuning optical waveguide 3941 and third tuning optical waveguide 3943 each have a longer length than fifth tuning optical waveguide 3945. In the second group of even index segments, second tuning optical waveguide 3942 and fourth tuning optical waveguide 3944 each have a longer length than sixth tuning optical waveguide 3946. The phase shifters associated with the different tuning optical waveguides can be located at different offset distances from nonlinear optical waveguide 3909. Each tuning optical waveguide can have a length that is selected to achieve a value that is some multiple of $2\pi$ radians for the phase walk-off of the nonlinear optical generation process that occurs between the beginning portion of the nonlinear optical waveguide segment that immediately precedes the tuning optical waveguide and the beginning portion of the subsequent segment in nonlinear optical waveguide 3909 into which that phase shifted idler light is coupled via the idler in wavelength selective coupler. For example, for third tuning optical waveguide 3943, the immediately preceding nonlinear optical waveguide segment is third segment 3903 and the subsequent nonlinear optical waveguide segment is fifth segment 3905.

As depicted for optical waveguide structure 3900 in FIG. 39, the phase shift associated with the tuning optical waveguides is modulo $2\pi$. For example, first tuning optical waveguide 3941 can have a phase shift of $100\pi$; third tuning optical waveguide 3943 can have a phase shift of $98\pi$. As a result, latitude is present on the length of optical waveguides in optical waveguide structure 3900.

Additionally, as depicted in FIG. 39, the placement of phase shifters can be staggered. For example, first phase shifter 3961 and third phase shifter 3963 can have a "staggered" placement along z-axis 3993. Thus, a portion of first phase shifter 3961 can overlap a portion of third phase shifter 3963 along y-axis 3992.

Figure 40:
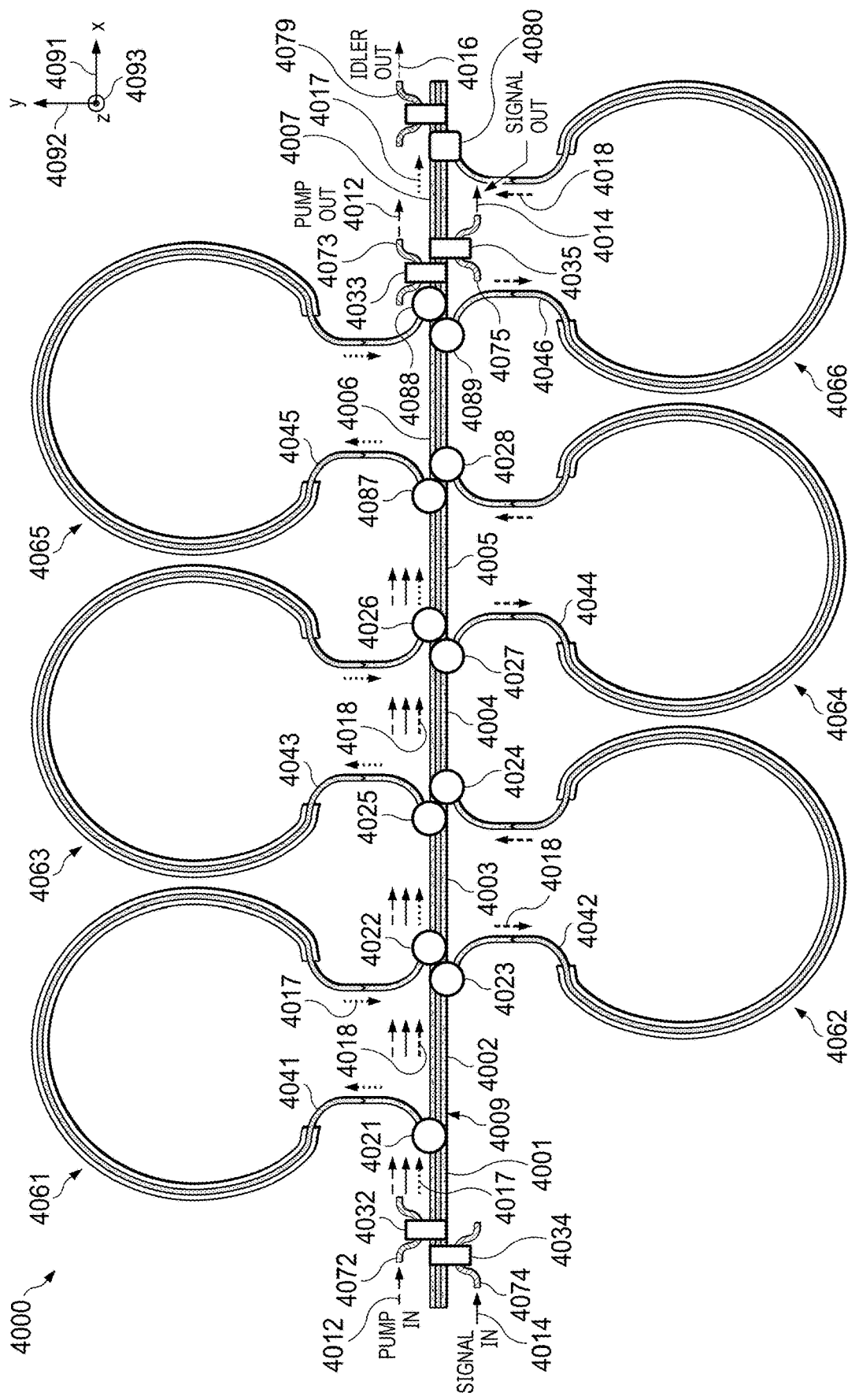
FIG. 40 is an illustration of an optical waveguide structure formed on an xy plane in accordance with an illustrative embodiment.

With reference now to FIG. 40, an illustration of an optical waveguide structure formed on a xy plane is depicted in accordance with an illustrative embodiment. As depicted, nonlinear optical waveguide 4009 is form on a xy plane defined by x-axis 4091 and y-axis 4092, in which a z-axis 4093 is perpendicular to the xy plane. In an illustrative example, nonlinear optical waveguides can be fabricated from a nonlinear optical material such as z-cut lithium niobate, c-axis aligned, and c-axis aligned 4H—SiC. In this example, z-axis 4093 of the nonlinear optical material such as z-cut lithium niobate, is perpendicular to the xy plane.

In this example, optical waveguide structure 4000 comprises nonlinear optical waveguide 4009, first tuning optical waveguide 4041, second tuning optical waveguide 4042, third tuning optical waveguide 4043, fourth tuning optical waveguide 4044, fifth tuning optical waveguide 4045, sixth tuning optical waveguide 4046, first idler out wavelength selective coupler 4021, second idler in wave selective coupler 4022, third idler out wavelength selective coupler 4023, fourth idler in wavelength selective coupler 4024, fifth idler out wavelength selective coupler 4025, sixth idler in wavelength selective coupler 4026, seventh idler out wavelength selective coupler 4027, eighth idler in wavelength selective coupler 4028, ninth idler out wavelength selective coupler 4087, tenth idler in wavelength selective coupler 4088, eleventh idler out wavelength selective coupler 4089, combiner 4080, pump input waveguide 4072, signal input waveguide 4074, pump output waveguide 4073, signal output waveguide 4075, idler output waveguide 4079, pump input coupler 4032, signal input coupler 4034, pump output coupler 4033, signal output coupler 4035, first phase shifter 4061, second phase shifter 4062, third phase shifter 4063, fourth phase shifter 4064, fifth phase shifter 4065, and sixth phase shifter 4066.

In this illustrative example, nonlinear optical waveguide 4009 has nonlinear optical waveguide segments. As depicted, these nonlinear optical waveguide segments are first segment 4001, second segment 4002, third segment 4003, fourth segment 4004, fifth segment 4005, sixth segment 4006, and seventh segment 4007, with seventh segment 4007 also serving as a final segment.

In this example, pump input coupler 4032 couples pump light 4012 introduced through pump input waveguide 4072 to first segment 4001. Signal input coupler 4034 couples signal light 4014 introduced in signal input waveguide 4074 to first segment 4001. Pump output coupler 4033 couples pump light 4012 from sixth segment 4006 to pump output waveguide 4073 so that pump light 4012 is not coupled into seventh segment 4007. Signal output coupler 4035 couples signal light 4014 from seventh segment 4007 to signal output waveguide 4075. Pump output coupler 4033 and signal output coupler 4035 are both located prior to combiner 4080 which is located at the end of seventh segment 4007. Combiner 4080 combines idler light 4017 from seventh segment 4007 and idler light 4018 from sixth tuning optical waveguide 4046 to form idler light 4016. Combiner 4080 can couple idler light 4016 to idler output waveguide 4079.

In the illustrative example, materials such as z-cut lithium niobate and c-axis aligned 4H—SiC used for nonlinear optical generation involving TM polarized light in optical waveguide structure 4000 do not have the geometric constraints imposed by x-cut lithium niobate. With these types of materials, the phase shifters in optical waveguide structure 4000 can be aligned in any direction along the xy plane, which is perpendicular to the z-axis 4093.

Thus, the length of the segments in nonlinear optical waveguide 4009 do not limit the length of the phase shifters associated with the tuning optical waveguides as depicted for optical waveguide structure 4000. Also, a phase shifter in a tuning optical waveguide does not need to have a straight path that is aligned along a particular crystallographic direction, unlike the phase shifters used in the optical waveguide structures depicted in FIG. 35, FIG. 38, and FIG. 39. Instead, a circular path as depicted in FIG. 40 for the phase shifters in optical waveguide structure 4000 can be used. The multiple phase tuning paths and phase shifters in such a nonlinear optical waveguide structure each could have a shape resembling the Greek letter capital omega, with the "feet" of the omega being the out wavelength selective coupler and in wavelength selective coupler for that tuning optical waveguide. In this example, the length of a segment is shorter than the length of a tuning optical waveguide and even is shorter than the length of a phase shifter.

Thus, the configuration of optical waveguide structure 4000 can potentially provide compensation for a greater tolerance in the waveguide cross-sectional dimensions. This configuration also can be scaled readily to increasingly larger numbers of segments.

Further, other shapes can be used in addition to or in place of the omega shape shown for the tuning optical waveguides in optical waveguide structure 4000. For example, even a meandering or irregular shape can be used for the tuning optical waveguides in addition to the omega. Additionally, the tuning optical waveguides in optical waveguide structure 4000 can have different shapes from each other.

Figure 41A:
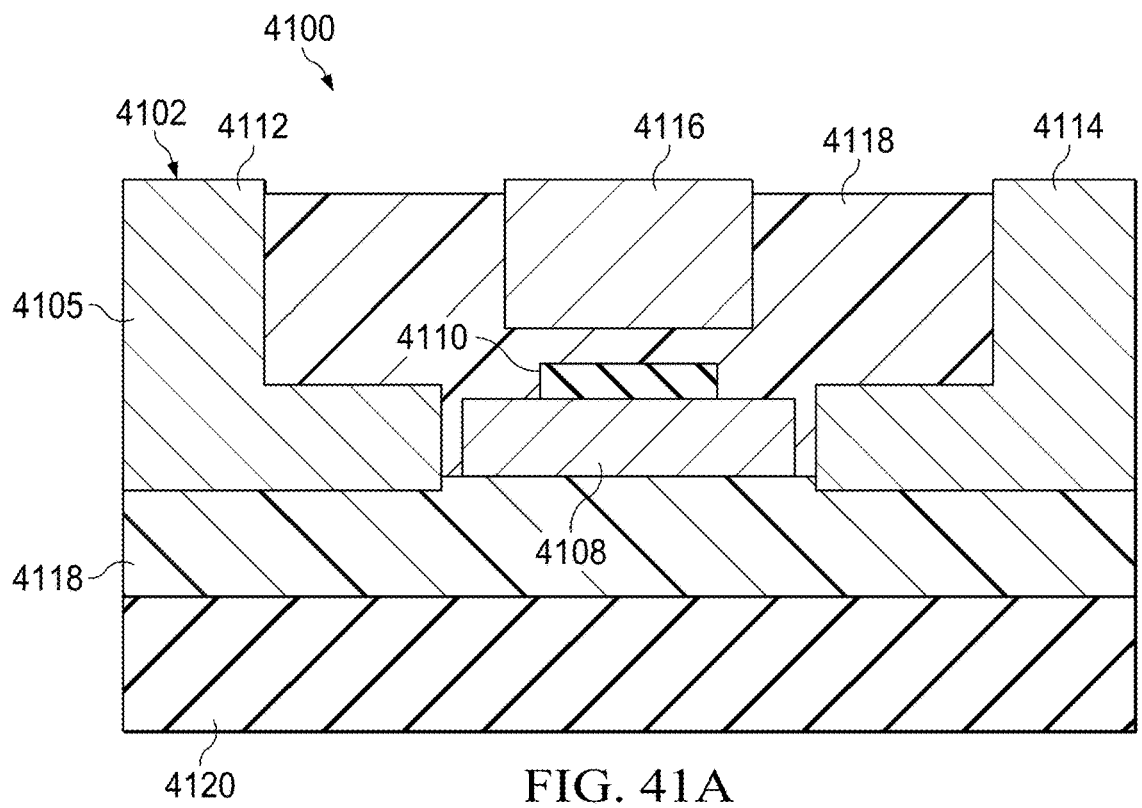
FIGS. 41A and 41B are illustrations of phase shifter cross sections in accordance with an illustrative embodiment.
Figure 41B:
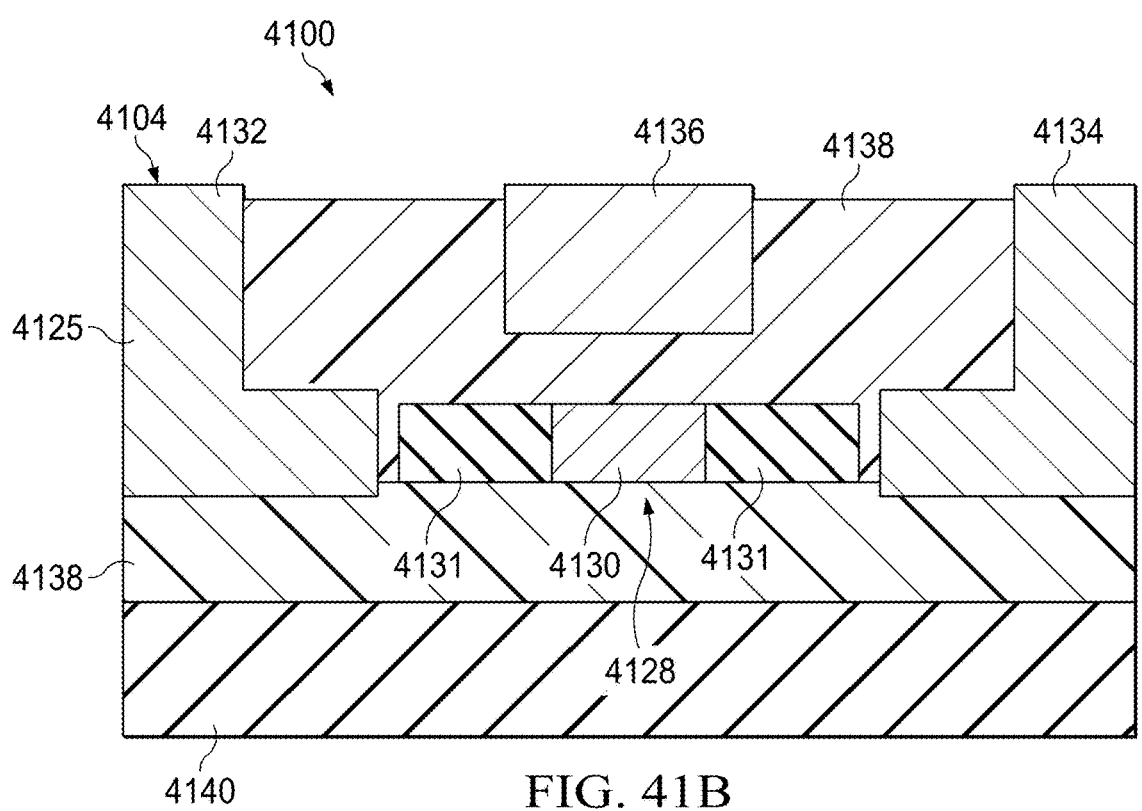

With reference next to FIGS. 41A and 41B, illustrations of phase shifter cross sections is depicted in accordance with an illustrative embodiment. Cross-sections 4100 can be used for shifting the phase of light traveling or propagating in optical waveguide structures using z-cut lithium niobate or c-axis aligned 4H—SiC, such as optical waveguide structure 4000 in FIG. 40. For TM polarized light in z-cut lithium niobate or c-axis aligned 4H—SiC, one of the electrodes for an electro-optic phase shifter should be located above the core region of the optical waveguide such as shown in cross-section 4102 and cross-section 4104.

Cross-section 4102 (FIG. 41A) is for an electro-optic (EO) phase shifter 4105 that is representative of phase shifters such as first phase shifter 4061, second phase shifter 4062, third phase shifter 4063, fourth phase shifter 4064, fifth phase shifter 4065, and sixth phase shifter 4066, that can be associated with tuning optical waveguides such as first tuning optical waveguide 4041, second tuning optical waveguide 4042, third tuning optical waveguide 4043, fourth tuning optical waveguide 4044, fifth tuning optical waveguide 4045, and sixth tuning optical waveguide 4046, respectively. As depicted, first tuning optical waveguide 4041, second tuning optical waveguide 4042, third tuning optical waveguide 4043, fourth tuning optical waveguide 4044, fifth tuning optical waveguide 4045 or sixth tuning optical waveguide 4046 comprises lithium niobate core region 4108 with silicon nitride rib structure 4110. Electro-optic phase shifter 4105 also comprises side electrode 4112, side electrode 4114, and top electrode 4116. These components are located within cladding 4118 which is located on silicon substrate 4120.

In this example, cross-section 4104 (FIG. 41B) is for an electro-optic (EO) phase shifter 4125 that can be associated with a segment in a nonlinear optical waveguide. As depicted, the nonlinear optical waveguide comprises core region 4128 that is comprised of lithium niobate center section 4130 with silicon nitride sides 4131. In this cross section, electro-optic phase shifter 4125 comprises side electrode 4132, side electrode 4134, and top electrode 4136. These components are located within cladding 4138 which is located on silicon substrate 4140.

In this illustrative example, cross-section 4102 and cross-section 4104 have electrode arrangements that provide increased values for the electro-optic (EO) coefficient of the material to be used as compared to other arrangements of electrodes. An example of an electro-optic coefficient is the $r_{33}$ coefficient of lithium niobate.

Figure 42:
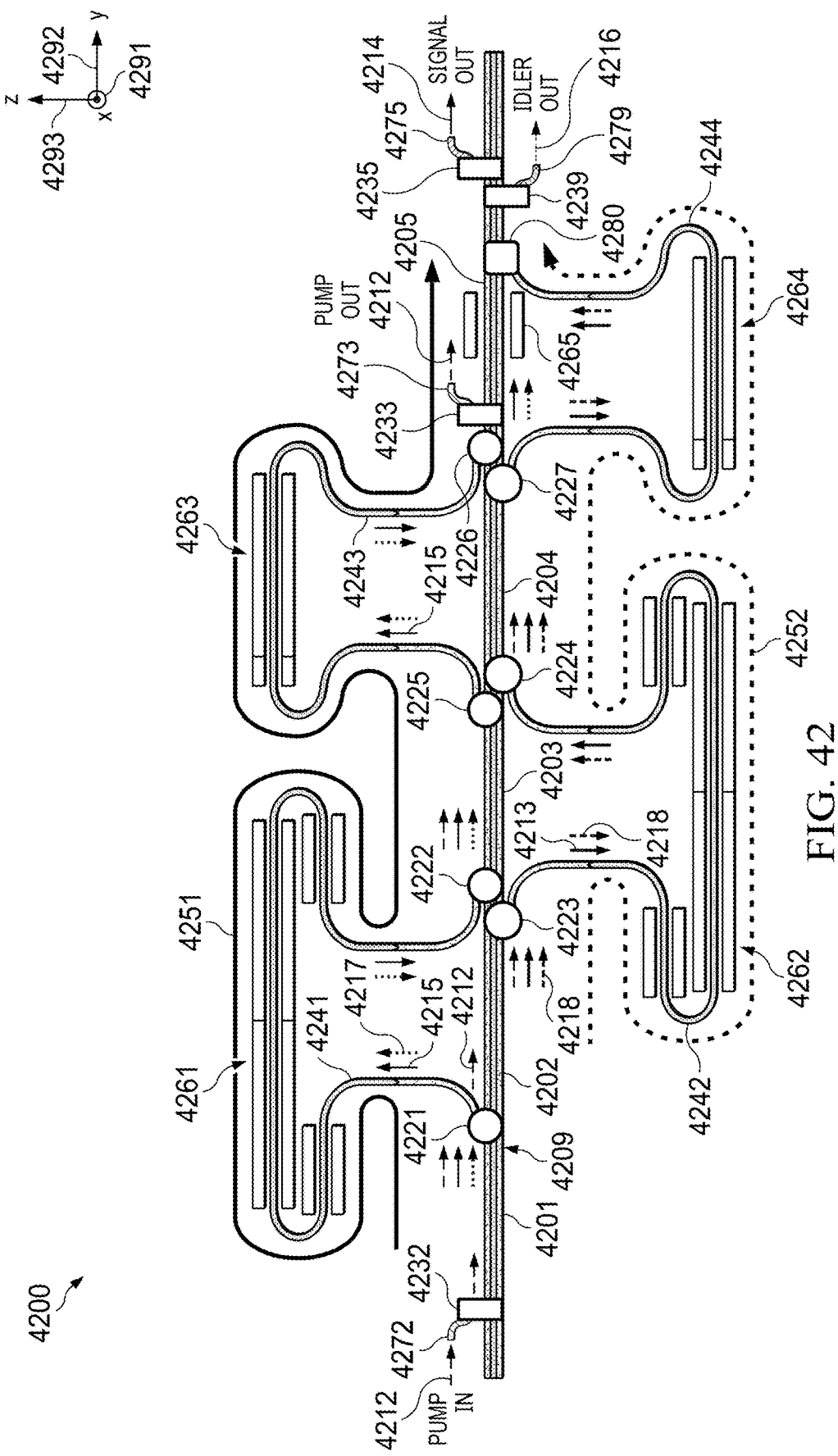
FIG. 42 is an illustration of an optical waveguide structure in accordance with an illustrative embodiment.

With reference to FIG. 42, an illustration of an optical waveguide structure is depicted in accordance with an illustrative embodiment. As depicted, optical waveguide structure 4200 comprises a number of different components. As depicted, optical waveguide structure 4200 comprises nonlinear optical waveguide 4209, first tuning optical waveguide 4241, second tuning optical waveguide 4242, third tuning optical waveguide 4243, fourth tuning optical waveguide 4244, first wavelength selective coupler 4221, second wavelength selective coupler 4222, third wavelength selective coupler 4223, fourth wavelength selective coupler 4224, fifth wavelength selective coupler 4225, sixth wavelength selective coupler 4226, seventh wavelength selective coupler 4227, combiner 4280, pump input waveguide 4272, optional signal input waveguide, optional idler input waveguide, pump output waveguide 4273, signal output waveguide 4275, idler output waveguide 4279, pump input coupler 4232, optional signal input coupler 4234, optional idler input coupler, pump output coupler 4233, signal output coupler 4235, idler output coupler 4239, first phase shifter 4261, second phase shifter 4262, third phase shifter 4263, fourth phase shifter 4264, and fifth phase shifter 4265. For spontaneous parametric down conversion, only pump light 4212 is supplied as the source light. Both signal light 4214 and idler light 4216 are generated by the nonlinear process occurring in optical waveguide structure 4200. For a parametric difference frequency generation or sum frequency generation process, signal light 4214 is supplied as an auxiliary source light with idler light 4216 generated by the nonlinear optical process or, alternatively, idler light 4216 is supplied as an auxiliary source light with signal light 4214 generated by the nonlinear optical process.

In this illustrative example, nonlinear optical waveguide 4209 has nonlinear optical waveguide segments. As depicted, these nonlinear optical waveguide segments are first segment 4201, second segment 4202, third segment 4203, fourth segment 4204, and fifth segment 4205.

In this example, pump input coupler 4232 couples pump light 4212 introduced through pump input waveguide 4272 to first segment 4201. Optional signal input coupler 4234 couples signal light 4214 introduced in optional signal input waveguide to first segment 4201. Optional idler input coupler couples idler light 4217 introduced in optional idler input waveguide to first segment 4201. Pump output coupler 4233 couples pump light 4212 from fourth segment 4204 to pump output waveguide 4273 so that pump light 4212 is not coupled into fifth segment 4205. Signal output coupler 4235 couples signal light 4214 from fifth segment 4205 to signal output waveguide 4275. Idler output coupler 4239 couples idler light 4216 from fifth segment 4205 to idler output waveguide 4279.

As depicted, nonlinear optical waveguide 4209 and other components are formed on a yz plane defined by z-axis 4293 and y-axis 4292 in which an x-axis 4291 is perpendicular to the plane. In an illustrative example, nonlinear optical waveguides can be fabricated from a nonlinear optical material such as x-cut lithium niobate. In this example, x-axis 4291 of the nonlinear optical material is perpendicular to the yz plane of nonlinear optical waveguide 4209 and the other components.

In optical waveguide structure 4200, a first group of odd index segments comprises first segment 4201, third segment 4203, and fifth segment 4205. A second group of even index segments comprises second segment 4202, and fourth segment 4204. As depicted, first tuning optical waveguide 4241, second tuning optical waveguide 4242 are tuning optical waveguides for signal light 4215 and idler light 4217 traveling through the odd index segments. Second tuning optical waveguide 4242 and fourth tuning optical waveguide 4244 are tuning optical waveguides for signal light 4213 and idler light 4218 traveling through the even index segments.

Each of these groups of segments and tuning optical waveguides forms a route. As a result, two routes are present through which signal light 4215 and 4213 and idler light 4217 and 4218 travel within optical waveguide structure 4200. First route 4251 comprises odd index segments and the associated optical tuning waveguides. In this example, first route 4251 comprises first segment 4201, third segment 4203, fifth segment 4205, first tuning optical waveguide 4241, and third tuning optical waveguide 4243. A combination of first tuning optical waveguide 4241 and third tuning optical waveguide 4243 can be, for example, first set of tuning optical waveguides 2941 in FIG. 29. Second route 4252 comprises even index segments and the associated optical tuning waveguides. In this example, second route 4252 comprises second segment 4202, fourth segment 4204, second tuning optical waveguide 4242, and fourth tuning optical waveguide 4244. A combination of second tuning optical waveguide 4242 and fourth tuning optical waveguide 4244 can be, for example, second set of tuning optical waveguides 2942 in FIG. 29.

Optical waveguide structure 4200 also has tuning optical waveguides that are separate from the nonlinear optical waveguide 4209. Idler light 4217 and signal light 4215 is routed at a first wavelength selective coupler 4221 out from nonlinear optical waveguide 4209 and then is routed back into nonlinear optical waveguide 4209 at a subsequent second wavelength selective coupler. The first segment 4201 of nonlinear optical waveguide 4209 precedes the first out-coupling point, which is first wavelength selective coupler 4221. At the first out-coupling point, idler light 4217 and signal light 4215 generated by the nonlinear optical process in the first segment 4201 is diverted into first tuning optical waveguide 4241 in which phases of idler light 4217 and signal light 4215 are adjusted. At the first in-coupling point, which is second wavelength selective coupler 4222, idler light 4217 and signal light 4215 from first tuning optical waveguide 4241 are routed back into nonlinear optical waveguide 4209 and into third segment 4203. The phases of the diverted idler light and signal light are adjusted by the electrically controlled tuning performed using first phase shifter 4261 to achieve at and after the first in-coupling point a constructive nonlinear optical interaction between the first generated light from the phase tuning path and the source light, which continues to propagate in the nonlinear optical waveguide 4209. As a result, additional generated idler light 4217 and signal light 4215 will continue to be produced in the portion of nonlinear optical waveguide 4209 after the first in-coupling point. This portion of nonlinear optical waveguide 4209 is the third segment 4203.

Similarly, idler light 4218 and signal light 4213 generated in second segment 4202 of nonlinear optical waveguide 4209 can be diverted to second tuning optical waveguide 4242 separate from nonlinear optical waveguide 4209 at a second out-coupling point which is third wavelength selective coupler 4223 and then routed back into nonlinear optical waveguide 4209 at a subsequent second in-coupling point which is fourth wavelength selective coupler 4224. Second segment 4202 of the nonlinear optical waveguide 4209 precedes the second out-coupling point. At the second out-coupling point, idler light 4218 and signal light 4213 generated by the nonlinear optical process in second segment 4202 are routed into second tuning optical waveguide 4242 in which the phases of idler light 4218 and signal light 4213 are adjusted. At the second in-coupling point, idler light 4218 and signal light 4213 are coupled from the second tuning optical waveguide 4242 back into nonlinear optical waveguide 4209, into fourth segment 4204. The phases of idler light 4218 and signal light 4213 are adjusted by the electrically controlled tuning by second phase shifter 4262 to achieve at and after the second in-coupling point a constructive nonlinear optical interaction between the second generated light from second tuning optical waveguide 4242 and pump light 4212, which continues to propagate in the nonlinear optical waveguide 4209. As a result, idler light 4218 and signal light 4213 will continue to be produced in the portion of nonlinear optical waveguide 4209 after the second in-coupling point. This portion of nonlinear optical waveguide 4209 is fourth segment 4204.

Optical waveguide structure 4200 can be used in a spontaneous parametric down conversion (SPDC) process to generate both signal light 4215 and signal light 4213 both at a signal wavelength and idler light 4217 and idler light 4218 both at an idler wavelength from source light, such as pump light 4212 at a pump wavelength. Pump light 4212 is supplied to nonlinear optical waveguide 4209 from pump input coupler 4232 and continues to propagate in nonlinear optical waveguide 4209 and is not diverted into the tuning optical waveguides. The generated signal and idler light generated prior to the first out-coupling point (i.e., generated in first segment 4201) is diverted into first tuning optical waveguide 4241. Since pump light 4212 still travels in nonlinear optical waveguide 4209, additional signal light and idler light is generated in the portion of nonlinear optical waveguide 4209 between the first out-coupling point and the first in-coupling point (i.e., in second segment 4202). The generated signal and idler light generated in the second segment 4202 is diverted into second tuning optical waveguide 4242 at the second out-coupling point. Again, since the pump light still travels in the NLO waveguide, additional signal and idler is generated in the portion of nonlinear optical waveguide 4209 between the second out-coupling point and the second in-coupling point (i.e., in third segment 4203). The generated signal and idler light generated in third segment 4203 is diverted into third tuning optical waveguide 4243 at the third out-coupling point. Since the pump light still travels in nonlinear optical waveguide 4209, additional signal and idler is generated in the portion of NLO waveguide between the third out-coupling point and the third in-coupling point (i.e., in fourth segment 4204). The generated signal light and idler light generated in the fourth segment 4204 is diverted into fourth tuning optical waveguide 4244 at the fourth out-coupling point.

In this illustrative example, combiner 4280 combines signal light 4213 and signal light 4415 and also combines idler light 4218 and idler light 4417 together after the end of fifth segment 4205 to produce signal light 4214 and idler light 4216, respectively.

Pump light 4212 is removed from nonlinear optical waveguide 4209 by a pump output coupler 4233 after the fourth out-coupling point. Thus, no additional signal and idler is generated in the portion of nonlinear optical waveguide 4209 between the fourth out-coupling point and the fourth in-coupling point (i.e., in fifth segment 4205). Combiner 4280 is located at the fourth in-coupling point. This optical combiner combines the signal light 4213 and idler light 4218 from fourth tuning optical waveguide 4244 with signal light 4215 and idler light 4217 from the fifth segment 4205. Signal light 4214 and idler light 4216 produced by this optical combiner is the desired output of nonlinear optical waveguide 4209. Additional at least one of the signal output coupler or idler output coupler can be used to selectively extract at least one of the generated signal light or the generated idler light.

Thus, in segments with an odd index contribute constructively to produce even more generated light. The odd-indexed third tuning optical waveguides enable the generation of light in the odd-indexed segments to accumulate constructively from one odd-indexed segment to the next. Thus, the effective length of the nonlinear optical interaction can be equivalent to the total combined length of the multiple odd-indexed segments. Similarly, light generated in those segments with an even index can contribute constructively to produce even more generated light. The even-indexed phase tuning paths enable the generation of light in the even indexed segments to accumulate constructively from one even index segment to the next even index segment. Thus, the effective length of the nonlinear optical interaction can be equivalent to the total combined length of the multiple even indexed segments.

When the wavelengths of the idler light 4217 and idler light 4218 and the wavelength of the signal light 4215 and 4213 are sufficiently close to each other, the same wavelength selective coupler can couple both the idler light and the signal light from a nonlinear optical waveguide segment to a tuning optical waveguide. Likewise, the same wavelength selective coupler can couple both the idler light and the signal light from a tuning optical waveguide to a nonlinear optical waveguide segment. Furthermore, the same phase shifter can shift the phase of the idler light and the phase of the signal light such that a desired phase walk-off is achieved. However, when the wavelength of the idler light and the signal light are not sufficiently close together, different wavelength selective coupler must be used to couple the signal light and to couple the idler light. Furthermore, different phase shifters must be used to adjust the phases of the signal light and of the idler light.

Figure 43:
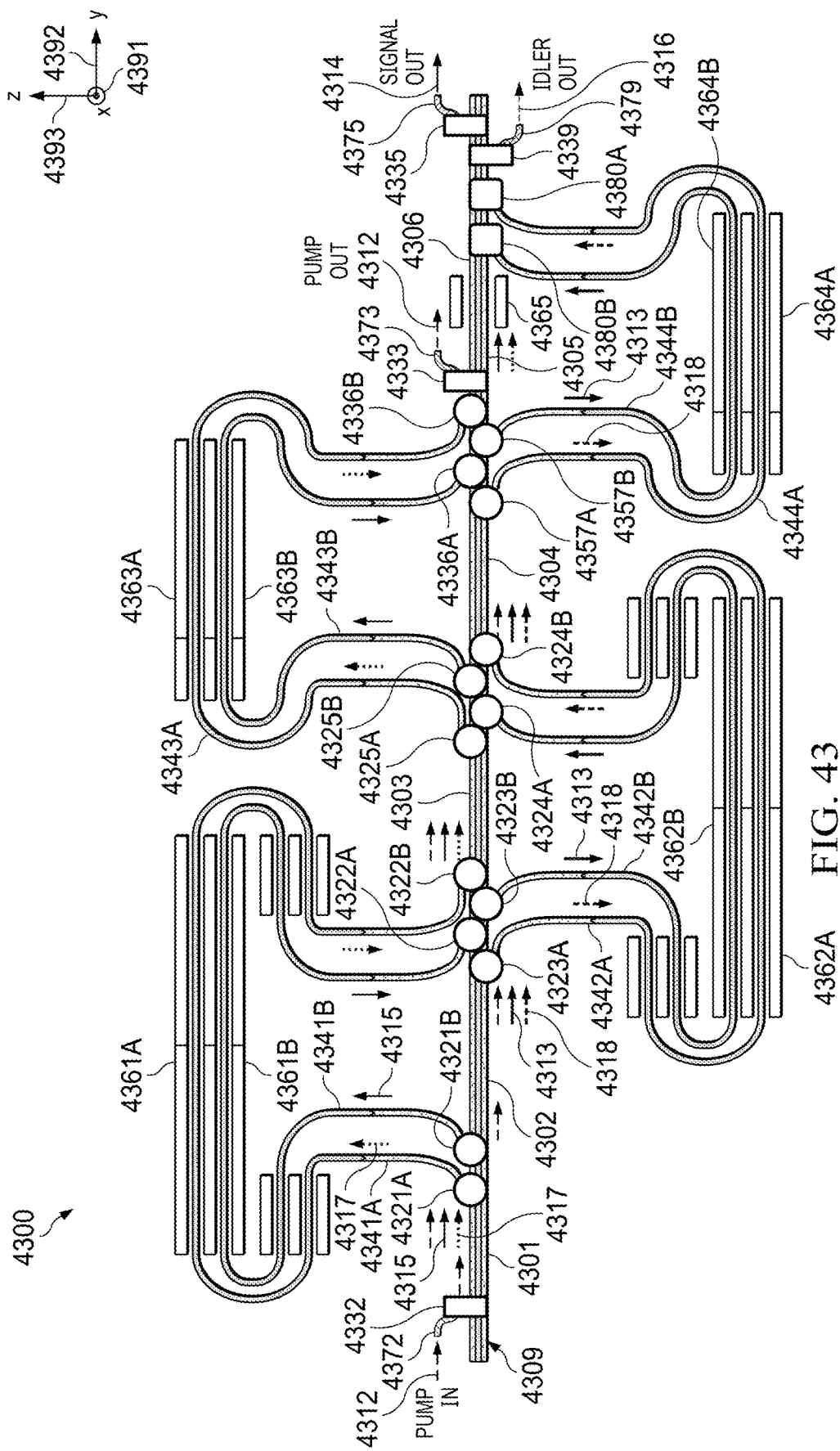
FIG. 43 is an illustration of an optical waveguide structure with separate tuning optical waveguides for signal light and for idler light in accordance with an illustrative embodiment.

With reference now to FIG. 43, an illustration of a nonlinear optical waveguide structure with separate tuning optical waveguides for signal light and for idler light is depicted in accordance with an illustrative embodiment. In this example, signal light 4314 and idler light 4316 can travel through optical waveguide structure 4300, using separate tuning optical waveguides. Optical waveguide structure 4300 may be especially useful for a nonlinear optical process such as spontaneous parametric down conversion (SPDC) in which both signal light 4314 and idler light 4316 are generated from source light comprising pump light 4312.

As depicted, optical waveguide structure 4300 comprises nonlinear optical waveguide 4309, first idler tuning optical waveguide 4341A, first signal tuning optical waveguide 4341B, second idler tuning optical waveguide 4342A, second signal tuning optical waveguide 4342B, third idler tuning optical waveguide 4343A, third signal tuning optical waveguide 4343B, fourth idler tuning optical waveguide 4344A, fourth signal tuning optical waveguide 4344B, first idler out wavelength selective coupler 4321A, first signal out wavelength selective coupler 4321B, second idler in second idler wavelength selective coupler 4322A, second signal in second signal wavelength selective coupler 4322B, third idler out wavelength selective coupler 4323A, third signal out wavelength selective coupler 4323B, fourth idler in wavelength selective coupler 4324A, fourth signal in fourth signal wavelength selective coupler 4324B, fifth idler out wavelength selective coupler 4325A, fifth signal out wavelength selective coupler 4325B, sixth idler in wavelength selective coupler 4336A, sixth signal in wavelength selective coupler 4336B, seventh idler out wavelength selective coupler 4357A, seventh signal out wavelength selective coupler 4357B, idler combiner 4380A, signal combiner 4380B, pump input waveguide 4372, pump output waveguide 4373, signal output waveguide 4375, idler output waveguide 4379, pump input coupler 4332, pump output coupler 4333, signal output coupler 4335, idler output coupler 4339, first idler phase shifter 4361A, first signal phase shifter 4361B, second idler phase shifter 4362A, second signal phase shifter 4362B, third idler phase shifter 4363A, third signal phase shifter 4363B, fourth idler phase shifter 4364A, fourth signal phase shifter 4364B, and optional fifth phase shifter 4365.

In this illustrative example, nonlinear optical waveguide 4309, has nonlinear optical waveguide segments. As depicted, these nonlinear optical waveguide segments are first segment 4301, second segment 4302, third segment 4303, fourth segment 4304, fifth segment 4305, and an optional output segment 4306.

In this example, pump input coupler 4332 couples pump light 4312 introduced through pump input waveguide 4372 to first segment 4301. Pump output coupler 4333 couples pump light 4312 from fourth segment 4304 to pump output waveguide 4373 so that no pump light 4312 travels through fifth segment 4305. Signal output coupler 4335 couples signal light 4314 from optional output segment 4306 to signal output waveguide 4375. Idler output coupler 4339 couples idler light 4316 from optional output segment 4306 to idler output waveguide 4379.

As depicted, nonlinear optical waveguide 4309 and other components are formed on a yz plane defined by z-axis 4393 and y-axis 4392 in which an x-axis 4391 is perpendicular to the plane. In an illustrative example, the nonlinear optical waveguides can be fabricated from a nonlinear optical material such as x-cut lithium niobate. In this example, x-axis 4391 of the nonlinear optical material is perpendicular to the yz plane of the structure of nonlinear optical waveguide 4309 and the other components.

In this illustrative example, idler light 4317 and 4318 and signal light 4315 and signal light 4313 are generated in the different segments in nonlinear optical waveguide 4309. The generated idler light and signal light are obtained from the output end of nonlinear optical waveguide 4309 in optical waveguide structure 4300.

Also, separate sets of wavelength selective couplers extract idler light and signal light from nonlinear optical waveguide segments into separate tuning optical waveguides and reinsert the idler light and signal light in the separate tuning optical waveguides back into the nonlinear optical waveguide segments. In other words, both idler light and signal travel in routes formed by the odd index segments and the even index segments but the phase tuning is performed separately for idler light and signal light by the phase shifters associated with the tuning optical waveguides through which idler light and signal light are travelling separately.

The portion of nonlinear optical waveguide 4309 between the pump input coupler 4332 and first idler out wavelength selective coupler 4321A defines first segment 4301. Idler light 4317 generated in first segment 4301 is diverted into first idler tuning optical waveguide 4341A by the first idler out wavelength selective coupler 4321A. This wavelength selective coupler diverts idler light 4317 into first idler tuning optical waveguide 4341A and couples pump light 4312 and signal light 4314 to first signal out wavelength selective coupler 4321B. Signal light 4315 generated in first segment 4301 is diverted into first signal tuning optical waveguide 4341B by the first signal out wavelength selective coupler 4321B. This wavelength selective coupler diverts signal light 4315 into first signal tuning optical waveguide 4341B but couples pump light 4312 into second segment 4302 in nonlinear optical waveguide 4309.

Thus, idler light 4317 and signal light 4315 are coupled from first segment 4301 into separate tuning waveguides to be re-inserted into third segment 4303. This process is repeated for each odd index segment with separate tuning optical waveguides for idler light 4317 and signal light 4315.

In an illustrative implementation of optical waveguide structure 4300, such as depicted in signal light 4214 and idler light 4216, idler light 4317 has a longer wavelength than signal light 4315. Both idler light 4317 and signal light 4315 propagate as the fundamental mode in nonlinear optical waveguide 4309. For the example, an idler out wavelength selective coupler, such as first idler out wavelength selective coupler 4321A, is located immediately before a signal out wavelength selective coupler, such as first signal out wavelength selective coupler 4321B. Also, a signal in wavelength selective coupler, such as second signal wavelength selective coupler 4322B, is located immediately before an idler in wavelength selective coupler, such as second idler wavelength selective coupler 4322A. However, other arrangements of the out wavelength selective couplers and in wavelength selective couplers for idler light 4317 and signal light 4315 can be used in other implementations.

For a given tuning optical waveguide in optical waveguide structure 4300, the phase shifters for signal light 4315 can be controlled separately from the phase shifters for idler light 4317 with the depicted configuration using separate tuning optical waveguides and phase shifters for idler light 4317 and signal light 4315. Thus, the phase of the signal light re-inserted into the subsequent segment, such as third segment 4303, in nonlinear optical waveguide 4309 can be adjusted to have that signal light interact constructively to produce additional signal light newly generated in that segment. The phase of the idler light re-inserted into the subsequent segment, such as third segment 4303, can be adjusted to have that idler light interact constructively to produce additional idler light newly generated in that segment.

As further depicted in FIG. 43, the portion of nonlinear optical waveguide 4309 between first signal out wavelength selective coupler 4321B and third idler out wavelength selective coupler 4323A defines second segment 4302. Idler light 4318 generated in second segment 4302 is diverted into second idler tuning optical waveguide 4342A by the third idler out wavelength selective coupler 4323A. This wavelength selective coupler diverts idler light 4318 into second idler tuning optical waveguide 4342A and couples pump light 4312 and signal light 4314 to third signal out wavelength selective coupler 4323B. Signal light 4313 generated in second segment 4302 is diverted into second signal tuning optical waveguide 4342B by the third signal out wavelength selective coupler 4323B. This wavelength selective coupler diverts signal light 4313 into second signal tuning optical waveguide 4342B but couples pump light 4312 into third segment 4303 in nonlinear optical waveguide 4309.

Thus, idler light 4318 and signal light 4313 are coupled from second segment 4302 into separate tuning waveguides and to be re-inserted into fourth segment 4304. This process is repeated for each even index segment with separate tuning optical waveguides for idler light 4318 and signal light 4313.

As depicted in this illustrative implementation, idler light 4318 has a longer wavelength than signal light 4313. Both idler light 4318 and signal light 4313 propagate as the fundamental mode in nonlinear optical waveguide 4309. For the example, an idler out wavelength selective coupler, such as third idler out wavelength selective coupler 4323A, is located immediately before a signal out wavelength selective coupler, such as third signal wavelength selective coupler 4323B. Also, a signal in wavelength selective coupler, such as fourth signal wavelength selective coupler 4324B, is located immediately before an idler in wavelength selective coupler, such as fourth idler wavelength selective coupler 4324A. However, other arrangements of the out wavelength selective couplers and in wavelength selective couplers for idler light 4318 and signal light 4313 can be used in other implementations.

For a given tuning optical waveguide in optical waveguide structure 4300, the phase shifters for signal light 4313 can be controlled separately from the phase shifters for idler light 4318 with the depicted configuration using separate tuning optical waveguides and phase shifters for idler light 4318 and signal light 4313. Thus, the phase of the signal light re-inserted into the subsequent segment, such as fourth segment 4304, in nonlinear optical waveguide 4309 can be adjusted to have that signal light interact constructively to produce additional signal light newly generated in that segment. The phase of the idler light re-inserted into the subsequent segment, such as fourth segment 4304, can be adjusted to have that idler light interact constructively to produce additional idler light newly generated in that segment.

In optical waveguide structure 4300, the adjustment of the idler phase for idler light 4317 or idler light 4318 can be controlled separately from the adjustment of the signal phase for signal light 4315 or signal light 4313. The tuning optical waveguides in the output portion of optical waveguide structure 4300, such as third idler tuning optical waveguides 4343A and third signal tuning optical waveguide 4343B as well as fourth idler tuning optical waveguides 4344A and fourth signal tuning optical waveguide 4344B have separate phase shifters for signal light 4315 and for idler light 4317 traveling separately though those tuning optical waveguides, 4343A and 4343B, and also have separate phase shifters for signal light 4313 and for idler light 4318 traveling separately through fourth idler tuning optical waveguides 4344A and fourth signal tuning optical waveguide 4344B. Thus, the phases of signal light 4315 and signal light 4313 in the two routes can be adjusted to achieve constructive interference at signal combiner 4380B. Also, the phases of idler light 4317 and 4318 in the two routes can be adjusted separately to achieve constructive interference at idler combiner 4380A.

The material used to fabricate optical waveguide structure 4300 can result in constraints on the lengths of the segments and the phase shifters associated with tuning optical waveguides. For example, materials such as x-cut lithium niobate for which the electro optical effect and the nonlinear optical coefficient is much stronger for TE polarized light traveling in a particular direction with respect to the crystal axes of the material result in constraints such as the phase shifters and nonlinear optical waveguide 4309 needing to be aligned parallel with each other and with the nonlinear optical waveguide 4309 aligned parallel to the material y-axis 4392. With phase shifters used in the examples such as the optical waveguide structures depicted in FIG. 35, FIG. 38, FIG. 39, FIG. 42 and FIG. 43, the phase shifters and the nonlinear optical waveguides are aligned parallel to the Y-axis of the exemplary lithium niobate nonlinear optical material. For these examples, the tuning optical waveguides for one group of segments (e.g., odd index) are located on one side of the nonlinear optical waveguide, such as nonlinear optical waveguide 4309, and the tuning optical waveguides of the other group segments (e.g., even index segments) are located on the other side of nonlinear optical waveguide. Such an arrangement provides more space for longer phase shifters that use materials in which both the electro optical (EO) effect and the nonlinear optical (NLO) coefficient are much stronger for TE polarized light traveling in a particular direction with respect to the crystal axes of the material, such that the phase shifters are preferably oriented parallel to the nonlinear optical waveguide.

Thus, the illustrative examples described in FIGS. 34 through 43 describe optical waveguide structures that have tuning optical waveguides that can be used to adjust the phase of light traveling through those tuning optical waveguides. In these examples, phase shifters are used to adjust the phase of light traveling through the tuning optical waveguides to obtain desired generation of light within the different optical waveguide structures.

Optical waveguide structure 4300 can be compared with optical waveguide structure 3400. Optical waveguide structure 3400 has one group of nonlinear optical waveguide segments and has separate tuning optical waveguides for the idler light and the signal light generated in each segment of the nonlinear optical waveguide. For the idler light and separately for the signal light in optical waveguide structure 3400, the same wavelength selective coupler, rather than two separate couplers, performs the extraction from a nonlinear optical waveguide segment into a tuning optical waveguide and the insertion from that tuning optical waveguide back into another nonlinear optical waveguide segment. Since only one group of segments is present in the example of FIG. 34, optical waveguide structure 3400 does not need to have a combiner located near the output of that structure, which can be used to combine the generated light from an odd index group and an even index group of segments. In contrast, optical waveguide structure 4300 has two groups of nonlinear optical waveguide segments that are arranged into an odd index group and an even index group. Furthermore, for the idler light in each group, and separately for the signal light in each group, a wavelength selective coupler is used to out couple the idler light (or the signal light) from a nonlinear optical waveguide segment to a tuning optical waveguide for the idler light (or for the signal light); and a different wavelength selective coupler is used to in couple the idler light (or the signal light) back from the tuning optical waveguide into another nonlinear optical waveguide segment. The presence of two different groups of nonlinear optical waveguide segments that generate different components of idler light (or signal light) is addressed by the combiner that combines those two components of idler light (or signal light). The maximum overall interaction distance for nonlinear optical generation is given by the total length of the segments in a group. Thus, if both optical waveguide structure 3400 and optical waveguide structure 4300 have 7 nonlinear optical waveguide segments each of 1 mm length, for example, and if both structures achieve the desired optimal phase walk-off at the start of each segment, optical waveguide structure 3400 could have higher nonlinear optical generation efficiency than optical waveguide structure 4300.

Figure 44:
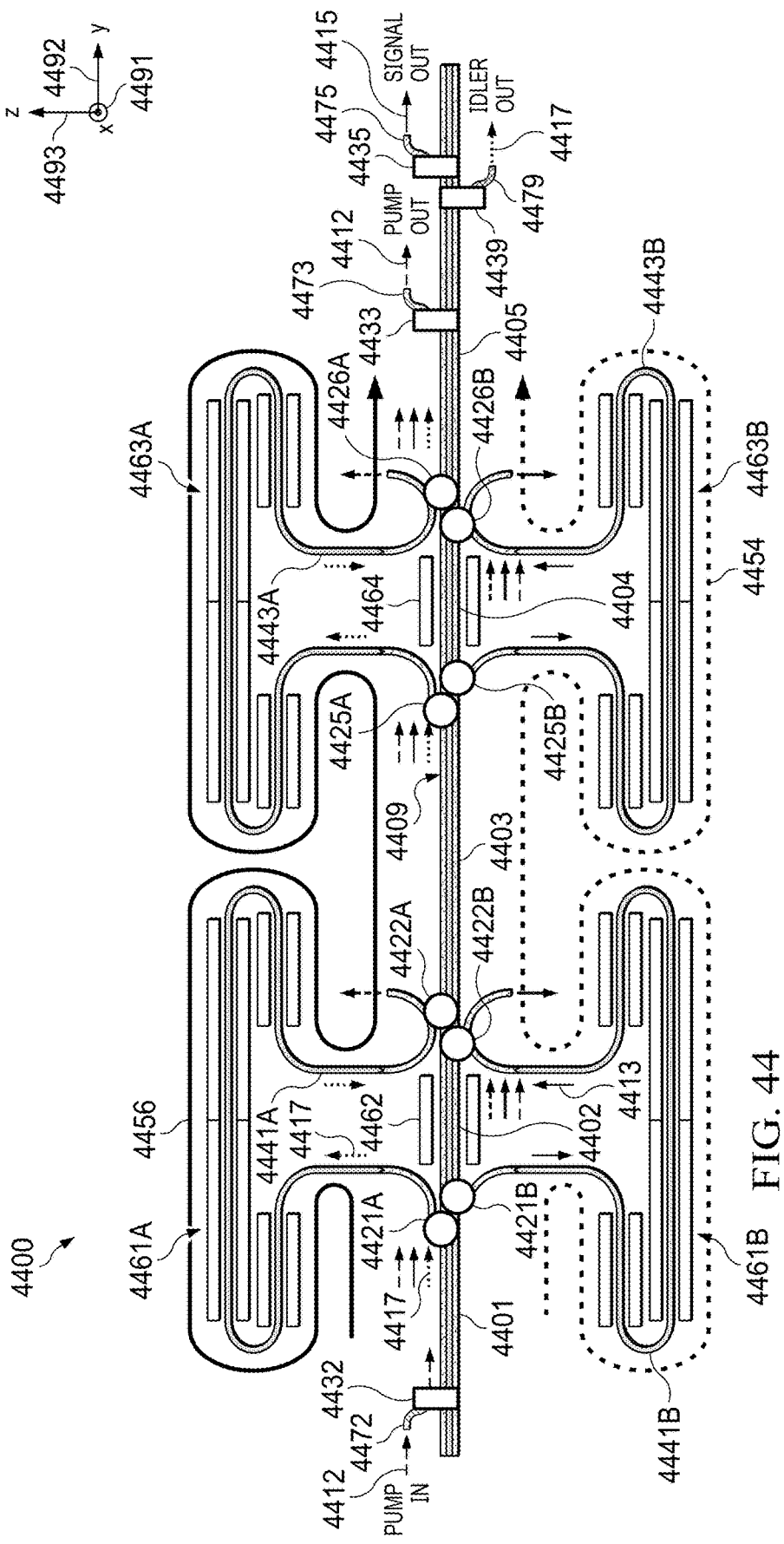
FIG. 44 is an illustration of an optical waveguide structure with two groups of segments in which one group of the segments is associated with tuning optical waveguides in accordance with an illustrative embodiment.

With reference to FIG. 44, an illustration of a nonlinear optical waveguide with two groups of segments in which only one group of segments is associated with tuning optical waveguides is depicted in accordance with an illustrative embodiment. In this illustrative example, optical waveguide structure 4400 is an open-ended nonlinear optical waveguide structure.

In this example, optical waveguide structure 4400 comprises a number of different components. As depicted, optical waveguide structure 4400 comprises nonlinear optical waveguide 4409, first idler tuning optical waveguide 4441A, first signal tuning optical waveguide 4441B, third idler tuning optical waveguide 4443A, third signal tuning optical waveguide 4443B, first idler out wavelength selective coupler 4421A, second idler in wavelength selective coupler 4422A, first signal out wavelength selective coupler 4421B, second signal in wavelength selective coupler 4422B, fifth idler out wavelength selective coupler 4425A, sixth idler in wavelength selective coupler 4426A, fifth signal out wavelength selective coupler 4425B, sixth signal in wavelength selective coupler 4426B, pump input waveguide 4472, pump output waveguide 4473, signal output waveguide 4475, idler output waveguide 4479, pump input coupler 4432, pump output coupler 4433, signal output coupler 4435, idler output coupler 4439, first idler phase shifter 4461A, first signal phase shifter 4461B, third idler phase shifter 4463A, and third signal phase shifter 4463B.

In this illustrative example, nonlinear optical waveguide 4409, has nonlinear optical waveguide segments. As depicted, these nonlinear optical waveguide segments are first segment 4401, second segment 4402, third segment 4403, fourth segment 4404, and fifth segment 4405.

As depicted, nonlinear optical waveguide 4409 and other components are formed on a yz plane defined by z-axis 4493 and y-axis 4492 in which an x-axis 4491 perpendicular to the plane. In an illustrative example, nonlinear optical waveguides can be fabricated from a nonlinear optical material such as x-cut lithium niobate. In this example, the x-axis of the nonlinear optical material is perpendicular to the yz plane of the structure of nonlinear optical waveguide 4409 and the other components.

In this example, pump input coupler 4432 couples pump light 4412 introduced through pump input waveguide 4472 to first segment 4401. Pump output coupler 4433 couples pump light 4412 from fifth segment 4405 to pump output waveguide 4473. Signal input coupler couples signal light 4415 introduced through signal input waveguide to first segment 4401. Signal output coupler 4435 couples signal light 4415 from fifth segment 4405 to signal output waveguide 4475. Idler output coupler 4439 couples idler light 4417 from fifth segment 4405 to idler output waveguide 4479.

In this illustrative example, first idler out wavelength selective coupler 4421A extracts idler light 4417 from first segment 4401 into first idler tuning optical waveguide 4441A. Second idler in wavelength selective coupler 4422A reinserts idler light 4417 into third segment 4403 after activations have been applied using first idler phase shifter 4461A associated with first idler tuning optical waveguide 4441A. Each phase shifter is comprised of three pairs of electrodes in this example. First signal out wavelength selective coupler 4421B extracts signal light 4415 from first segment 4401 into first signal tuning optical waveguide 4441B and second signal in wavelength selective coupler 4422B reinserts signal light 4415 into third segment 4403 after activations have been applied using first signal phase shifter 4461B associated with first signal tuning optical waveguide 4441B.

In this illustrative example, third idler out wavelength selective coupler 4425A extracts idler light 4417 from third segment 4403 into third idler tuning optical waveguide 4443A. Sixth idler in wavelength selective coupler 4426A reinserts idler light 4417 into fifth segment 4405 after activations have been applied using third idler phase shifter 4463A associated with third idler tuning optical waveguide 4443A. Fifth signal out wavelength selective coupler 4425B extracts signal light 4415 from third segment 4403 into third signal tuning optical waveguide 4443B, and sixth signal in wavelength selective coupler 4426B reinserts signal light 4415 into fifth segment 4405 after activations have been applied using third signal phase shifter 4463B associated with third signal tuning optical waveguide 4443B.

In this example, even index segments are second segment 4402 and fourth segment 4404. Odd index segments are first segment 4401, third segment 4403, and fifth segment 4405. The even index segments are not associated with a tuning optical waveguide. In this example, odd index segments are associated with tuning optical waveguides.

Further, separate tuning optical waveguides are present for idler light 4417 and for signal light 4415. In other words, each tuning optical waveguide is used for tuning either idler light 4417 or signal light 4415 in this example.

Each of these groups of segments and tuning optical waveguides forms a route. As a result, idler route 4456 is present through which idler light 4417 travels within optical waveguide structure 4400. Idler route 4456 comprises odd index segments, first segment 4401, third segment 4403 and fifth segment 4405, and the associated idler tuning optical waveguides, first idler tuning optical waveguide 4441A and third idler tuning optical waveguide 4443A for idler light 4417. Signal route 4454 comprises odd index segments, first segment 4401, third segment 4403 and fifth segment 4405, and the associated signal tuning optical waveguides, first signal tuning optical waveguide 4441B and third signal tuning optical waveguide 4443B, for signal light 4415.

In optical waveguide structure 4400, each tuning optical waveguide for idler light 4417 begins at an idler out wavelength selective coupler located at the end of the associated odd index segment. This wavelength selective coupler is designed to selectively couple idler light 4417 out of the odd index segment into a tuning optical waveguide. Each tuning optical waveguide for idler light 4417 ends at an idler in wavelength selective coupler located at the end of the even index segment that follows immediately after the associated odd index segment. This wavelength selective coupler is designed to selectively couple idler light 4417 out of the tuning optical waveguide and reinsert this light into the next odd index segment.

Each tuning optical waveguide for signal light 4415 begins at a signal out wavelength selective coupler located at the end of the associated odd index segment. Each tuning optical waveguide for signal light 4415 ends at a signal in wavelength selective coupler located at the end of the even index segment that follows immediately after the associated odd index segment. For this example, the idler out wavelength selective coupler is located immediately before the signal out wavelength selective coupler. Also, the idler in wavelength selective coupler is located immediately after the signal in wavelength selective coupler.

In the example of optical waveguide structure 4400, idler light 4417 is generated from nonlinear optical interaction occurring in odd index segments such as first segment 4401 and third segment 4403. Signal light 4415 is generated from nonlinear optical interaction occurring in odd index segments such as first segment 4401 and third segment 4403.

Besides the light generated in the odd index segments, idler light 4418 can be generated in even index segments such as second segment 4402 and fourth segment 4404. Also, signal light 4413 can be generated from nonlinear optical interaction occurring in odd index segments such as first segment 4401 and third segment 4403.

Optical waveguide structure 4400 uses the idler in wavelength selective coupler at the end of each tuning optical waveguide to also couple out and remove idler light 4418 that is generated in the immediately preceding even index segment. This removal of idler light 4418 generated in the even index segments prevents idler light 4418 generated in the even index segments from interfering destructively with idler light 4417 coupled into next odd index segment and also from interacting destructively to reduce or reverse the generation of idler light 4417 in the next odd index segment.

Similarly, the signal in wavelength selective coupler at the end of each tuning optical waveguide also couples out and removes signal light 4413 that is generated in the even index segment. This removal of signal light 4413 generated in the even index segments prevents those generated signal light from interfering destructively with signal light 4415 coupled into the next odd index waveguide segment and also from interacting destructively to reduce or reverse the generation of signal light 4415 in the next odd index segment.

In optical waveguide structure 4400, the length of each segment prior to a tuning optical waveguide can be selected to be sufficiently small that the magnitude of the phase walk-off resulting from anticipated fabrication and operational tolerances of optical waveguide structure 4400 is no greater than $\pi$ radians. The phase shifters in a tuning optical waveguide can be configured to have an applicable length sufficiently large to achieve an electrically controlled phase shift of $\pm\pi$ radians. The overall length of a tuning optical waveguide for idler light 4417 is selected to achieve a relative phase shift that is 0 or a multiple of $2\pi$ radians between idler light 4417 coupled out of the tuning optical waveguide path and the newly generated idler light in the subsequent segment. Similarly, the overall length of a tuning optical waveguide for signal light 4415 can be selected to achieve a relative phase shift that is 0 or a multiple of $2\pi$ radians between signal light 4415 coupled out of the tuning optical waveguide and the newly generated signal light in the subsequent segment.

The optical waveguide structure 4400 can be used to implement a parametric down conversion process, such as difference frequency generation or even spontaneous parametric down conversion, or to implement a parametric up conversion process, such as sum frequency generation and second harmonic generation. Consider, for example, a second order nonlinear optical parametric down conversion process that generates idler light from pump light and signal light supplied to the optical waveguide structure. The idler-wave amplitude $M_i$ of the idler light 4417 in third segment 4403 can be described by $$M_i(y = E_3) \approx \frac{2id_{33}\omega_i}{n_i c} M_p M_s \int_{S_1}^{E_3} \exp(i(\Phi_{S1} + \Delta ky)) dy \approx \tag{1}$$

$$M_i(S_3) + \frac{2id_{33}\omega_i}{n_i c} M_p M_s \left( \frac{-i \times \exp(i\Phi_{S3} + i\Delta k L_{S3E3}) + i \times \exp(i\Phi_{S3})}{\Delta k} \right)$$

These approximate expressions assume there is negligible change in the amplitudes of the source pump light $M_p$ and source signal light $M_s$, and that only the amplitude of the idler light changes as a result of the nonlinear optical interaction. The generation of the idler light over the length of third segment 4403 considers the nonlinear interactions that occur from the starting point S1 of first segment 4401 to the ending point E3 of the third segment 4403. Since for this example, we assume the source pump light and source signal light are supplied to the nonlinear optical waveguide 4409 at the starting point S1 of the first segment. Thus, we can set the phase walk-off $\phi_{s1}$ of the nonlinear optical process at starting point S1 to zero. In many cases, the phase matching in a nonlinear optical waveguide segment, such as third segment 4403, is not perfect. Thus, there is a non-zero wave-vector mismatch $\Delta k = k_p \pm k_s - k_i$ between the wave vectors for the pump light $k_p$ and signal light $k_s$ and the wave vector for the generated idler light $k_i$ in a nonlinear optical waveguide segment. The expression for the wave-vector mismatch has a plus sign for an up-conversion, sum-frequency generation process and has a minus sign for a down-conversion, difference-frequency generation process. In an illustrative example, the length of a nonlinear optical waveguide segment, such as from a starting point S3 to an ending point E3 of third segment 4403 with length $L_{S3E3}$, is chosen such that the phase walk-off for that segment, $\Delta k L_{S3E3}$, has a value between zero and $\pi$ radians.

In an illustrative example, the generation of additional idler light in third segment 4403 can build upon the generation of idler light in first segment 4401. This dependence on the idler light from first segment 4401 is shown in Expression 1 above. The term $M_i(S_3)$ represents the amplitude of the idler wave at the starting point of third segment 4403. To fully benefit from the idler light generated in a preceding segment of nonlinear optical waveguide and thus to have the generation of additional idler light in third segment 4403 be constructive with the generation of idler light in first segment 4401, it is desirable to have the phase walk-off $\phi_{S3}$ at the starting point of third segment 4403 equal zero or an even multiple of n radians (or a multiple of $2\pi$ radians). The phase walk-off at the starting point of third segment 4403 is given by:

$$\Phi_{S3} \approx (k_p - k_i - k_s)L_{S1E1} + k_{p2}L_{S2E2} + \Delta\phi_{p2} - k_{sT}L_{T1s} - \Delta\phi_{sT1} - k_{iT}L_{T1i} - \Delta\phi_{iT1} \quad (2)$$

Expression 2 is approximate and neglects the phase shifts for the pump light, signal light and idler light that may result from the wavelength selective couplers. Expression 2 illustrates that the phase walk-off at the starting point of third segment 4403 depends on the phase walk-off obtained at the ending point of first segment 4401, as described by $\Phi_{E1} = (k_p - k_i - k_s)L_{S1E1}$, assuming a down-conversion process. The pump light 4412 travels with wave vector $k_{p2}$ through length $L_{S2E2}$ of second segment 4402. The signal light 4415 travels with wave vector $k_{sT}$ through length $L_{T1s}$ of first signal tuning optical waveguide 4441B. The idler light 4417 from first segment 4401 travels with wave vector $k_{iT}$ through length $L_{T1i}$ of first idler tuning optical waveguide 4441A.

Phase shifter 4462 can apply an activation that produces a phase shift of $\Delta\phi_{p1}$ to the pump light; phase shifter 4464 can apply an activation that produces a phase shift of $\Delta\phi_{p2}$ to the pump light; first signal phase shifter 4461B can apply an activation that produces a phase shift of $\Delta\phi_{sT1}$ to the signal light; and first idler phase shifter 4461A can apply an activation that produces a phase shift of $\Delta\phi_{iT1}$ to the idler light. For optical waveguide structure 4400, the pump light, signal light, and idler light are affected by different phase shifters. Thus, it is possible to apply electro-optic activations to those phase shifters such that the phase shift of the pump light has an opposite sign from the phase shift for the idler light. This form of push-pull control would not be possible if the same phase shifter were to apply an activation that affects both the pump light and the idler light, for example.

In this example, a pump-inserting coupler, pump input coupler 4432, is located at the start of first segment 4401 and the location of this coupler defines the start of the nonlinear optical interaction. A pump-extracting coupler, signal output coupler 4435, is located at the end of the final segment, fifth segment 4405, and the location of this coupler defines the end of the nonlinear optical interaction in this open-ended nonlinear optical waveguide structure. An idler output coupler can be located subsequent to the pump-extracting coupler to extract the generated idler light from the NLO waveguide. Similarly, a signal output coupler can be located subsequent to the pump-extracting coupler to extract the generated signal light from the nonlinear optical waveguide.

In the different illustrative examples in FIGS. 34 through 44, the phase shifters are implemented as electro optical phase shifters in which the electrodes for a phase shifter are constructed using electro-optical material. The use of electro optical phase shifters is not meant to limit the manner in which other illustrative examples can be implemented. For example, in another illustrative example the phase shifters can be implemented using thermal phase shifters in which the electrodes apply activation in the form of heat.

The selection of the type electrodes and the configuration of the electrodes for phase shifters can be based on the type of material used for the substrate in which the optical waveguide structure is fabricated. For example, when the substrate is an x-cut material and the electrodes for the optical electrical phase shifters, at least one of folds or overlaps can be used such that the electrodes are aligned to a y-axis on a plane formed by the Y axis and z-axis. This alignment increases the effectiveness of activations applied by the electrodes to the tuning optical waveguides when electro-optical materials used to form the electrodes. Electro optical phase shifters at a faster response and can more quickly control the phase in a tuning electrode as compared to thermal phase shifters. In other words, electro optical phase shifters can provide a faster response time for controlling the phase of light as compared to using other types of phase shifters such as thermal phase shifters.

In another example, when thermal phase shifters are used, this type of alignment is unnecessary. As result, folds and overlaps may not be needed. The use of thermal phase shifters can allow for less constraints with respect to the positioning and design of phase shifters and tuning optical waveguides. However, the use of temperature as an activation applied by thermal phase shifters has a slower response time for controlling the phase of light traveling through the tuning optical waveguide.

Some features of the illustrative examples are described in the following clauses. These clauses are examples of features and are not intended to limit other illustrative examples.

Clause 1

An optical waveguide structure comprising:
    a nonlinear optical waveguide;
    a set of tuning optical waveguides;
    a set of wavelength selective couplers that couples light between the nonlinear optical waveguide and a tuning optical waveguide based on a wavelength of light; and
    a set of phase shifters located along one or more tuning optical waveguides in the set of tuning optical waveguides.

Clause 2

The optical waveguide structure according to clause 1, wherein the light comprises a first wavelength light and a second wavelength light produced from the first wavelength light through a nonlinear optical interaction occurring within the nonlinear optical waveguide; the optical waveguide structure further comprising:
- a first segment in the nonlinear optical waveguide;
- a second segment in the nonlinear optical waveguide;
- a wavelength selective coupler in the set of wavelength selective couplers that couples the first wavelength light from the first segment into the second segment, wherein the wavelength selective coupler couples the second wavelength light from the first segment into the tuning optical waveguide; and
- a phase shifter in the set of phase shifters that applies an activation to the tuning optical waveguide to change a phase shift for the second wavelength light in the tuning optical waveguide.

Clause 3

The optical waveguide structure according to clause 2, wherein the second wavelength light in the tuning optical waveguide is coupled from the tuning optical waveguide to the second segment by the wavelength selective coupler.

Clause 4

The optical waveguide structure according to clause 3, wherein the phase shifter in the set of phase shifters applies the activation to the tuning optical waveguide to change the phase shift for the second wavelength light in the tuning optical waveguide such that a phase walk-off for the nonlinear optical interaction in the nonlinear optical waveguide from a starting point where the first wavelength light is supplied to the first segment to a junction between the wavelength selective coupler and the second segment is zero or an even multiple of $\pi$ radians.

Clause 5

The optical waveguide structure according to one of clauses 2, 3, or 4, wherein the wavelength selective coupler is a first wavelength selective coupler and the optical waveguide structure further comprises:
- a third segment in the nonlinear optical waveguide; and
- a second wavelength selective coupler in the set of wavelength selective couplers, wherein the second wavelength selective coupler in the set of wavelength selective couplers couples first wavelength light from the second segment into the third segment.

Clause 6

The optical waveguide structure according to clause 5, wherein the second wavelength light in the tuning optical waveguide is coupled from the tuning optical waveguide to the third segment by the second wavelength selective coupler.

Clause 7

The optical waveguide structure according to clause 6, wherein the phase shifter in the set of phase shifters applies the activation to the tuning optical waveguide to change the phase shift for the second wavelength light in the tuning optical waveguide such that a phase walk-off for the nonlinear optical interaction in the nonlinear optical waveguide from a starting point where the first wavelength light is supplied to the first segment to a junction between the second wavelength selective coupler and the third segment is zero or an even multiple of $\pi$ radians.

Clause 8

The optical waveguide structure according to one of clauses 5, 6, or 7 wherein the tuning optical waveguide is a first tuning optical waveguide and the phase shifter in the set of phase shifters is a first phase shifter; the optical waveguide structure further comprising:
- a second tuning optical waveguide;
- a second phase shifter in the set of phase shifters located along the second tuning optical waveguide; and
- a third wavelength selective coupler in the set of wavelength selective couplers that couples first wavelength light from the second segment into the third segment and couples second wavelength light from the second segment into the second tuning optical waveguide.

Clause 9

The optical waveguide structure according to clause 8 further comprising:
- a fourth segment in the nonlinear optical waveguide; and
- a fourth wavelength selective coupler in the set of wavelength selective couplers that couples second wavelength light from the second tuning optical waveguide into the fourth segment, wherein the fourth wavelength selective coupler couples the first wavelength light from the third segment into the fourth segment.

Clause 10

The optical waveguide structure according to clause 9, wherein the second phase shifter applies an activation to the second tuning optical waveguide to change a phase shift for the second wavelength light in the second tuning optical waveguide such that a phase walk-off for the nonlinear optical interaction in the nonlinear optical waveguide from a first junction between the first wavelength selective coupler and the second segment to a second junction between the fourth wavelength selective coupler and the fourth segment is zero or an even multiple of $\pi$ radians.

Clause 11

The optical waveguide structure according to clause 9 further comprising:
- a third tuning optical waveguide;
- a fifth wavelength selective coupler in the set of wavelength selective couplers that couples second wavelength light from the third segment into the third tuning optical waveguide and couples first wavelength light from the third segment into the fourth segment; and
- a sixth wavelength selective coupler in the set of wavelength selective couplers that couples second wavelength light from the third tuning optical waveguide into a fifth segment and couples first wavelength light from the fourth segment into the fifth segment.

Clause 12

The optical waveguide structure according to clause 11, further comprising:
- a third phase shifter in the set of phase shifters located along the third tuning optical waveguide, wherein the third phase shifter applies an activation to the third tuning optical waveguide to change a phase shift for the second wavelength light in the third tuning optical waveguide such that a phase walk-off for the nonlinear optical interaction in the nonlinear optical waveguide from a third junction between the second wavelength selective coupler and the third segment to a fourth junction between the sixth wavelength selective coupler and the fifth segment is zero or an even multiple of $\pi$ radians.

Clause 13

The optical waveguide structure according to one of clauses 2, 3, 4, 5, 6, 7, 8, 9, 10, 11, or 12 further comprising:
- a phase shifter located along a segment in the nonlinear optical waveguide, wherein the phase shifter located along the segment in the nonlinear optical waveguide applies an activation to the segment to change a phase shift for the first wavelength light in the segment, and wherein the phase shift for the first wavelength light in the segment resulting from the activation applied to the segment has an opposite sign from the phase shift for the second wavelength light resulting from the activation applied to the tuning optical waveguide.

Clause 14

The optical waveguide structure according to one of clauses 9, 10, 11, 12, or 13 further comprising:

a combiner that combines the second wavelength light from the first segment and the second wavelength light from the second segment to form a combined wavelength light.

Clause 15

The optical waveguide structure according to clause 14, wherein a third phase shifter in the set of phase shifters located along a third tuning optical waveguide and a fourth phase shifter in the set of phase shifters located along the fourth tuning optical waveguide apply activations that produce a difference between a phase of the second wavelength light from the first segment and a phase of the second wavelength light from the second segment that equals zero or an even multiple of $2\pi$ radians at the combiner.

Clause 16

The optical waveguide structure according to one of clauses 9, 10, 11, 12, 13, 14, or 15, further comprising:

a source output coupler that couples the first wavelength light out of a final segment in the nonlinear optical waveguide.

Clause 17

The optical waveguide structure according to clause 16 further comprising:

a final phase shifter in the set of phase shifters located along the final segment.

Clause 18

The optical waveguide structure according to one of clauses 2, 3, 4, 5, 6, 7, 8, 9, 10, 11, 12, 13, 14, 15, 16, or 17, wherein the first wavelength light is a pump light and the second wavelength light is one of a signal light and an idler light.

Clause 19

The optical waveguide structure according to one of clauses 1, 2, 3, 4, 5, 6, 7, 8, 9, 10, 11, 12, 13, 14, 15, 16, 17, or 18, wherein the set of phase shifters is associated with the tuning optical waveguide being at least one of adjacent to part of the tuning optical waveguide, connected to part of the tuning optical waveguide, or integrated as part of the tuning optical waveguide.

Clause 20

The optical waveguide structure according to one of clauses 1, 2, 3, 4, 5, 6, 7, 8, 9, 10, 11, 12, 13, 14, 15, 16, 17, 18, or 19, wherein the set of phase shifters is selected from at least one of a tuning electrode, a thermal element, shape memory alloy element, or piezo electric element.

Clause 21

The optical waveguide structure according to one of clauses 1, 2, 3, 4, 5, 6, 7, 8, 9, 10, 11, 12, 13, 14, 15, 16, 17, 18, 19, or 20, wherein the tuning optical waveguide has a set of folds, wherein a pair of electrodes for a phase shifter in the set of phase shifters is present along a length of the tuning optical waveguide occurring after a fold in the set of folds such that the phase shifter and wherein the length is parallel to a crystal axis of an nonlinear optical material in which the optical waveguide structure and the set of tuning waveguides is formed.

Clause 22

The optical waveguide structure according to clause 21, wherein the nonlinear optical material is an x-cut lithium niobate and wherein the optical waveguide structure is formed on a yz plane and an x-axis of the nonlinear optical material is perpendicular to the yz plane of the optical waveguide structure and the set of tuning optical waveguides.

Clause 23

An optical waveguide structure comprising:

a nonlinear optical waveguide;

a tuning optical waveguide;

a set of wavelength selective couplers that couples light between the nonlinear optical waveguide and the tuning optical waveguide based on a wavelength of light; and a set of phase shifters located along the set of tuning optical waveguide.

Clause 24

The optical waveguide structure according to clause 23, wherein the nonlinear optical waveguide comprises segments alternating between odd index segments and even index segments, wherein a first wavelength light travels through the odd index segments and the even index segments and further comprising:

tuning optical waveguides including the tuning optical waveguide;

a first route through odd index segments and a first set of wavelength selective couplers that couples an odd index second wavelength light generated in the odd index segments from the odd index segments into a first set of tuning optical waveguides in the tuning optical waveguides and from the first set of tuning optical waveguides back into the odd index segments;

a second route though even index segments and a second set of wavelength selective couplers that couples an even index second wavelength light generated in the even index segments from the even index segments into a second set of tuning optical waveguides in the tuning optical waveguides and from the second set of tuning optical waveguides back into the even index segments;

phase shifters including the set of phase shifters, wherein a first set of phase shifters is associated with the first set of tuning optical waveguides and applies first activations to adjust a first phase of the odd index second wavelength light and a second set of phase shifters is associated with the second set of tuning optical waveguides and applies second activations to adjust a second phase of the even index second wavelength light; and a combiner, wherein the combiner receives the odd index second wavelength light from a first end of the first route, receives the even index second wavelength light from a second end of the second route and combines the odd index second wavelength light and the even index second wavelength light to form a second wavelength light.

Clause 25

The optical waveguide structure according to one of clauses 23 or 24, wherein the light comprises a first wavelength light and a second wavelength light produced from the first wavelength light through a nonlinear optical interaction occurring within the nonlinear optical waveguide; the optical waveguide structure further comprising:

a first wavelength selective coupler in the set of wavelength selective couplers that couples the second wavelength light from an exit location in the nonlinear optical waveguide to a starting point in the tuning optical waveguide;

a second wavelength selective coupler in the set of wavelength selective couplers that couples the second wavelength light from an ending point in the tuning optical waveguide an entry location in the nonlinear optical waveguide; and a phase shifter in the set of phase shifters located between the starting point and the ending point in the tuning optical waveguide, wherein the phase shifter applies an activation to the second wavelength light in the tuning optical waveguide to change a phase shift for the second wavelength light in the tuning optical waveguide.

Clause 26

A method for a nonlinear optical interaction, the method comprising:
coupling, by a wavelength selective coupler, a first wavelength light from a first segment in a nonlinear optical waveguide into a second segment in the nonlinear optical waveguide;

coupling, by the wavelength selective coupler, a second wavelength light from the first segment in the nonlinear optical waveguide into a tuning optical waveguide; and applying, by a phase shifter, an activation to the tuning optical waveguide to change a phase shift for the second wavelength light in the tuning optical waveguide.

Clause 27

The method according to clause 26, wherein the wavelength selective coupler is a first wavelength selective coupler and further comprising:
coupling by a second wavelength selective coupler, the first wavelength light from the second segment in the nonlinear optical waveguide into a third segment in the nonlinear optical waveguide; and coupling, by the second wavelength selective coupler, the second wavelength light from the tuning optical waveguide into the third segment in the nonlinear optical waveguide.

Clause 28

The method according to clause 27, wherein the change in the phase shift for the second wavelength light in the tuning optical waveguide modifies a phase walk-off for the nonlinear optical interaction in the nonlinear optical waveguide from an entry location where the first wavelength light is supplied to the first segment to an entry location in the third segment to have a value that is zero or an even multiple of π radians.

Clause 29

The method according to one of clauses 26, 27, or 28 further comprising:
coupling, by the wavelength selective coupler, the second wavelength light from the tuning optical waveguide into the second segment in the nonlinear optical waveguide, wherein the change in the phase shift for the second wavelength light in the tuning optical waveguide modifies a phase walk-off for the nonlinear optical interaction in the nonlinear optical waveguide from an entry location where the first wavelength light is supplied to the first segment to an entry location into the second segment to have a value that is zero or an even multiple of π radians.

Clause 30

The method according to one of clauses 26, 27, 28, or 29, wherein the tuning optical waveguide is a first tuning optical waveguide and the phase shifter is a first phase shifter and further comprising:
coupling, by a third wavelength selective coupler, the first wavelength light from the second segment in the nonlinear optical waveguide into a second tuning optical waveguide;

applying, by a second phase shifter, a second activation to the second tuning optical waveguide to change the phase shift for the second wavelength light in the second tuning optical waveguide;

coupling, by a fourth wavelength selective coupler, the first wavelength light from a third segment in the nonlinear optical waveguide into a fourth segment in the nonlinear optical waveguide; and coupling, by the fourth wavelength selective coupler, the second wavelength light from the second tuning optical waveguide into the fourth segment in the nonlinear optical waveguide, wherein the phase shift for the second wavelength light is changed by the second activation applied to the second tuning optical waveguide, wherein the change in the phase shift for the second wavelength light in the second tuning optical waveguide modifies a phase walk-off for the nonlinear optical interaction in the nonlinear optical waveguide from an entry location where the first wavelength light is supplied to the second segment to an entry location into the fourth segment to have a value that is zero or an even multiple of π radians.

Clause 31

The method according to one of clauses 27, 28, 29, or 30 further comprising:
coupling, by a combiner, the second wavelength light from a first tuning optical waveguide into an output segment in the nonlinear optical waveguide; and coupling, by the combiner, the second wavelength light from a second tuning optical waveguide into the output segment in the nonlinear optical waveguide.

Clause 32

The method according to one of clauses 30 or 31 further comprising:
coupling, by a combiner, the second wavelength light from the third segment in the nonlinear optical waveguide into an output segment in the nonlinear optical waveguide; and coupling, by the combiner, the second wavelength light from the fourth segment into the output segment in the nonlinear optical waveguide.

Clause 33

The method according to clause 32 further comprising:
applying, by a third phase shifter, a third activation to the second wavelength light in the third segment; and applying, by a fourth phase shifter, a fourth activation the second wavelength light in the fourth segment, wherein the third activation adjusts a phase of the second wavelength light in the third segment, wherein the fourth activation adjusts the phase of the second wavelength light in the fourth segment such that a difference between the phase of the second wavelength light in the third segment and a phase of the second wavelength light in the fourth segment is an even multiple of π radians where the second wavelength light in the third segment and second wavelength light in the third segment and the second wavelength light in the fourth segment are coupled by the combiner into the output segment. The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An optical waveguide structure comprising:
   a nonlinear optical waveguide;
   a set of tuning optical waveguides;
   a set of wavelength selective couplers that couples light between the nonlinear optical waveguide and a tuning optical waveguide based on a wavelength of light; and
   a set of phase shifters located along one or more tuning optical waveguides in the set of tuning optical waveguides;
   wherein the light comprises a first wavelength light and a second wavelength light produced from the first wavelength light through a nonlinear optical interaction occurring within the nonlinear optical waveguide; the optical waveguide structure further comprising:
   a first segment in the nonlinear optical waveguide;
   a second segment in the nonlinear optical waveguide;
   a wavelength selective coupler in the set of wavelength selective couplers that couples the first wavelength light from the first segment into the second segment, wherein the wavelength selective coupler couples the second wavelength light from the first segment into the tuning optical waveguide; and
   a phase shifter in the set of phase shifters that applies an activation to the tuning optical waveguide to change a phase shift for the second wavelength light in the tuning optical waveguide.

2. The optical waveguide structure of claim 1, wherein the second wavelength light in the tuning optical waveguide is coupled from the tuning optical waveguide to the second segment by the wavelength selective coupler.

3. The optical waveguide structure of claim 2, wherein the phase shifter in the set of phase shifters applies the activation to the tuning optical waveguide to change the phase shift for the second wavelength light in the tuning optical waveguide such that a phase walk-off for the nonlinear optical interaction in the nonlinear optical waveguide from a starting point where the first wavelength light is supplied to the first segment to a junction between the wavelength selective coupler and the second segment is zero or an even multiple of $\pi$ radians.

4. The optical waveguide structure of claim 1, wherein the wavelength selective coupler is a first wavelength selective coupler and the optical waveguide structure further comprises:
   a third segment in the nonlinear optical waveguide; and
   a second wavelength selective coupler in the set of wavelength selective couplers, wherein the second wavelength selective coupler in the set of wavelength selective couplers couples the first wavelength light from the second segment into the third segment.

5. The optical waveguide structure of claim 4, wherein the second wavelength light in the tuning optical waveguide is coupled from the tuning optical waveguide to the third segment by the second wavelength selective coupler.

6. The optical waveguide structure of claim 5, wherein the phase shifter in the set of phase shifters applies the activation to the tuning optical waveguide to change the phase shift for the second wavelength light in the tuning optical waveguide such that a phase walk-off for the nonlinear optical interaction in the nonlinear optical waveguide from a starting point where the first wavelength light is supplied to the first segment to a junction between the second wavelength selective coupler and the third segment is zero or an even multiple of $\pi$ radians.

7. The optical waveguide structure of claim 4, wherein the tuning optical waveguide is a first tuning optical waveguide and the phase shifter in the set of phase shifters is a first phase shifter; the optical waveguide structure further comprising:
   a second tuning optical waveguide;
   a second phase shifter in the set of phase shifters located along the second tuning optical waveguide; and
   a third wavelength selective coupler in the set of wavelength selective couplers that couples the first wavelength light from the second segment into the third segment and couples the second wavelength light from the second segment into the second tuning optical waveguide.

8. The optical waveguide structure of claim 7 further comprising:
   a fourth segment in the nonlinear optical waveguide; and
   a fourth wavelength selective coupler in the set of wavelength selective couplers that couples the second wavelength light from the second tuning optical waveguide into the fourth segment, wherein the fourth wavelength selective coupler couples the first wavelength light from the third segment into the fourth segment.

9. The optical waveguide structure of claim 8, wherein the second phase shifter applies an activation to the second tuning optical waveguide to change a phase shift for the second wavelength light in the second tuning optical waveguide such that a phase walk-off for the nonlinear optical interaction in the nonlinear optical waveguide from a first junction between the first wavelength selective coupler and the second segment to a second junction between the fourth wavelength selective coupler and the fourth segment is zero or an even multiple of $\pi$ radians.

10. The optical waveguide structure of claim 8 further comprising:
    a third tuning optical waveguide;
    a fifth wavelength selective coupler in the set of wavelength selective couplers that couples the second wavelength light from the third segment into the third tuning optical waveguide and couples the first wavelength light from the third segment into the fourth segment; and a sixth wavelength selective coupler in the set of wavelength selective couplers that couples the second wavelength light from the third tuning optical waveguide into a fifth segment and couples the first wavelength light from the fourth segment into the fifth segment.

11. The optical waveguide structure of claim 10, further comprising:
a third phase shifter in the set of phase shifters located along the third tuning optical waveguide, wherein the third phase shifter applies an activation to the third tuning optical waveguide to change a phase shift for the second wavelength light in the third tuning optical waveguide such that a phase walk-off for the nonlinear optical interaction in the nonlinear optical waveguide from a third junction between the second wavelength selective coupler and the third segment to a fourth junction between the sixth wavelength selective coupler and the fifth segment is zero or an even multiple of $\pi$ radians.

12. The optical waveguide structure of claim 8 further comprising:
a combiner that combines the second wavelength light from the first segment and the second wavelength light from the second segment to form a combined second wavelength light.

13. The optical waveguide structure of claim 12, wherein a third phase shifter in the set of phase shifters located along a third tuning optical waveguide and a fourth phase shifter in the set of phase shifters located along a fourth tuning optical waveguide apply activations that produce a difference between a phase of the second wavelength light from the first segment and a phase of the second wavelength light from the second segment that equals zero or an even multiple of $2\pi$ radians at the combiner.

14. The optical waveguide structure of claim 8, further comprising:
a source output coupler that couples the first wavelength light out of a final segment in the nonlinear optical waveguide.

15. The optical waveguide structure of claim 14 further comprising:
a final phase shifter in the set of phase shifters located along the final segment.

16. The optical waveguide structure of claim 1 further comprising:
a phase shifter located along a segment in the nonlinear optical waveguide,
wherein the phase shifter located along the segment in the nonlinear optical waveguide applies an activation to the segment to change a phase shift for the first wavelength light in the segment,
and wherein the phase shift for the first wavelength light in the segment resulting from the activation applied to the segment has an opposite sign from the phase shift for the second wavelength light resulting from the activation applied to the tuning optical waveguide.

17. The optical waveguide structure of claim 1, wherein the first wavelength light is a pump light and the second wavelength light is one of a signal light and an idler light.

18. The optical waveguide structure of claim 1, wherein the set of phase shifters is associated with the tuning optical waveguide being at least one of adjacent to part of the tuning optical waveguide, connected to part of the tuning optical waveguide, or integrated as part of the tuning optical waveguide.

19. The optical waveguide structure of claim 1, wherein the set of phase shifters is selected from at least one of a tuning electrode, a thermal element, shape memory alloy element, or piezo electric element.

20. The optical waveguide structure of claim 1, wherein the nonlinear optical material is an x-cut lithium niobate and wherein the optical waveguide structure is formed on a yz plane and an x-axis of the nonlinear optical material is perpendicular to the yz plane of the optical waveguide structure and the set of tuning optical waveguides.

21. An optical waveguide structure comprising:
a nonlinear optical waveguide;
a tuning optical waveguide;
a set of wavelength selective couplers that couples light between the nonlinear optical waveguide and the tuning optical waveguide based on a wavelength of light; and
a set of phase shifters located along the tuning optical waveguide;
wherein the nonlinear optical waveguide comprises segments alternating between odd index segments and even index segments, wherein a first wavelength light travels through the odd index segments and the even index segments and further comprising:
tuning optical waveguides including the tuning optical waveguide;
a first route through odd index segments and a first set of wavelength selective couplers that couples an odd index second wavelength light generated in the odd index segments from the odd index segments into a first set of tuning optical waveguides in the tuning optical waveguides and from the first set of tuning optical waveguides back into the odd index segments;
a second route though even index segments and a second set of wavelength selective couplers that couples an even index second wavelength light generated in the even index segments from the even index segments into a second set of tuning optical waveguides in the tuning optical waveguides and from the second set of tuning optical waveguides back into the even index segments;
phase shifters including the set of phase shifters, wherein a first set of phase shifters is associated with the first set of tuning optical waveguides and applies first activations to adjust a first phase of the odd index second wavelength light and a second set of phase shifters is associated with the second set of tuning optical waveguides and applies second activations to adjust a second phase of the even index second wavelength light; and
a combiner, wherein the combiner receives the odd index second wavelength light from a first end of the first route, receives the even index second wavelength light from a second end of the second route and combines the odd index second wavelength light and the even index second wavelength light to form a combined second wavelength light.

22. The optical waveguide structure of claim 21, wherein the light comprises a first wavelength light and a second wavelength light produced from the first wavelength light through a nonlinear optical interaction occurring within the nonlinear optical waveguide; the optical waveguide structure further comprising:
a first wavelength selective coupler in the set of wavelength selective couplers that couples the second wavelength light from an exit location in the nonlinear optical waveguide to a starting point in the tuning optical waveguide;

a second wavelength selective coupler in the set of wavelength selective couplers that couples the second wavelength light from an ending point in the tuning optical waveguide an entry location in the nonlinear optical waveguide; and a phase shifter in the set of phase shifters located between the starting point and the ending point in the tuning optical waveguide, wherein the phase shifter applies an activation to the second wavelength light in the tuning optical waveguide to change a phase shift for the second wavelength light in the tuning optical waveguide.

* * * * *

UNITED STATES PATENT AND TRADEMARK OFFICE
CERTIFICATE OF CORRECTION

| | | |
|---|---|---|
| PATENT NO. | : 12,399,416 B2 | Page 1 of 1 |
| APPLICATION NO. | : 18/059605 | |
| DATED | : August 26, 2025 | |
| INVENTOR(S) | : Daniel Yap, Thaddeus Ladd and Brett Yurash | |

It is certified that error appears in the above-identified patent and that said Letters Patent is hereby corrected as shown below:

In the Claims

Column 128, Line 3, Claim 3, correct "of a radians." to read -- of π radians. --

Signed and Sealed this
Thirtieth Day of September, 2025

John A. Squires
*Director of the United States Patent and Trademark Office*